US010831452B1

(12) United States Patent
Hunter

(10) Patent No.: US 10,831,452 B1
(45) Date of Patent: Nov. 10, 2020

(54) MODIFICATION OF IN-EXECUTION SMART CONTRACT PROGRAMS

(71) Applicant: Digital Asset Capital, Inc., Gaithersburg, MD (US)

(72) Inventor: Edward Hunter, Gaithersburg, MD (US)

(73) Assignee: Digital Asset Capital, Inc., Gatithersburg, MD (US)

( * ) Notice: Subject to any disclaimer, the term of this patent is extended or adjusted under 35 U.S.C. 154(b) by 0 days.

(21) Appl. No.: 16/893,295

(22) Filed: Jun. 4, 2020

Related U.S. Application Data

(60) Provisional application No. 62/897,240, filed on Sep. 6, 2019, provisional application No. 62/959,377, filed on Jan. 10, 2020, provisional application No. 62/959,418, filed on Jan. 10, 2020, provisional application No. 62/959,481, filed on Jan. 10, 2020, provisional application No. 63/020,808, filed on May 6, 2020, provisional application No. 63/033,063, filed (Continued)

(51) Int. Cl.
*G06F 8/33* (2018.01)
*G06F 8/65* (2018.01)

(52) U.S. Cl.
CPC ............. *G06F 8/33* (2013.01); *G06F 8/65* (2013.01); *H04L 2209/38* (2013.01)

(58) Field of Classification Search
CPC ...................................... G06F 8/33; G06F 8/65
See application file for complete search history.

(56) References Cited

U.S. PATENT DOCUMENTS

| 10,594,477 | B2 * | 3/2020 | Shao | G06Q 10/10 |
| 2019/0253239 | A1 * | 8/2019 | Shao | G06Q 50/188 |
| 2019/0370799 | A1 * | 12/2019 | Vivas | H04L 9/0643 |

(Continued)

FOREIGN PATENT DOCUMENTS

WO  WO-2020035871 A1 * 2/2020 ............. G06Q 40/12

OTHER PUBLICATIONS

Weingärtner, T. et al., Smart Contracts Using Blockly: Representing a Purchase Agreement Using a Graphical Programming Language, 2018 Crypto Valley Conference on Blockchain Technology (CVCBT), Jun. 20-22, 2018, pp. 55-64, [retrieved on Jul. 30, 2020], Retrieved from the Internet.*

(Continued)

*Primary Examiner* — Geoffrey R St Leger
(74) *Attorney, Agent, or Firm* — Pillsbury Winthrop Shaw Pittman LLP

(57) ABSTRACT

A method includes obtaining a program state encoding a directed graph, the directed graph comprising a set of norm vertices and directed graph edges. The method also includes obtaining an amendment request encoding a set of conditional statement parameters and determining a set of active norm vertices in the directed graph. The method also includes selecting a set of target norm vertices of the set of active norm vertices based on the set of conditional statement parameters and determining a set of selected entities based on the set of target norm vertices. The method also includes determining whether a set of criteria associated with the set of selected entities is satisfied and updating the set of conditional statement parameters and entities based on the set of conditional statements in response to a determination that the set of criteria is satisfied.

22 Claims, 26 Drawing Sheets

Related U.S. Application Data on Jun. 1, 2020, provisional application No. 63/034,255, filed on Jun. 3, 2020.

(56) References Cited

U.S. PATENT DOCUMENTS

| | | | |
|---|---|---|---|
| 2020/0201843 A1* | 6/2020 | Irazabal | G06F 16/2379 |
| 2020/0235947 A1* | 7/2020 | Baykaner | H04L 9/0816 |

OTHER PUBLICATIONS

Mao, D. et al., Visual and User-Defined Smart Contract Designing System Based on Automatic Coding, IEEE Access (vol. 7), Jun. 4, 2019, pp. 73131-73143, [retrieved on Jul. 30, 2020], Retrieved from the Internet.*

Härer, F., et al., A Comparison of Approaches for Visualizing Blockchains and Smart Contracts, Jusletter IT Weblaw, Feb. 21, 2019, 8 pages, [retrieved on Jul. 30, 2020], Retrieved from the Internet.*

Levi, S. D. et al., An Introduction to Smart Contracts and Their Potential and Inherent Limitations, Harvard Law School Forum on Corporate Governance, May 26, 2018, 10 pages, [retrieved on Jul. 31, 2020], Retrieved from the Internet.*

Guida, L., et al., Supporting Reuse of Smart Contracts through Service Orientation and Assisted Development, 2019 IEEE International Conference on Decentralized Applications and Infrastructures (DAPPCON), Apr. 4-9, 2019, 10 pages, [retrieved on Jul. 30, 2020], Retrieved from the Internet.*

* cited by examiner

MODIFICATION OF IN-EXECUTION SMART CONTRACT PROGRAMS

CROSS-REFERENCE TO RELATED APPLICATIONS

This patent claims the benefit of U.S. Provisional Patent Application 62/897,240, filed 6 Sep. 2019, titled "SMART DEONTIC DATA SYSTEMS." This patent also claims the benefit of U.S. Provisional Patent Application 62/959,377, filed 10 Jan. 2020, titled "SMART DEONTIC MODEL AND SYSTEMS." This patent also claims the benefit of U.S. Provisional Patent Application 62/959,418, filed 10 Jan. 2020, titled "GRAPH-MANIPULATION BASED DOMAIN-SPECIFIC ENVIRONMENT." This patent also claims the benefit of U.S. Provisional Patent Application 62/959,481, filed 10 Jan. 2020, titled "GRAPH OUTCOME DETERMINATION IN DOMAIN-SPECIFIC EXECUTION ENVIRONMENT." This patent also claims the benefit of U.S. Provisional Patent Application 63/020,808, filed 6 May 2020, titled "COUNTERPARTY SCENARIO MODELING." This patent also claims the benefit of U.S. Provisional Patent Application 63/033,063, filed 1 Jun. 2020, titled "MODIFICATION OF IN-EXECUTION SMART CONTRACT PROGRAMS." This patent also claims the benefit of U.S. provisional patent application 63/034,255, filed 3 Jun. 2020, titled "SEMANTIC CONTRACT MAPS." The entirety content of each aforementioned patent filing is hereby incorporated by reference.

BACKGROUND

1. Field

This disclosure relates generally to computer systems and, more particularly, to graph-manipulation based domain-specific execution environments.

2. Background

Distributed applications operating on a distributed computing platform may be useful in a variety of contexts. Such applications can store program state data on a tamper-evident ledger operating on the distributed computing platform. Use of a tamper-evident ledger or some other data systems distributed over multiple computing devices may increase the security and reliability of distributed applications.

SUMMARY

The following is a non-exhaustive listing of some aspects of the present techniques. These and other aspects are described in the following disclosure.

Some aspects include a process that includes obtaining, with a computing system, program state of a smart contract, wherein the program state encodes a directed graph, the directed graph comprising: a set of vertices, and a set of directed edges connecting respective pairs of vertices among the set of vertices, a wherein the program state includes a set of conditional statements and a set of entities; obtaining, with the computing system, a request encoding a set of conditional statement parameters corresponding to an amendment to the smart contract; determining, with the computing system, a first subset of vertices in the directed graph, wherein each respective vertex of the first subset causes a state change of the program state in response to a respective conditional statement associated with the respective vertex being satisfied; selecting, with the computing system, a second subset of the first subset based on the set of conditional statement parameters encoded in the request; determining, with the computing system, a set of selected entities based on the second subset; determining, with the computing system, whether a set of criteria associated with the set of selected entities is satisfied; updating, with the computing system, the set of conditional statement parameters based on the set of conditional statements in response to a determination that the set of criteria associated with the set of selected entities is satisfied; updating, with the computing system, the second subset based on the updated set of conditional statements; and storing, with the computing system, the program state in storage memory after updating the second subset.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
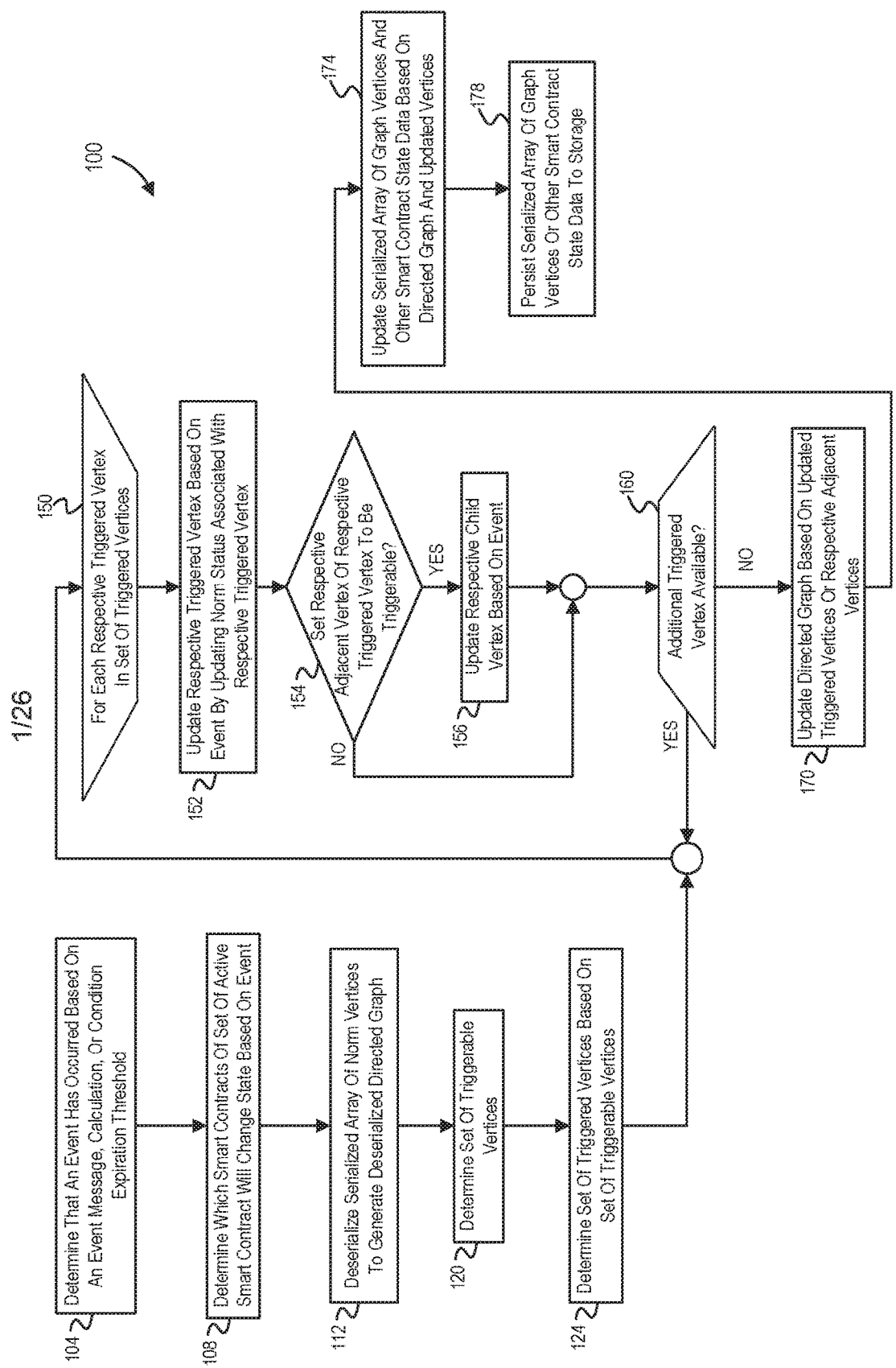
FIG. 1 is a flowchart of an example of a process by which program state data of a program may be deserialized into a directed graph, updated based on an event, and re-serialized, in accordance with some embodiments of the present techniques.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of language processing. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Technology-based self-executing protocols, such as smart contracts and other programs, allow devices, sensors, and program code have seen increased use in recent years. However, some smart contracts and contract information models often rely on program instructions or industry-specific data structures, which may be difficult to generalize, use for comparison analysis, or reuse in similar contexts due to minor differences in contract details. As a result, uses of smart contracts has not extended into areas that are often the domain of natural language documents. Described herein is a process and related system to construct, interpret, enforce, analyze, and reuse terms for a smart contract in a systematic and unambiguous way across a broad range of applicable fields. In contrast, contracts encoded in natural language text often rely on social, financial, and judicial systems to provide the resources and mechanisms to construct, interpret, and enforce terms in the contracts. As contract terms increase in number or a situation within which the contract was formed evolves, such a reliance may lead to a lack of enforcement, ambiguity, and wasted resources spent on the re-interpretation or enforcement of contract terms.

Some embodiments may include smart contracts (or other programs) that include or are otherwise associated with a directed graph representing a state of the smart contract. In some embodiments, vertices of the graph may be associated with (e.g., encode, or otherwise represent) norms (e.g., as norm objects described below) of the smart contract, like formal language statements with a truth condition paired with a conditional statement that branches program flow (and changes norm state) responsive to the whether the truth condition is satisfied, for instance, "return a null response if and only if an API request includes a reserved character in a data field." In some embodiments, norms of a smart contract may represent terms of a contract being represented by the smart contract, legal conditions of the contract, or other verifiable statements. As used herein, a smart contract may be a self-executing protocol executable as an application or portion of an application on a distributed computing platform, centralized computing system, or single computing device. Furthermore, as used herein, a graph may be referred to as a same graph after the graph is manipulated. For example, if a graph being referred to as a "first graph" is represented by the serialized array [[1,2], [2,3], [3,4]] is modified to include the extra vertex and graph edge "[1,5]" and become the modified graph represented by the serialized array "[[1,2], [2,3], [3,4], [1,5]]," the term "first graph" may be used to refer to the modified graph.

A self-executing protocol may be a program, like a smart contract. Self-executing protocols may execute responsive to external events, which may include outputs of third-party programs, and human input via a user interface. A self-executing protocol may execute on a computing substrate that involves human intervention to operate, like turning on a computer and launching an event listener.

A norm of a smart contract may be encoded in various formal languages (like programming languages, such as data structures encoding statements in a domain-specific programming language) and may include or otherwise be associated with one or more conditional statements, a set of norm conditions of the one or more conditional statements, a set of outcome subroutines of the one or more conditional statements, a norm status, and a set of consequent norms. In some embodiments, satisfying a norm condition may change a norm status and lead to the creation or activation of the consequent norms based on the actions performed by the system when executing the outcome subroutines corresponding to the satisfied norm condition. In some embodiments, a norm may be triggered (i.e. "activated") when an associated norm condition is satisfied by an event, as further described below. Alternatively, some types of norms may be triggered when a norm condition is not satisfied before a condition expiration threshold is satisfied. As used herein, a triggerable norm (i.e. "active norm") is a norm having associated norm conditions may be satisfied by an event. In contrast, a norm that is set as not triggerable (i.e. "inactive") is a norm is not updated even if its corresponding norm conditions are satisfied. As used herein, deactivating a norm may include setting the norm to not be triggerable.

A smart contract and its norms may incorporate elements of a deontic logic model. A deontic logic model may include a categorization of each of the norms into one of a set of deontic primitive logical categories. A deontic primitive logical category ("logical category") may include a label such as "right," "obligation," or "prohibition." The logical category may indicate a behavior of the norm when the norm is triggered. In addition, a norm of the smart contract may have an associated norm status such as "true," "false," or "unrealized," where an event may trigger a triggerable norm by satisfying a norm condition (and thus "realizing" the norm). These events may be collected into a knowledge list. The knowledge list may include an associative array of norms, their associated states, an initial norm status during the initial instantiation of the associated smart contract, their norm observation times (e.g., when a norm status was changed, when an event message was received, or the like), or other information associated with the norms. The smart contract may also include a set of consequent actions, where a consequent action may include an association between a triggered norm and any respective consequent norms of the smart contract. As further discussed below, the set of consequent actions may be updated as events occur and the smart contract state is updated, which may result in the formation of a history of previous consequent actions. It should be understood that the term "norm" is used for illustrative purposes and that this term may have different names in other references and contexts. The labeling of norms may also be used for symbolic artificial intelligence (AI) systems. As described further below, the use of these symbolic AI systems in the context of a smart contract may allow for sophisticated verification and predictive techniques that may be impractical for pure neural network systems which do not use symbolic AI systems. It should be understood that, while the term "logical category" is used in some embodiments, other the terms may be used for categories or types of categories without loss of generality. For example, some embodiments may refer to the use of a "category label" instead of a logical category.

Some embodiments may store a portion of the smart contract state in a data serialization format ("serialized smart contract state data"). For example, as further described below, some embodiments may store a vertices of a directed graph (or both vertices and edges) in a data serialization format. In response to determining that an event has occurred, some embodiments may deserialize the serialized smart contract state data into a deserialized directed graph. In some embodiments, a vertex (a term used interchangeably with the term node) of the directed graph may be associated with a norm from a set of norms of the smart contract and is described herein as a "norm vertex," among other terms, where a norm vertex may be connected one or more other norm vertices via graph edges of the directed graph. Some embodiments may then update the directed graph based on a set of consequent norms and their associated consequent norm vertices, where each of the consequent norms are determined based on which norms were triggered by the event and what norm conditions are associated with those active norms. The updated directed graph may then be reserialized to update the smart contract. In some embodiments, a norm vertex may not have any associated conditions. In some embodiments, the amount of memory used to store the serialized smart contract state data may be significantly less than the memory used by deserialized smart contract state data. During or after the operation to update the smart contract, some embodiments may send a message to entities listed in a list of entities (such as an associative array of entities) to inform the entities that the smart contract has been updated, where the smart contract includes or is otherwise associated with the list of entities. Furthermore, it should be understood in this disclosure that a vertex may include (or comprise) a condition by being associated with the condition. For example, a norm vertex may include a first norm condition by including a reference pointer to the first norm condition.

In some embodiments, generating the smart contract may include using an integrated development environment (IDE) and may include importing libraries of provisions re-used across agreements. Furthermore, some embodiments may generate a smart contract based on the use of natural language processing (NLP), as further described below. For example, some embodiments may apply NLP operations to convert an existing prose document into a smart contract using operations similar to those described for patent application 63/034,255, titled "Semantic Contract Maps," which is herein incorporated by reference. For example, some embodiments may apply a set of linear combinations of feature observations and cross observations across first order and second orders in feature space to determine a smart contract program or other symbolic AI program. Alternatively, or in addition, some embodiments may include constructing a smart contract from a user interface or text editor without using an existing prose document. In some embodiments, the smart contract may be encoded in various forms, such as source code, bytecode, or machine code encodings. In some embodiments, a smart code may be generated or modified in one type of encoding and be converted to another type of encoding before the smart code is used. For example, a smart contract may be edited in a source code encoding, and the smart contract may be executed by converting the smart contract into a bytecode encoding executing on a distributed computing platform. As used herein, a smart contract may be referred to as a same smart contract between different encodings of the smart contract. For example, a smart contract may be written in source code and then converted to a machine code encoding, may be referred to as a same smart contract.

Furthermore, as used herein, the sets of items of a smart contract data model may be encoded in various formats. A set of items be encoded in an associative array, a b-tree, a R-tree, a stack, or various other types of data structures. As used herein, the sets of items in the data model may be determined based on their relationships with each other. For example, a set of entities may be encoded as an associative array of entities or may be encoded as an entities b-tree, and elements of a knowledge list may include references to an entity in the set of entities for either type of encoding. In some embodiments, sets of items in their respective data models may be based on the underlying relationships and references between the items in the sets of items, and embodiments should not be construed as limited to specific encoding formats. For example, while some embodiments may refer to an associative array of norms, it should be understood that other embodiments may use a b-tree to represent some or all of the set of norms.

A smart contract may be stored on different levels of a memory hierarchy. A memory hierarchy of may include (in order of fastest to slowest with respect to memory access speed) processor registers, Level 0 micro operations cache, Level 1 instructions cache, Level 2 shared cache, Level 3 shared cache, Level 4 shared cache, random access memory (RAM), a persistent flash memory, hard drives, and magnetic tapes. For example, a Level 1 cache of a computing device may be faster than a RAM of the computing device, which in turn may be faster than a persistent flash memory of the computing device. In some embodiments, the memory of a computing device at a first layer of the memory hierarchy may have a lower memory capacity than a memory of the computing device at a slower layer of the memory hierarchy. For example, a Level 0 cache may memory capacity of 6 kibibytes (KiB), whereas a Level 4 cache may have a memory capacity of 128 mebibytes (MiB). In some embodiments, memory may be further distinguished between persistent storage and non-persistent storage (i.e. "non-persistent memory"), where persistent storage is computer memory that may retain the values stored in it without an active power source. For example, persistent storage may include persistent flash memory, hard drives, or magnetic tape, and non-persistent memory may include processor registers, cache memory, or dynamic RAM. In some embodiments, a smart contract may be stored on memory at different levels of the memory hierarchy to increase storage efficiency of the smart contract. For example, serialized smart contract state data of the smart contract may be stored on RAM of a computing device while the deserialized smart contract state data may be stored on a cache of the computing device.

In some embodiments, the smart contract may update infrequently, such as less than once per hour, less than once day, less than once per month, or the like. The relative infrequency of the updates can mean that the relative computing resources required to deserialize and reserialize data be significantly less than the computing resources required to maintain deserialized data in higher-speed memory. In some embodiments, the dynamic program state By serializing a portion of the smart contract data and persisting the serialized data instead of the corresponding deserialized data to a persistent storage, a computing system may use reduce the memory requirements of storing and executing the smart contract. In addition, the computing system may also increase the number of smart contracts being executed concurrently by a distributed computing platform or single computing device. Furthermore, as used herein, updating a value may include changing the value or generating the value.

As described herein, some embodiments may store smart contract data in other forms. For example, while some embodiments may temporarily store a directed graph in non-persistent storage, some embodiments may store the directed graph on a persistent storage. In some embodiments, various other types of information such as norm statuses (e.g. "triggered," "failed," "satisfied," etc.) or logical categories (e.g. "rights," "obligation," "prohibition," etc.) may be included in or otherwise associated with some or all of the vertices of the directed graph. Furthermore, some embodiments may generate visual display representing of the program state data to show the directed graph and its associated statuses, categories, or other information. For example, as further described below, some embodiments may display the directed graph as a hierarchical visual element such as a hierarchy tree in a web application.

A smart contract may be implemented in various ways. For example, some embodiments may construct, enforce, or terminate the smart contract using a distributed ledger or distributed computing system. Alternatively, some embodiments may implement the smart contract using a request-response system over a public or private internet protocol (IP) network. Use of the methods described herein may increase the efficiency of smart contract enforcement by advancing the state of complex multi-entity agreements in a fast and unambiguous way. Furthermore, implementing and using smart contracts with the embodiments described herein may allow for the comparison, quantification, and reuse of smart contracts in a way that would be inapplicable to custom-coded smart contracts.

In some embodiments, the smart contract may be stored in a tamper-evident data-store. As discussed below, tamper-evident data stores (e.g., repositories rendering data tamper-evident with one or more tamper-evident data structures) afford desirable properties, including making it relatively easy to detect tampering with entries in the data store and making it relatively difficult or impossible to tailor entries to avoid such detection. Furthermore, various smart contracts may be operating across one or more nodes of the tamper-evident data store, reducing the susceptibility of the smart contract to regional disturbances.

None of the preceding should be taken to suggest that any technique is disclaimed or that the approaches described herein may not be used in conjunction with other approaches having these or other described disadvantages, for instance, some embodiments may use a custom-written smart-contract that includes one or more of the norms, data structures, or graphs described herein. Or some embodiments may store a directed graph without serialization or deserialization operations. Or some embodiments may be implemented on a centralized server without storing smart contract state data on a distributed computing system such as a decentralized computing system. Further, it should be emphasized that the data structures, concepts, and instructions described herein may bear labels different from those applied here in program code, e.g., a data structure need not be labeled as a "node" or a "graph" in program code to qualify as such, provided that the essential characteristics of such items are embodied.

In some embodiments, the process 100 of FIG. 1, like the other processes and functionality described herein, may be implemented as computer code stored on a tangible, non-transitory, machine-readable medium, such that when instructions of the code are executed by one or more processors, the described functionality may be effectuated. Instructions may be distributed on multiple physical instances of memory, e.g., in different computing devices, or in a single device or a single physical instance of memory (e.g., non-persistent memory or persistent storage), all consistent with use of the singular term "medium." In some embodiments, the operations may be executed in a different order from that described, some operations may be executed multiple times per instance of the process's execution, some operations may be omitted, additional operations may be added, some operations may be executed concurrently and other operations may be executed serially, none of which is to suggest that any other feature described herein is not also amenable to variation.

FIG. 1 is a flowchart of an example of a process by which program state data of a program may be deserialized into a directed graph, updated based on an event, and re-serialized, in accordance with some embodiments of the present techniques. In some embodiments, the process 100, like the other processes and functionality described herein, may be implemented by a system that includes computer code stored on a tangible, non-transitory, machine-readable medium, such that when instructions of the code are executed by one or more processors, the described functionality may be effectuated. Instructions may be distributed on multiple physical instances of memory, e.g., in different computing devices, or in a single device or a single physical instance of memory, all consistent with use of the singular term "medium." In some embodiments, the operations may be executed in a different order from that described. For example, while the process 100 is described as performing the operations of block 112 before block 124, the operations of block 124 may be performed before the operations of block 112. Some operations may be executed multiple times per instance of the process's execution, some operations may be omitted, additional operations may be added, some operations may be executed concurrently and other operations may be executed serially, none of which is to suggest that any other feature described herein is not also amenable to variation.

In some embodiments, the process 100 includes determining that an event has occurred based on an event message, a calculation, or a condition expiration threshold, as indicated by block 104. In some embodiments, the system may determine that an event has occurred after receiving an event message at an API of the system indicating that the event has occurred. As used herein, an event message may be transmitted across or more packets over a wired or wireless connection, where a system may continuously, periodically, or be activated to listen for an event message. In some embodiments, as described further below, an event message may be transmitted over a public or private IP network. Alternatively, or in addition, the event message may be transmitted via the channels of a distributed computing system. For example, the event message may be transmitted from a first node of a distributed computing system (e.g., a blockchain platform) to a second node of the distributed computing system, where the first node and second node may be at different geographic locations (e.g., different nodes executing on different computing devices) or share a same geographic location (e.g., different nodes executing on a same computing device). Furthermore, an event message may be sent by a first smart contract executing on a first computing distributed platform to a second smart contract executing on a same or different distributed computing platform. In some embodiments, determining than event has occurred does not require verification that the event has occurred. For example, in some embodiments, receiving an event message indicating an event has occurred may be sufficient for the system to determine that the event occurred. Furthermore, in some embodiments, a norm vertex may be triggered based on an event satisfying a subset of its associated norm conditions. Alternatively, a norm vertex may be triggered only after an event satisfies all of its associated norm conditions.

In some embodiments, the event may include satisfying a condition expiration threshold associated with a triggerable norm vertex (herein "triggerable vertex") without satisfying a norm condition associated with the triggerable vertex, where a norm condition may be various types of conditions implemented in a computer-readable form to return a value (e.g., "True," "False," set of multiple binary values, or the like). For example, a norm condition may include an "if" statement to test whether a payload containing a set of values was delivered to an API of the system by a specific date, where a condition expiration threshold is associated with the norm condition. After the specific date is reached, the system may determine that the condition expiration threshold is satisfied and determine whether the associated norm condition is satisfied. In response to a determination that the norm condition is not satisfied, the system may determine that an event has occurred, where the event indicates that a condition expiration threshold associated with a triggered norm vertex (herein "triggered vertex") is satisfied and that an associated norm condition of the triggered vertex is not satisfied. As further stated below, such an event may trigger the associated norm vertex and result in the activation of a set of norms, where the activation of the set of norms may be represented by the generation or association of an adjacent vertex to the triggered vertex, where the adjacent vertex may be updated to be triggerable. As used in this disclosure, it should be understood that satisfying the condition expiration threshold of a triggerable vertex does satisfy a condition associated with the triggerable vertex.

In some embodiments, the event message may include a publisher identifier to characterize a publisher of the event message. As used herein, a publisher may be an entity and may include various sources of an event message. For example, a publisher may include a publisher in a publisher-subscriber messaging model or a sender of a response or request in a response-request messaging model. In some embodiments, the publisher identifier may be an entity identifier that is a specific name unique to a source of the event message. For example, a publisher identified by the publisher identifier "BLMBRG" may be transmitted in the event message, where "BLMBRG" is unique to a single publisher. Alternatively, or in addition, a publisher identifier may include or be otherwise associated with an identifier corresponding to an entity type that may be assigned to one or more sources of event messages. For example, the publisher identifier may include or otherwise be associated with an entity type such as "TRUSTED-VENDOR," "ADMIN", or the like.

After receiving a publisher identifier, the system may determine whether the publisher identifier is associated with one of a set of authorized publishers with respect to the event indicated by the event message. In some embodiments, the system may refer to a set of authorized publishers corresponding to the event indicated by the event message. For example, the event message may indicate that an event associated with the event message "PAY DELIVERED" has occurred. In in response, the system may determine that the event satisfies an condition threshold, where satisfying the condition threshold may include a determination that the event satisfies one or more norm conditions in an associative array of conditions and that the associated publisher is authorized to deliver the message. The associative array of conditions may include a list of norm conditions that, if satisfied, may result in triggering at least one triggerable vertex of the smart contract. For example, the system may determine that the event "PAY DELIVERED" is a direct match with the norm condition "if(PAY DELIVERED)" of the associative array of conditions. In some embodiments, the system may then refer to the set of authorized publishers associated with the event "PAY DELIVERED." The system may then determine whether the publisher identifier is in the set of authorized publishers or otherwise associated with the set of authorized publishers, such as by having an entity type representing the set of authorized publishers. In some embodiments, if the system determines that the event message is not authorized, the event message may be rejected as not authorized.

In some embodiments, the operation to authorize the event may include a operations represented by Statement 1 or Statement 2 below, where "prop" may be a string value including an event and "pub" may be a string value representing a publisher identifier or entity type. In some embodiments, Statement 1 below may represent an authorization operation that includes the arrival of an event E[pub] from publisher pub. The system may then compare the publisher "P[E[pub]]" of the event "E[pub]" with each of a set of authorized publishers "D[E[prop]][pub]", where each of the set of authorized publishers is authorized to publish the event "E[prop]". In some embodiments, the set of entities may include or otherwise be associated with the set of authorized publishers. Statement 2 may represent the situation which a plurality of entities may publish a valid event and the systems authorizes a message based on the entity type "P[E[pub]][role]" being in the set of authorized publishers "D[E[prop]][pub]," where the set of authorized publishers "D[E[prop]][pub]" may include authorized publisher type:

$$D[E[\text{prop}]][pub]==P[E[pub]] \tag{1}$$

$$D[E[\text{prop}]][pub]==P[E[pub]][\text{role}] \tag{2}$$

In some embodiments, the set of authorized publishers may include a set of publisher identifiers, and the publisher identifier may in the set of publisher identifiers. For example, if the publisher identifier is "BLMBRG" and the set of authorized publishers include "BLMBRG," the system may determine that an event message including the publisher identifier "BLMBRG" is authorized. Alternatively, or in addition, the set of authorized publishers may include one or more authorized entity types and a respective publisher may be an authorized publisher if the respective publisher identifier is associated with the authorized entity type. For example, if the publisher identifier is "BLMBRG," and if the set of authorized publishers include the entity type "AUTH PROVIDERS," and if "BLMBRG" is associated with "AUTH PROVIDERS" via an associative array, then the system may determine that the publisher identifier is associated with the set of authorized publishers. In response, the system may determine that the event message including the publisher identifier "BLMBRG" is authorized. In some embodiments, the system may determine that one or more events indicated by the event message has occurred only after determining that the event message is authorized.

In some embodiments, the event message may include a signature value usable by the system to compute a cryptographic hash value. Furthermore, some event messages may include the event payload with the signature value (e.g., via string concatenation) to compute the cryptographic hash value. The system may use various cryptographic hashing algorithms such as SHA-2, Bcrypt, Scrypt, or the like may be used to generate a cryptographic hash value. In some embodiments, the system may use salting operations or peppering operations to increase protection for publisher information. In some embodiments, the system may retrieve a cryptographic certificate based on a publisher identifier as described above and authenticate the event message after determining that on the cryptographic hash value satisfies one or more criteria based on the cryptographic certificate. A cryptographic certificate may include a cryptographic public key used to compare with the cryptographic hash value, as further discussed below. In addition, the cryptographic certificate may also include one or more second cryptographic values indicating a certificate issuer, certificate authority private key, other certificate metadata, or the like.

In some embodiments, a smart contract may include or be associated with a plurality of cryptographic certificates. The system may determine of which cryptographic certificate to use may be based on a map of entities of the smart contract. In some embodiments, the operation to authenticate the event may include a statement represented by Statement 3 below, where "v" may represent a signature verification algorithm, E[sig] may represent a signature value of an event object "E," "P[E[pub]]" may represent a data structure that includes the entity that had published the event E, and P[E[pub]][cert] may represent a cryptographic certificate value such as cryptographic public key:

$$v(E[sig],P[E[pub]][\text{cert}])==\text{True} \tag{3}$$

Various signature verification algorithms may be used to authenticate an event message based on a signature value of the event message. For example, the system may determine that the cryptographic hash value is equal to the cryptographic certificate, and, in response, authenticate the event message. In some embodiments, the system may determine that one or more events indicated by the event message has occurred only after authenticating the event message.

In some embodiments, the system may determine that an event has occurred based on a determination that a condition expiration threshold has been reached. One or more norms represented by norm vertices in the smart contract may include a condition expiration threshold such as an obligation that must be fulfilled by a first date or a right that expires after a second date. For example, a smart contract instance executing on the system may include a set of condition expiration thresholds, where the set of condition expiration thresholds may include specific dates, specific datetimes, durations from a starting point, other measurements of time, other measurements of time intervals, or the like. The system may check the set of condition expiration thresholds to determine if any of the condition expiration thresholds have been satisfied.

An event message may be transmitted under one of various types of messaging architecture. In some embodiments, the architecture may be based on a representational state transfer (REST) system, where the event message may be a request or response. For example, a system may receive a request that includes the event message, where the request includes a method identifier indicating that the event message is stored in the request. As an example, the system may receive a request that includes a "POST" method indicator, which indicates that data is in the request message. In addition, the request my include a host identifier, where the host identifier indicates a host of the smart contract being executed by the system. For example, the host identifier may indicate a specific computing device, a web address, an IP address, a virtual server executing on a distribute computing platform, a specific node of a decentralized computing system, or the like.

In some embodiments, the architecture may be based on a publisher-subscriber architecture such as the architecture of the advanced message queuing protocol (AMQP), where the event message may be a either a publisher message or subscriber message. For example, using the AMQP, a client publisher application may send an event message over a TCP layer to an AMQP server. The event message may include a routing key, and the AMQP server may act as a protocol broker that distributes the event message to the system based on the routing key after storing the event message in a queue. In some embodiments, the system may be a subscriber to the client publisher application that sent the event message.

In some embodiments, the process 100 includes determining which smart contracts of a set of active smart contracts that will change state based on the event, as indicated by block 108. As discussed above, in some embodiments, the system may determine that the event satisfies one or more norm conditions, and, in response, determine that the instance of the smart contract will change state. For example, as further discussed below, the system may determine that the event indicated "PAYLOAD 0105 PROVIDED" satisfies the norm condition represented by the condition "IF DELI VERED(PAYLOAD)," In response, the system may determine that the smart contract will change state. Alternatively, or in addition, as discussed above, the system may determine that the event does not satisfy one or more norm conditions but does satisfy a condition expiration threshold. In response, the system may determine that the instance of the smart contract will change state based on the event not satisfying one or more norm conditions while having satisfied the condition expiration threshold. Furthermore, while this disclosure may recite the specific use of a smart contract program in certain sections, some embodiments may use, modify, or generate other symbolic AI programs in place of a smart contract, where symbolic AI programs are further discussed below.

In some embodiments, the system may include or otherwise have access to a plurality of smart contracts or smart contract instances. The system may perform a lookup operation to select which of the smart contracts to access in response to determining that an event has occurred. In some operations, the smart contract may compare an event to the associative array of conditions corresponding to each of a set of smart contracts to select of the set of smart contracts should be updated and filter out smart contracts that would not change state based on the event. The system may then update each of the smart contract instances associated with a changed norm status, as discussed further below. Furthermore, the system may then update the respective associative array of conditions corresponding to the set of smart contracts. In some embodiments, an associative array of conditions may include only a subset of norm conditions associated with a smart contract, where each the subset of norm conditions is associated with a triggerable vertex of the smart contract. In some embodiments, the system may first deduplicate the norm conditions before performing a lookup operation to increase performance efficiency. For example, after determining that an event has occurred, some embodiments may search through a deduplicated array of norm conditions. For each norm condition that the event would trigger, the system may then update the one or more smart contracts associated with the norm condition in the deduplicated array of norm conditions. By selecting smart contracts from a plurality of smart contracts based on an array of norm conditions instead of applying the event to the norm conditions associated with the norm vertices of each of the set of smart contracts, the system may reduce computations required to update a set of smart contracts.

The smart contract or associated smart contract state data may be stored on various types of computing systems. In some embodiments, the smart contract state data may be stored in a centralized computing system and the associated smart contract may be executed by the centralized computing system. Alternatively, or in addition, the smart contract or associated smart contract state data may be stored on a distributed computing system (like a decentralized computing system) and the associated smart contract may be executed using a decentralized application. Fore example, the smart contract may be stored on and executed by a Turing-complete decentralized computing system operating on a set of peer nodes, as further described below.

In some embodiments, the smart contract data may include or be otherwise associated with a set of entities, such as a set of entities encoded as an associative array of entities. The associative array of entities that may include one or more entities that may interact with or view at least a portion of the data associated with the smart contract. In some embodiments, the associative array of entities may include a first associative array, where keys of the first associative array may indicate specific smart contract entities (e.g. data observers, publishers, or the like), and where each of the keys may correspond with a submap containing entity data such as a full legal name, a legal identifier such as a ISIN/CUSIP and an entity type of the entity such as "LENDER," "BORROWER", "AGENT," "REGULATOR," or the like. In some embodiments, one or more entities of the associative array of entities may include or be associated with a cryptographic certificate such as a cryptographic public key. As described above, the cryptographic certificate may be used to authenticate an event message or other message. By including authorization or authentication operations, the system may reduce the risk that an unauthorized publisher sends an event message or that the event message from a publisher is tampered without the system determining that tampering had occurred. In addition, authorization or authentication operations increase the non-repudiation of event messages, reducing the risk that a publisher may later disclaim responsibility for transmitting an event message.

In some embodiments, the smart contract may also include or otherwise be associated a set of conditions, such as a set of conditions encoded as an associative array of conditions. In some embodiments, the associative array of conditions may include a set of norm conditions and associated norm information. In some embodiments, the set of norm conditions may be represented by an associative array, where a respective key of the associative array may be a respective norm condition or norm condition identifier. The corresponding values of the associative array may include a natural language description of the corresponding condition and one or more publisher identifiers allowed to indicate that an event satisfying the respective norm condition has occurred. In some embodiments, the publisher identifier may indicate a specific entity key or an entity type. Furthermore, the smart contract may also include or otherwise be associated with a set of norm vertices or a set of graph edges connecting the vertices, as further described below.

In some embodiments, the process 100 includes deserializing a serialized array of norm vertices to generate a deserialized directed graph, as indicated by block 112. In some embodiments, the smart contract may include or otherwise be associated with a set of norm vertices encoded as a serialized graph in various data serialization formats, where the smart contract may encode a part or all the norm vertices by encoding the graph edges connecting the norm vertices The serialized graph may include a representation of an array of subarrays. A data serialization format may include non-hierarchical formats or flat-file formats, and may be stored in a persistent storage. In some embodiments, a serialized array of norm vertices may include numeral values, strings, strings of bytes, or the like. For example, the array of norm vertices (or other data structures in program state) may be stored in a data serialization format such as JSON, XML, YAML, XDR, property list format, HDF, netCDF, or the like. For example, an array may be decomposed into lists or dictionaries in JSON amenable to serialization. Each subarray of an array of subarrays may include a pair of norm vertices representing a directed graph edge. For example, a subarray may include a first value and a second value, where the first value may represent a tail vertex of a directed graph edge, and where the second value may represent a head vertex of the directed graph edge. For example, a subarray may include the value "[1,5]" where the first value "1" represents a tail vertex indicated by the index value "1" and "5" represents a head vertex indicated by the index value "5." While in serialized form, the array of norm vertices may reduce memory requirements during data storage operations and bandwidth requirements during data transfer operations.

In some embodiments, the serialized array of norm vertices may be used to construct an adjacency matrix or an index-free adjacency list to represent a deserialized directed graph during a deserialization operation. In some embodiments, an adjacency matrix or adjacency list may increase efficient graph rendering or computation operations. In some embodiments, the deserialized directed graph may be stored in a faster layer of memory relative to the serialized graph, such as in a non-persistent memory layer. For example, the system may deserialize a serialized array of vertices stored in flash memory to a deserialized directed graph stored in Level 3 cache. In some embodiments, as further described below, instead of forming a directed graph that includes all of the norm vertices included in the serialized array of norm vertices, the system may instead form a directed graph from a subset of the serialized array of norm vertices. As described above, each norm vertex may have an associated norm status indicating whether the norm vertex is triggerable. In response, the system may form a directed graph of the triggerable vertices without rendering or otherwise processing one or more norm vertices not indicated to be triggerable. Using this method, a vertex that is included in the serialized array of vertices may be absent in the directed graph stored in non-persistent memory. By reducing the number of number of vertices in a deserialized directed graph, the efficiency of querying and updating operations of the smart contract may be increased.

In some embodiments, the system may include an initial set of norm vertices that is distinct from the array of norm vertices. For example, some embodiments may determine that the smart contract had made a first determination that an event had occurred. In some embodiments, the system may search the data associated with the smart contract to find an initial set of norm vertices representing an initial state of the smart contract. The system may then deserialize the initial set of norm vertices when executing the smart contract and perform the operations further described below. The system may then deserialize a different array of norm vertices during subsequent deserialization operations.

In some embodiments, the process 100 includes determining a set of triggerable vertices based on the directed graph, as indicated by block 120. In some embodiments, the system may determine the set of triggerable vertices based on the directed graph stored in non-persistent memory by searching through the vertices of the directed graph for each of the head vertices of the directed graph and assigning these vertices as a set of head vertices. The system may then search through the set of head vertices and filter out all head vertices that are also tail vertices of the directed graph, where the remaining vertices may be the set of leaf vertices of the directed graph, where each of the leaf vertices represent a triggerable vertex. Thus, the set of leaf vertices determined may be used as the set of triggerable vertices.

Alternatively, in some embodiments, a vertex of the set of norm vertices may include or otherwise be associated with a norm status indicating whether the vertex is triggerable or not. In some embodiments, the system may search through the directed graph for vertices that have an associated norm status indicating that the respective vertex is triggerable. Alternatively, or in addition, the system may search through a list of norm statuses associated with the vertices of the serialized array of norm vertices to determine which of the vertices is triggerable and determine the set of triggerable vertices. For example, in some embodiments, each norm vertex of a smart contract may have an associated norm status indicating whether the vertex is triggerable or not triggerable, where the vertices and their associated statuses may be collected into a map of vertex trigger states. The system may then perform operations to traverse the map of vertex trigger states and determine the set of triggerable vertices by collecting the vertices associated with a norm status indicating that the vertex is triggerable (e.g. with a boolean value, a numeric value, a string, or the like). For example, the system may perform operations represented by Statement 4 below, where G may represent a graph and may be an array of subarrays g, where each subarray g may represent a norm vertex and may include a set of values that include the value assigned to the subarray element g[4], where the subarray element g[4] indicates a norm status, and "Active" indicates that the norm vertex associated with subarray g is triggerable, and A is the set of triggerable vertices:

$$A \leftarrow \{g \in G | g[4] = \text{``Active''}\} \quad (4)$$

In some embodiments, the process 100 includes determining a set of triggered vertices based on the set of triggerable vertices, as indicated by block 124. In some embodiments, the system may compare determine the set of triggered vertices based on which the norm conditions associated with the vertices of the directed graph are satisfied by the event. In some embodiments, a norm condition may directly include satisfying event. For example, a norm condition may include "IF DELIVERED(PAYMENT)," where the function "DELIVERED" returns a boolean value indicating whether a payment represented by the variable "PAYMENT" is true or false. The system may then determine that the norm condition is satisfied if "DELIVERED (PAYMENT)" returns the boolean value "True." The system may then add the vertex associated with the norm condition to the set of triggered vertices. For example, the system may perform operations represented by Statement 5 below, where "A" is the set of triggerable vertices determined above, and where each subarray "a" may represent a triggerable vertex and may include a set of values that include the value assigned to the subarray element a[1], where the subarray element a[1] indicates a condition, and "U" is the set of triggered vertices, and "N" is an associative array that describes the possible graph nodes that may be triggered, such that, for an event prop, N[prop] may return a structure that contains defining details of the vertices associated with the event prop:

$$U \leftarrow \{a \in A | N[a[1]][\text{prop}] = E[\text{prop}]\} \quad (5)$$

In some embodiments, the determination that an event satisfies a norm condition may be based on a categorization of a norm into logical categories. As further described below in FIG. 5, logical categories may include values such as a "right," "obligation," "prohibition," "permission," or the like. In some embodiments, after a determination that an event triggers a norm condition, the generation of consequent norms or norm status changes associated with a triggered vertex may be based on the logical category.

In some embodiments, a snapshot contract status may be associated with the smart contract and may be used to indicate a general state of the smart contract. The snapshot contract status may indicate whether the obligations of a contract are being fulfilled or if any prohibitions of the contract are being violated. For example, in some embodiments, satisfying an obligation norm condition may result in an increase in the snapshot contract status and triggering a prohibitions norm may result in a negative change to the snapshot contract status.

In some embodiments, the process 100 includes performing one or more operations indicated by blocks 152, 154, 156, and 160 for each of the respective triggered vertex of the set of triggered vertices, as indicated by block 150. In some embodiments, the process 100 includes updating the respective triggered vertex based on an event by updating a norm status associated with the respective triggered vertex, as indicated by block 152. Updating a respective triggered vertex may include updating one or more norm statuses or other status values associated with the respective triggered vertex. For example, a norm status of the respective triggered vertex may be updated to include one of the strings "SATISFIED," "EXERCISED," "FAILED," or "CANCELED," based on the norm conditions associated with the respective triggered vertex having been satisfied, exercised, failed, or canceled, respectively. In some embodiments, the system may update a norm status to indicate that the respective triggered vertex is not triggerable. For example, an obligation norm of a smart contract may be required to be satisfied only once. In response, after determining that the norm condition associated with the obligation has been satisfied by an event, the system may update a first status value associated with the respective triggered vertex to "false," where the first status value indicates whether the respective triggered vertex is triggerable. In some embodiments, the one or more status values may include a valence value indicating the number of connections from the respective triggered vertex to another vertices, the number of connections to the respective triggered vertex from other vertices, or the like. As further described below, in some embodiments, the valence value or other status value associated with the respective triggered vertex may be updated after performing operations associated with the adjacent vertices of the respective triggered vertex.

In some embodiments, the process 100 includes determining whether a respective adjacent vertex of the respective triggered vertex should be set to be triggerable, as indicated by block 154. In some embodiments, the respective triggered vertex may include a pointer to or otherwise be associated with a set of adjacent vertices, where each of the set of adjacent vertices represent a norm of the smart contract that are set to occur after the respective triggered vertex is triggered. In some embodiments, the system may determine whether an adjacent vertex of a respective triggered vertex should be set as triggerable based on specific conditions associated with the adjacent vertex. For example, a respective triggered vertex may include program code instructing that a first set of adjacent vertices should be set to be triggerable if a first set of conditions are satisfied and that a second set of adjacent vertices should be set to be triggerable if a second set of conditions are satisfied, where the first set of adjacent vertices are distinct from the second set of adjacent vertices. Alternatively, or in addition, the respective triggered vertex may include program instructing that a third set of adjacent vertices should be set to be triggerable if the first set of conditions are not satisfied but an associated condition expiration threshold is satisfied.

In some embodiments, the process 100 includes updating the respective adjacent vertex based on the event, as indicated by block 156. Updating the respective adjacent vertex based on the event may include setting one or more norm statuses associated with the adjacent vertex to indicate that the respective adjacent vertex is triggerable. For example, after a determination that a respective adjacent vertex associated with a permission norm is to be set to be triggerable, a norm status associated with the respective adjacent vertex may be updated to the value "triggerable."

In some embodiments, the process 100 includes determining whether any additional triggered vertices are available, as indicated by block 160. In some embodiments, the system may determine that additional triggered vertices are available based on a determination that an iterative loop used to cycle through each the triggered vertices has not reached a termination condition. In response to a determination that additional triggered vertices are available, the process 100 may return to the operations of block 150. Otherwise, operations of the process 100 may proceed to block 164.

In some embodiments, the process 100 includes updating the directed graph based on the updated triggered vertices or the respective adjacent vertices, as indicated by block 170. In some embodiments, updating the directed graph may include updating an adjacency matrix or adjacency list representing the directed based on each of the triggered vertices or their respective adjacent vertices. In some embodiments, instead of looping through each updated vertex and then updating the directed graph, the system may update the directed graph during or after each update cycle. For example, after updating the respective triggered vertex as described in block 156, the system may update the deserialized directed graph.

In some embodiments, the process 100 includes updating the serialized array of norm vertices or other smart contract state data based on the directed graph and updated vertices, as indicated by block 174. In some embodiments, updating the serialized array of norm vertices may include serializing the directed graph into a data serialization format, as described above. In some embodiments, the data serialization format may be the same as the data serialization format used when performing operations described for block 112. For example, the system may implement a depth-first search (DFS) over the deserialized directed graph to record distinct edge pairs and update the serialized array of norm vertices by either modifying or replacing the serialized array of norm vertices.

In some embodiments, the system may update a knowledge set based on the event and smart contract state changes that occurred in response to the event. In some embodiments, the knowledge set may include a set of previous events. The set of previous events may be encoded as a list of previous events. The list of previous events may include a subarray, where each subarray includes an event identifier of a recorded event or information associated with the recorded event. For example, the list of previous events may include a date and time during which an event occurred, an event identifier, one or more norm conditions satisfied by the event, or the like. In some embodiments, a norm condition may be based on the list of previous events. For example, a norm condition may include a determination of whether an event type had occurred twice within a time duration based on the list of previous events. In some embodiments, the knowledge set may include a set of previously-triggered vertices, where the set of previously-triggered vertices may be encoded as an array of previously-triggered vertices. In some embodiments, the system may further update the knowledge set by updating the array of previously-triggered vertices based on the triggered vertices described above. For example, after updating a respective triggered vertex as described above, the system may update the array of previously-triggered vertices to include the respective triggered vertex. The array of previously-triggered vertices may include a vertex identifier associated with the respective triggered vertex, an event identifier associated with the event that triggered the respective triggered vertex, and a set of values identifying the vertices that are set to be triggerable after triggering the respective triggered vertex.

In some embodiments, the process 100 includes persisting the updated serialized array of norm vertices or other smart contract data to storage, as indicated by block 178. In some embodiments, persisting the smart contract data to storage may include updating the memory storage in a single computing device or a computing device of a centralized computing system. Alternatively, or in addition, persisting the smart contract data to storage may include storing the smart contract data to a decentralized tamper-evident data store. In some embodiments, by storing the serialized array of norm vertices in a decentralized tamper-evident data store instead of storing a deserialized directed graph in the decentralized tamper-evident data store, the system may increase the efficiency and performance of the data distribution amongst the nodes of the decentralized tamper-evident data store. Furthermore, in some embodiments, triggering a norm vertex may include triggering a smart contract termination action. When a smart contract termination action is triggered, vertices other than the respective triggered vertex may be updated to set the statuses of each vertex of these other vertices as not triggerable, even if these other vertices are not directly connected to the triggered vertex.

In some embodiments, the system may display a visualization of the smart contract state. For example, the system may display a visualization of smart contract state as a directed graph, such as (though not limited to) those shown in FIG. 5-10, 17-18, or 20 below, where the vertices may have different colors based on norm status and/or logical category. Alternatively, or in addition, the system may generate other types of visualizations of the smart contract state. For example, the system may display a pie chart representing of a plurality of smart contract types that indicate which type of the smart contracts have the highest amount of associated cost.

In some embodiments, the process 100 or other processes described in this disclosure may execute on a decentralized computing platform capable of persisting state to a decentralized tamper-evident data store. Furthermore, in some embodiments, the decentralized computing platform may be capable of executing various programs, such as smart contracts, on the computing platform in a decentralized, verifiable manner. For example, each of a set of peer nodes of the computing platform may perform the same computations, and a consensus may be reached regarding results of the computation. In some embodiments, various consensus algorithms (e.g., Raft, Paxos, Helix, Hotstuff, Practical *Byzantine* Fault Tolerance, Honey Badger *Byzantine* Fault Tolerance, or the like) may be implemented to determine states or computation results of the various programs executed on the decentralized computing platform without requiring that any one computing device be a trusted device (e.g., require an assumption that the computing device's computation results are correct). The one or more consensus algorithms used may be selected or altered to impede an entity from modifying, corrupting, or otherwise altering results of the computation by peer nodes not under the entity's control. Examples of a decentralized tamper-evident data store may include Interplanetary File System, Blockstack, Swarm, or the like. Examples of a decentralized computing platform may include Hyperledger (e.g., Sawtooth, Fabric, or Iroha, or the like), Stellar, Ethereum, EOS, Bitcoin, Corda, Libra, NEO, or Openchain.

Figure 2:
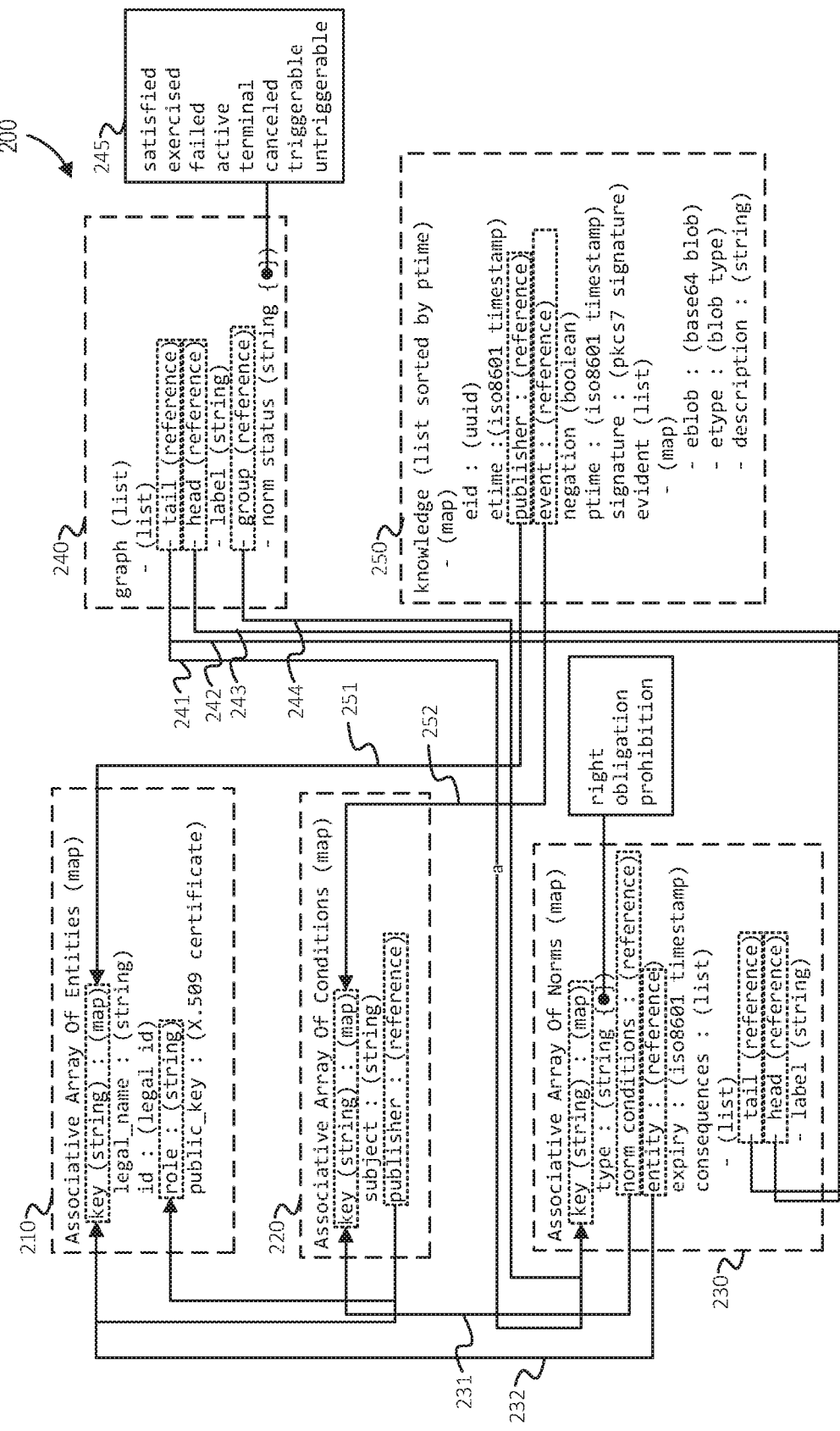
FIG. 2 depicts a data model of program state data, in accordance with some embodiments of the present techniques.

FIG. 2 depicts a data model of program state data, in accordance with some embodiments of the present techniques. In some embodiments, a smart contract may include or otherwise be associated with program state data such as smart contract state data 200. The smart contract state data 200 includes an associative array of entities 210, an associative array of conditions 220, an associative array of norms 230, a graph list 240, and a knowledge list 250. The associative array of entities 210 may include a set of keys, each key representing an entity capable of interacting with or observing smart contract data. For example, a publisher providing an event message to the smart contract may be an entity. The corresponding value of a key of the associative array of entities 210 may include a submap that includes values for a name, a legal identifier value (e.g., a ISIN/CUSIP identifier), an entity type for authorization operations, and a public key for authentication operations (e.g., a cryptographic public key). In some embodiments, the name, identifier value, entity type, or public keys may be used in the authorization and authentication operations discussed for block 104.

The associative array of conditions 220 may include a set of keys, where each key represents an event that may trigger at least one triggerable vertex that would result in a change in norm status, and where a corresponding value of each key includes an events submap. The events submap may include a publisher identifier. As shown by the link 221, the publisher identifier may be used as a reference to the key of the associative array of entities. Alternatively, or in addition, the events submap may include a subject identifier, which may include natural text language to provide a context for the corresponding event.

The associative array of norms 230 may include a set of keys, where each key may represent a norm of the smart contract, which may be associated with as a norm vertex in a graph, norm conditions and consequent norms. In some embodiments, the consequent norms may themselves be associated with their own norm vertices. Each value corresponding to the norm may include a norms submap that includes one or more norm conditions that may be used to trigger the norm by satisfying a norm condition, or by not satisfying the norm condition after satisfying condition expiration threshold associated with the norm. As shown by the link 231, the norm conditions may include a norm identifier that may be used as a reference to a key of the associative array of conditions 220. The norms submap may also include an entity identifier, where the entity identifier may be used as reference to a key of the associative array of entities 210, as shown by the link 232. The norm may also include a condition expiration threshold, which may be represented by the "expiry" field shown in the associative array of norms 230. As discussed above, some embodiments may result in a norm status change or trigger other updates to a vertex if a norm condition is not satisfied but the condition expiration threshold is satisfied. The norm submap may also include a consequences list, where the consequences list may include set of sublists that includes a tail vertex representing a consequent norm that become triggerable, a head vertex of the new norm (which may be the triggered norm), and a label.

In some embodiments, a smart contract state may initially construct the graph list 240 in a first iteration based on the associative array of norms 230 and update the graph list 240 based on a previous iteration of the graph list 240. As described above, the graph list may be in a serialized form, such as a serialized array of norm vertices written in the YAML markup language. As discussed above, the graph list 240 may be a list of graph sublists, where each sublist includes a tail vertex value, a head vertex value, a label associated with the graph edge connecting the tail vertex with the head vertex, a group identifier, and a norm status value. In some embodiments, the norm status may include values such as "satisfied," "exercised," "failed," "active," "terminal," "canceled," "triggerable," or "untriggerable." In some embodiments, a norm vertex may be associated with more than one norm status. As shown by link 241, a tail vertex of the graph may be linked to a norm in the associative array of norms 230. Similarly, as shown by the links 242-243, the tail and head vertices of the graph list 240 may be associated with a listed tail norm or head norm in the associative array of norms 230 for a respective norm. Furthermore, as shown by the link 244, the group identifier listed in a graph sublist may also be associated with a value in the associative array of norms 230, such as with a key in the associative array of norms 230.

In some embodiments, a smart contract state may initially construct the knowledge list 250 in a first iteration based on the associative array of norms 230 and update the knowledge list 250 based on smart contract state changes. The knowledge list 250 may be sequentially ordered in time (e.g. a time when a norm status changes, a time when an event is received, or the like). In some embodiments, each entry of the knowledge list 250 may include an identifier "eid," an event time "etime," a publisher identifier associated with an event that triggered a norm vertex, the event that triggered the norm vertex. In addition, the knowledge list 250 may include various other data related to the smart contract state change, such as a field "negation" to indicate whether an event is negated, a field "ptime" in ISO8601 format to represent an sub-event time (e.g. for event that require multiple sub-events to trigger a norm vertex), a field "signature" to provide a signature value that allows authentication against the public key held by a publisher for later data authentication operations or data forensics operations. In some embodiments, the knowledge list 250 may include an evidence list, where the evidence list may include a base64 encoded blob, an evidence type containing a string describing the file type of the decoded evidence, and a field for descriptive purposes. In some embodiments, the evidence list may be used for additional safety or verification during transactions.

Outcome Measurement and Prediction

In some embodiments, outcomes of symbolic AI models (like the technology-based self-executing protocols discussed in this disclosure, expert systems, and others) may be simulated and characterized in various ways that are useful for understanding complex systems. Examples of symbolic AI systems include systems that may determine a set of outputs from a set of inputs using one or more lookup tables, graphs (e.g. a decision tree), logical systems, or other interpretable AI systems (which may include non-interpretable sub-components or be pipelined with non-interpretable models). The data models, norms, or other elements described in this disclosure constitute an example of a symbolic AI model. Some embodiments may use a symbolic AI model (like a set of smart contracts) in order to predict possible outcomes of the model and determine associated probability distributions for the set of possible outcomes (or various population statistics). Features of a symbolic AI model that incorporates elements of data model described in this disclosure may increase the efficiency of smart contract searches. In addition, the use of logical categories (e.g., "right," "permission," "obligation") describing the relationships between conditional statements (or other logical units) of a smart contract may allow the accurate prediction of (or sampling of) outcomes across a population of differently-structured smart contracts without requiring a time-consuming analysis of each of the contexts of individual smart contracts from the population of differently-structured smart contracts. Furthermore, the operations of a symbolic AI model may be used to predict outcomes (e.g., of a smart contract, or call graph of such smart contracts) and may be tracked to logical units (like conditional statements, such as rules of a smart contract). These predicted outcomes may be explainable to an external observer in the context of the terms of the logical units of symbolic AI models, which may be useful in medical fields, legal fields, robotics, dev ops, financial fields, or other fields of industry or research.

In some embodiments, the symbolic AI model may include the use of scores for a single smart contract or a plurality of smart contracts, where the score may represent various values, like a range of movement along a degree of freedom of an industrial robot, an amount of computer memory to be allocated, an amount of processing time that a first entity owes a second entity, an amount to be changed between two entities, a total amount stored by an entity, or the like. A symbolic AI model may include scores of different type. Changes in scores of different type may occur concurrently when modeling an interaction between different entities. For example, a first score type may represent an amount of computer memory to be stored within a first duration and a second score type may represent an amount of computer memory to stored within a second duration that occurs after the first duration. A smart contract may be used to allocate computer memory across two different entities to optimize memory use across the entity domains. Possible outcomes and with respect to memory allocation across the two domains may be simulated. Alternatively, or in addition, exchanges in other computing resources of the same type or different types may be simulated with scores in a symbolic AI model. For example, a symbolic AI model may include a first score and as second score, where the first score may represent an amount of bandwidth available for communication between a first entity or second entity and a third entity, and where the second score may represent an amount of memory available for use by the first or second entity. The outcome of an exchange negotiated via a smart contract between the first and second entity for bandwidth and memory allocation may then be simulated to predict wireless computing resource distribution during operations of a distributed data structure across a wireless network.

In some embodiments, simulating outcomes of may include processing one or more norm vertices representing one or more norms of a smart contract as described in this disclosure. For example, the symbolic AI model may include an object representing a norm vertex, where the object includes a first score representing an amount owed to a first entity and a second score representing an amount that would be automatically transferred to the first entity (e.g., as a down payment). In some embodiments, the symbolic AI model may incorporate the entirety of a smart contract and its associated data model when performing simulations based on the smart contract. For example, a symbolic AI model may include one or more directed graphs of to represent the state of a data model. Alternatively, or in addition, some embodiments may include more data than the smart contract being simulated or less data than the smart contract be simulated.

In some embodiments, the symbolic AI system (a term used interchangeably with symbolic AI model) may process the conditional statements (or other logical units) associated with each of the norms of a smart contract to increase simulation efficiency by extracting only quantitative changes and making simplifying assumptions about score changes. For example, a system may collect the norm conditions and associated outcome subroutines associated with each of a set of norm vertices and extract only the changes in an amount of currency owed as a first score and changes in an amount of currency transferred as a seconds score when incorporating this information into the conditions of the symbolic AI model. In some embodiments, the information reduction may increase computation efficiency by removing information from the analysis of a smart contract determined to be not pertinent to a selected score. Some embodiments simulate outcomes across a plurality of smart contracts using a standardized search and simulation heuristic, and the system described herein may provide a population of scores, where the population of scores may be the plurality of outcome scores determined from a simulation of each of the smart contracts or values computed from the plurality of outcome scores. For example, values determined based on the population of scores may include parameters of a probability distribution of the scores, a total score value, a measure of central tendency (e.g. median score value, mean score value, etc.), or the like.

In some embodiments, the symbolic AI model may be an un-instantiated smart contract or may be a transformation thereof, e.g., approximating the smart contract. For example, as further described below, the system may instantiate a program instance that includes a symbolic AI model based on a selected smart contract that is not yet instantiated. Alternatively, a symbolic AI model may be determined based on an instantiated smart contract. For example, the system may select an instantiated smart contract with a program state that has already changed from its initial program state in order to determine future possible outcomes in the context of the existing changes. The system may then copy or otherwise use a simulated version of the changed program state when simulating the instantiated smart contract. For example, the system may select an instantiated smart contract for simulation with a symbolic AI system and deserialize a directed graph of the instantiated smart contract. The symbolic AI system may copy the deserialized directed graph to generate a simulation of the directed graph, where the nodes of the simulated directed graph are associated with simplified conditional statements that convert quantifiable changes into scores and are stripped of non-quantifiable changes in comparison to the conditional statements of the smart contract.

Figure 3:
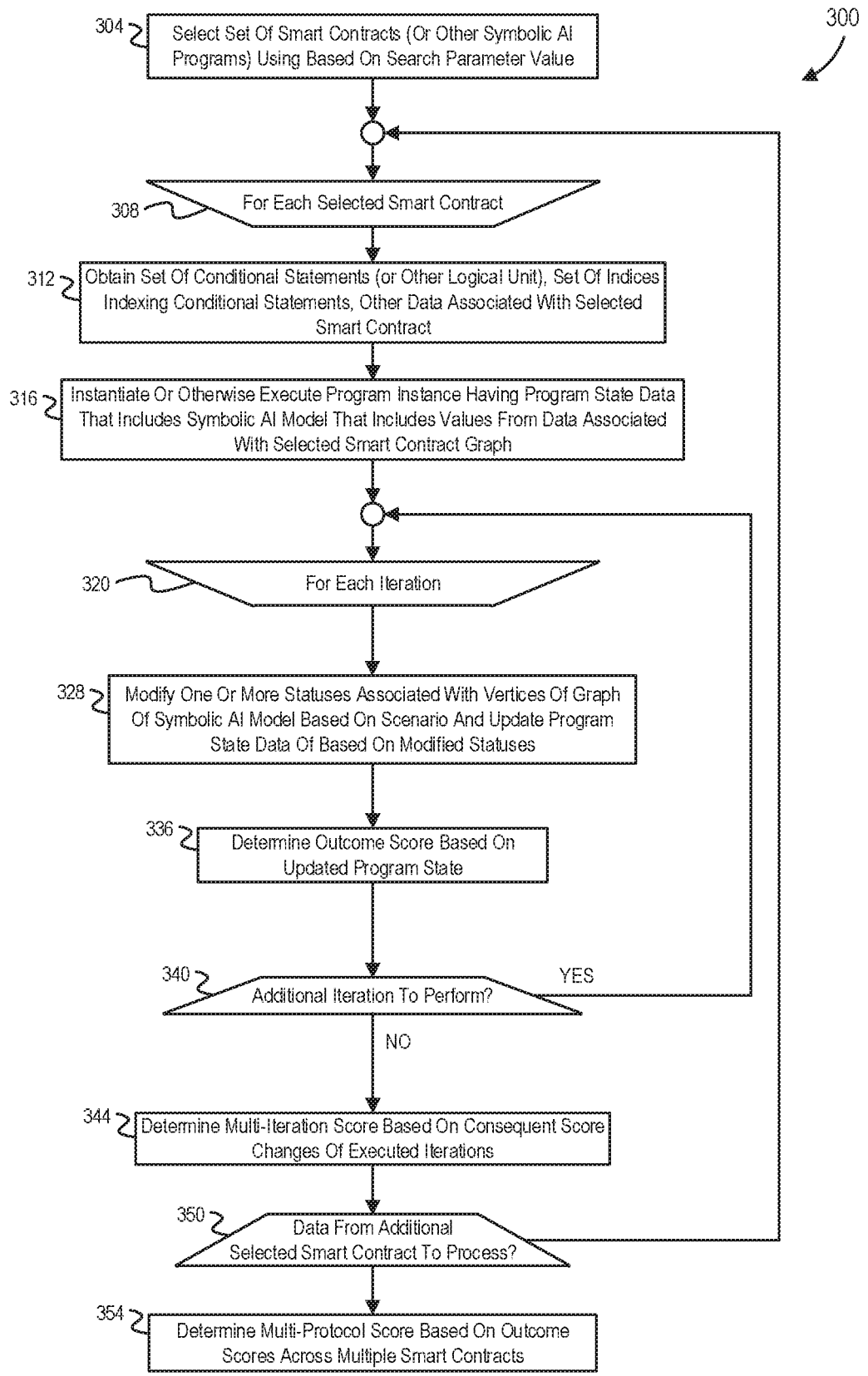
FIG. 3 is flowchart of an example of a process by which a program may simulate outcomes or outcome scores of symbolic AI models, in accordance with some embodiments of the present techniques.

FIG. 3 is flowchart of an example of a process by which a program may simulate outcomes or outcome scores of symbolic AI models, in accordance with some embodiments of the present techniques. In some embodiments, a process 300 includes selecting a set of smart contracts (or other symbolic AI models) based on a search parameter, as indicated by block 304. In some embodiments, a system may include or otherwise have access to a plurality of smart contracts or smart contract instances, and the system may select a set of smart contracts from the plurality based on a specific search parameter, such as an entity, entity type, event, event type, or keyword. For example, the system may perform a lookup operation to select which of the smart contracts to access based an event. During the lookup operation, the system may compare an event to the associative arrays of conditions corresponding to each of a plurality of smart contracts and select a set of smart contracts based on which of the smart contracts would change state in response to receiving the event. Some embodiments may crawl a call graph (of calls between smart contracts, or other symbolic AI models) to select additional smart contracts.

In addition, or alternatively, the system may perform a lookup operation to select which of the smart contracts to access based on an entity or entity type. For example, the system may compare an entity to the associative arrays of entities corresponding to each of a plurality of smart contracts and select a set of smart contracts based on which of the corresponding arrays of entities include the entity. An entity identifier may be in an array of entities or some other set of entities if an entity type associated with the entity identifier is in the array of entities. For example, if the entity "BLMBRG" has an associated entity type of "trusted publisher," some embodiments may determine that "BLMBRG" is in the set of entities of a smart contract if the entity type "trusted publisher" is listed in the set of entities. Alternatively, some embodiments may require that the exact entity identifier be listed in a set of entities before determining that the entity identifier in the set of entities. For example, some embodiments may determine that "BLMBRG" is in a set of entities of a smart contract only if "BLMBRG" is one of the elements of the set of entities. Furthermore, in some embodiments, the search may include intermediary entities between two different entities, where intermediary smart contract may be a smart contract (other than the first or second smart contract) that has relationships with both the first and second entities. For example, a search for smart contracts relating a first entity and a second entity may return a set smart contracts that include a first smart contract and a second smart contract, where the array of entities of the first smart contract includes the first entity and an intermediary entity, and where the array of entities of the second smart contract includes the second entity and the intermediary entity.

In some embodiments, an intermediary entity for a first entity and a second entity may be found by determining the intersection of entities between a first set of smart contracts associated with the first entity and a second set of smart contracts associated with the second entity. For example, the system may select a first set of smart contracts from a plurality of smart contracts based on which sets of entities associated with plurality of smart contracts include the first entity. Similarly, the system may select a second set of smart contracts from a plurality of smart contracts based on which sets of entities associated with plurality of smart contracts include the second entity. The system may then determine the intersection of entities by searching through the sets of entities of the first and second set of smart contracts to collect the entities that appear in both the first set and second set and determine that these collected entities are intermediary entities. In some embodiments, as further described below, additional methods are possible to determine a set of smart contracts associating a first entity with a second entity in order to quantify a relationship between the first entity and the second entity.

As discussed in this disclosure, some embodiments may crawl a call graph to select additional smart contracts based on possible relationships between a first entity and a second entity. The call graph may be a privity graph, which may track privity relations between the first entity and entities other than the second entity in order to determine or quantify relations between the first entity and the second entity. if For example, some embodiments may crawl through a privity graph of possible score changes across multiple contracts and determine a quantitative score relationship between a first entity and a second entity based on a first transaction between the first entity and a third entity, a second transaction between the third entity and a fourth entity, a third transaction between the fourth entity and a fifth entity, and a fourth transaction between the fifth entity and the second entity.

In some embodiments, the process 300 includes performing one or more operations indicated by blocks 312, 316, 320, 324, 328, 336, 340, 344, and 350 for each of the respective smart contracts or other programs of the selected set of smart contracts or other programs, as indicated by block 308. As further discussed below, the one or more outputs from executing each of the smart contracts may be used to determine a population of scores of multiple smart contracts. As used herein, the population of scores of multiple smart contracts may represent one or more population metric values calculated from scores of the smart contract. For example, the population of scores of multiple smart contracts may include a measure of central tendency, a measure of dispersion, a kurtosis value, a parameter of a statistical distribution, one or more values of histogram, or the like. Furthermore, in some embodiments, the process 300 may include performing one or more operations in parallel using multiple processor cores, where performing multiple operations in parallel may include performing the multiple operations concurrently. For example, some embodiments may perform the operations of the blocks 312, 316, 320, 324, 328, 336, 340, 344, and 350 for a plurality of smart contracts in parallel by using one or more processors for each of the plurality of smart contracts. By performing operations in parallel, computation times may be significantly reduced.

In some embodiments, the process 300 includes acquiring a set of conditional statements (or other logical units), set of entities, set of indices indexing the conditional statements, or other data associated with the selected smart contract, as indicated by block 312. Each of the set of conditional statements may be associated with an index value and may include or be otherwise associated with a respective set of conditions and a respective set of outcome subroutines, where a computing device may execute the respective set of outcome subroutines in response to an event satisfying the respective set of conditions. In some embodiments, the set of conditional statements may form a network, like a tree structure, with respect to each other. For example, an outcome subroutine of one the conditional statements may include a reference to or otherwise use an index value associated with another conditional statement. In some embodiments, the set of conditional statements and set of indices may be acquired from a data model, where the index values may be or otherwise correspond to the identifiers for norm vertices of a directed graph. For example, the set of conditional statements and set of indices may be acquired from the associative array of norms 230, the associative array of conditions 220, and the graph list 240. Alternatively, the system may acquire the conditional statements and indices from data stored using other data models. For example, the system may acquire the conditional statements from an indexed array of objects, where each object may include a method that can take an event as a parameter, test the event based on a condition of the method, and return a set of values or include a reference to another object of the array. The system may use the indices of the indexed array as the indices of the conditional statements and parse the methods to provide the set of conditional statements.

In some embodiments, the process 300 includes instantiating or otherwise executing a program instance having program state data that includes a symbolic AI model that includes values from the data associated with the selected smart contract, as indicated by block 316. In some embodiments, the symbolic AI model may include graph vertices associated with the set of conditional statements described in this disclosure and may also include directed graph edges connecting the graph vertices. In addition, or alternatively, the symbolic AI model may include a set of tables, decision trees, graphs, or logical systems to provide a predicted value as an output based on one or more inputs corresponding to real or simulated events. For example, the system may traverse the directed graph of a symbolic AI model to determine which nodes of the directed graph to visit based on a decision tree of the symbolic AI model. Furthermore, in some embodiments, the symbolic AI system may be re-instantiated or be modified in real-time in response to a particular event message updating a smart contract being simulated. For example, an instantiated smart contract may be executing and concurrently being simulated by a symbolic AI system. In response to the smart contract receiving an event message, the symbolic AI system may determine a new set of events based on the event message and update its own program state such that its new initial state is based on the smart contract program state after the smart contract program state has been updated by the events of the event message.

In some embodiments, the symbolic AI model may include a graph. In some embodiments, the system may generate a graph list such as the graph list 240 using the methods discussed in this disclosure. In some embodiments, the program instance may be a local version of a selected smart contract and have program state data identical to program state data in the selected smart contract. Alternatively, the program instance may include program data not included in the smart contract or exclude data included in the smart contract. In some embodiments, the graph of the symbolic AI model may include a set of graph vertices and a set of directed graph edges connecting the graph vertices, where each of the graph vertices may be identified by an identifier and corresponds to a conditional statement of a smart contract. In some embodiments, the identifier may be the set of index values associated with the conditional statements of the smart contract. Alternatively, the identifier may be different from the set of index values associated with the conditional statements of the smart contract. For example, the system may choose a set of identifiers that are different from the set of index values to increase system efficiency or reduce memory use.

In some embodiments, the directed graph edges may be structured to provide directional information about the graph vertices of a symbolic AI model. For example, a directed graph edge may be represented as an array of identifier pairs. The first element of each of the identifier pairs may be treated as a tail vertex by the symbolic AI system and the second element of the identifier pairs may be treated as a head vertex by the symbolic AI system. In some embodiments, the selected smart contract may already be in the process of being executed and the program state data of the program instance may include the norm statuses and scores of the smart contract state. For example, the program state data may be copied directly from the state data of a selected smart contract, where the changes effected by the outcome subroutines may be treated as scores.

A smart contract score may represent one of various types of values. For example, a smart contract score may represent a reputation score of an entity in a social network, a cryptocurrency value such as an amount of cryptocurrency, an amount of electrical energy, an amount of computing effort such as Ethereum's Gas, an amount of computing memory, or the like. A smart contract score may represent an objective value associated with an entity, such as an available amount of computing memory associated with the entity. Alternatively, a smart contract score may represent an amount by which a stored value is to be changed, such as a credit amount transferred from a first entity to a second entity.

In some embodiments, a program state may keep track of a plurality of scores. For example, a vertex of a directed graph of a symbolic AI model may include or otherwise be associated with a first score representing an amount of possessed by a first entity, a second score representing an amount owed to or owed by the first entity, a third score representing an amount possessed by a second entity, and a fourth score representing an amount owed to or owed by the second entity. In some embodiments, a conditional statement may be parsed to determine outcome scores. For example, an outcome subroutine associated with a vertex of a graph of the symbolic AI model may include instructions that a first entity is obligated provide 30 cryptocurrency units to a second entity and that the second entity is obligated to send a message to the first entity with an electronic receipt, and the system may determine that an associated score of the first vertex is equal to 30 and also determine that no score value is needed for the sending of the message. As further discussed below, by keeping track of scores and score changes, entire populations of smart contracts may be analyzed with greater accuracy without requiring a deep understanding of the specific terms or entity behaviors of any specific contract.

In some embodiments, a symbolic AI model may include statuses corresponding to each of a set of vertices representing the norms of a smart contract. The symbolic AI model statuses may use the same categories as the norm statuses of a smart contract. Furthermore, the symbolic AI model status for a vertex may be identical to or be otherwise based on the status for the corresponding norm vertex being simulated. For example, if a norm status for a first norm vertex of a smart contract is "triggered-satisfied," the symbolic AI model status for a first symbolic AI model vertex corresponding to the first norm vertex may also be "triggered-satisfied." Alternatively, the system may select a different categorical value for a symbolic AI model vertex status that is still based on the corresponding norm status. Similarly, the symbolic AI model may include vertex categories similar to or identical to the logical categories associated with of the set of norm vertices of a smart contract. Furthermore, the symbolic AI model vertex category may be identical to or be otherwise based on the logical for the corresponding norm vertex being simulated. For example, if a logical category for a first norm vertex of a smart contract is "Rights" the symbolic AI model category for a first symbolic AI model vertex ("vertex category") corresponding to the first norm vertex may also be "Rights." Alternatively, the system may select a different categorical value for a vertex category that is still based on the corresponding logical category.

In some embodiments, the instantiated program may be a smart contract that may use or otherwise process events. Alternatively, or in addition, the program instance may be a modeling application and not an instance of the selected smart contract itself. For example, a symbolic AI system may be a modeling application that determines the values of a corresponding symbolic AI model based on the conditional statements of a smart contract without requiring that an event message be sent to an API of the modeling application. In some embodiments, the program instance of the symbolic AI system may change program state without performing one or more operations used by the smart contract that the program instance is based on. For example, the program instance of the symbolic AI system may change its program state data without deserializing serialized smart contract data, even if the smart contract that the program instance is based on includes operations to deserialize serialized smart contract data. In some embodiments, the program state data may be stored using a data model similar to that described in this disclosure for FIG. 2. Alternatively, or in addition, the program state data may be stored in various other ways. For example, instead of storing values in separate arrays, the program instance may store the norm conditions, norm outcome actions, and their relationships to each other as part of a same array.

In some embodiments, the process 300 includes performing one or more iterations of the operations indicated by blocks 320, 324, 328, 332, 336, and 340 for each of the respective smart contracts or other programs of the selected set of smart contracts or other programs, as indicated by block 320. Furthermore, in some embodiments, the process 300 may include performing the one or more iterations in parallel using multiple processor cores. For example, some embodiments may include performing multiple iterations of the operations of the blocks 320, 324, 328, 332, 336, or 340 for multiple iterations in parallel using a plurality of processor cores. By performing the multiple iterations of the operations in parallel, computation times may be significantly reduced.

In some embodiments, the system may perform one or more iterations of operations to modify the statuses of a first set of vertices and then update the program state data based on the modified statuses in order to acquire a plurality of outcomes. The program state data or a portion of the program state data may be in a same state at the start each iteration, where two states of program state data are identical if both states have the same set of values. For example, if a first state of program state data is [1,2,3], and if a second state of program state data is [1,2,4], and if the program state data is reverted to [1,2,3], the reverted program state data may be described as being in the first state. In some embodiments, the system may execute the smart contract or smart contract simulation for a pre-determined number of iterations. Alternatively, or in addition, as further recited below, the smart contract or smart contract simulation may be repeatedly executed until a set of iteration stopping criteria are achieved. As further discussed below, the plurality of outcomes corresponding to the plurality of iterations may be used to provide one or more multi-iteration scores usable for decision-support systems and for determining multi-protocol scores.

In some embodiments, the system may modify one or more statuses associated with the vertices of the graph of the symbolic AI model based on a scenario and update the program state data based on the modified statuses, as indicated by block 328. In some embodiments, the scenario may be a set of inputs based on events. For example, a scenario may include simulated events or simulated event messages that may be testable by the conditions of a conditional statement. In response, a first vertex of the program instance may compare the simulated event to a condition and determine that a second vertex of the symbolic AI model of the should be activated. For example, an input may include an event "entity A transmitted data 0x104ABC to entity C," which may satisfy a condition and change a status associated with a first vertex associated with the conditional statement to "satisfied." As discussed below, the system may then update the symbolic AI model based on the status change by activating an adjacent vertex to the first vertex.

Alternatively, or in addition, an input may include a message to change a program state without including an event that satisfies the norm conditions associated with the norm. For example, the input may include direct instructions interpretable by a symbolic AI system to set a vertex status to indicate that the corresponding vertex is triggered and direct which of a set of outcome subroutines to execute. The system may then update the symbolic AI model by activating one or more adjacent vertices described by the subset of outcome subroutines to execute.

In some embodiments, the scenario may include a single input. Alternatively, the scenario may include a sequence of inputs. For example, the scenario may include a first event, second event, and third event in sequential order. In some embodiments, the set of events may be generated using a Monte Carlo simulator. Some embodiments may randomly determine subsequent states from an initial state based on one or more probability distributions associated with each state of a set of possible subsequent states with respect to a previous state, where the probability distributions may be based on scores and logical categories associated with the set of possible states. For example, the program state may be in a state where only two subsequent possible states are possible, where the first subsequent possible state includes triggering a rights norm and a second subsequent possible state includes triggering an obligations norm.

In some embodiments, one or more inputs of a scenario may be determined using a decision tree. In some embodiments, a decision tree may be used to provide a set of decision based on scores, logical categories, statuses, and other factors associated with the active vertices of a simulated smart contract state. For example, a symbolic AI system may determine that the two possible states for a smart contract may result from either exercising a first rights norm or exercising of a second rights norm. A decision tree may be used to compare the logical categories, the scores associated with each norm, and the other information related to the active norms to determine which rights norm an entity would be most likely to exercise. In some embodiments, the symbolic AI system may compare a first score associated with a possible state represented by a first tree node with a second score of a different possible state represented by a second tree node. In response to the first score being greater than the second score, the symbolic AI system may determine a simulated input that will result in the future state represented by the first tree node. Furthermore, in some embodiments, the decision tree may incorporate probability distributions or other decision-influencing factors to more accurately simulate real-world scenarios.

Alternatively, or in addition, some embodiments may include a Monte Carlo Tree Search (MCTS) method to generate a random sequence of events based on a set of possible events and a probability distribution by which the events may occur. The operations of the simulation may be made more efficient by selecting events that known to satisfy at least one condition of the set of conditional statements of the smart contract being simulated. In some embodiments, a symbolic AI system may determine a set of events for a smart contract simulation by determining a first simulated input based on a set of weighting values assigned to vertices of a graph of a symbolic AI model associated with norms of the smart contract. In some embodiments, the system may further determine a simulated input based on a count of the number of iterations of the simulation performed so far.

The system may then update the symbolic AI model based on the first simulated input, advancing the symbolic AI model to a second state. For example, after changing the status of a first vertex associated with an obligations norm from "unrealized" to "failed," the symbolic AI model may then activate a first adjacent vertex representing a rights norm and a second adjacent vertex representing an prohibitions norm, where both adjacent vertices are adjacent to the first vertex. The symbolic AI system may then determine a second simulated input, wherein the second simulated input may be selected based on weighting value corresponding to each of the first adjacent vertex and second adjacent vertex, where the weighting value may be a score of the smart contract. For example, the weighting value of the first adjacent vertex may be $\frac{2}{4}$ and the weighting value of the second adjacent vertex may be $\frac{1}{6}$. Some embodiments may then update the symbolic AI model when it is in the second state based on the second simulated input in order to advance the second model to a terminal state, where a terminal state is one that satisfies a terminal state criterion. Once in a terminal state, the symbolic AI system may update the weighting values associated with the symbolic AI model before performing another iteration of the simulation.

Various terminal state criteria may be used. For example, a terminal state criterion may be that there is no further state change possible. Alternatively, a terminal state criterion may be that the smart contract is cancelled. The system may then update each of the weighting values associated with each of the nodes after reaching a terminal state before proceeding to perform another iteration. In some embodiments, the symbolic AI system may set a status of a vertex to "failed"

to simulate the outcomes of a first entity failing to transfer a score (e.g. failure to pay) a second entity.

In some embodiments, the determination of an input may be based on the type of conditional statement being triggered. As further discussed below, one or more of the conditional statements may be non-exclusively classified as one or more types of norms. Example of norm types include rights norms, obligations norms, or prohibition norms. As further discussed below, norm types may also include associations as being part of a pattern, such as a permission pattern. For example, a vertex may include or be otherwise associated with the label "consent or request." By determining activities based on logical categories associated with the conditional statements instead of specific events, predictive modeling may be performed using globalized behavior rules without interpreting each of the globalized behavior rules for each specific contract. For example, a sequence of event may be generated a based on a first probability distribution that approximates an obligation of a first entity as having a 95% chance of being fulfilled and a 5% chance of being denied and a second probability distribution that approximates that a second entity has a 10% chance of cancelling a smart contract before the first entity exercises a right to cure the failure to satisfy the obligation. Using these rules, population scores associated with the population of smart contracts between a first entity and a second entity that consist of obligations norms to pay, rights norms to cure, and rights norms to cancel may be determined without regards to the specific structure of individual smart contracts in the population of smart contracts.

The system may then update each of the smart contract instances associated with a changed norm status, as discussed further below. Furthermore, the system may then update the respective associative array of conditions corresponding to the set of smart contracts. In some embodiments, an associative array of conditions may include only a subset of norm conditions associated with a smart contract, where each the subset of norm conditions is associated with a triggerable vertex of the smart contract. In some embodiments, the system may first deduplicate the norm conditions before performing a lookup operation to increase performance efficiency. For example, after determining that an event has occurred, some embodiments may search through a deduplicated array of norm conditions. For each norm condition that the event would trigger, the system may then update the one or more smart contracts associated with the norm condition in the deduplicated array of norm conditions.

Some embodiments may obtain a sequence of inputs instead of a single input. In some embodiments, the system may use a neural network to generate the sequence of inputs. In some embodiments, the neural network may determine a state value s based on the program state data and provide a vector of probabilities associated with for each of a set of possible changes in the program state. The neural network may also determine a state value to estimate the expected value of the program state after system applies the scenario to the program. In some embodiments, the neural network may use a MCTS algorithm to traverse a tree representing possible future states of the smart contract from a root state. The system may determine a next possible state $s_{+1}$ for each state s by selecting a state with a low visit count, high predicted state value, and high probability of selection. The parameters (e.g. weights, biases, etc.) of the neural network making the state value determination may be represented by θ. After each iteration ending in a terminal state, the system may adjust the values θ to increase the accuracy of the neural network's predicted state value in comparison to the actual state value assessed whenever a terminal state is reached. Furthermore, a symbolic AI model may have a total score value, and the system may update the total score value based on the state value.

In some embodiments, the process 300 includes determining an outcome score based on the updated program state data, as indicated by block 336. In some embodiments, as stated in this disclosure, a set of scores may be associated with one or more of the outcome states. For example, an outcome of a first norm may include a transfer of currency values from a first entity to a second entity. The symbolic AI system may record this score and combine it with other scores in the same iteration in order to determine a net score for that score type. For example, the symbolic AI system may record each currency change based on inputs and outcomes in order to determine a net currency change, where a score of the smart contract may be the net currency change. Alternatively, or in addition, the symbolic AI system may record scores across different iterations to determine a multi-iteration score, as described further below. Example outcome scores may include a net amount of currency exchanged, a net amount of computing resources consumed, a change in the total cryptocurrency balance for an entity, or the like.

The process 300 may execute a number of iterations of smart contract state change simulations to determine possible outcomes and outcome scores. In some embodiments, there may be one or more criteria to determine if an additional iteration is needed, as indicated by block 340. In some embodiments, the one or more criteria may include whether or not a pre-determined number of iterations of simulations have been executed. For example, some embodiments may determine that additional iterations are needed if the total number of executed iterations is less than an iteration threshold, where the iteration threshold may be greater than five iterations, greater than ten iterations, greater than 100 iterations, greater than 1000 iteration, greater than one million iterations, greater than one billion iterations, or the like. Alternatively, or in addition, the one or more criteria may include determining whether a specific outcome occurs. For example, the one or more criteria may include determining whether the outcome score is less than zero after a terminal state is reached. If the additional iterations are needed, operations of the process 300 may return to block 320. Otherwise, operations of the process 300 may proceed to block 344.

In some embodiments, the process 300 includes determining a multi-iteration score based on the outcome scores of executed iterations, as indicated by block 344. The multi-iteration score may be one of various types of scores and may include values such as a net change in score across multiple iterations, a probability distribution parameter, a measure of central tendency across multiple iterations, a measure of dispersion, or a measure of kurtosis. For example, the system may use a first outcome score from a first iteration, a second outcome score from a second iteration, or additional outcome scores from additional iterations to determine an average outcome score. The system may determine additional multi-iteration scores in the form of probability distribution parameters to determine a probability distribution. As used herein, a measure of kurtosis value may be correlated with a ratio of a first value and a second value, wherein the first value is based on a measure of central tendency, and wherein the second value is based on a measure of dispersion. For example, the measure of kurtosis may equal to $\mu^4/\sigma^4$, where $\mu$ may be a fourth central moment of a probability distribution and a may be a standard deviation of the probability distribution.

In some embodiments, the multi-iteration score may be used to provide one or more predictions using Bayesian inference methods. In some embodiments, the multi-iteration score may be used to generate a probability distribution for the probability that a particular event or event type occurred based on a score, such as a change in currency value or an amount of computing resources consumed. For example, the system may calculate a mean average cryptocurrency amount determined across multiple iterations as a first multi-iteration score and a standard deviation of the cryptocurrency amount as the second multi-iteration score while tracking the number of payment delays associated with the respective cryptocurrency amounts. The system may then use the first and second multi-iteration scores to generate a gaussian distribution, where the system may use the gaussian distribution to perform Bayesian inferences in order to determine a probability that a payment delay occurred after obtaining the value of a new cryptocurrency amount.

In some embodiments, the multi-iteration score may be a weight, bias, or other parameter of a neural network. For example, some embodiments may use a set of multi-iteration scores as weights of a neural network, where the training inputs of the neural network may be outcome scores and the training outputs of the neural network may be events, indicators representing activated outcome subroutines, or activated patterns. Once trained, the neural network may determine the probability of events, triggered conditional statements, or triggered patterns based on observed scores. In some embodiments, the parameters of the neural network may be transferred to other neural networks for further training. For example, a first neural network may be trained using the outcome scores as inputs and sets of events as outputs, and the weights and biases of the training may be transmitted to a second neural network for further training. The second neural network may then be used to indicate whether a particular event had a sufficiently high possibility of occurring based on a score or score change. In addition, the multi-iteration score may include outputs of a convolutional neural network, which may be used to determine behavior patterns across multiple smart contracts.

In some embodiments, the symbolic AI system may use a fuzzy logic method to predict the occurrence of an event based on the outcomes of a smart contract. A fuzzy logic method may include fuzzifying inputs by using one or more membership functions to determine a set of scalar values for each of a set of inputs, where the set of scalar values indicate the degree of membership of the inputs of a set of labels for each of the inputs of a smart contract being simulated by a symbolic AI system. For example, the system may use a membership function to determine a percentage values between 0% and 100% for a set of labels such as "profitable," "risky," or the like. The percentage values may indicate, for each of the smart contracts, a degree of membership to each of the labels. The symbolic AI system may then determine an fuzzified outcome score based on the set of fuzzified data by first using a set of rules in combination with an inference engine to determines the degree of match associated with the fuzzy input and determine which of the set of rules to implement. As used herein, an inference engine may be a system that applies a set of pre-defined rules. For example, an inference engine may include a set of "if-then" expressions that provided responses to particular inputs. By using the inference engine in combination with the set of rules, the fuzzified outcome score may provide an indication of a broader label for the smart contract, such as "unconventional," "risk too high," or the like. In some embodiments, the symbolic AI system may defuzzify the fuzzified outcome score using various methods such as centroid of area method, bisector of area method, mean of maximum method, or the like. The defuzzifying process may result in a defuzzified outcome score that may also be used to determine a label.

In some embodiments, each of the scenarios may have an associated scenario weight, where the associated scenario may be a numeric value representing a normalized or nonnormalized probability of occurrence. For example, a smart contract may be processed based one of three possible scenarios, where the first scenario may have a weighting value equal to 0.5, the second scenario may have a weighting value equal to 0.35, and the third scenario may have a weighting value equal to 0.15. The system may use the associated scenario weights when determining a multi-iteration score. For example, if the first, second, and third scenarios results in allocating, respectively, 100, −10, or −100 computing resource units to a first entity, the system may determine that the expectation resource units allocated to the first entity is equal to 31.5 computing resource units and use the expectation resource units as the allocation value. While the above described using a scalar value as a weighting value, some embodiments may instead use a probability distribution as an associated scenario weight for each of the scenarios and determine the weighting value.

In some embodiments, the system may determine if data from an additional smart contract is to be processed, as indicated by block 350. As discussed in this disclosure, the process 300 may execute a number of simulations of different smart contracts to simulate possible outcomes and score changes. In some embodiments, each of the set of selected smart contracts may be simulated using a symbolic AI simulator. Furthermore, each of the set smart contracts may use the same set of weights/probability values to determine unique scenarios. For example, using the same set of weights corresponding to different combinations of available vertices, the system may determine a first scenario for a first symbolic AI model and a second scenario for a second symbolic AI model, where the first and second symbolic AI models have directed graphs that are different from each other. In some embodiments, the same weights may be used because the plurality of symbolic AI models may include vertices based on the same set of statuses and same set of logical categories. If the additional iterations are needed, operations of the process 300 may return to block 308. Otherwise, operations of the process 300 may proceed to block 354.

In some embodiments, the process 300 includes determining a multi-protocol score based on the outcome scores across multiple smart contracts, as indicated by block 354. A multi-protocol score may be any score that is determined based on a plurality of outcomes from simulating different smart contracts, where the plurality of outcomes may include either or both multi-iteration scores or scores determined after a single iteration. In some embodiments, the multi-protocol score may be determined by determining a population of scores associated with a given entity. For example, a population of scores may be a population of expected income across a population of 500 instantiated smart contracts. The multi-protocol score may be a total income value, average income value, kurtosis income value, or the like.

In some embodiments, one or more methods to determine a multi-iteration score may be used to determine a multi-protocol score. For example, use of fuzzy logic, Bayesian inference, or neural networks may be used to predict multi-protocol scores. For example, some embodiments may use a first set of multi-iteration scores from a plurality of smart contract simulations as inputs and a second set of multi-iteration scores from the same plurality of smart contract simulations as outputs when training a neural network, where a set of multi-protocol score may be one or more the parameters of the trained neural network. For example, some embodiments may include a neural network trained to predict the probability that a specific type of smart contract was used based on multi-iteration scores such as an average payment duration and an average payment amount.

In some embodiments, multiple multi-protocol scores may be used to determine risk between a first entity and a second entity. For example, operations of the process 300 may be performed to determine a list of smart contracts shared by a first entity and a second entity and predict possible risks to the first entity in scenarios resulting from the incapability of the second entity to fulfill one or more norms in the list of smart contracts. In some embodiments, the risk posed to a first entity by a second entity may include considerations for intermediate relationships. For example, a first entity may be owed multiple amounts from a plurality of entities other than a second entity, and a second entity may owe multiple amounts to the plurality of entities. In some embodiments, a risk associated with the total amount of a score value to be collected by the first entity from the plurality of entities may be assessed based on the risk of the second entity failing to fulfill one or more obligations to transfer score values to one or more of the plurality of entities. While the relationship between the first entity and the second entity may be difficult to determine using conventional smart contract systems if no explicit privity relations are listed in the smart contracts, the symbolic AI models described in this disclosure allow these relationships to be determined by searching through entity lists or crawling through one or more privity graphs.

FIGS. 4-9 below show a set of directed graphs that represent examples of program state of a smart contract or a simulation of a smart contract. Each vertex of the directed graph may represent conditional statements that encode or are otherwise associated with norm conditions and outcome subroutines that may be executed when a norm condition is satisfied. Each directed graph edge of the directed graph may represent a relationship between different conditional statements. For example, the tail vertex of a directed graph edge may represent a norm vertex that, if triggered, will activate the respective head vertex of the directed graph edge. As used in this disclosure, the direction of a directed graph edge points from the tail vertex of the directed graph edge to the head vertex of the directed graph edge. Furthermore, the direction of the of the directed graph edge may indicate that the respective head vertex to which the directed graph edge points is made triggerable based on a triggering of the respective tail vertex. In some embodiments, a norm vertex may be triggered if the trigger direction is the same as the directed graph edge direction for each directed graph edge. In some embodiments, the direction of a directed graph edge associated with norm condition may be used to categorize a norm or norm vertex.

Figure 4:
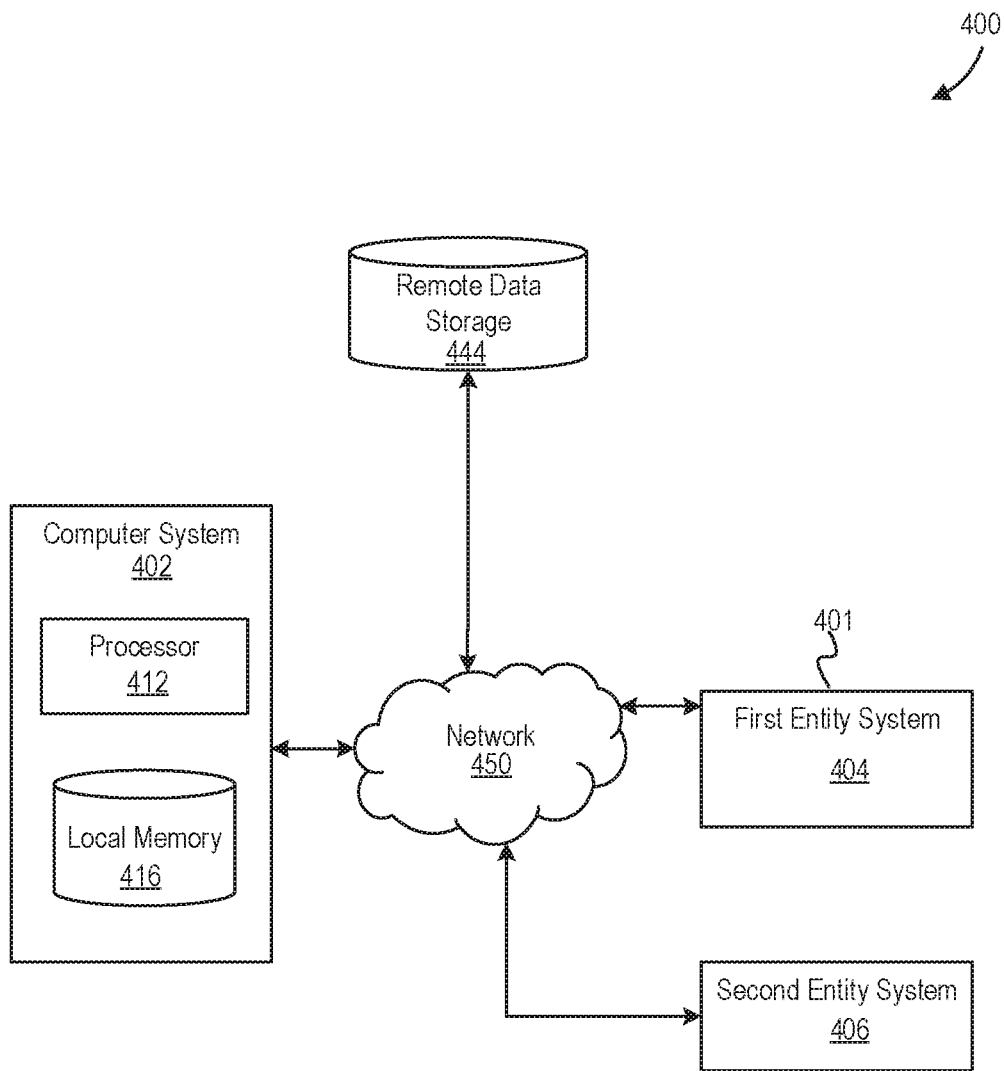
FIG. 4 show a computer system for operating one or more symbolic AI models, in accordance with some embodiments of the present techniques.

Figure show a computer system for operating one or more symbolic AI models, in accordance with some embodiments of the present techniques. As shown in FIG. 4, a system 400 may include computer system 402, first entity system 404, second entity system 406 or other components. The computer system 402 may include a processor 412 and a local memory 416, or other components. Each of the first entity system 404 or second entity system 406 may include any type of mobile computing device, fixed computing device, or other electronic device. In some embodiments, the first entity 404 may perform transactions with the second entity 406 by sending messages via the network 450 to the computer system 402. In some embodiments, the computer system 402 may execute one or more applications using one or more symbolic AI models with a processor 412. In addition, the computer system 402 may be used to perform one or more of the operations described in this disclosure for the process 100 or the process 300. Parameters, variables, and other values used by a symbolic AI model or provided by the symbolic AI model may be retrieved or stored in the local memory 416. In some embodiments, parameters, variables, or other values used or provided by the computer system 402, entity systems 404-406, or other systems may be sent to or retrieved from the remote data storage 444 via the network 450.

Figure 5:
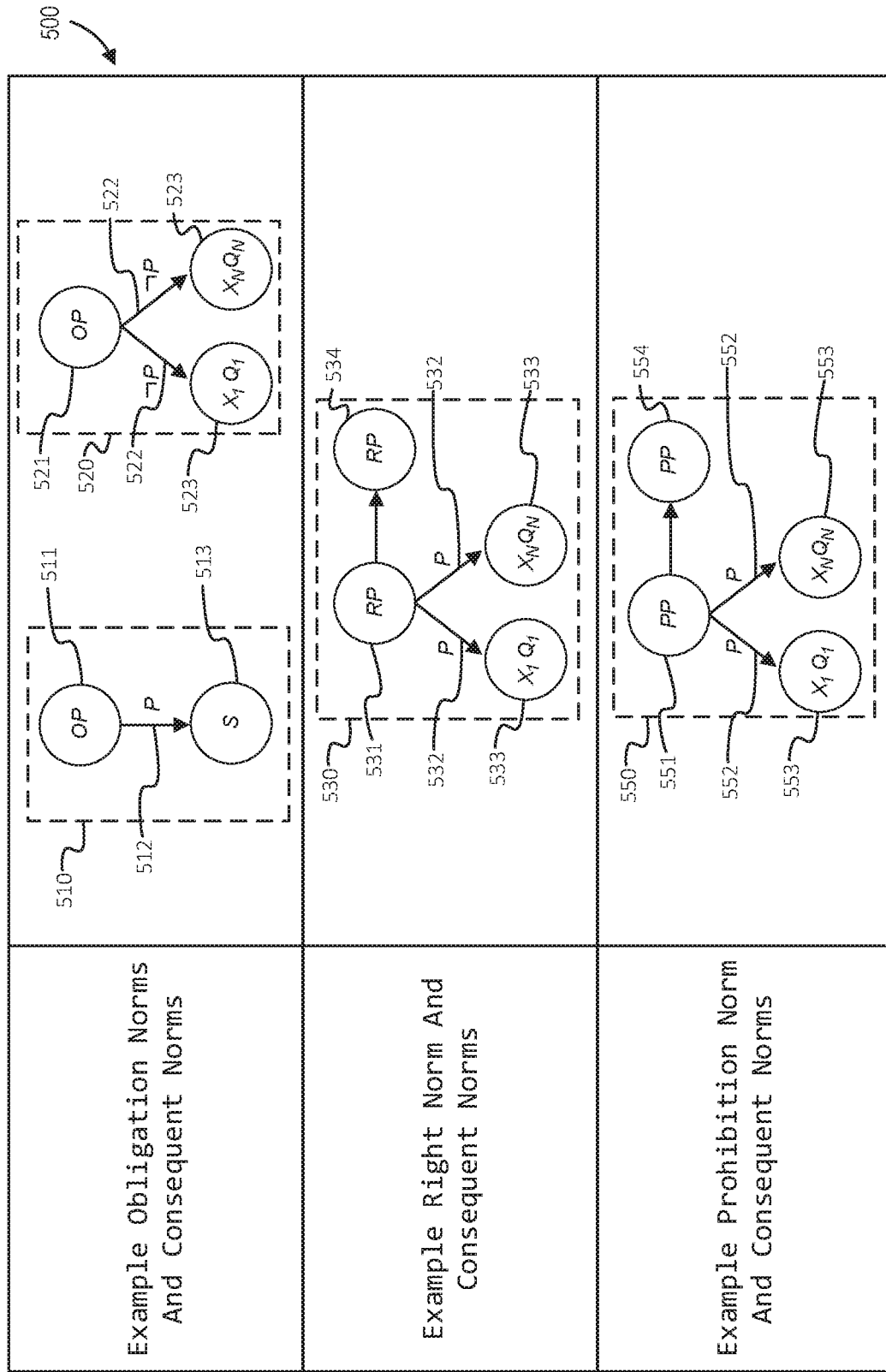
FIG. 5 includes a set of directed graphs representing triggered norms and their consequent norms, in accordance with some embodiments of the present techniques.

FIG. 5 includes a set of directed graphs representing triggered norms and their consequent norms, in accordance with some embodiments of the present techniques. The table 500 shows various triggered vertices and their respective consequent vertices in the form of directed graphs. In some embodiments, the system may include categories for norms of a smart contract based on a deontic logic model, where the categories may include obligation norms, rights norms, or prohibition norms. In addition to various contract-specific ramifications of these categories, norms within each category may share a common set of traits with respect to their transiency and possible outcomes. As shown in table 500, the relationship between a triggered norm and its consequent norms may be represented as a directed graph, where each of the norms may be represented by a vertex of the directed graph and where each triggering event may be used to as a label associated with a graph edge.

Box 510 includes a directed graph representing a smart contract state (or simulation of the smart contract state) after an event satisfying a norm condition of the obligation norm represented by the norm vertex 511. As shown in box 510, after a determination that the norm condition P associated with the norm vertex 511 is satisfied by an event (indicated by the directed graph edge 512), the system may generate an adjacent vertex 513 indicating that the norm vertex 511 is satisfied, where a norm status of the adjacent vertex 513 may be set as "terminal" to indicate that the adjacent vertex is terminal. In some embodiments, a determination that the state of the smart contract or simulation thereof is terminal may be made if a vertex of the smart contract or simulation thereof indicated to be terminal. In some embodiments, instead of generating the adjacent vertex 513, the system may update a norm status associated with the norm vertex 511 to indicate that the norm vertex 511 is satisfied. For example, the system may update a norm vertex associated with the obligation norm by setting a norm status associated with the norm vertex to "satisfied," "terminal," or some other indicator that the obligation norm has been satisfied by an event. In some embodiments, updating a norm vertex associated with the obligation norm may be represented by the statement 6, where $\xrightarrow{P}$ represents a result of the norm condition associated with the obligation norm "OP" being satisfied, and S represents the generation of a norm vertex indicating that the conditions of the obligation norm have been satisfied:

$$\text{In OP} \xrightarrow{P} S \qquad (6)$$

As shown in box 520, an norm condition P may end up not satisfying a norm condition associated with the norm vertex 521 after satisfying a condition expiration threshold, where the norm vertex 521 is associated with an obligation norm. In response, the system may update the norm vertex 521 by setting a norm status associated with the norm vertex 521 to "failed" or some other indicator that the norm condition associated with the norm vertex 521 has been not satisfied. For example, an event may indicate that a condition expiration threshold has been satisfied without an obligation norm condition being satisfied. In response, the system may generate or otherwise set as triggerable the set of consequent norms associated with adjacent vertices 523, where the relationship between a failure to satisfy a norm condition P of the norm vertex 521 and the adjacent vertices 523 is indicated by the directed graph edges 522. In some embodiments, the generation of the adjacent vertices may be represented by the statement 7, where $\xrightarrow{\neg P}$ indicates that the instructions to the right of the symbol $\xrightarrow{\neg P}$ are to be performed if a norm condition "OP" is not satisfied, and the instructions represented by the symbolic combination $\Lambda_i X_i Q_i$ represents the generation or activation of the consequent norms that result from the failure of OP:

$$OP \xrightarrow{\neg P} \Lambda_i X_i Q_i \qquad (7)$$

In some embodiments, in response to an event satisfying a norm condition of a rights norm, the system may update a norm vertex associated with the rights norm by setting a norm status associated with the norm vertex to "exercised" or some other indicator that the rights norm has been triggered based on an event. For example, as shown in box 530, in response to an event satisfying a norm condition associated a rights norm represented by the norm vertex 531, the system may update a norm vertex associated with the norm vertex 531 by setting a norm status associated with the norm vertex 531 to "exercised" or some other indicator that the rights norm has been exercised. In response, the system may generate or otherwise set as triggerable the set of consequent norms associated with adjacent vertices 533, where the relationship between satisfying a norm condition P associated with the norm vertex 531 and the set of consequent norms associated with adjacent vertices 533 is indicated by the directed graph edges 532. Furthermore, in some embodiments, a rights norm may be contrasted with an obligation norm by allowing a rights norm to remain triggerable after triggering. This may be implemented by further generating or otherwise setting as triggerable the rights norm associated with the rights norm vertex 534. In some embodiments, a rights norm may expire after use. For example, some embodiments may not generate the rights norm vertex 534 after triggering the norm vertex 531. In some embodiments, the operation described above may be represented by statement 8 below, where the result of triggering a rights norm $Rh_1$ by satisfying the norm condition P may result in a conjunction of newly-triggerable consequent norms $\Lambda_i X_i Q_i$ and a rights norm $RP_2$ that is identical to the rights norm $RP_1$, where $\Lambda$ represents a mathematical conjunctive operation:

$$RP_1 \xrightarrow{P} \Lambda_i X_i Q_i \Lambda RP_2 \qquad (8)$$

In some embodiments, in response to an event satisfying the norm condition of a "prohibition" norm, the system may update a norm vertex associated with the "prohibition" norm by setting a norm status associated with the norm vertex to "violated" or some other indicator that the "prohibitions"" norm has been triggered based on an event. For example, as shown in box 550, an event may satisfy a norm condition P associated with the prohibition norm represented by a norm vertex 551. In response, the system may update the norm vertex 551 by setting a norm status associated with the norm vertex 551 to "violated" or some other indicator that the associated prohibitions norm condition has been satisfied. In response, the system may generate or otherwise set as triggerable the set of consequent norms associated with adjacent vertices 553, where the relationship between satisfying a norm condition P associated with the norm vertex 551 and the set of consequent norms associated with adjacent vertices 553 is indicated by the directed graph edges 552. Furthermore, in some embodiments, a prohibitions norm may be contrasted with an obligation norm by allowing a prohibitions norm to survive triggering. In addition, in some embodiments, triggering a prohibitions norm may result in the system decreasing a value representing the state of the smart contract. This may be implemented by further generating or otherwise setting as triggerable the prohibitions norm associated with the prohibitions norm vertex 554 after triggering the norm vertex 551. In some embodiments, the operation described above may be represented by statement 9 below, where the result of triggering a prohibition norm $PP_1$ by satisfying the norm condition P may result in a conjunction of newly-triggerable consequent norms $\Lambda_i X_i Q_i$ and a prohibition norm $PP_2$ that is identical to the prohibition norm $PP_1$, where $\Lambda$ represents a mathematical conjunctive operation:

$$PP_1 \xrightarrow{P} \Lambda_i X_i Q_i \Lambda PP_2 \qquad (9)$$

Figure 6:
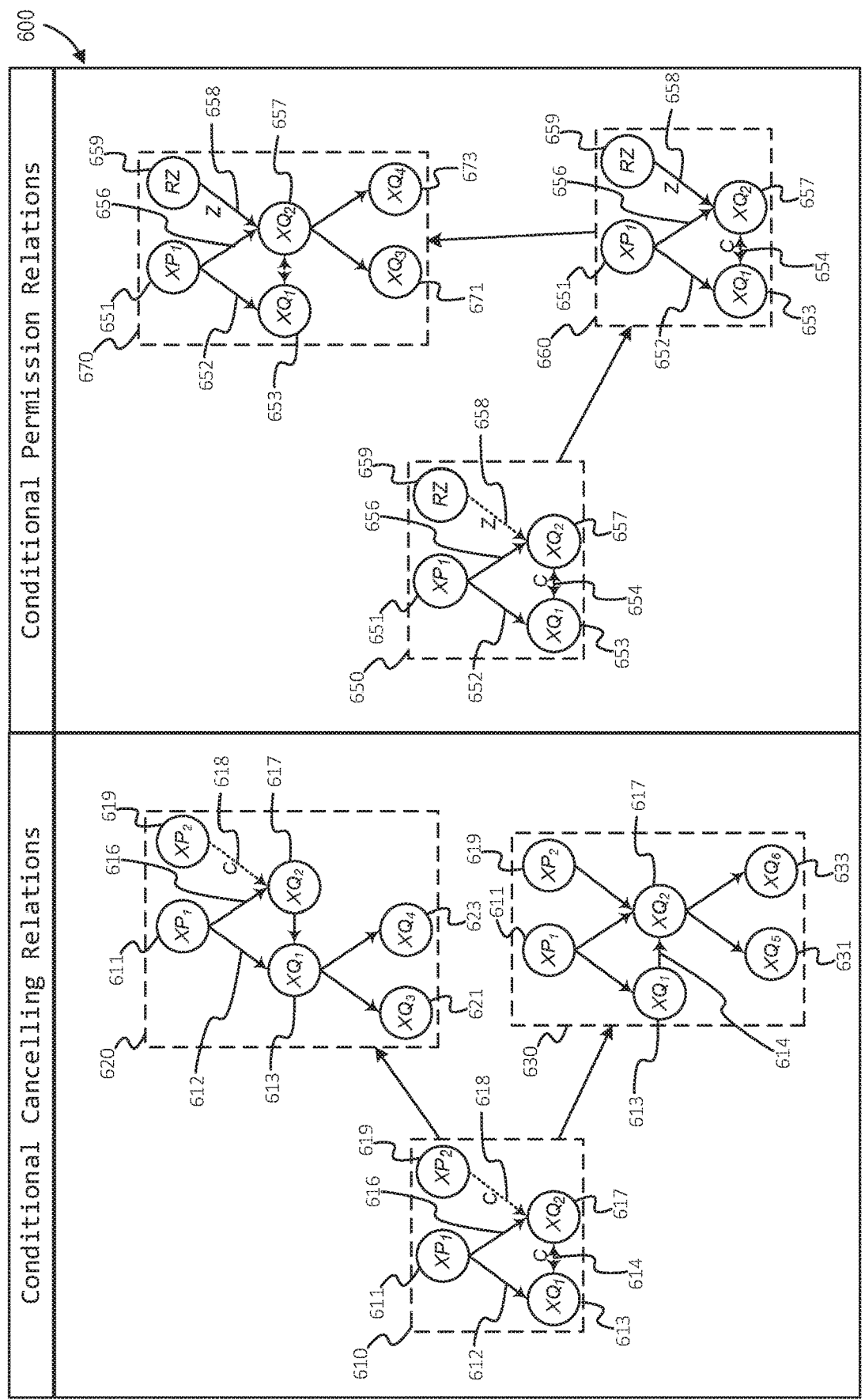
FIG. 6 includes a set of directed graphs representing possible cancelling relationships and possible permissive relationships between norms, in accordance with some embodiments of the present techniques.

FIG. 6 includes a set of directed graphs representing possible cancelling relationships and possible permissive relationships between norms, in accordance with some embodiments of the present techniques. The table 600 includes a left column that includes a directed graph 610 representing an initial state and a directed graph 620 that represents a first possible outcome state of the initial state and a directed graph 630 that represents a second possible outcome state of the initial state. In some embodiments, a norm condition may be a cancellation condition, where satisfying a cancellation condition results in the cancellation of one or more norms. Cancelling a norm may include deactivating a norm, deleting the norm, deleting graph edges to the norm, or otherwise or otherwise setting the norm as not triggerable. For example, an obligations norm may include a cancellation outcome subroutine, where triggering the obligations norm may result in the cancellation of one or more norms adjacent to the obligations norm. In some embodiments, the effect of satisfying a cancellation norm may be represented by statement 10 below, where XP may represent an obligations norm, $\xrightarrow{P, \neg P}$ may indicate that the event which triggers the norm XP occurs when the norm condition P is either satisfied or failed, $\Lambda_i X_i Q_i$ represents the set of consequent norms that are set to be triggerable based on the event triggering XP, and $X_j U_j$ may represent the set of consequent norms that cancelled based on event triggering XP:

$$XP \xrightarrow{P, \neg P} \Lambda_i X_i Q_i \Lambda \Lambda_{j-} X_j U_j \qquad (10)$$

As shown by statement 10 above, one or more norms may be cancelled. In some embodiments, a cancellation may be implemented as an inactive graph edge between the norm XP and the norms $X_jU_j$, where the graph edge representing the conditional relationship between the norm XP and the norms $X_jU_j$ are directed towards the norm XP. In some embodiments, the cancellation of a norm may be implemented by setting an indicator to indicate that a norm or condition associated with the cancelled norm is no longer triggerable.

The directed graph 610 may represent a state of a start contract and may include the first vertex 611, second vertex 613, third vertex 617, and fourth vertex 619, each of which are associated with a norm of a smart contract. The directed graph 610 also depicts a mutual cancellation relationship between the norm associated with the second vertex 613 and the third vertex 617 represented by the XQ1-XQ2 graph edge 614, where a mutual cancellation relationship of a pair of norm vertices may include a cancellation of one norm vertex of the pair upon triggering of the other norm vertex of the pair. The directed graph 610 also depicts a unidirectional cancellation relationship between the norm associated with the fourth vertex 619 and the third vertex 617 as represented by the XP2-XQ2 graph edge 618. In some embodiments, satisfying or otherwise triggering the norm associated with the third vertex 617 may instantiate the RZ-XQ2 graph edge 618 and cancel the fourth vertex 619. In some embodiments, each of vertices and graph edges shown in FIG. 5 may be represented using a protocol simulation program. For example, the first vertex 611 may be modeled in a simulation program and may be associated with a conditional statement of a smart contract.

In some embodiments, the state represented by the directed graph 610 may advance to the state represented by the directed graph 620. The state represented by the directed graph 620 may be achieved by triggering the norm associated with the second vertex 613, which may result in the cancellation of the norm associated with the third vertex 617. Furthermore, as illustrated by the directed graph 620, triggering the norm associated with the second vertex 613 may also result in the activation of fifth vertex 621 and sixth vertex 623. In addition, triggering the norm associated with the third vertex 617 may result in the cancellation of the norm associated with the fourth vertex 619. Furthermore, as illustrated by the directed graph 630, triggering the norm associated with the third vertex 617 may also result in the activation of a seventh vertex 631 and eighth vertex 633. Each of these triggering behaviors may be implemented directly by a smart contract.

In some embodiments, the triggering relationship described in this disclosure may be modeled using a symbolic AI system that may keep track of any scores associated with events that trigger the norms and the outcomes of triggering the norms. For example, a first probability value may be assigned to the state represented by the directed graph 620 and a second probability value may be assigned to the state represented by the directed graph 630 during a simulation of the smart contract. The symbolic AI system may use the first and second probability values to advance the state represented by either the directed graph 620 or the directed graph 630 over multiple iterations to compute a multi-iteration score using the methods described in this disclosure. For example, if the first probability value is 20% and the second probability value is 80%, and a first score represented by the directed graph 620 is equal to 100 cryptocurrency units and a second score represented by the directed graph 630 is equal to 1000 cryptocurrency units, a multi-iteration score may be equal to 820 cryptocurrency units.

The right column of table 600 includes a directed graph 550, which may represent an initial state of a smart contract (or simulation thereof). The right column of table 600 also includes a directed graph 560 that represents a first possible outcome state of the initial state and a directed graph 570 that represents a subsequent possible outcome state of the first possible outcome state. The initial state represented by the directed graph 550 may include a permissive condition of a permission norm, where satisfying a permissive condition may result in the activation of one or more norms. For example, after being activated, a rights norm RP may include a set of permissions $\{RV_k\}$ that are triggered after satisfying an norm condition associated with the rights norm RP, where the rights norm RP may also be described as a permission norm. Triggering the set of permissions $\{RV_k\}$ may either set the norm XP to be triggerable or otherwise prevent an outcome subroutine of the norm XP from being executed until the set of permissions $\{RV_k\}$ are triggered. This relationship may be represented by statement 11 below, where XP may represent an obligations norm, $RV_k$ represents the permissions that must be triggered before XP may be triggered, $\xrightarrow{P.\neg P}$ may indicate that the event which triggers the norm XP occurs when the norm condition P is either satisfied or failed, $\Lambda_i X_i Q_i$ represents the set of consequent norms that are set to be triggerable based on the event triggering XP after the permissions $RV_k$ are triggered, and $X_jU_j$ may represent the set of consequent norms that cancelled based on event triggering XP after the permissions $RV_k$ are triggered:

$$XP|RV_k \xrightarrow{P.\neg P} \Lambda_i X_i Q_i \Lambda \Lambda_{j\neg} X_j U_j \qquad (11)$$

As shown by statement 11 above, XP may be set to be triggerable upon triggering of the permission $RV_k$. Triggering XP after the permissions $RV_k$ are triggered results in activation of the consequent norms $\Lambda_i X_i Q_i$ and cancels the norms $X_jU_j$. In some embodiments, the conditions needed to trigger permissions may be activated in conjunction with rights norms dependent on the permissions, and thus XP and $RV_k$ may be activated as a result of triggering the same triggered norm. In some embodiments, permission behavior may be performed by a smart contract or a simulation thereof by modifying a first status of a first vertex and a second status of a second vertex to indicate that the first and second vertices are triggered, where the first vertex may represent a first rights norm such as XP and the second vertex may represent a permission norm such as a norm having outcome permissions $RV_k$. The smart contract, or a simulation thereof, may trigger a third vertex that is adjacent to the first vertex and the second vertex such as a vertex in $\Lambda_i X_i Q_i$ in response to the first and second statuses now being triggered.

The directed graph 550 may include a first vertex 551, second vertex 553, third vertex 557, and fourth vertex 559. The directed graph 550 also depicts a mutual cancellation relationship between the norm associated with the second vertex 553 and the third vertex 557 represented by the XQ1-XQ2 graph edge 554. The directed graph 550 also depicts a permission relationship between the norm associated with the fourth vertex 559 and the third vertex 557 as represented by the RZ-XQ2 graph edge 558, where the fourth vertex 559 may include or otherwise be associated with permission conditions that must be satisfied in order to trigger the third vertex 557. In some embodiments, satisfying or otherwise triggering the norm associated with the fourth vertex 559 may instantiate the RZ-XQ2 graph edge 558 and allow the outcome subroutines of the third vertex 557 to be executed.

In some embodiments, the program state represented by the directed graph 550 may produce an outcome state represented by the directed graph 560. The outcome state represented by the directed graph 560 may be achieved by satisfying a norm condition associated with the fourth vertex 559. In some embodiments, after the XQ1-XQ2 graph edge 554 becomes instantiated, an event satisfying a norm condition associated with the third vertex 557 may result in the program state represented by the directed graph 570. The directed graph 570 may represent a program state where the norm associated with the third vertex 557 is triggered, resulting in the activation of additional norms associated with the fifth vertex 571 and sixth vertex 573.

In some embodiments, a symbolic AI system may be used to generate a scenario that includes a sequence of inputs having a first input and a second input. The first input may advance the state represented by the directed graph 550 to the state represented by the directed graph 560 and the second input may advance the state represented by the directed graph 560 to the state represented by the directed graph 570. The sequence of inputs may be determined using any of the methods described in this disclosure. For example, the sequence of inputs may be determined using a Monte Carlo method, a neural network, or the like.

Figure 7:
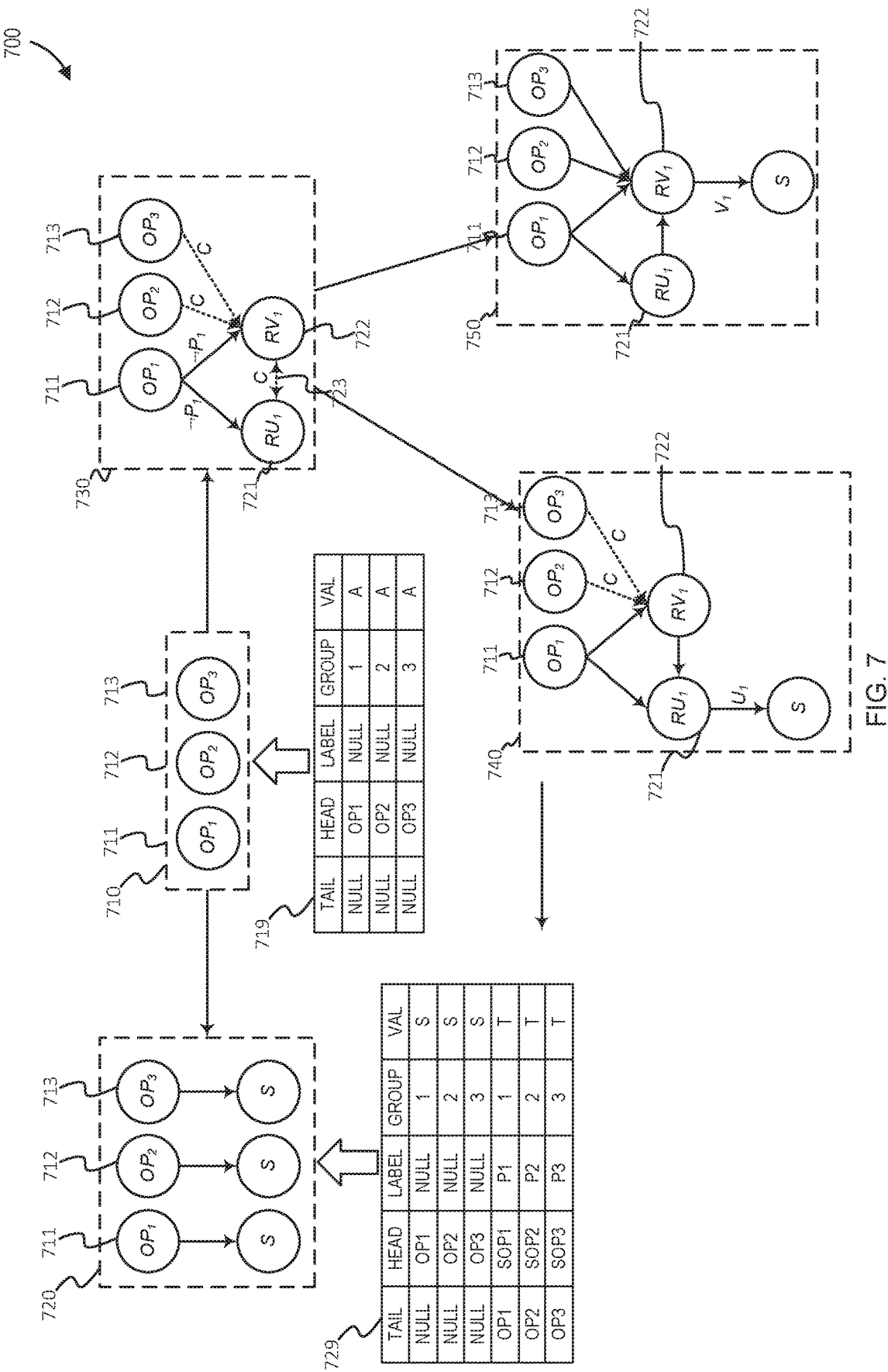
FIG. 7 includes a set of directed graphs representing a set of possible outcome states based on events corresponding to the satisfaction or failure of a set of obligations norms, in accordance with some embodiments of the present techniques.

FIG. 7 includes a set of directed graphs representing a set of possible outcome states based on events corresponding to the satisfaction or failure of a set of obligations norms, in accordance with some embodiments of the present techniques. The set of directed graphs 710 includes a set of three vertices 711-713, each representing an obligation norm to perform a set of related tasks. In some embodiments, the obligation norm may represent an obligation to transmit digital assets, deliver a data payload, or perform a computation. For example, the obligation norm represented by the first vertex 711 may be associated with an obligation for a first entity to transmit a down payment to a second entity, where a determination that the down payment occurred may be based on an event message sent by the second entity confirming that payment was delivered. The obligation norm represented by the second vertex 712 may be associated with an obligation for the second entity to deliver an asset to the first entity, where a determination that the asset was delivered may be based on an event message sent by the second entity confirming that the asset was delivered. The obligation norm represented by the third vertex 713 may be associated with an obligation for the first entity to pay a balance value to the second entity.

The set of directed graphs 720 may represent a first outcome state that may result from the program state represented by the set of directed graphs 710, where each of the obligation norms represented by the three vertices 711-713 are satisfied. In some embodiments, a smart contract simulation system such as a symbolic AI system may assign a probability value to the possibility the state represented by the set of directed graphs 710 is advanced to the outcome state represented by the set of directed graphs 720. For example, a symbolic AI system may assign a probability for the outcome state represented by the set of directed graphs 720 to be equal to 82% when starting from the state represented by the set of directed graphs 710. The symbolic AI system may then perform a set of simulations based on this probability value using a Monte Carlo simulator.

The set of directed graphs 730 may represent a second outcome state that may result from the program state represented by the set of directed graphs 710, where the first obligation is not satisfied and the time has exceeded a condition expiration threshold associated with the first vertex 711. As shown in the set of directed graphs 730, a failure to meet the first obligation represented by the first vertex 711 may result in a system generating or otherwise activating norms associated with a fourth vertex 721 and a fifth vertex 722. In some embodiments, the norm associated with the fourth vertex 721 may represent a first entity's right to cure the payment failure and the norm associated with the fifth vertex 722 may represent a second entity's right to terminate the smart contract. The bidirectional graph edge 723 indicates that triggering one of the pair of vertices 721-722 will cancel or otherwise render as inactive the other of the pair of vertices 721, which may indicate that curing a failed obligation and terminating the smart contract may be mutually exclusive outcomes. In some embodiments, a symbolic AI system (or other modeling system) may assign a probability value to the possibility the state represented by the set of directed graphs 710 is advanced to the outcome state represented by the set of directed graphs 720. For example, the symbolic AI system may assign a probability for the outcome state represented by the set of directed graphs 720 to be equal to 6% when performing a simulation based on the smart contract program state represented by the set of directed graphs 710.

In some embodiments, the state represented by the set of directed graphs 730 may be advanced to the state represented by a set of directed graphs 740. In some embodiments, the state represented by a set of directed graphs 740 may be an outcome state after the norm associated with the fourth vertex 721 is triggered. As shown in the set of directed graphs 740, triggering the norm associated with the fourth vertex 721 may result in cancelling the norm associated with fifth vertex 722. In some embodiments, a symbolic AI system may use probability value representing the probability of the state represented by the set of directed graphs 730 advancing to the state represented by a set of directed graphs 740. For example, a symbolic AI system may use 50% as the probability that the state represented by the set of directed graphs 730 advances to the state represented by a set of directed graphs 740. If the probability of the state represented by the set of directed graphs 720 advancing to the state represented by a set of directed graphs 730 is equal to 6%, this would mean that the probability of the state represented by the set of directed graphs 710 advancing to the state represented by a set of directed graphs 740 is equal to 3% by applying the multiplication rule for the probability of independent events.

In some embodiments, the state represented by the set of directed graphs 730 may be advanced to the state represented by a set of directed graphs 750. In some embodiments, the state represented by a set of directed graphs 750 may be an outcome state after the norm associated with the fifth vertex 722 is triggered. As shown in the set of directed graphs 750, triggering the norm associated with the fifth vertex 722 may result in cancelling the norm associated with second vertex 712, third vertex 713, and fourth vertex 721. In some embodiments, a symbolic AI system may assign a probability value to the possibility of a smart contract state being in the outcome state represented by the set of directed graphs 750 when starting from the program state represented by the set of directed graphs 730. In some embodiments, the probability values associated with each state may be updated after each iteration in a set of simulated iterations using one or more of the methods in this disclosure. For example, some embodiments may apply a MCTS method to explore the program states represented by the sets of directed graphs 710, 720, 730, and 740 across multiple iterations while keeping track of scores for each iteration in order to determine outcome scores for each iteration and multi-iteration scores.

Figure 8:
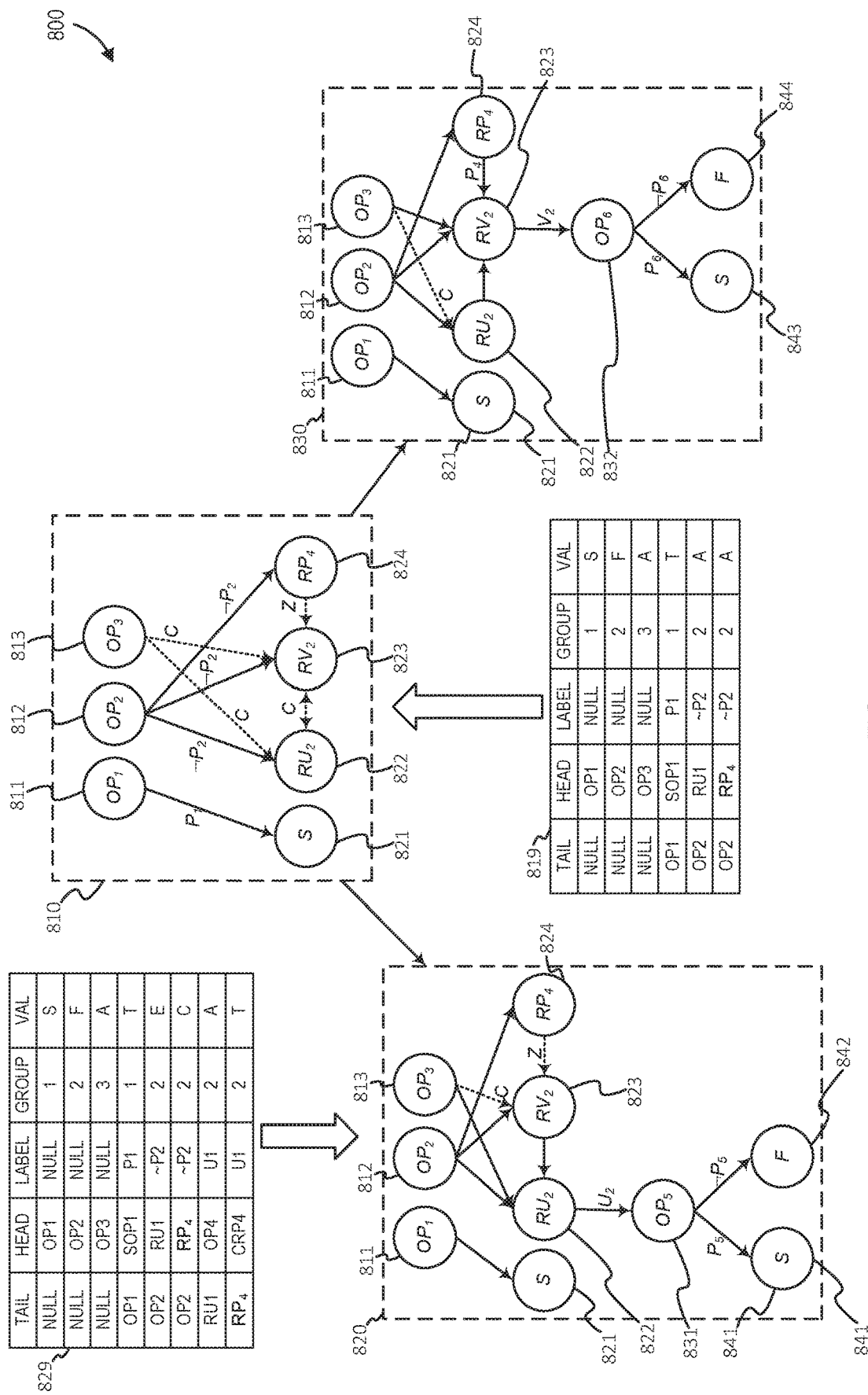
FIG. 8 includes a set of directed graphs representing a set of possible outcome states after a condition of a second obligations norm of a set of obligations norms is not satisfied, in accordance with some embodiments of the present techniques.

FIG. 8 includes a set of directed graphs representing a set of possible outcome states after a condition of a second obligations norm of a set of obligations norms is not satisfied, in accordance with some embodiments of the present techniques. In some embodiments, the set of directed graphs 810 may represent an initial state of a smart contract. Alternatively, the set of directed graphs 810 may represent an outcome state. For example, the program state represented by the set of directed graphs 810 may be an outcome state of the program state represented by the set of directed graphs 710, with an associated occurrence probability equal to 6%. The set of directed graphs 810 may represent a failure to satisfy a norm condition associated with the second vertex 812. In some embodiments, the second vertex 812 may represent an obligation norm indicating an obligation for a second entity to deliver an asset, such as a schematic, to the first entity.

In some embodiments, the state represented by the set of directed graphs 810 may be advanced to the state represented by a set of directed graphs 820. In some embodiments, the state represented by a set of directed graphs 820 may be an outcome state after the norm associated with the fifth vertex 822 is triggered. As shown in the set of directed graphs 820, triggering the norm associated with the fifth vertex 822 may result in cancelling the norm associated with sixth vertex 823. In some embodiments, the fifth vertex 822 may represent a first entity's right to terminate the order and obtain a refund. This outcome may be represented by the eighth vertex 831, which may represent an obligation norm indicating that the second entity has an obligation to pay the first entity, and that this obligation may either be satisfied or failed, as indicated by vertices 841 and 842, respectively.

In some embodiments, the state represented by the set of directed graphs 810 may be advanced to the state represented by a set of directed graphs 830. In some embodiments, the state represented by a set of directed graphs 820 may be an outcome state after the norm associated with the sixth vertex 823 is triggered. As shown in the set of directed graphs 830, triggering the norm associated with the sixth vertex 823 may result in cancelling the norm associated with sixth vertex 823. In some embodiments, the sixth vertex 823 may represent a first entity's right to cure the failure to satisfy the norm represented by the second vertex 812. This outcome may be represented by the ninth vertex 832, which may represent an obligation norm indicating that the second entity has an obligation to deliver an asset to the first entity, and that this obligation may either be satisfied or failed, as indicated by vertices 843 and 844, respectively.

In some embodiments, a symbolic AI system may assign a probability value to the possibility of a smart contract state being in the outcome state represented by the set of directed graphs 820 or set of directed graphs 830 when starting from the program state represented by the set of directed graphs 810. For example, a symbolic AI system may determine that the probability that the outcome state represented by the set of directed graphs 820 is equal to 40%. Similarly, the symbolic AI system may determine that the probability that the outcome state represented by the set of directed graphs 830 is equal to 60%. In some embodiments, the symbolic AI system may use a Bayesian inference to determine if an obligation norm was failed was failed based on a probability distribution computed from the scores associated with program states such as those states represented by the sets of directed graphs 820 or 830. For example, the symbolic AI system may acquire a new score value and, based on the score value, predict whether an obligation represented by the second vertex 812 was failed.

Figure 9:
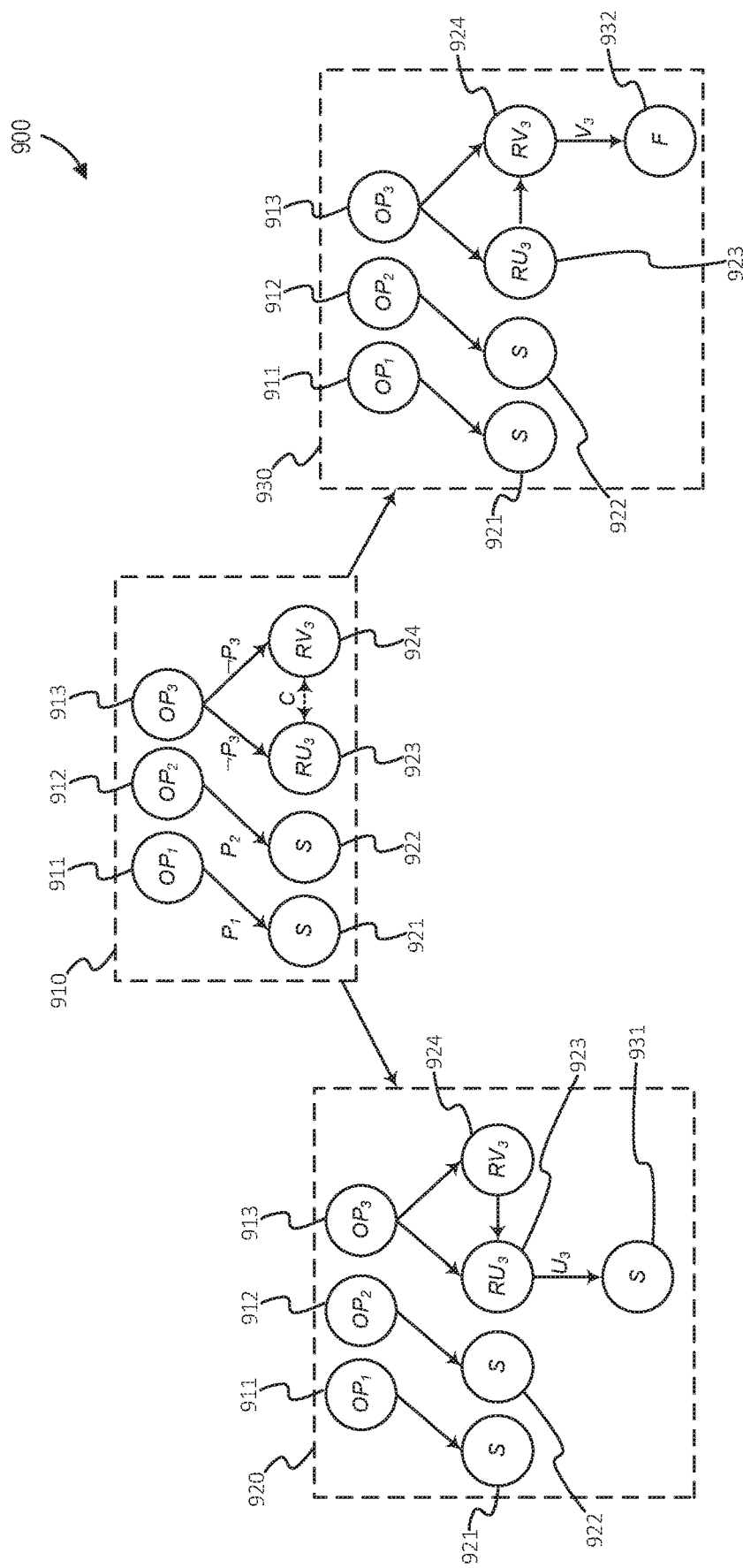
FIG. 9 includes a set of directed graphs representing a set of possible outcome states after a condition of a third obligations norm of a set of obligations norms is not satisfied, in accordance with some embodiments of the present techniques.

FIG. 9 includes a set of directed graphs representing a set of possible outcome states after a condition of a third obligations norm of a set of obligations norms is not satisfied, in accordance with some embodiments of the present techniques. In some embodiments, the set of directed graphs 910 may represent an initial state of a smart contract. Alternatively, the set of directed graphs 910 may represent an outcome state. For example, the program state represented by the set of directed graphs 910 may be an outcome state of the program state represented by the set of directed graphs 810, with an associated occurrence probability equal to 6%. The set of directed graphs 910 may represent a failure to satisfy a norm condition associated with the third vertex 913. In some embodiments, the third vertex 913 may represent an obligation norm indicating an obligation for a first entity to pay a balance value to the second entity. Triggering the norm associated with third vertex 913 by failing to satisfy an associated obligation condition may result in activating norms associated with a sixth vertex 923 and a seventh vertex 924. In some embodiments, the norm associated with the sixth vertex 923 may represent a first entity's right to cure the payment failure and the norm associated with the seventh vertex 924 may represent a second entity's right to declare a breach and flag the first entity for further action (e.g. initiate arbitration, incur a reputation score decrease, or the like).

In some embodiments, the state represented by the set of directed graphs 910 may be advanced to the state represented by a set of directed graphs 920. In some embodiments, the state represented by a set of directed graphs 920 may be an outcome state after the norm associated with the sixth vertex 923 is triggered. In some embodiments, the norm associated with the sixth vertex 923 may represent a first entity's right to cure the payment failure, and thus triggering the rights norm associated with the sixth vertex 923 may represent a first entity's right to cure the failure. As indicated by the satisfaction vertex 931, curing the payment failure may end all outstanding obligations of the smart contract.

In some embodiments, the state represented by the set of directed graphs 910 may be advanced to the state represented by a set of directed graphs 930. In some embodiments, the state represented by a set of directed graphs 930 may be an outcome state after the norm associated with the seventh vertex 924 is triggered. In some embodiments, the norm associated with the seventh vertex 924 may represent a second entity's right to declare a breach, and thus triggering the rights norm associated with the seventh vertex 924 may represent a second entity's declaration of contract breach. This may result in the activation of the failure vertex 932, which may include outcome subroutines that sends a message indicating that the smart contract is in breach to a third party or sends instructions to an API of another application.

Figure 10:
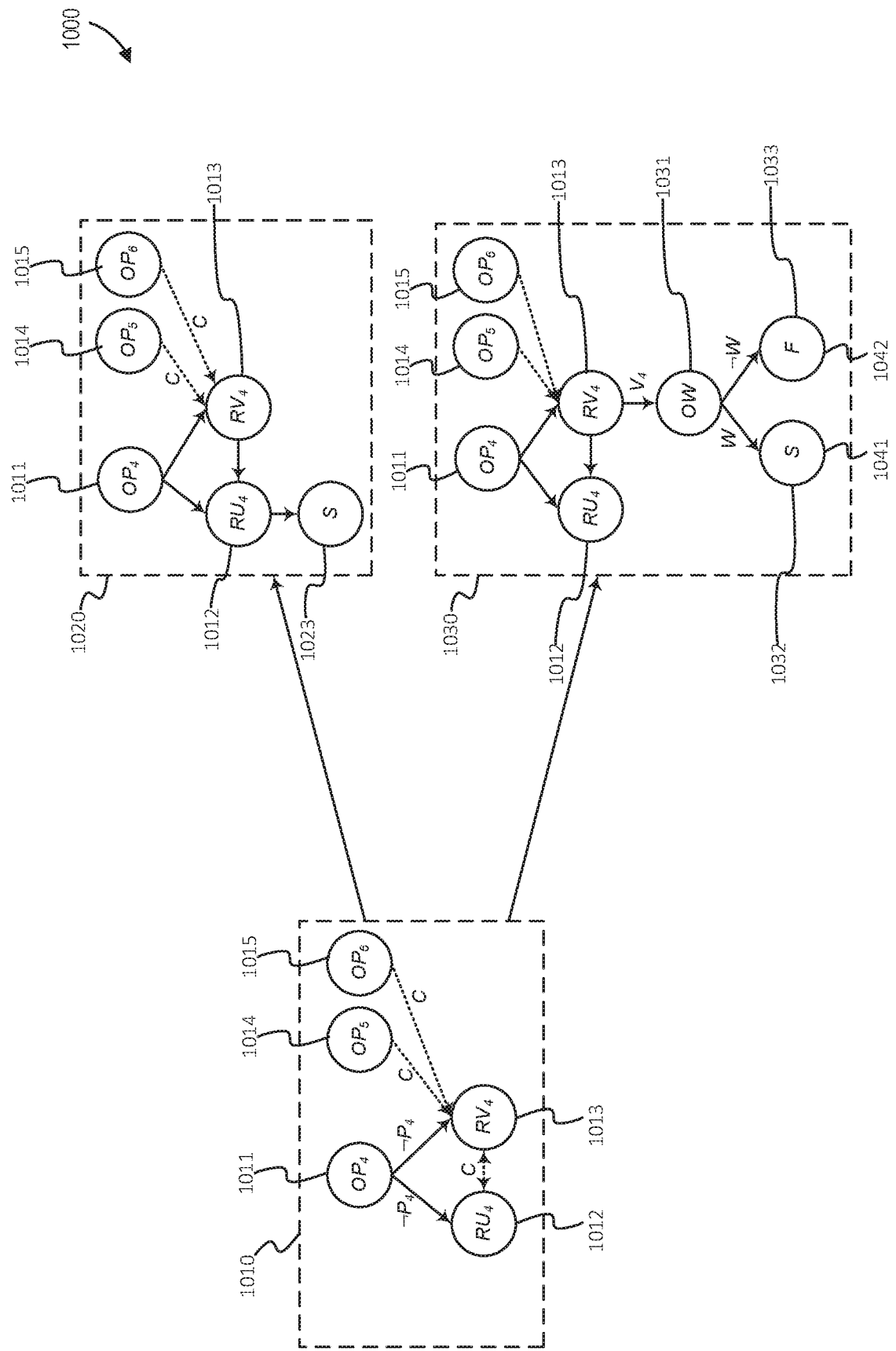
FIG. 10 includes a set of directed graphs representing a pair of possible outcome states after a condition of a fourth obligations norm of a set of obligations norms is not satisfied, in accordance with some embodiments of the present techniques.

FIG. 10 includes a set of directed graphs representing a pair of possible outcome states after a condition of a fourth obligations norm of a set of obligations norms is not satisfied, in accordance with some embodiments of the present techniques. FIG. 10 includes a directed graph 1010 representing a first program state of a smart contract or a symbolic AI simulation thereof. The program state represented by the directed graph 1010 may be changed to the program state represented by a directed graph 1020. Alternatively, the program state represented by the directed graph 1010 may be changed to the program state represented by a directed graph 1030. The directed graph 1010 includes a first vertex 1011 that may represent an obligations norm. In some embodiments, the first vertex 1011 may represent an obligation norm reflecting an obligation to pay by the time a condition expiration threshold is satisfied. If the obligation to pay is failed, the obligation norm associated with the first vertex 1011 may be triggered and the rights norms associated with the second vertex 1012 and the third vertex 1013 may be activated. The second vertex 1012 may represent a rights norm to cure the failure to satisfy the obligations norm represented by the first vertex 1011, and the third vertex 1013 may represent a rights norm to accelerate the payments the smart contract. The directed graph 1010 also includes a pair of vertices 1014-1015 representing future obligations to pay, where exercising the rights norm represented by the third vertex 1013 may cancel the future obligations to pay.

In some embodiments, the state represented by the directed graph 1010 may be advanced to the state represented by the directed graph 1020. In some embodiments, the state represented by the directed graph 1020 may be an outcome state after the norm associated with the second vertex 1012 is triggered. In some embodiments, the norm associated with the second vertex 1012 may represent a right to cure the failure to satisfy the norm condition associated with the first vertex 1011. As indicated by the directed graph 1020, exercising the rights norm associated with the second vertex 1012 may satisfy the norm and activate the vertex 1023, which may indicate that the rights norm associated with the second vertex 1012 has been satisfied.

In some embodiments, the state represented by the directed graph 1010 may be advanced to the state represented by the directed graph 1030. In some embodiments, the state represented by the directed graph 1030 may be an outcome state after the norm associated with the third vertex 1013 is triggered. In some embodiments, the rights norm associated with the third vertex 1013 may represent a right to accelerate payment. Triggering the rights norm associated with the third vertex 1013 may cancel the rights norm associated with the second vertex 1012. In addition, triggering the rights norm associated with the third vertex 1013 may also cancel the obligation norms associated with the vertices 1014-1015. Triggering the rights norm associated with the third vertex 1013 may cause the system to activate a new obligation norm associated with the fourth vertex 1031. In some embodiments, the new obligation norm may include norm conditions to determine whether a first entity transmits a payment amount to the second entity. For example, the new obligation norm may determine whether the first entity transmitted the entirety of a principal payment of a loan to the second entity. The obligation norm associated with the fourth vertex 1031 may be associated to a satisfaction norm represented by a fifth vertex 1041 or a failure norm represented by a sixth vertex 1042.

In some embodiments, advancement of the state represented by the directed graph 1010 to the state represented by the directed graph 1020 or the state represented by the directed graph 1030 may be simulated using a symbolic AI system. For example, the state represented by the directed graph 1010 may be copied into a symbolic AI model, where both the conditional statements associated with the nodes and of the directed graph the edges connecting the nodes of the directed graph may be copied. A symbolic AI system may then simulate state changes using the symbolic AI model to determine an expected value for a smart contract that has already reached the state represented by the directed graph 1010, where the expected value may be a multi-iteration score.

In some embodiments, each of the smart contracts represented by the directed graphs 610, 650, 710, and 1010 may be analyzed using a symbolic AI system to determine one or more multi-protocol scores. For example, each of the smart contracts represented by the directed graphs 610, 650, 710, and 1010 may be analyzed to produce multi-iteration scores such as average scores for each smart contract and a kurtosis value of expected scores. In some embodiments, the analysis may use the same rules to govern the behavior entities in the smart contract by basing the rules on logic types and vertex statuses instead of the contexts of specific agreements. For example, each smart contract simulation may be simulated with a set of rules that include a rule that the probability that a rights norm to cure is triggered instead of a rights norm to accelerate being triggered is equal to 90%. The multi-iteration scores may then be further analyzed to determine a multi-protocol score. For example, based on a multi-iteration score representing a risk score associated with each of the smart contracts, the total exposed risk of a first entity with respect to a second entity may be determined, where the total exposed risk may be a multi-protocol score.

Figure 11:
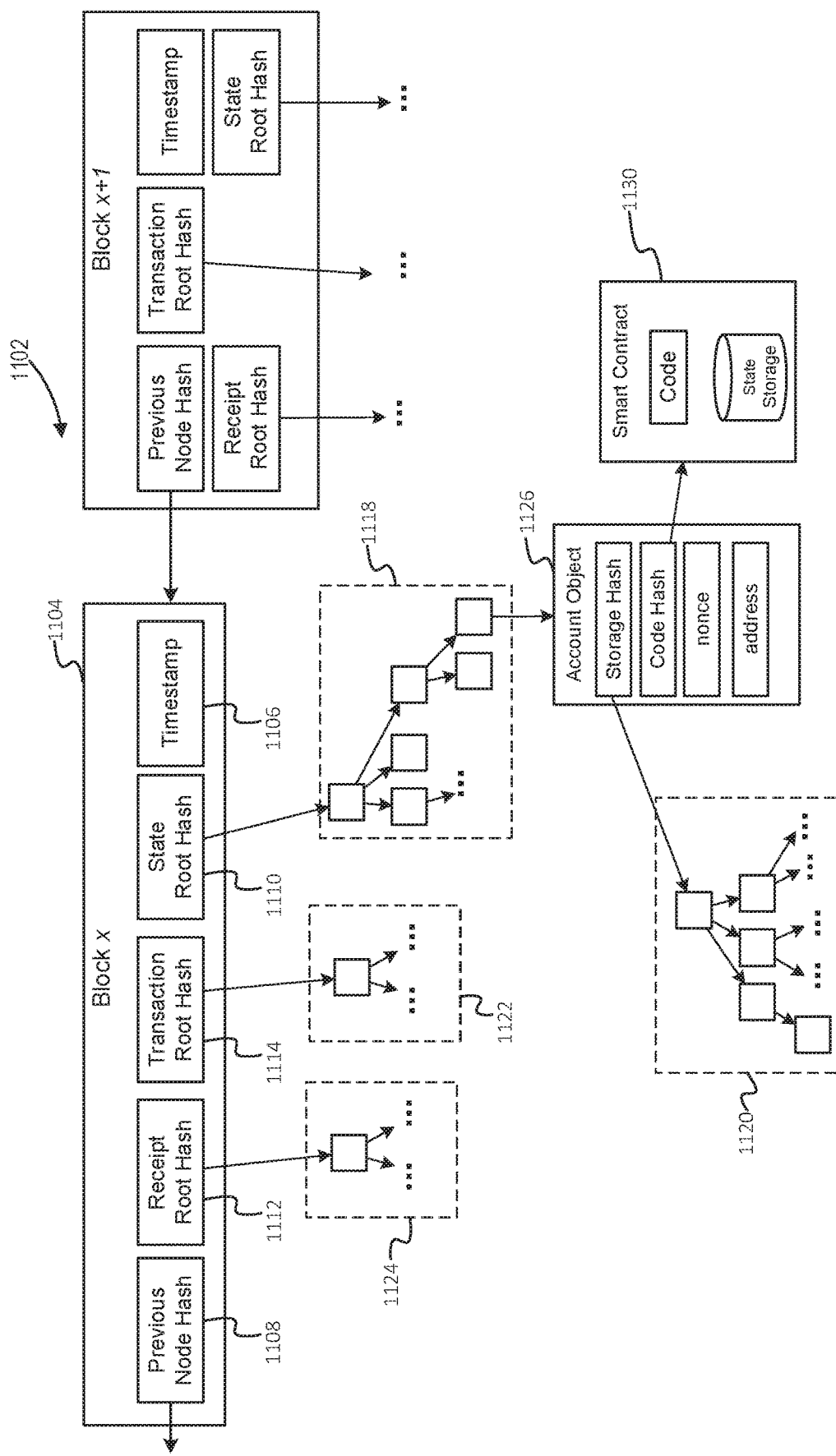
FIG. 11 is a block diagram illustrating an example of a tamper-evident data store that may used to render program state tamper-evident and perform the operations in this disclosure, in accordance with some embodiments of the present techniques.

FIG. 11 is a block diagram illustrating an example of a tamper-evident data store that may used to render program state tamper-evident and perform the operations in this disclosure, in accordance with some embodiments of the present techniques. In some embodiments, the tamper-evident data store may be a distributed ledger, such as a blockchain (or other distributed ledger) of one of the blockchain-based computing platforms described in this disclosure. FIG. 11 depict two blocks in a blockchain, and also depicts tries of cryptographic hash pointers having root hashes stored in the two blocks. The illustrated arrows may represent pointers (e.g., cryptographic hash). For example, the arrow 1103 may represent a pointer from a later block to block 1104 that joints the two blocks together. In some embodiments, blocks may be consecutive. Alternatively, the data from the use of a smart contract may skip several blocks between uses of the smart contract. As shown in FIG. 11, a tamper-evident data store 1102 may include a linked list of blocks that includes the block 1104 and other blocks, where the linked list of blocks may be connected by cryptographic hash pointers.

In some embodiments, a directed acyclic graph of cryptographic hash pointers may be used to represent the tamper-evident data store 1102. Some or all of the nodes of the directed acyclic graph may be used to form a skip list or linked list, such as the node corresponding to or otherwise representing as block 1104. In some embodiments, each block represented by a node of this list may include multiple values as content. For example, each respective block may include a timestamp of creation 1106, a cryptographic hash of content of the previous node pointed to by an edge connecting those nodes 1108, a state root value 1110 for a trie of cryptographic hash values that may be referred to as a state trie 1118, a cryptographic hash 1112 that is a root value of a receipt trie 1124 of cryptographic hash values referred to as a receipt trie, and a cryptographic hash value 1114 that is a root value of a trie of cryptographic hash values referred to as a transaction trie 1122. In some embodiments, the block 1104 may be connected to a plurality of tries (e.g., three or more tries) via cryptographic hash pointers. For example, the block 1104 may be connected to Merkle roots (or other roots) of the plurality of tries of cryptographic hash values.

In some embodiments, the state trie 1118 may include multiple levels of cryptographic hash pointers that expand from a root to leaf nodes through 2 or more (e.g. 3, 11, 5, 6, etc.) hierarchical levels of branching. In some embodiments, an account address of a smart contract or instance of invocation thereof may correspond to a leaf nodes, where the smart contract may be an instance of the smart contract described in the process 110. In some embodiments, leaf nodes or paths to the leaf nodes of the state trie 1118 may include the fields in the account object 1126. The address may be a smart contract address or instance of invocation of the smart contract, the nonce value may be a count of the times that the smart contract was invoked, the code hash value may be or otherwise include a cryptographic hash of a bytecode representation of the smart contract 1130, the storage hash may be a root (e.g. Merkle root) of a trie of cryptographic hash pointers 1120. In some embodiments, the trie of cryptographic hash pointers 1120 may store key-value pairs encoding a transient program state of the smart contract that changes or is not needed between invocations of the smart contract. In some embodiments, the fields of the account object 1126 may include a predecessor pointer that points to a previous entry of an earlier state trie corresponding to a previous invocation of the smart contract and associated information or hashes.

Figure 12:
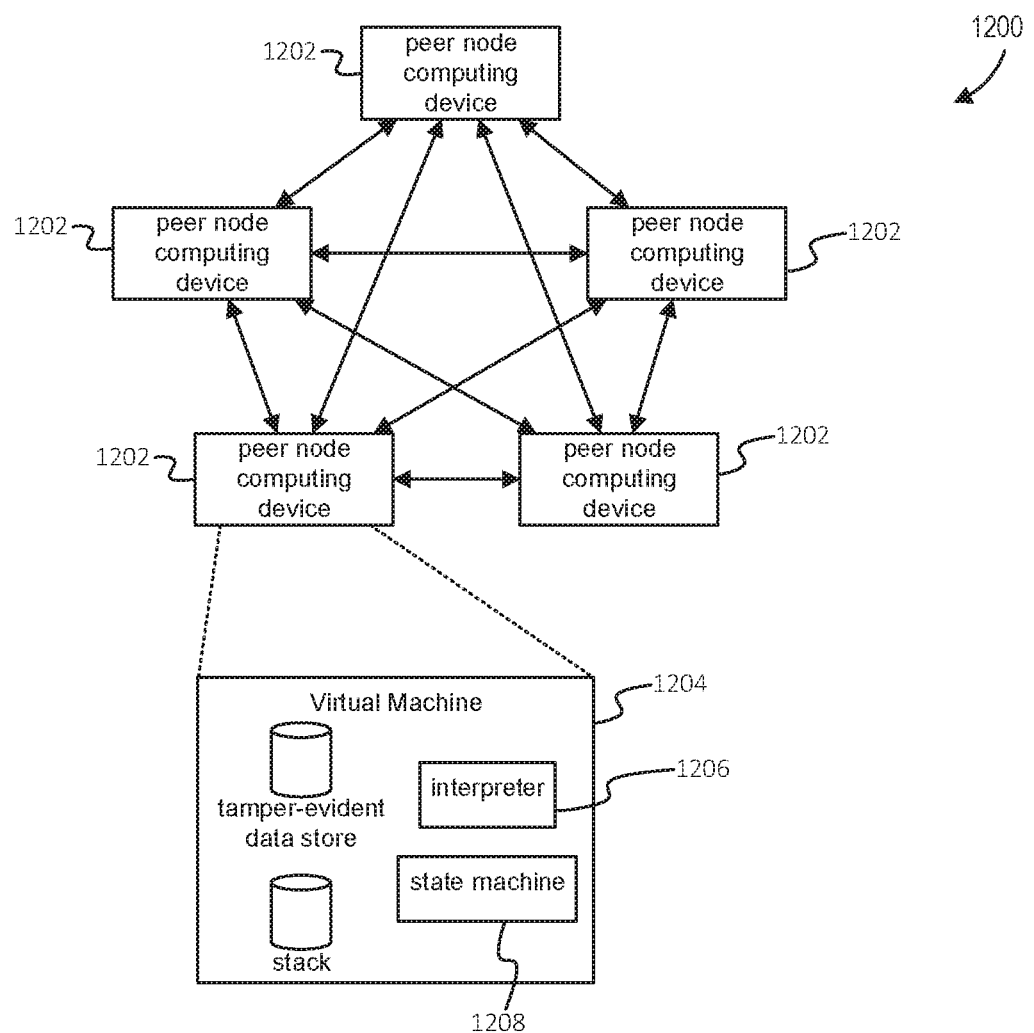
FIG. 12 depicts an example logical and physical architecture of an example of a decentralized computing platform in which a data store of or process of this disclosure may be implemented, in accordance with some embodiments of the present techniques.

FIG. 12 depicts an example logical and physical architecture of an example of a decentralized computing platform in which a data store of or process of this disclosure may be implemented, in accordance with some embodiments of the present techniques. In some embodiments, there may be no centralized authority in full control of a decentralized computing platform 1200. The decentralized computing platform 1200 may be executed by a plurality of different peer computing nodes 1202 via the ad hoc cooperation of the peer computing nodes 1202. In some embodiments, the plurality of different peer computing nodes 1202 may execute on a single computing device, such as on different virtual machines or containers of a single computing device. Alternatively, or in addition, the plurality of different computing nodes 1202 may execute on a plurality of different computing devices, where each computing device may execute one or more of the peer computing nodes 1202. In some embodiments, the decentralized computing platform 1200 may be a permissionless computing platform (e.g., a public computing platform), where a permissionless computing platform allows one or more various entities having access to the program code of the peer node of the permissionless computing platform to participate by using the peer node.

In some embodiments, the decentralized computing platform 1200 may be private, which may allow a peer computing node of the decentralized computing platform 1200 to authenticate itself to the other computing nodes of the decentralized computing platform 1200 by sending a value based on a private cryptographic key, where the private cryptographic key may be associated with a permissioned tenant of the decentralized computing platform 1200. While FIG. 12 shows five peer computing nodes, commercial embodiments may include more computing nodes. For example, the decentralized computing platform 1200 may include more than 10, more than 100, or more than 1000 peer computing nodes. In some embodiments, the decentralized computing platform 1200 may include a plurality of tenants having authentication credentials, wherein a tenant having authentication credentials may allow authorization of its corresponding peer nodes for participation in the decentralized platform 1200. For example, the plurality of tenants may include than 2, more than 12, more than 10, more than 120, more than 100, or more than 1000 tenants. In some embodiments, the peer computing nodes 1202 may be co-located on a single on-premise location (e.g., being executed on a single computing device or at a single data center). Alternatively, the peer computing nodes 1202 may be geographically distributed. For example, the peer computing nodes 1202 may be executing on devices at different data centers or on devices at different sub-locations of an on-premise location. In some embodiments, distinct subsets of the peer nodes 1202 may have distinct permissions and roles. In some cases, some of the peer nodes 1202 may operate to perform the deserialization operations, graph update operations, or reserialization operations as described in this disclosure.

Figure 13:
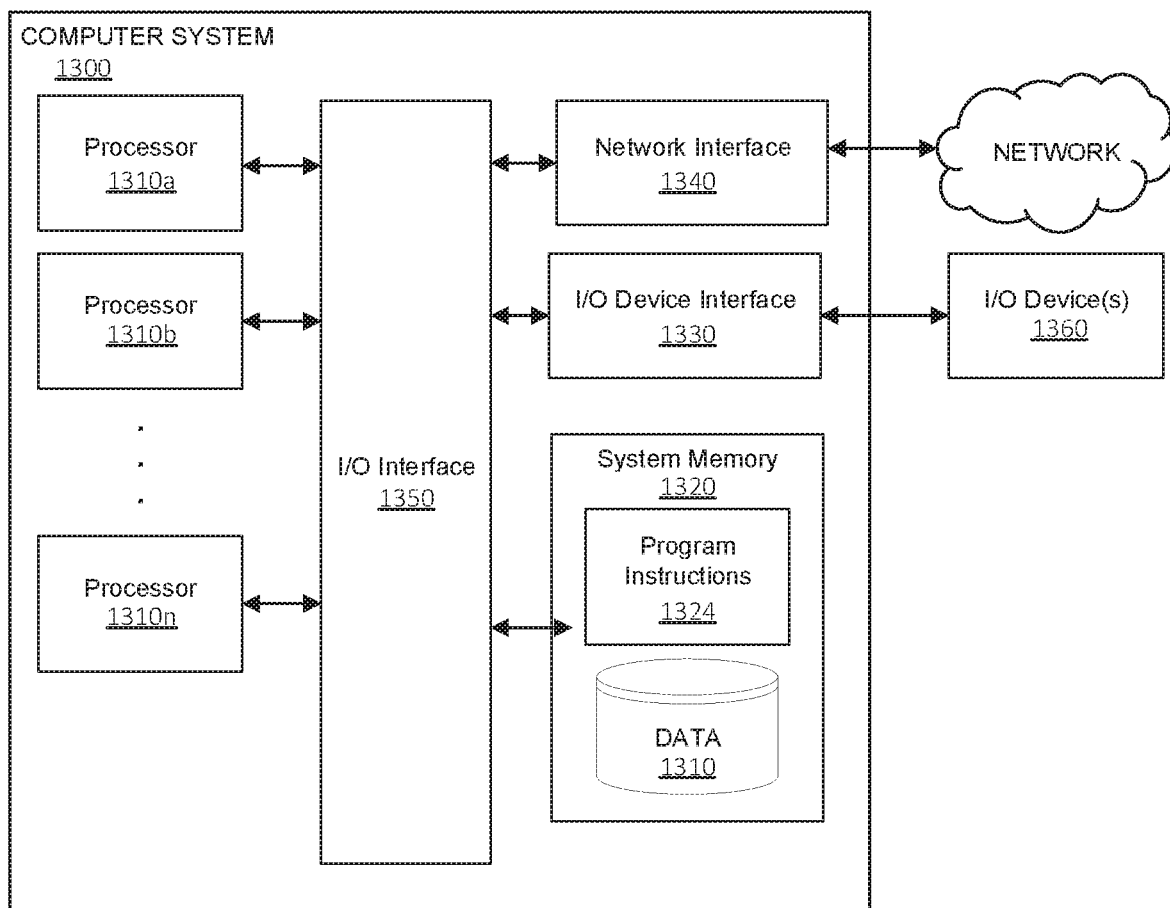
FIG. 13 shows an example of a computer system by which the present techniques may be implemented in accordance with some embodiments.

FIG. 13 shows an example of a computer system by which the present techniques may be implemented in accordance with some embodiments. Various portions of systems and methods described herein, may include or be executed on one or more computer systems similar to computer system 1300. Further, processes (such as those described for FIG. 1, 3, 14-16, 21, 23-24, or 26) and modules described herein may be executed by one or more processing systems similar to that of computer system 1300.

Computer system 1300 may include one or more processors (e.g., processors 1310a-1310n) coupled to System memory 1320, an input/output I/O device interface 1330, and a network interface 1340 via an input/output (I/O) interface 1350. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computer system 1300. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may include one or more microcontrollers. A processor may receive instructions and data from a memory (e.g., System memory 1320). Computer system 1300 may be a uni-processor system including one processor (e.g., processor 1310a), or a multi-processor system including any number of suitable processors (e.g., 1310a-1310n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computer system 1300 may include a plurality of computing devices (e.g., distributed computer systems) to implement various processing functions.

I/O device interface 1330 may provide an interface for connection of one or more I/O devices 1360 to computer system 1300. I/O devices may include devices that receive input (e.g., from a user) or output information (e.g., to a user). I/O devices 1360 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1360 may be connected to computer system 1300 through a wired or wireless connection. I/O devices 1360 may be connected to computer system 1300 from a remote location. I/O devices 1360 located on remote computer system, for example, may be connected to computer system 1300 via a network and network interface 1340.

Network interface 1340 may include a network adapter that provides for connection of computer system 1300 to a network. Network interface may 1340 may facilitate data exchange between computer system 1300 and other devices connected to the network. Network interface 1340 may support wired or wireless communication. The network may include an electronic communication network, such as the Internet, a local area network (LAN), a wide area network (WAN), a cellular communications network, or the like.

System memory 1320 may be configured to store program instructions 1324 or data 1310. Program instructions 1324 may be executable by a processor (e.g., one or more of processors 1310a-1310n) to implement one or more embodiments of the present techniques. Program instructions 1324 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1320 may include a tangible program carrier having program instructions stored thereon. A tangible program carrier may include a non-transitory, computer-readable storage medium. A non-transitory, computer-readable storage medium may include a machine readable storage device, a machine readable storage substrate, a memory device, or any combination thereof. Non-transitory, computer-readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1320 may include a non-transitory, computer-readable storage medium that may have program instructions stored thereon that are executable by a computer processor (e.g., one or more of processors 1310a-1310n) to cause the subject matter and the functional operations described herein. A memory (e.g., System memory 1320) may include a single memory device and/or a plurality of memory devices (e.g., distributed memory devices). Instructions or other program code to provide the functionality described herein may be stored on a tangible, non-transitory, computer-readable media. In some cases, the entire set of instructions may be stored concurrently on the media, or in some cases, different parts of the instructions may be stored on the same media at different times.

I/O interface 1350 may be configured to coordinate I/O traffic between processors 1310a-1310n, System memory 1320, network interface 1340, I/O devices 1360, and/or other peripheral devices. I/O interface 1350 may perform protocol, timing, or other data transformations to convert data signals from one component (e.g., System memory 1320) into a format suitable for use by another component (e.g., processors 1310a-1310n). I/O interface 1350 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1300 or multiple computer systems 1300 configured to host different portions or instances of embodiments. Multiple computer systems 1300 may provide for parallel or sequential processing/execution of one or more portions of the techniques described herein.

Those skilled in the art will appreciate that computer system 1300 is merely illustrative and is not intended to limit the scope of the techniques described herein. Computer system 1300 may include any combination of devices or software that may perform or otherwise provide for the performance of the techniques described herein. For example, computer system 1300 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a GPS device, or the like. Computer system 1300 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described in this disclosure. In some embodiments, instructions stored on a computer-accessible medium separate from computer system 1300 may be transmitted to computer system 1300 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In some embodiments, a program state of a smart contract program encoded in a symbolic AI system may include a directed graph, where entities of the symbolic AI system may cause events that simulate evolving program state by selecting vertices of the directed graph. Event-causing operations performed by an entity to establish, maintain, or end relationships between entities may be analyzed by an intelligent agent being executed by a computing system. An intelligent agent may include any set of functions, operations, routines, or applications that may perceive or otherwise obtain input values, refer to one or more stored parameters, and determine an outcome response from the input values using the one or more stored parameters, wherein at least one routine of the intelligent agent allows for one or more of the set of stored parameters to be changed over time. The intelligent agent may take advantage of the directed graph and its associated categorizations to determine a set of outcome program states after an event caused by a first entity or a counterparty entity, where the events caused by the counterparty entity are not in the control of the first entity. Using the set of outcome program states, the intelligent agent may respond to counterparty-caused events.

Operations to determine outcome states of a multiparty smart contract program are often prevented by the difficulty of accounting for information asymmetry, differing goals amongst entities, and computational complexity. In some embodiments, an entity of a multiparty smart contract program may perform an action without having the information necessary for precisely valuing the action. In some embodiments, an entity of a multiparty smart contract program may have different goals or strategies with respect to another entity of the program. Furthermore, an entity or its counterparty entities of a multiparty smart contract program may have a large number of options and variations of those options available when causing a state-changing event, which may increase the difficulty of decision-making operations for AI systems tasked with predicting the outcomes of those events. By using a symbolic AI model that models entity transactions using a directed graph with associated vertex categories, a system may more efficiently and accurately overcome these difficulties to determine outcome states and their associated outcome stores.

A smart contract program implemented using a symbolic AI model may include vertex categories associated with norms. The use of vertex categories in association with the norms or norm vertices of a symbolic AI model may increase the speed and accuracy of outcome determination. The categorization of the norms or their associated directed graph vertices into a set of vertex categories such as "obligations," "rights," "prohibitions," or the like may indicate outcome behaviors in response to their conditional statements ("conditions") being satisfied or not satisfied. By pre-categorizing a set of vertices of a directed graph representing the program state of a smart contract program into one of a set of vertex categories, the system may rapidly simulate evolving a program state into possible future states. In addition, the system may be free from computing burdens related to examining each individual condition and conditional outcome of every norm encoded in a smart contract program or parsing ad-hoc coded statements. Such advantages may be especially useful in many scenarios involving a graph of a symbolic AI model that includes a large number of vertices, such as more than 100 vertices or more than 1000 vertices.

Figure 14:
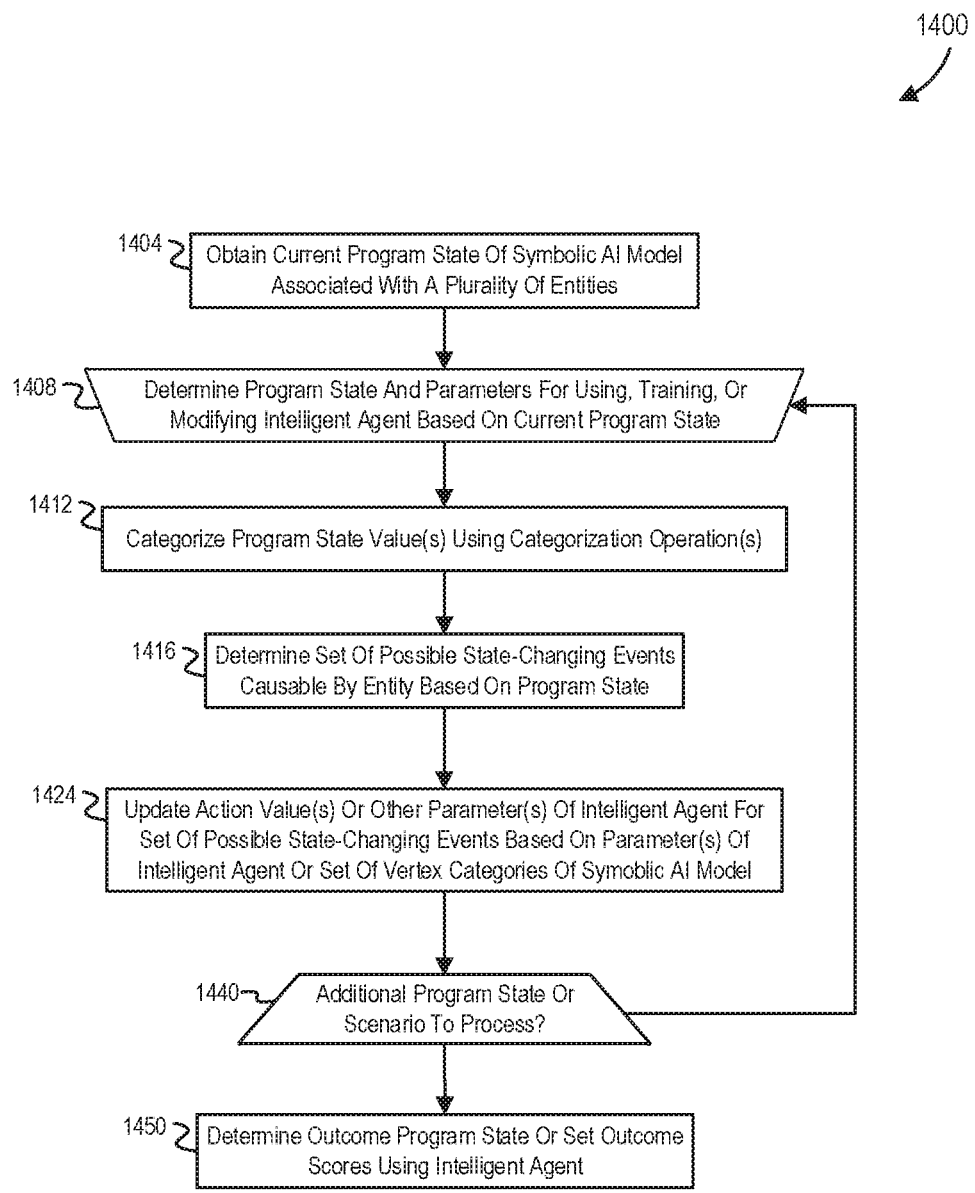
FIG. 14 is a flowchart of an example of a process by which a program may use an intelligent agent to determine outcome program states for smart contract programs, in accordance with some embodiments of the present techniques.

FIG. 14 is a flowchart of an example of a process by which a program may use an intelligent agent to determine outcome program states for smart contract programs, in accordance with some embodiments of the present techniques. In some embodiments, the process 1400, process 1500, or process 1600 like the other processes and functionality described herein, may be implemented by a system that includes computer code stored on a tangible, non-transitory, machine-readable medium, such that when instructions of the code are executed by one or more processors, the described functionality may be effectuated.

In some embodiments, one or more operations of the process 1400 may be otherwise initiated in response to a detected change in a program state of an application. For example, an event obtained by a symbolic AI system may indicate that an asset has been removed from a set of assets, which results in the change of an asset value stored in the program state data of the symbolic AI system. In some embodiments, as further described below, in addition to initiating one or more operations of the process 1400, one or more parameters of an intelligent agent associated with an entity may be updated based on the changed program state. Alternatively, or in addition, operations of the process 1400 may begin without detecting a change in the program state of the application.

In some embodiments, the process 1400 includes obtaining a current program state of a symbolic AI model associated with a plurality of entities, as indicated by block 1404. In some embodiments, the symbolic AI model may include a smart contract program, such as a smart contract described above for the operation 304. The program state of the symbolic AI model may include a directed graph, such as the directed graphs described above. The use of "norm" in the context the process 1400 may include or be otherwise associated with a norm vertex of a directed graph representing some or all of a program state of the symbolic AI model. In some embodiments, the current program state may indicate an uninitialized form or otherwise un-triggered form and may include a directed graph including a single active vertex without a previously-triggered vertex. Alternatively, the current program state may have already progressed from an initial and may include a set of vertices that have already been triggered. In some embodiments, the directed graph of a current program state may have a few number of vertices, such as one vertex, two vertices, less than five vertices, less than ten vertices, or the like. In some embodiments, the directed graph of a current program state may have a large number of vertices, such as 100 vertices, 1000 vertices, 10,000 vertices, or the like.

In some embodiments, the process 1400 includes determining one or more program states and parameters for using, training, or modifying an intelligent agent based on the current program state, as indicated by block 1408. As further described below, an intelligent agent may include a set of programs, routines, sub-routines, or the like being executed by the system to determine outcome program states or their associated outcome scores based on an input program state. In some embodiments, a program state used for or by an intelligent agent may be identical to the current program state. Alternatively, a program state used in the process 1400 may be modified from a current program state, where some values of the modified program state may differ from the values of the current program state. In some embodiments, the program state in the process 1400 may include changes in values to simulate additional possibilities at a current time or in the future. For example, a first entity may be engaged with the second entity in a smart contract program to stream a computing resource to the second entity. Even if the current program state indicates that the computing resource is available, the program state used in the process 1400 may include a program state representing a scenario in which the computing resource becomes corrupted while being used by the second entity. The smart contract program may include a rights norm that allows the second entity to provision additional computing resources in such an event, which may allow this scenario to be tested. As described further below, multiple scenarios may be used to determine action values across multiple possible scenarios. In some embodiments, probabilities or other measures of likelihood may be assigned to scenarios. A richer set of possible outcome program states determined from these associated measures of likelihood may be used to account for possible future outcomes.

As described below, a scenario may be determined based on actions performed by additional entities. For example, if a first smart contract program includes a set of obligation norms and rights norms associated with a first entity and a second entity, the actions of a third entity that is not an entity listed in the first smart contract program may still affect the program state of the first smart contract program. These effects may manifest by altering a parameter of the program state, such as increasing an amount of required material density in a manufacturing context or alter a specific state of an entity. For example, a failure of the third entity to transfer an asset or score value to the second entity may likewise affect the program state of the first entity by altering one or more expected reward values associated with the values being transferred by the second entity. As another example, if the second entity is noted to fail an obligation to the third entity, a parameter associated with the second entity may be modified to indicate that the second entity has a higher likelihood of failing an obligation to the first entity.

In some embodiments, the process 1400 may include categorizing a program state value using one or more categorization operations, as indicated by block 1412. The program state value may be a numerical value, a categorical value, a set of values, or the like. The categorized program state may include one or more converted values that are based on the one or more program state value. For example, a first score value in the program state that is equal to "30" may be converted to a categorical value using a categorization operation that bins all quantitative values between 0 to 15 into the category "LOW" and all quantitative values greater than 15 into the category value "HIGH," resulting in the conversion of the program state value from 30 into the categorized program state value "HIGH." Using the one or more categorization operations may result in a discretized representation of a program state value, which may reduce the computation resources required to generate counterparty predictions. Furthermore, an intelligent agent may account for categorized program states during training or prediction operations either by applying an initial simulated event to a program state and then modifying the program state using a categorization operation or by applying the categorization operation to the simulated event directly.

In some embodiments, the process 1400 may include determining a set of possible state-changing events causable by an entity based on the program state, as indicated by block 1416. In some embodiments, the set of possible state-changing events causable by an entity may be determined based on conditions associated with a set of active vertices associated with norms. Determining the possible state-changing events causable by the entity may include finding the set of vertices indicated as active in the program state ("set of active vertices"). For example, the program state may include a set of active vertices, where the set of active vertices are associated with a set of norms that include an obligation norm to allocate memory, a rights norm to inspect an asset provided in response to the allocated memory, and a prohibition norm on deleting allocated memory. The term "active vertex" means that the norm associated with the active vertex is triggerable such that satisfying a set of conditional statements ("set of conditions') associated with the norm will result in the system performing one or more operations conditional on the set of conditions being satisfied.

In some embodiments, the set of possible state-changing events causable by an entity may also include state-changing events associated with norms that are not active in the current program state. For example, a first norm may be a rights norm to terminate a smart contract that may be activated if a specified type of encrypted message is sent by a third entity via a specific API. A current program state may be such that the specified type of encrypted message has not been sent, but an intelligent agent may use a scenario that includes a probability that the specified type of encrypted message will be sent in the future. For example, the scenario may include that the probability of the specified type of encrypted message will be sent within the next two months is equal to 0.15%. As further described below, during traversal of a directed graph of the program state that spans one or more edges, an intelligent agent may simulate the encrypted message being sent and include its subsequent outcome states as part of an expanded directed graph. The outcome states and their associated outcome scores may then be included and considered by the intelligent when providing projections of outcomes.

In some embodiments, a plurality of events may trigger one or more of a set of active vertices associated with active norms. For example, a first state-changing event may include allocating 10 gigabytes (GB) from the first entity to a second entity and a second state-changing event may include allocating 50 GB from the first entity to the second entity, where either the first state-changing event or second state-changing event may both satisfy a same obligation norm. In some embodiments, the system may simulate and keep both events as separate events and, as further described below, determine different action values for each of the selected set of events, where each of the selected set of events may be associated with an action of an entity. Alternatively, some embodiments may simplify multiple possible events that satisfy a norm to one or more categorized events, such as providing a minimum or maximum amount of allocated memory necessary to satisfy a norm and determine an action score for the categorized event. In some embodiments, as further described below, simulations of future program states may directly trigger norms of a program state, where the conditions associated with triggering the norms may be retroactively applied to determine the event that triggered the norm. In some embodiments, the selected set of events may be determined based on probability distributions associated with the entities. For example, a first entity may include a set of entity properties defining a gaussian distribution, where a mean memory allocation defined by the gaussian distribution may be used to determine an amount of memory allocated in an event of the selected set of events.

While the above example describes an event to allocate memory, other events are possible. For example, some embodiments may include events such as an allocation of a transfer rate in a data pipeline, a transmission of instructions to accelerate a payment deadline via an API, or transference of an asset from a first entity to a second entity. For example, in response to the determination that an active vertex is associated with an obligation norm for a first entity to pay a minimum amount, the set of possible events may include a first possible event caused by the first entity transferring the minimum amount, a second possible event caused by the first entity to transferring 200% of the minimum amount, and a third possible event caused by the first event transferring a remaining balance in full. In some embodiments, as further described below, a learning system may be used to simulate the occurrence of multiple events that lead to a same directed graph shape but may result in different final program states.

In some embodiments, the process 1400 includes updating a set of action values or other parameters of an intelligent agent for the set of possible state-changing events based on parameters of an intelligent agent or a set of vertex categories of the symbolic AI model, as indicated by block 1424. In some embodiments, the set of parameters of an intelligent agent may include parameters defining a policy, where a policy may include a policy function that maps a program state to an event caused by an entity or action or a probability of the event occurring. In some embodiments, the policy function may be deterministic and predict the same action when presented with the same program state. Alternatively, the policy function may be stochastic, wherein a same program state may result in different predicted actions based on a probability distribution. For example, when provided a first state as an input, the policy function may provide 25% as the possibility for the first state to transition to a second state and 75% as the probability for the first state to transition to a third state.

In some embodiments, an action value may include a quantitative or categorical value. An action value may be associated with an event caused by an entity and, as further described below, and may be used to determine outcome states or response instructions. Alternatively, an action value for an entity may be associated with an action of the entity, where the action may be analyzed to determine which elements of the action change a program state. For example, a first entity may perform an action that includes transferring an amount to the second entity along with a message indicating that no further transfers will occur. In some embodiments, a system may ignore the message as having no effect on a program state and consider the event associated with the action as identical to the first entity transferring the amount to the second entity without sending an associated message. In some embodiments, updating an action value may include changing an existing value associated with the action value. Alternatively, updating the action value may include determining a new action value and associating it with the possible state-changing events causable by an entity. In some embodiments, the action value may be modified or otherwise determined based on an entity property, as further described in this disclosure. For example, an entity property may modify the likelihood of events occurring, modify a reward value associated with a possible outcome of an action, or otherwise determine a behavior pattern associated with an entity.

In some embodiments, the parameters of the intelligent agent may include the action values themselves. For example, the intelligent agent may use the action values as parameters of the policy function by including an operation to select which event is most likely to be caused by an entity based on the action values. The policy function may select the event from a set of possible events by determining which event has the greatest action value from the action values associated with the set of possible actions.

In some embodiments, the action value associated with a set of possible state-changing events causable by an entity may be determined based on a reward value associated with a change from a first program state to a second program state caused by the state-changing event. The reward value may be equal to or otherwise based on a score change of an entity and may be associated with one or more conditions of the set of conditions. For example, if a condition to satisfy an obligation norm includes a threshold value of 10 units, where the threshold value indicates that satisfying the obligation norm requires an allocation of 10 computing instances to a first entity from a second entity, the reward value for the obligation norm or its associated directed graph vertex may be +10 for the second entity. In some embodiments, each entity may have its own set of reward values and, correspondingly, their own set action values based on those reward values. For example, a first entity may have +10 as the reward value associated with a first vertex based on a threshold value of 10 for a condition associated with the first vertex, and a second entity may have −20 as the reward value associated with the same first vertex based on the threshold value and an addition −10 as part of a transaction cost associated with the first vertex. In some embodiments, the set of vertex categories may be used to modify or set reward values based on their failure or satisfaction. For example, the system may determine that a first vertex is categorized as an obligation and, in response to a status change indicating that the first vertex is failed, deduct a failure penalty from the reward value associated with the first vertex or a child vertex of the first vertex.

In some embodiments, a reward value may be modified based on an entity property value associated with an entity or entity role. The entity property value may be used to change the reward value to a greater or lower value. An entity property may indicate an entity's characteristic, limitation, behavior pattern, or the like. For example, a first entity may be associated with a first entity property for an entity property correlated with an acceptable loss before catastrophic entity failure ("loss multiplier threshold"), where losses greater than the first entity property value are multiplied by five (or some other numeric value). For example, if the first entity property value for a loss multiplier threshold is 200, losses greater than 200 will be multiplied by five, such that the reward value for a loss of "200" may be equal to "−200" for the first entity, but a reward value for a loss of "201" may be equal to "1005." Alternatively, or in addition, instead of applying a multiplier to a value, some embodiments may set a reward value to a pre-determined value. As further discussed below, by altering reward values based on one or more entity properties, entity biases, tendencies, or behavior patterns may be simulated. Alternatively, or in addition, a probability distribution defined by one or more entity properties may be used to modify or otherwise determine a reward value.

By using a threshold value encoded in or otherwise associated with the conditions associated with norm vertices, efficient estimation of reward values may be performed without requiring additional and potentially error-prone simulations of unexpected events or entity behaviors which are unlikely to occur or whose variations are otherwise not relevant to an outcome program state or outcome score. In some embodiments, the threshold value of a condition itself may be stored in a conditions data model and may be retrieved based on an identifier of a vertex or norm associated with the condition. By storing the threshold value in retrievable form, operations to use the threshold values of conditions in a symbolic AI model may be performed with greater speed and accuracy. In addition, other values associated with vertices may be stored and retrieved based on vertex or norm identifiers, such as transaction costs associated with transactions between entities.

In some embodiments, the action value may be determined based on future reward values associated with possible future program state transitions and may further be modified based on one or more discount factors, transition probabilities, environmental state effects, learning rates, or some function thereof. For example, an action value may be an output of a policy function. The action value may be affected by various other program state values, intelligent agent parameters, or other values. The future reward values may be based on a set of threshold values encoded in or otherwise associated with the norms simulated to as triggered in the future program state. In addition, the reward values may be based on additional factors, such as other program state values, specific directed graph configurations, types of vertex statuses, or the like. In some embodiments, determining a set of action values may include generating a sequence of program states that include an initial program state, a set of intermediate program states, and a terminal program state that indicates that a smart contract program is complete. For example, an action value A may be determined using statement 12 below during the training of an intelligent agent. As shown below, $A(s_t, e_t)$ is the action value associated with the event $e_t$ being caused while the program state is in the state $s_t$, $\alpha$ is a learning rate, $r_{t+1}$ is the reward value associated with the state change caused by event $e_t$ from the program state $s_t$, and $\gamma$ is a discount factor:

$$A(s_t,e_t) \leftarrow A(s_t,e_t) + \alpha[r_{t+1} + \gamma A(s_{t+1},e_{t+1}) - A(s_t,e_t)] \quad (12)$$

In some embodiments, operations to determine an action value for a state-changing event or action may include expanding a directed graph of a first program state to include its possible child vertices to generate a second directed graph representing a possible future program states. The possible future program states may be reached from a set of possible events and may be used to determine a set of reward values associated with the set of possible events. The system may determine an action value based on the score changes of that state, a discount factor, transition probabilities to possible future states, and the path scores associated with the possible future states. The reward value may be determined in various ways. For example, statement 13 below may be used to determine a path score as a total reward value $R_\pi(s)$ associated with a state s, where $R_\pi(s')$ is a total reward value associated with a possible state s', s' and e may represent an index of each possible program state or event caused by an entity, respectively, r is a reward value that may indicate a local, immediate reward corresponding to the transition from the state s to the state s', $\gamma$ is a discount factor, p is a probability value of transitioning from the state s to the state s', and $\pi$ represents a policy function that provides a probability of an entity causing event e when at the program state is at state s:

$$R_\pi(s) = \sum_e \pi(e|s) \sum_{s',r} p(s',r|s,e)[r + \gamma R_\pi(s')] \quad (13)$$

As shown above for statement 13, some embodiments may determine the total reward value for a current state based on the expected rewards and corresponding probabilities of occurrence of future states. For example, the system may traverse through the directed graph of a smart contract program and determine a first reward value based on a determination that a first program state corresponds with an event caused by the first entity satisfying an obligation norm to transfer 300 units to a second entity as part of a resource allocation agreement. The system may assign a reward value of −300 in association with the first entity and a reward value of +300 in association with the second entity. In some embodiments, these reward value may be used to represent score changes in one of various possible scenarios, such as score changes in an agreement by the first entity to allocate 300 terabytes to the second entity in return for the second entity reallocating more memory to the first entity at a later time. Some embodiments may use the rewards to represent other score changes, such as changes during transfers of digital currency, reputation scores, or the like. If the satisfaction of this obligation does not result in the termination of the smart contract program but instead in the activation of a first rights norm for the second entity to transfer 400 units to the first entity within fifty days and a second rights norm for the second entity to transfer 310 units to the first entity within ten days.

In some embodiments, a time difference may be used in conjunction with the discount factor to determine a future value. The system may use a discount factor of 99.5% per day and determine that, based on this discount factor and reward value, the discounted reward value for the first possible state value "$\gamma R_\pi(s_1')$" is 311.33 by computing the result of the expression "$0.995^{50} \times 400$." Similarly, the system may use a discount factor of 99.5% per day and determine that, based on this discount factor and reward value, the discounted reward value for the second possible state value "$\gamma R_\pi(s_2')$" is 294.84 by computing the result of the expression "$0.995^{10} \times 310$." In some embodiments, the system may use of a policy function that determines that second entity has a 95% chance of satisfying the first rights norm and a 5% chance of satisfying the second rights norm in statement 13 above to determine a total value for the state $R_\pi$ by computing a total reward value of 10.5 by simplifying the expression "$-300+95\% \times 311.33 + 5\% \times 294.84$." The reward value may be further modified based on vertex categories. For example, some embodiments may impose additional reward value deductions for failing an obligation, violating prohibitions, or the like. Furthermore, reward values may be further altered based on one or more entity properties.

In some embodiments, an end state may be used when determining reward values for possible future states. In some embodiments, an end state may be a terminal program state. A terminal program state for an application may be one in which no additional program states are possible after the application has reached the terminal program state. For example, a function may test whether any norms are triggerable in a program state, and, if the function determines that no norms of the program state are triggerable, determine that the program state is in a terminal program state. In some embodiments, the system may determine that a program state is terminal if a terminal norm is reached, where a norm or its associated vertex may be categorized as a terminal norm to indicate that a terminal program state has been reached.

In some embodiments, an end state may be based on an absolute or relative expiration threshold. For example, some embodiments may include a determination that a program state has reached its expiration threshold of 30 years, where each program state has an associated time point based on a timestamp associated with the satisfaction of the norms that would result in that program state. For example, a program state may include an obligation by the first entity to allocate an amount of computing resources to a second entity every month, and determining a set of events that satisfies these obligation norms may include advancing the simulated time by one month for each event that satisfies an obligation norm. If an expiration threshold of the symbolic AI model is one year, the system may determine that an end state has been reached once the one-year expiration threshold has been reached. Thus, an event that satisfies the twelfth obligation may be associated with a non-zero reward value that affects the action value of a currently active norm, and an event that satisfies the thirteenth obligation norm may not affect the action value of the same currently active norm.

In some embodiments, linear algebra direct solution methods may be impractical for determining reward values due the number of possible states. In addition, assigning value in real-world scenarios with incomplete information may provide additional challenges. Such challenges may include an inability to fully quantify the risks associated with certain types of anticipated rewards, the activation of norms that allow for new possible actions based on changes in an environment, or the like. For example, in response to an electrical blackout that had previously not been occurring, a first-party entity representing a manufacturing center may trigger a rights norm that requires a second entity representing a utility company to allocate a specified amount of electrical energy and terminate the program state, but the satisfaction of such an obligation may be physically impossible. Assigning an action value to a program state may include a determination of the value based on both the specified amount of electrical energy and a probability value associated with non-delivery of the specified amount of electrical energy.

In some embodiments, action values may be determined by performing repeated simulations of applying different sequences of events to a smart contract program and updating action values based on intermediate or final results of the repeated simulations. For example, a system may determine the action value by using dynamic programming, Monte-Carlo simulations, or temporal-difference learning. In some embodiments, an intelligent agent may perform these repeated simulations using one or more machine learning models to determine action values associated with the possible events or actions associated with a program state. Embodiments of these learning operations usable to determine action value(s) and outcome states are described further below for FIG. 15.

In some embodiments, the process 1400 includes determining if there are additional scenarios for consideration, as indicated by block 1440. In some embodiments, the system may be configured to consider only a current program state. Alternatively, the system may be configured to consider multiple program states based on the current program state. For example, the system may have a pre-arranged set of scenarios where assets are modified to have greater quantitative resources or fewer quantitative resources. In addition, as discussed further below, the system may use scenarios determined based on environmental variable changes or possible actions from additional entities that are not listed in the entity list of a smart contract program state. For example, the system may update action values based determines that there are additional scenarios for consideration, operations of the process 1400 may proceed to block 1408. Otherwise, operations of the process 1400 may proceed to block 1450.

In some embodiments, the process 1400 includes determining a set of outcome program states or a set of outcome scores using the intelligent agent, as indicated by block 1450. The set of outcome program states may include using the operations above to predict one or more possible outcome program states. For example, an intelligent agent may use the operations above to determine a set of possible directed graphs representing in a set of terminal program states. Alternatively, or in addition, the intelligent agent may predict outcome program states that are not terminal program states.

The set of outcome scores may be associated with the set of outcome program states and may include various types of values. In some embodiments, the set of outcome scores may include a total score change determined from the reward values and the transition probabilities from the current program state to a set of terminal program states. In some embodiments, the set of outcome scores may be based on a starting value associated with an entity and may also be separated based on vertex categories or events. For example, a set of outcome scores for an entity may include a total score owed to the entity based on a first set of obligation norms, a total score owed by the entity based on a second set of obligation norms, a total score provided to the entity via a first set of events, and a total score provided by the entity via a second set of events. Alternatively, or in addition, the set of outcome scores may include a probability weight for a cumulative reward score reaching a target value or for a particular outcome program state or outcome program state value occurring. For example, an outcome score may include a probability weight correlated with the probability that a first entity fails to satisfy an obligation norm, such as by allowing a time point to satisfy a failure time threshold of the obligation norm.

In some embodiments, the system may determine whether an outcome score satisfies a set of outcome score thresholds and, in response, perform an action in response to the outcome score satisfying the set of outcome score thresholds. For example, the system may determine that an outcome score equal to a probability that a set of outcome program states will occur is greater than an outcome score threshold and, in response, transmit a warning message indicating that the outcome score is greater than the outcome score threshold via an API to a device. Alternatively, or in addition, the system may be configured to perform one or more additional actions on behalf of one or more entities in response to a threshold be satisfied. For example, in response to an outcome score satisfying a net loss threshold, the system may be configured to trigger a rights norm that obligates a first entity to return a score value to a second entity. Furthermore, similar to other methods described in this disclosure a plurality of outcome states or outcome scores may be used to determine a population of outcome states, a population of outcome scores, or their corresponding population scores. A population score may include population statistics such as mean values, median values, kurtosis values, tail risk tolerance, or the like.

Figure 15:
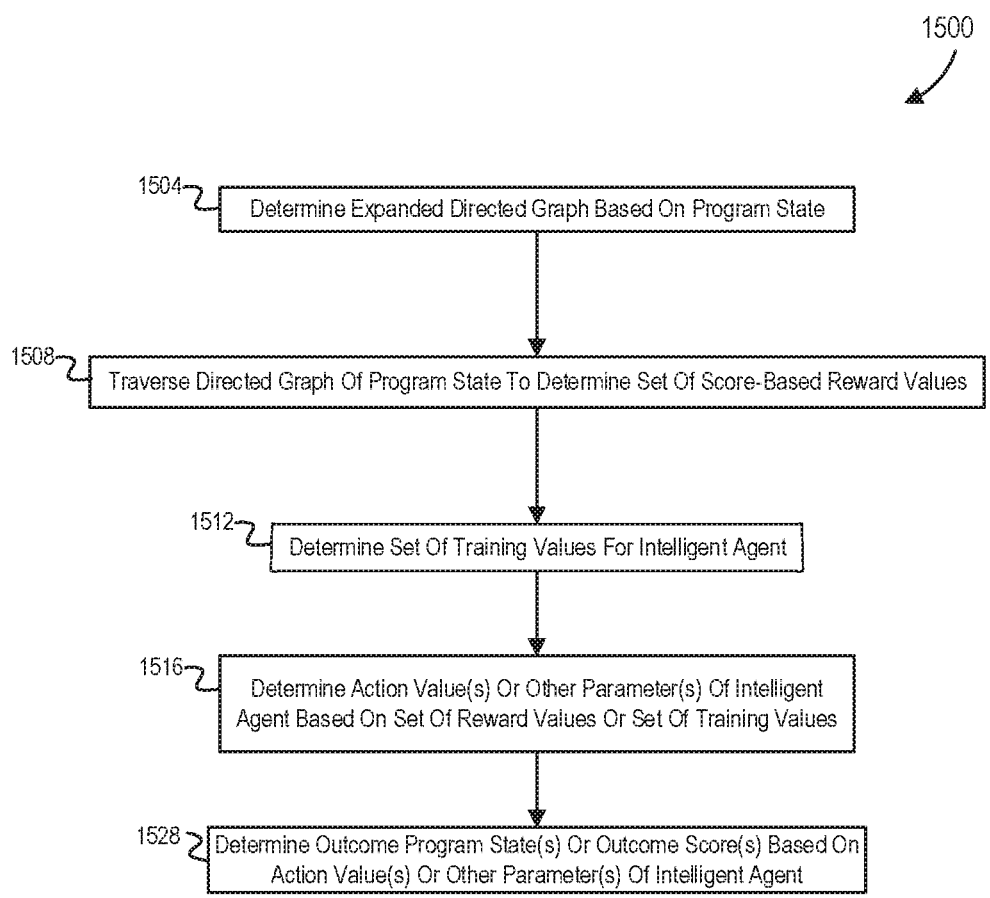
FIG. 15 is a flowchart of an example of a process by which a program may train or otherwise prepare an intelligent agent to determine outcome program states, in accordance with some embodiments of the present techniques.

FIG. 15 is a flowchart of an example of a process by which a program may train or otherwise prepare an intelligent agent to determine outcome program states, in accordance with some embodiments of the present techniques. In some embodiments, the process 1500 may include determining an expanded directed graph based on a program state, as indicated by block 1504. The program state may include a program state described above for the process 1400. The expanded directed graph may be determined by using a directed graph of the program state or a copy thereof to determine a first set of possible child vertices that are child vertices of the active vertices of the directed graph. The system may expand the directed graph by associating the vertices of the directed graph with the first set of possible child vertices. The system may then continue expanding the directed graph by determining a second set of possible child vertices that are child vertices of the first set of possible child vertices and associating the second set of child vertices with their respective vertices in the first set of possible child vertices. The system may continue simulating evolving program state by expanding the directed graph to until each terminal vertex is reached, or until some other end state is reached, where the expanded directed graph may be associated with a possible outcome program state after the simulated state evolution. Similar to those described above, a terminal vertex of a directed graph of a smart contract program implemented with a symbolic AI model may be vertex that has no child vertices, may be described as leaf of a directed graph, and may be associated with a terminal state.

Alternatively, instead of expanding a directed graph of an application state directly, the system may simulate events that trigger the vertices of the directed graph. As described above, these simulated events may include simulations of one or more entities that cause events based on the norms of the directed graph. For example, the system may simulate the triggering of a first obligation norm associated with a condition requiring that a first entity release at least 500 GB of memory in response to a simulated event of the first entity releasing 850 GB of memory.

In some embodiments, the system may traverse the directed graph to determine a set of score-based reward values, as indicated by block 1508. In some embodiments, the system may traverse the directed graph while expanding the directed graph. For example, as the system expands a directed graph, the system may also record the score changes associated with outcomes of satisfying or failing the norms of the directed graph. An intelligent agent may use these score changes to determine score-based reward values associated with transitions between different program states. For example, failing a vertex categorized as an obligation norm may set a vertex status to indicate that the obligation norm is failed and activate a child vertex associated with a norm condition having a threshold value equal to "−10." In response, the score-based reward value associated with the state change may be a decrease of 10.

In some embodiments, the system may traverse the directed graph after performing one or more expansion operation on the directed graph in order to determine score-based reward values based on the outcomes of satisfying or failing each norm of the directed graph. As described above, an obligation norm may be failed if it is not satisfied if a time point reaches a time threshold of the obligation norm. Furthermore, during simulation of events, an event may include an event that would satisfy the conditions of a norm that occurs after a failure time threshold, and the intelligent agent may determine that a vertex should be associated with a status indicating failure if response to a determination that the time point associated with the condition is associated with a failure time threshold.

In some embodiments, the system may update a set of data structure instances (e.g., an array, a vector, a list, or the like) to store the set of reward values associated with each program state or program state transition. In addition, the set of data structures may include labels for the program states of an application, the transitions between each of the program states, action values associated with each transition, or the like.

In some embodiments, the process 1500 may include determining a set of training values for an intelligent agent, as described in block 1512. The set of training values may include training inputs and training objectives, where the training inputs and training objectives may be obtained using one or more various methods. An intelligent agent may include one or more machine learning models. Example machine learning models may include supervised learning models, unsupervised learning models, semi-supervised learning models, reinforcement learning models, or the like. In some embodiments, using the machine learning model may include training or using a set of neural networks, such as one or more of the neural networks described above. Various types of neural network training methods may be utilized to determine the parameters of a neural network. In some embodiments, the neural network training method may include a backpropagation operation that includes passing a training input through the neural network to determine a neural network prediction. The neural network prediction may be compared to a training objective to determine a loss function. The loss function may then be propagated back to update the parameters of the neural network using a gradient descent method. This process may be repeated until the neural network prediction sufficiently matches the training objective to update the parameters of the neural network.

In some embodiments, the training inputs and training objectives may be acquired from histories of similar smart contract programs. Alternatively, or in addition, the training inputs and training objectives may be acquired from simulations of possible future events. Furthermore, the training inputs and training objectives may depend in part on the set of learning systems used to determine outcome program states or outcome scores. In some embodiments, training inputs may be iteratively generated during each iteration of training. For example, the intelligent agent may generate a first set of training inputs during a training iteration, where a training iteration may include simulating evolving program state using a pseudorandom method to determine which set of vertices to include in a path through a directed graph. The simulated state evolution may also include updating a set of action values or other parameters based on the results of the simulated state evolution and generating a second set of training inputs based on the updated parameters. The training inputs may be generated during a simulation of the satisfaction of norms or failure to satisfy norms. In some embodiments, the determination of the training inputs may be based on one or more entity properties. For example, an entity may include a set of values defining a probability distribution, where the probability distribution may be used to determine whether the entity will satisfy or fail an obligation, and the system may sample from the probability distribution to determine one or more values for a training input.

In some embodiments, the process 1500 may include determining a set of action values or other set of parameters of the intelligent agent based on the set of reward values and training values, as indicated by block 1516. An action value may represent a weight assigned to a possible action of an entity that causes a state change in the program state of an application. In some embodiments, the action value may be determined based on a set of paths through a directed graph, where each respective path of the set of paths includes a respective plurality of vertices and respective directed edges connecting each vertex of the respective plurality of vertices with at least one other vertex. In some embodiments, a set of action values may be determined based on determining the sequence of reward values associated with the respective set of vertices for each respective path of a set of paths. The action value may be further determined based on training values obtained from historical data or acquired from simulations.

In some embodiments, the intelligent agent may include a model-based reinforcement learning model as a part of a machine learning model. Using a model-based reinforcement learning model may include using a Markov decision process comprising a state transition model to simulate program state evolution by predicting a next program state and a reward model to determine an expected reward during the transition to the next program state. In some embodiments, the system may continue simulating the evolution of a program state through a sequence of states by traversing through a directed path based on the vertices and edges of a directed graph until a terminal program state is reached. The evolution of the program state may be simulated over a set of simulated state evolutions, where each simulated state evolution in the set of simulated state evolutions may be associated with a path through the directed graph. The associated paths may be used to form a set of paths. As a system traverses a directed path, the system may determine a subset of reward values associated with the directed path and may use this subset of reward values to determine a path score or otherwise use the subset of reward values to determine an action score. In some embodiments, the expected reward value between each state change may be based on the set of score-based reward values determined above, where each path in a set of paths may be associated with a different expected total reward value. In addition to score changes associated with vertices, the system may also modify action values based on the satisfaction or failure of obligation norms. For example, the system may decrease the reward value by a failure penalty associated with the transition from a first state to a second state if the transition was the result of failing an obligation norm. In some embodiments, the failure penalty may be a pre-determined value.

Various reinforcement learning models may be implemented to determine the action values using a neural network of the intelligent agent, such as a policy gradient approach, a Q-learning approach, a value-based learning approach, some combination thereof, or the like. In some embodiments, the system may use a policy gradient approach. For example, using a policy gradient approach may include using a set of policy weights equal to or otherwise based on the action values, wherein each policy weight corresponds with a possible event that an entity may cause at one or more program states represented by a configuration of a directed graph. In some embodiments, the intelligent agent may perform repeated iterations of the simulated state evolution using a set of training inputs to determine the results of an entity acting according to instructions based on the policy function, wherein each intermediate outcome or terminal outcome may be used to increase or decrease a corresponding policy weight. The set of simulated state evolutions may being performed continue until a training objective is achieved, where the training objective may include a maximization of a total reward value, a minimization of a loss function, a minimization of the number of obligation norms having a status as being failed, or the like. Various policies may be used, such as softmax policy, Gaussian policy, or the like. In some embodiments, the number of iterations may be greater than 10 iterations, greater than 1000, greater than 10,000 iterations, greater than 100,000 iterations, greater than 1,000,000 iterations, or the like.

In some embodiments, the system may use a Monte Carlo Tree Search (MCTS) operation to determine the set of action values by sequentially selecting vertices of a directed graph based on the graph edges. The system may use a trained neural network to determine an initial set of actions causable by a first entity and their associated initial set of action values. Each action of the initial set of actions may be associated with an initial action value also determined by the trained neural network. The initial action value may be based on the score-based reward values determined above and may be correlated with a probability of the first entity performing that associated action. In some embodiments, the initial action value may be the output of a softmax function. For example, the initial set of actions determined by a neural network may include a first action associated with a pre-processed weight equal to 3, a second action associated with a pre-processed weight equal to 1, and a third action associated with a pre-processed weight equal to 2. The intelligent agent may apply a softmax function to the pre-processed weights to determine an initial set of action values approximately equal to [0.665, 0.090, 0.245].

In some embodiments, a system may perform a comprehensive set of tree search operations through each vertex of a directed graph until every end state is achieved. For example, if there are five paths from a starting vertex to a set of end states, some embodiments may comprehensively traverse each of the five paths to determine five sets of reward values associated with each of the five paths. In some embodiments, the system may determine each possible path from a starting vertex to each terminal vertex and then determining the associated reward values and probabilities associated with the vertices of each respective path to determine action values associated with entity actions. Alternatively, the system may determine multiple sequences of events caused by one or more entities to determine a set of paths through a directed graph such that at least one of the sequences of events is associated with each of the paths and every possible path from the starting vertices to a terminal vertex or another vertex associated with an end state is one of the set of paths.

In some embodiments, a directed graph may be searched using probabilistic methods. For example, if there are five paths from a starting vertex to a set of end states, some embodiments may traverse four of the five paths and avoid simulating a selection of at least one of the vertices of the directed graph. Various implementations of a probabilistic method may be used. For example, action values of a directed graph may indicate that an obligation norm vertex may a 99.99% chance of being satisfied and a 0.01% chance of being failed for simulation. Over the course of 100 searches through a directed graph to simulate evolving program state from an initial program state that starts at the obligation norm vertex, the system may use a random, pseudorandom, or quasi-random number generation method to determine whether the obligation norm vertex is satisfied or failed. Each search through a directed graph may include determining a set of computed values using the random, pseudorandom, or quasi-random number and selecting the next vertex based on the set of computed values. In some embodiments, each search may continue until a terminal vertex or some other vertex associated with an end state is reached. The search may be repeated for multiple iterations. For example, a search may be repeated for a directed graph with new computed pseudorandom values to determine a corresponding new path through the directed graph more than 10 times, more than 1000 times, more than 10,000 times, more than 100,000 times, more than 1,000,000 times, or the like.

In some embodiments, it is possible that the use of a random, pseudorandom, or quasi-random number generation method to select paths based on these action values may skip one or more vertices such that no paths that include activated vertices resulting from failing the obligation norm. Various random, pseudorandom, or quasi-random number generation methods may be used, such as a method based on a physical phenomenon or a computational method based on a seed value. Example random, pseudorandom, or quasi-random number generation methods may include wideband photonic entropy source-dependent methods, linear congruential generator methods, middle square methods, middle square Weyl sequence methods, permuted congruential generator methods, low-discrepancy sequence methods, or the like.

In some embodiments, the neural network may include a deep neural network usable as a fuzzy story of values. For example, the deep neural network may be a deep convolutional neural network, deep graph neural network, deep recurrent neural network, some combination thereof, or the like. The neural network may receive the directed graph vertices and edges as input and be trained to predict a return value based on the reward values determined above. In some embodiments, the training objective may be based on a total reward value. Alternatively, or in addition, the training objective may be based on the satisfaction of each obligation norm or non-satisfaction of a prohibition norm. For example, a training objective may be classified as positive or negative, where a positive outcome is associated with a terminal program state in which all obligation norms are satisfied, and a negative outcome is associated with all other possible terminal program states. Alternatively, or in addition, a training objective may be based on both reward values and vertex categories. For example, a positive outcome may be associated with all terminal program states in which all obligation norms are satisfied or over 100% of a target score threshold is satisfied, where the target score threshold is based on score transfers determined from the reward values.

After performing each of a set of searches in a set of MCTS operations, the intelligent agent may determine a path score associated with the path taken through the directed graph based on the reward values associated with the vertices of a directed path. A directed path may include a linkage of graph vertices via their connected directed edges, where the path direction may be determined by the edge directions of the directed edges. For example, if performing an iteration of the MCTS operation resulted in a first path that started a first vertex associated with a first reward value equal to "−400," a second reward value of "−100," and a third reward value of "+1100," the system may determine that a total reward value is equal to "+600" by summing the three individual reward values. As further described above, the system may also include vertex category based modifications to the reward value. For example, if the system determines that the path includes a norm vertex having a status indicating failure, the system may reduce the total reward value from "+600" to "−9000" based on a failure penalty equal to "−9600." The intelligent agent may then update the aggregate score associated with the action based on the total reward value. After a loop through an MCTS operation, the system may also retrain the neural network based on the aggregate score or total reward values to determine the values for a next run-through of the MCTS operation.

In some embodiments, a deep Q-learning approach may be taken to implement a reinforcement learning method. For example, an intelligent agent using a deep Q-learning approach may use a multi-layer neural network to determine internal reward values based on a program state. The intelligent agent may include one or more various types of neural networks, such as a convolutional neural network or a graph neural network. Graph neural networks may include graph auto-encoders, graph convolutional neural networks, graph generative networks, graph attention networks, and graph spatial-temporal networks. In some embodiments, a graph neural network may be useful to receive the structure of a directed graph representing a smart contract program state as an input to generate one or more output values. During training, the intelligent agent may also store previous program states, program state transitions (or the action used to cause the transition), reward values, and outcome program states as experiences in a memory buffer and select these experiences from the memory buffer for retraining the neural network.

In some embodiments, the intelligent agent may implement a counterfactual regret minimization method when determining an action value. Use of a counterfactual regret minimization method may include operations described in "Deep Counterfactual Regret Minimization" (Brown, Noam; Lerer, Adam; Gross, Sam; Sandholm, Tuomas. Nov. 1, 2018, arXiv: 1811.00164), which is hereby incorporated by reference. To implement a counterfactual regret minimization operation, the parameters of the intelligent agent may include one or more strategy profile values and a set of counterfactual regret values, wherein each counterfactual regret value of the set of counterfactual regret values is associated with an action. In some embodiments, the counterfactual regret value may reduce a corresponding action value and may represent the regret of not following a strategy profile. For example, a counterfactual regret value for an action may be quantitatively defined as a difference between a total expected loss of an algorithm using a combination of strategies and a minimum total loss when following a single strategy.

In some embodiments, a counterfactual regret may be determined based on a calculation of counterfactual utility values for each of a set of possible events that an entity may cause, where a set of strategy values may be used to assign probabilities to each event of the set of possible events. The strategy values may be determined using a strategy function, where the strategy function for a given program state may be based on a probability distribution function over a set possible events causable by an entity when the program is at the given program state.

Determining a counterfactual utility value of an event caused by an entity may be based on the set of reward values determined above and a set of probabilities. A probability of the set of probabilities may indicate reaching a terminal program state from the current program state after the entity causing for the entity, where the computation may include different paths from a set of paths, where each path of the set of paths may start at an initial vertex and end at a terminal vertex. In some embodiments, determining a counterfactual utility value of an action for a first entity may include a sum of products, where each of the products is a product of a total reward value associated with a terminal program state and a corresponding probability of reaching the respective terminal program state from the current program state. In some embodiments, an initial program state may be changed to one or more intermediate program states before being changed to a terminal program state. For example, a counterfactual regret value $u_i$ for entity i may be determined using statement 14 below, where $\pi^\sigma(se, s')$ represents the probability of reaching a terminal program state s' starting at a program state se, where se may represent the subsequent program state after a state-changing event e is received, W is the set of terminal program states, $\pi_{-i}^\sigma(s)$ represents a counterfactual reach probability of reaching the state s assuming the strategy σ is used, and u(s') represents a path score as determined by incrementing/decrementing the cumulative reward value when changing from the current state s to the final state s' based on the reward values determined above:

$$u_i = \sum_{s \in I, h' \in W} \pi_{-i}^\sigma(s) \pi^\sigma(se, s') u(s') \tag{14}$$

In some embodiments, the system may determine the probability of reaching a respective terminal program state using a set of strategy values, where the strategy values may be based on an information set representing the amount of information about the smart contract program state available to the first entity. In some embodiments, each entity may have all information available about the smart contract program state, resulting in a perfect information set. Alternatively, one or more of the entities may have incomplete information about the smart contract program state.

In some embodiments, the intelligent agent may execute a regret matching routine to calculate a counterfactual regret value for one or more possible actions. Using the regret matching routine may include determining a reward value for an entity associated with the entity causing an event at a time point, where the reward value may be equal to or otherwise based on the score changes caused by the event. Using the regret matching routine may also include determining a total reward associated with causing the event at the time point. Using the regret matching routine may also include determining an additional reward value associated with causing the event based on a set of strategy values. Using the regret matching routine may also include determining an additional reward value associated with causing the event based on a sum of total reward values associated with using multiple sets of strategy values. Using the regret matching routine may also include updating a set of strategy values at the time point based on a regret value for an action and a total regret value across all actions. For example, the regret matching routine may include updating a strategy value based on a ratio of a regret value acquired of performing a first action with a first information set and a sum of regret values, where each regret value of the sum regret values is based on a different action and the first information set.

In some embodiments, additional strategic behavior may be considered by using neural networks to consider the viability of additional events causable by an entity that would be ignored or otherwise grouped in a category. For example, some embodiments may perform one or more operations similar to those used in the MuZero algorithm, where the MuZero algorithm is described in "Mastering Chess and Shogi by Self-Play with a General Reinforcement Learning Algorithm" (Schrittwieser, Antonoglou, Hubert, Simonyan, Sifre, Schmitt, Guez, Lockhart, Hassabis, Graepel, Lillicrap, Silver. Submitted 19 Nov. 2019. arXiv: 1911.08265), which is hereby incorporated by reference. Using a MuZero algorithm may include performing a set of self-play operations to determine viable event-causing actions and a set of a training operations based on the results of the self-play operations to determine score-maximizing behavior.

In some embodiments, the intelligent agent may store multiple versions of the neural network in a neural network parameter store and outcome program states in an outcome program state store. In some embodiments, the outcome program states may include results from a set of self-play operations or actual outcome program states from previous executions of a smart contract program. During a self-play operation, the intelligent agent may obtain an initial set of events causable by an entity, such as transferring a set of different score amounts at a set of different time points, changing one or more environmental states, or the like. In some embodiments, the intelligent agent may determine an initial set of events causable by an entity based on the conditions of the smart contract program. For example, if a condition of an obligation norm of the smart contract program includes a score transfer threshold requiring the allocation of at least 10 gigabits per second (GB/s) from an entity with respect to a data pipeline, the intelligent agent may vary the score transfer threshold to a set of modified values including 50% of the score transfer threshold and 200% of the score transfer threshold, resulting in the set of modified values of 5 GB/s and 20 GB/s. The intelligent agent may then include the first entity allocating 5 GB/s, allocating 10 GB/s, and allocating 20 GB/s as three possible events in the initial set of events.

The intelligent agent may use the initial set of events to simulate one or more entities that cause events using an initial set of self-play operations. A self-play operation may include using an initial set of random decisions representing actions or events caused by each entity, such as via a Monte Carlo Search Tree operation (MCTS) described further below, until a terminal program state is reached. The intelligent agent may then store the terminal program state, an associated terminal state outcome score, or other outcome program states or their associated outcome scores in the outcome program state store. The results of the initial set of self-play operations may be used to train a plurality of neural networks. The intelligent agent may perform multiple iterations of the self-play operations sequentially or in parallel for a pre-determined number of times, such as more than 10 times, more than 100 times, more than 10000 times, more than $10^6$ times, or the like.

In some embodiments, the intelligent agent may use the results of the initial set of self-play operations to train a plurality of neural networks in combination with additional MCTS operation. The intelligent agent may begin at a first vertex of a directed graph and traverse the directed graph by proceeding to an adjacent vertex determined by the set of directed edges connected to the first vertex. Each configuration of the directed graph may be of a different program state or be otherwise associated with a different program state. For example, the intelligent agent may traverse to a first child vertex of an initial directed graph from a starting vertex. The intelligent agent may proceed to expand the directed graph to simulate evolution of its associated program state until arriving at a terminal child vertex and ending at a terminal program state. In some embodiments, performing an MCTS operation may include determining a maximum upper confidence bound (UCB) score, where the UCB score may be based on an exploration weight and a total weight score, where the exploration weight is correlated with exploring less-visited nodes and the total weight score is correlated with following the vertices associated with the greatest total reward values.

The MCTS operation may include keeping track of the number times a vertex is visited, which entity that is responsible each change in state, a prior probability value correlated with the probability of the vertex being visited in an iteration of a simulated state evolution, a backfilled vertex sum value, a hidden state value, and a predicted total reward value for an entity, or the like. After each state change, the intelligent agent may use a first neural network to determine an internal predicted value and hidden state value associated with the vertex. The intelligent agent may also use a second neural network to determine a policy weight based on the hidden state value. The intelligent agent may then expand the directed graph again, if possible, and update the policy prior value with a new policy weight using the third neural network. The internal predicted value and hidden state values of the vertices of the expanded directed graph may then be backpropagated up the directed graph to a root vertex of the directed graph.

In some embodiments, the intelligent agent may initialize each neural network of the plurality of neural networks and set a learning rate based on the number of previous training iterations. As described above, the first neural network may be trained to generate a set of internal predicted values and hidden state values, forming an internal representation of a program state. The second neural network may then be trained to formulate a set of policy weights for a policy function based on the internal representation. A third neural network may then be trained to predict a network-predicted reward value based on the policy weights and internal predicted value, where the action value may be equal to or otherwise based on the network-predicted reward value.

In some embodiments, the system may determine a set of possible state-changing events from a first vertex using one of the neural networks described above, where more than one event may cause a same adjacent vertex to be selected on the directed graph. In some embodiments, the intelligent agent may generate a decision tree associated with but not identical to the directed graph. For example, the intelligent agent may generate a decision tree having one or more decision tree vertices for each smart contract directed graph vertex, where each respective decision tree vertex associated with a respective smart contract directed graph vertex is associated with a different event or action that would trigger the respective smart contract directed graph vertex.

In some embodiments, the efficiency of tree traversal during a set of MCTS operations may be increased by limiting the outcomes based on the set of vertex categories assigned to each vertex. For example, a system may encounter a vertex associated with a category value indicating that the vertex represents or is otherwise associated with an obligation norm. In some embodiments, an obligation norm may be categorized based on a set of types of statuses, set of behaviors, or set of properties, where a status change to a satisfied status may result in the activation of a first set of child vertices and a status change to a failed status may result in the activation of a second set of child vertices. For example, a set of conditions encoded in an obligation norm associated with a vertex may be satisfied, triggering the vertex by changing the status of the vertex ("vertex status") to a satisfied status and activating a first set of child vertices connected to the vertex via a first set of graph edges. In addition, if the obligation norm associated with a vertex is not satisfied before a failure threshold is satisfied, the system may trigger the vertex by changing the vertex status to a failed status and activate a second set of child vertices connected to the vertex via a second set of graph edges. In some embodiments, one or more obligation norms may be set to an unsatisfied status, where an unsatisfied status may indicate that the one or more obligation norms have not been satisfied but are still satisfiable.

In some embodiments, separate sets of events may be determined based on entities. For example, a first entity may be set as a first-acting entity and a second entity may be set as a counterparty entity, where each of the first-acting entity and counterparty entity may be able to cause different types of events. For example, a first-acting entity may cause events that satisfy a set of first-acting entity conditions that includes allocating different amounts of resources at different times, recalling allocated resources, or modifying a property of an allocated resource. Similarly, the resource-using entity may be able to cause one or more of a second set of events to trigger a second set of conditions associated with a second set of vertices triggerable by events causable by the counterparty entity ("set of counterparty conditions"). For example, the set of counterparty conditions may include verifying that an allocated resource satisfies a set of resource properties, confirming resource delivery, providing a digital asset after confirming the allocation of a resource, or the like.

As described above, when implementing a set of MCTS operations, the system may determine a next possible state s+1 for each state s based on a set of heuristic values associated with the set of events causable by an entity. A heuristic value may be determined using a function based on a ratio of an aggregate score associated with an event caused by an entity, the number of times that the event has been performed while performing the set of MCTS operations, a total number of iterations, and an exploration parameter. For example, the heuristic value may be determined as the sum of a first value and a second value. The first value may be a ratio of the aggregate score value to the number of times that an action has been taken while performing the set of MCTS operations. The second value may be a product of the exploration constant and a ratio of a logarithm of the total number of iterations performed while performing the set of MCTS operations and the total number of iterations. In some embodiments, each heuristic value may be associated with an event causable by an entity and may be used to determine which event is most probable. For example, if a first heuristic value is greater than a second heuristic value, an event associated with the first heuristic value may have a greater probability of being selected than an event associated with the second heuristic value.

Alternatively, or in addition, the heuristic value may be based on the vertex categories assigned to each respective vertex activated by the respective action. For example, if a first event is associated with a failure to satisfy an obligation norm, the system may automatically deduct a pre-determined failure penalty from an associated first heuristic value or set the first heuristic value to a pre-determined value. Similarly, if a second event satisfies a rights norm, the system may automatically increase the associated second heuristic value by a pre-determined amount from or set the second heuristic value to a pre-determined value. By using the vertex categories implemented in a symbolic AI model, the system may increase the efficiency and accuracy of operations to determine outcome program states based on a directed graph of an initial program state.

In some embodiments, the process 1500 may include determining a set of outcome program states or set of outcome scores or other parameters of the intelligent agent based on the set of action values or other set of parameters of the intelligent agent, as indicated by block 1528. In some embodiments, the intelligent agent may determine an outcome program state by providing a probability distribution associated with one or more possible outcome program states. For example, the intelligent agent may use a trained neural network described above to determine that there is a 25% chance that a smart contract program will end at a first terminal program state, a 35% chance that a smart contract program will end at a second terminal program state, and a 40% chance that a smart contract program will end at a third terminal program state. In some embodiments, an outcome program state may be associated with an outcome score, where the outcome score may be based on a total reward value, a total reward range, a risk of failure value, or the like. In some embodiments, a smart contract program may receive an event associated with an action performed by a counter entity that causes a change to a program state into a subsequent actual outcome program state that is not in the set of predicted outcome program states.

In some embodiments, a set of expected outcome program states determined using the operations above may be used as part of an unexpected event threshold. The system may determine that an unexpected event threshold is satisfied if an actual outcome program state is not in the set of expected outcome program states. In response, the system may perform an action such as transmitting a message indicating that an unexpected event had occurred. For example, an intelligent agent may determine that the set of expected outcome program states includes a first program state and second program state. The first example program state may be associated with a counterparty entity satisfying an obligation norm by transferring a digital asset required to access a restricted database, and the second example program state may be associated with the counterparty entity satisfying a right to rescind the request for access. If the counterparty entity instead satisfies a rights norm to override the security request, which results in a third example program state that is not in the set of expected outcome program states, the system may determine that an unexpected event threshold is satisfied. In response, the system may transmit a message indicating that an unexpected event threshold was satisfied. Furthermore, in some embodiments, the system may determine a behavior pattern of an entity based on the events caused by the entity. In some embodiments, the behavior pattern may be analyzed using a neural network to determine anomalous behavior indicating that the entity is likely to fail a future obligation or cancel the smart contract based on past behavior of the same entity or similar entities.

Figure 16:
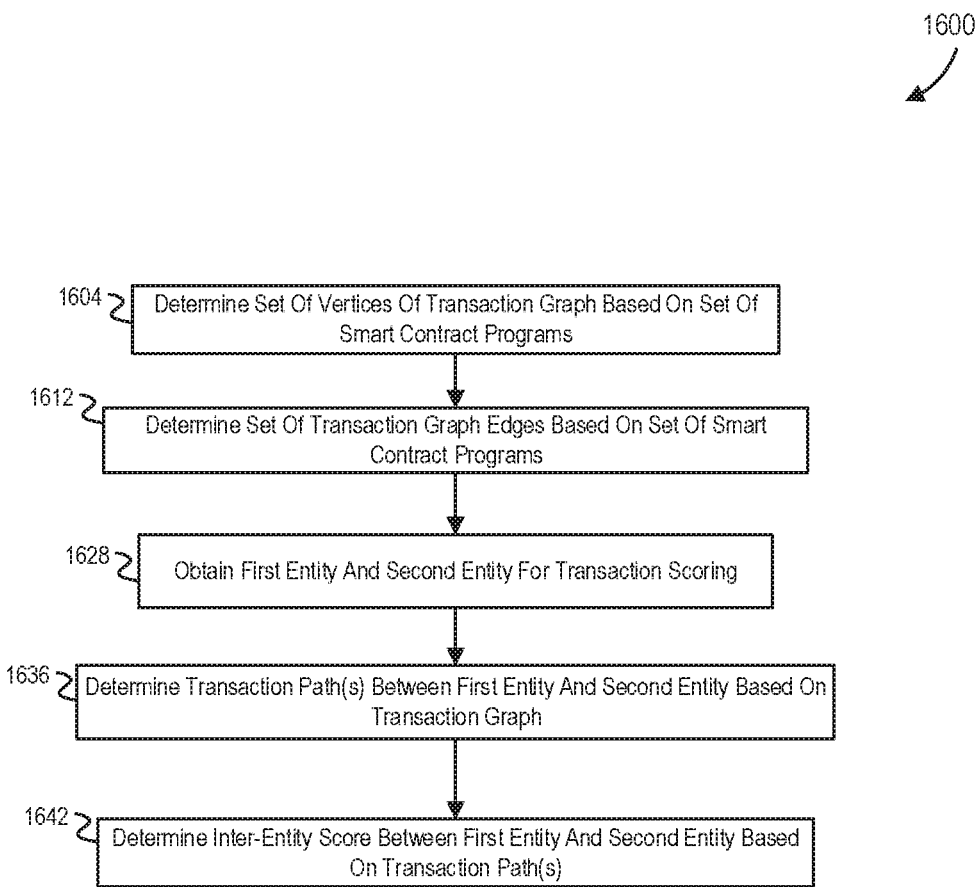
FIG. 16 is a flowchart of an example of a process by which a program may determine an inter-entity score quantifying a relationship between a pair of entities across multiple smart contract programs, in accordance with some embodiments of the present techniques.

FIG. 16 is a flowchart of an example of a process by which a program may determine an inter-entity score quantifying a relationship between a pair of entities across multiple smart contract programs, in accordance with some embodiments of the present techniques. In some embodiments, the process 1600 may include determining a set of vertices of a transaction graph based on a set of smart contract programs, as indicated by block 1604. In some embodiments, a transaction graph may be used to track score exchanges, asset transfers, or other transactions between multiple entities across a set of smart contract programs. For example, the vertices of the transaction graph ("transaction graph vertices") may represent entities of the set of smart contract programs, and a set transaction graph edges may represent score changes, where the directions of the set of transaction graph edges may be used to represent a net transaction score change. The entity of a transaction graph may refer to a vertex of the transaction graph ("transaction graph vertex") that is associated with the entity.

The set of smart contract programs may be stored on a single set of computing devices. Alternatively, one or more of the set of smart contract programs may be stored on different computing devices. The system may determine the vertices of a transaction graph based on one or more entities stored in an entity list of a smart contract program. For example, a system may access a set of five smart contract programs that include a total of seventy-five entities and generate a transaction graph having seventy-five vertices, where each respective transaction graph vertex of the transaction graph is associated with one of the seventy-five entities. In some embodiments, each vertex of the transaction graph may also have an associated smart contract list, where the associated smart contract list includes identifiers for each smart contract program that lists the entity. For example, a first vertex may have an associated smart contract list comprising a first smart contract program identifier and a second smart contract program identifier.

In some embodiments, the process 1600 may include determining a set of the transaction graph edges based on the set of smart contract programs, as indicated by block 1612. The set of transaction graph edges may represent categorical or quantitative relationships between the entities represented by the transaction graph vertices. In some embodiments, the system may expand the directed graphs of the set of smart contract programs and determine their associated outcome program states to determine possible transactions between the different entities of the transaction graph. For example, the system may expand a smart contract directed graph and review each norm vertex of the smart contract directed graph to detect a first score change between a first entity and a second entity, a second score change between the first entity and a third entity, and a third score change between the second entity and the third entity. The system may update a first transaction graph edge of a transaction graph between the first entity and the second entity based on the first score change, a second transaction graph edge between the first entity and the third entity based on the second score change, and a third transaction graph edge between the second entity and the third entity based on the third score change.

In some embodiments, the system may traverse a set of directed graphs of a set of smart contract programs to modify the value associated with a transaction graph edge based on transactions between entities indicated by the directed graph vertices. For example, the system may traverse a set of directed graphs of program states, where the set of directed graphs includes a first smart contract program directed graph and a second smart contract program directed graph. If the first smart contract program directed graph includes a score change based on a condition requiring that a first entity allocates 30 terabytes of memory to a second entity, and the second smart contract program directed graph includes a score change based on a condition requiring that the second entity allocate 35 terabytes of memory to the first entity, the transaction graph edge may be updated after a system traverses through both smart contract program directed graphs. The update may change a set of score changes associated with the transaction graph edge to indicate a transfer of five terabytes from the second entity to the first entity.

Furthermore, in some embodiments, each respective smart contract program may be associated with a respective contribution weight for each entity in the transaction graph, where the respective contribution weight may indicate the proportional weight that the smart contract program has on a score change associated with the entity. For example, if a first smart contract program increases the score change for an entity by 5 and a second smart contract program increases the score change for the entity by 10, the first smart contract program may be associated with a first contribution weight of 33.3% for the entity and the second smart contract may be associated with a second contribution weight of 66.7% for the entity. In some embodiments, the set of contribution weights may be used to determine which smart contracts have had a greatest past impact on a set of entities or which are anticipated to have the greatest future impact on the set of entities.

In some embodiments, the process 1600 may include obtaining a first entity and second entity for transaction scoring, as indicated by block 1628. In some embodiments, the first entity and second entity may be explicitly provided by a user as inputs or selected by default. For example, a user signed in as the first entity or otherwise representing the first entity may use a graphic user interface and select a second entity. Alternatively, or in addition, the system may be instructed to generate a list of transaction scores and, in response, systematically perform one or more operations described in this disclosure for each of a selected set of pairs of entities, where the first and second entities are one of the pair of entities in the selected set of pairs of entities.

In some embodiments, the process 1600 may include determining a set of transaction paths between a first entity and a second entity based on the transaction graph, as indicated by block 1636. A transaction path may include a directed sequence of transaction graph edges starting at a first vertex and ending at another vertex, where each transaction graph edge may represent a transaction. For example, if a first transaction graph edge is directed from a first entity to a second entity, a second transaction graph edge is directed from the first entity to a third entity, and a third transaction graph edge is directed from the second entity to the third entity, a first path from the first entity to the third entity may include the first transaction graph edge, and a second path from the first entity to the third entity may include the second transaction graph edge and the third transaction graph edge.

In some embodiments, the path may be determined using one or more path search criteria. For example, a path search criterion may include a criterion that the path between a first entity and a second entity includes an intermediate entity, wherein each transaction graph edge of the path represents an obligation to transmit an amount of assets. In some embodiments, the path search criteria may include one or more criteria to filter out transaction paths that include transaction graph edges that are below a certain value. For example, the set of path search criteria may include a criterion that each transaction of a transaction path involves a transaction score greater than a transaction path threshold, where the transaction path threshold may be set to any value. In some embodiments, the path search criteria may be used to determine system vulnerabilities. For example, a transaction graph edge representing a token exchange between a first entity and a second entity may be mediated by a verification entity, where the first entity and second entity are both blind to each other's identities, but a failure to satisfy an obligation norm on the part of the second entity may prevent the first entity from securing an asset from the third entity. The system may determine a transaction path that includes a set of transaction graph edges to determine an exposure to failure experienced by the first entity with respect to an action or inaction of the second entity.

In some embodiments, the process 1600 may include determining an inter-entity score between a first entity and a second entity based on the set of transaction paths, as indicated by block 1642. The inter-entity score may represent one of various types of metrics and may be used to determine an entity reputation score. In some embodiments, the inter-entity score may indicate a vulnerability score, where previously-undetected vulnerabilities based on relationships between a first entity and a second entity are detected by including a set of transaction paths that include additional entities as intermediate transaction graph vertices of a transaction graph. In some embodiments, the vulnerability score may also be based on observable states of an entity. For example, a first, second, and third entity may represent a web application, a hosting application relied upon by the web application, and a cloud-connected server supplying memory resources to the hosting application, respectively. The system may assign a vulnerability score to quantify the vulnerability of the first entity to a failure of the second entity based on a net amount of computer memory the third entity is to allocate to the hosting application via an obligation norm of the cloud-connected server. The system may then determine an inter-entity score between the first entity and the third entity based on this vulnerability score.

In some embodiments, the inter-entity score may be used to update an action value. For example, some embodiments may determine an action value based on a set of reward values that includes a first reward value, where the first reward value is based on a condition requiring that a first entity transfer a score amount to a second entity. The first entity may have an inter-entity score with respect to a third entity, where the inter-entity score exceeds an inter-entity score threshold. In response to the inter-entity score exceeds an inter-entity score threshold, the first entity may modify the first reward value, such as by reducing the reward value. Alternatively, or in addition, the system may modify the first reward value based on a detected change in the status of the third entity. For example, if it is determined that the third entity is in a state that indicates it is unable to satisfy a set of obligation norms with respect to the first entity, the system may reduce the first reward value. In some embodiments, changing the reward value may be directly based on an entity reputation score, and the entity reputation score may be based on one or more inter-entity scores.

In some embodiments, the inter-entity score may indicate the detection of a cyclical path that begins and ends at a same entity. For example, the system may determine that a transaction path is cyclical, where a first entity is obligated to transfer a first amount of assets to a second entity, the second entity is obligated to transfer the first amount of assets to the third entity, and the third entity s obligated to transfer the first amount of assets back to first entity. A system may determine a cyclical path based on this relationship by detecting that the transaction path representing this relationship may have a same vertex as the start and end of the transaction path with a same or similar amount for each transaction graph edge of the transaction path. An inter-entity score may be determined based on this path based on an average amount of assets to be transferred along the cycle and include or otherwise be associated with an identifier indicating that the inter-entity score reflects a cyclical path.

In some embodiments, the system may determine that an entity is associated with a transaction that includes an obligation norm having a status indicating failure and, in response, reduces a reward associated with other possible transactions involving the entity. For example, a transaction graph may include a first entity that is scheduled to transfer a score value to a second entity at a future time, where the score value being transferred may be used to determine a reward value such as the reward values described above. The system may detect that the first entity had failed a previous obligation to transfer a different score value to a different entity and, in response, reduce the reward value based on historical data indicating that the first entity has a reduced probability of satisfying its obligation to other entities.

Figure 17:
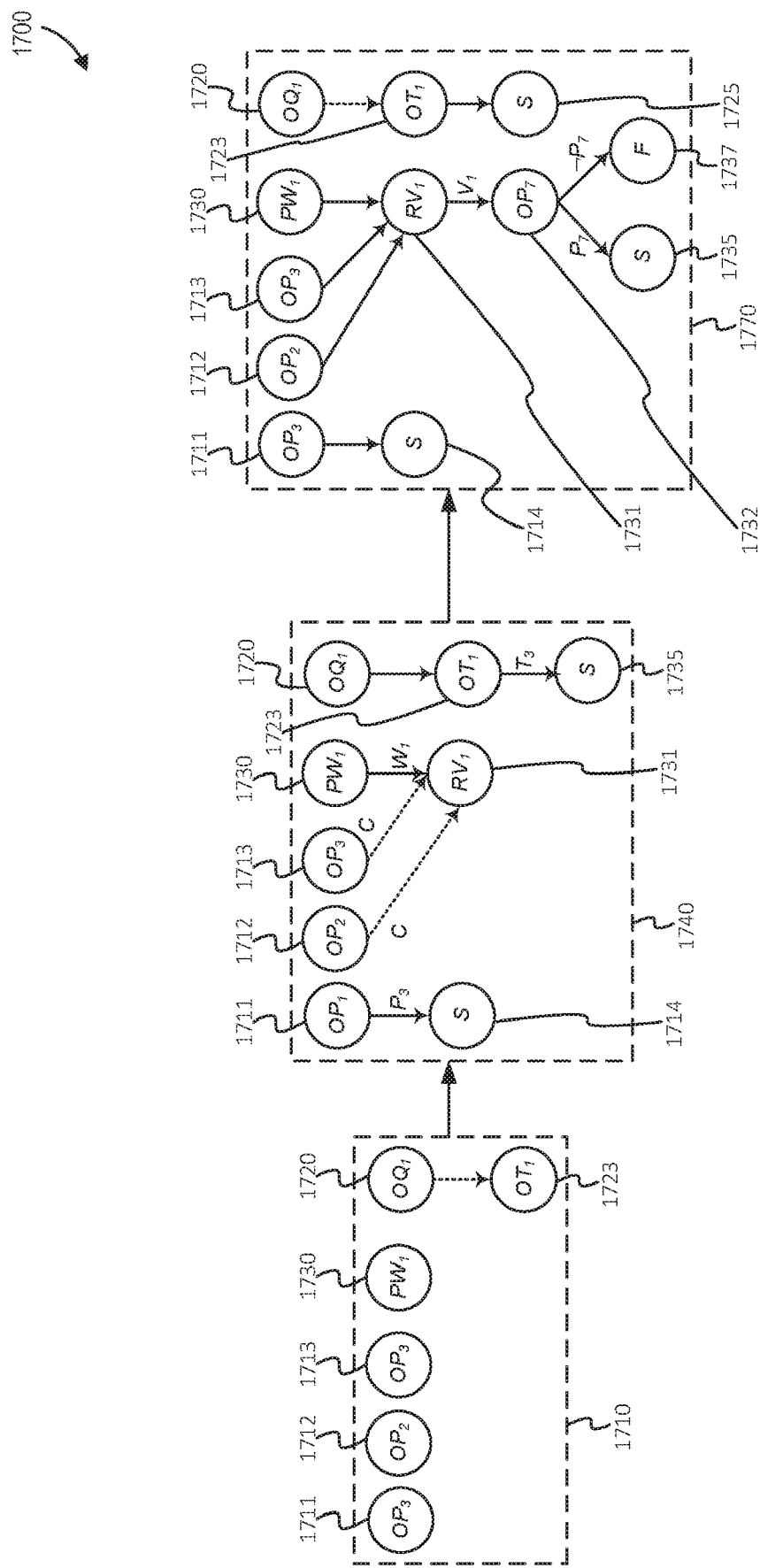
FIG. 17 depicts a set of directed graphs representing possible outcome program states after a triggering condition of a prohibition norm is satisfied, in accordance with some embodiments of the present techniques.

FIG. 17 depicts a set of directed graphs representing possible outcome program states after a triggering condition of a prohibition norm is satisfied, in accordance with some embodiments of the present techniques. The set of directed graphs 1700 includes a set of obligation norms representing affirmative covenants and prohibition norms representing negative covenants. By using obligation norms and prohibition norms as encoded using the methods described in this application, these covenants may be programmatically enforced and analyzed without the writing or using ad-hoc computer code based on one or more detected events. In some embodiments, an event may be directly sensed by the computer system and rendered comparable to one or more norm conditions. Alternatively, or in addition, an external party, such as a network administrator, may send or confirm the occurrence of an event at appropriate frequencies.

In some embodiments, a smart contract or other symbolic AI system may include a set of scores representing one or more properties of an entity. A smart contract may include an entity with a set of associated entity score values representing various properties of the entity. For example, a smart contract may include an entity representing a power facility. The entity may include or be associated with a first entity score indicating a maximum available power, a second entity score indicating an amount of transferable power, a third score indicating a facility fuel consumption rate, and a fourth score indicating a total failure risk.

In some embodiments, an entity may include or be associated with additional entity properties. For example, a smart contract may include an entity representing a first asset. The first entity may include or otherwise be associated with a first entity property that includes a first list of indicators, where each of the first list of indicators points to an owner of the first asset. The asset may include or otherwise be associated with a second entity property that includes a second list of indicators, where each of the second list of indicators points to another entity owned by the first entity. In addition, the asset may also be associated with quantitative score values, such as an asset valuation, a monthly cash flow, a liability value, or the like.

In some embodiments, the value of an asset or otherwise associated with the asset may be stored in various ways. For example, a score representing the value may be directly stored in a smart contract state data instead of being included as a part of entity data. For example, a smart contract score may be stored in the knowledge list 250 of the smart contract state data 200 described above, where the smart contract score may represent the value of all entities listed assets by the smart contract state data 200.

The box 1710 shows a directed graph including a set of norm vertices 1711-1713 representing a set of consecutive obligation norms. For example, the set of norm vertices 1711-1713 may be associated with a set of consecutive obligation norms to repay a loan across three intervals of time. The box 1710 also includes a norm vertex 1720 associated with an affirmative obligation norm, where an affirmative obligation norm may be associated with an affirmative covenant on the part of a first entity to provide a data payload or digital asset at a pre-determined time, and where a failure to satisfy the conditions associated with the norm vertex 1720 may result in activation of the obligation norm of the norm vertex 1723. For example, the norm vertex 1720 may represent an affirmative obligation norm that tests whether the first entity provided user verification values to a second entity, where the verified data may include information such as application health report, a financial statement, a transaction confirmation, or the like. Failure to satisfy the conditions of the norm vertex 1720 before a failure state of the norm vertex 1720 is reached may result in activation of the norm vertex 1723, which may be associated with an obligation to transmit a message or may result in the system autonomously generating a warning message. In some embodiments, a symbolic AI model may include a plurality of affirmative obligation norms associated with affirmative covenants. For example, some embodiments may include a first norm that includes norm conditions to determine whether certified financial statements are sent from a first entity to a second entity at different times. The box 1710 also includes a norm vertex 1730 associated with a prohibition norm, where the prohibition norm may include conditions and outcomes enforcing the terms of a negative covenant. For example, the prohibition norm may encode or otherwise be associated with a norm condition to determine whether any entity made acquisitions greater than a pre-determined threshold or incur certain types of debt. In some embodiments, these norm conditions may be satisfied based on an automated report provided to an API of the smart contract. Alternatively, or in addition, these norm conditions may be satisfied based on an administrator action.

The box 1740 shows a directed graph of an outcome program state that may follow the program state shown by the directed graph of box 1710. In some embodiments, one or more operations described above for the process 1400 or the process 1500 may be used to determine an outcome program state shown by the directed graph of the box 1740, where the initial program state may be represented by the directed graph of the box 1710. For example, the intelligent agent described above may determine the outcome program states represented by the box 1740 and assign it an outcome score of 85% using one or more operations described above.

As indicated by the directed graph in the box 1740, a condition of the prohibition norm of the norm vertex 1730 may be satisfied, which may in turn cause the computer system to generate an obligation norm associated with the rights norm of the fourth norm vertex 1731. In some embodiments, the rights norm of the fourth norm vertex 1731 may encode or otherwise be associated with conditions based on whether a counterparty entity transmits a message including instructions to exercise the rights norm of the fourth norm vertex 1731. In addition, an event has triggered the norm vertex 1720, where the event is a failure to satisfy the norm vertex 1720 before a failure time threshold is satisfied. The failure of the norm associated with the norm vertex 1720 activates the obligation norm associated with the norm vertex 1723. A second event has then triggered the obligation norm associated with the norm vertex 1723 by satisfying the norm condition of the obligation norm, resulting in the satisfaction norm 1735. In some embodiments, the directed graph may explicitly include the satisfaction norm 1735, such as in a data structure storing the directed graph. Alternatively, or in addition, the directed graph may generate an indicator indicating that the norm vertex 1723.

The box 1770 shows a directed graph representing a program state that may follow the program state shown by the directed graph of box 1740. In some embodiments, one or more operations described above for the process 1500 or the process 1600 may be used to determine an outcome program state shown by the directed graph of the box 1740, where the initial program state may be represented by the directed graph of the box 1710. As indicated by the directed graph in the box 1770, the rights norm of the fourth norm vertex 1731 may be triggered, activating a new obligation norm associated with the norm vertex 1732. In some embodiments, the new obligation norm may include norm conditions to determine whether a first entity transmits a payment amount to the second entity. For example, the new obligation norm may determine whether the first entity transmitted the entirety of a principal payment of a loan to the second entity. An event may then either satisfy or fail the norm condition encoded by or otherwise associated with the norm vertex 1732. The satisfaction of the norm vertex 1732 may result in the activation of the satisfaction norm vertex 1735, and failure of the norm vertex 1732 may result in the activation of the failure norm vertex 1737. In some embodiments, the satisfaction norm vertex 1735 or failure norm vertex 1737 may be terminal vertices. Alternatively, in some embodiments, the norm vertex 1732 may be considered a terminal vertex for embodiments where satisfaction norm vertices or failure norm vertices are not explicitly stored in a directed graph.

Figure 18:
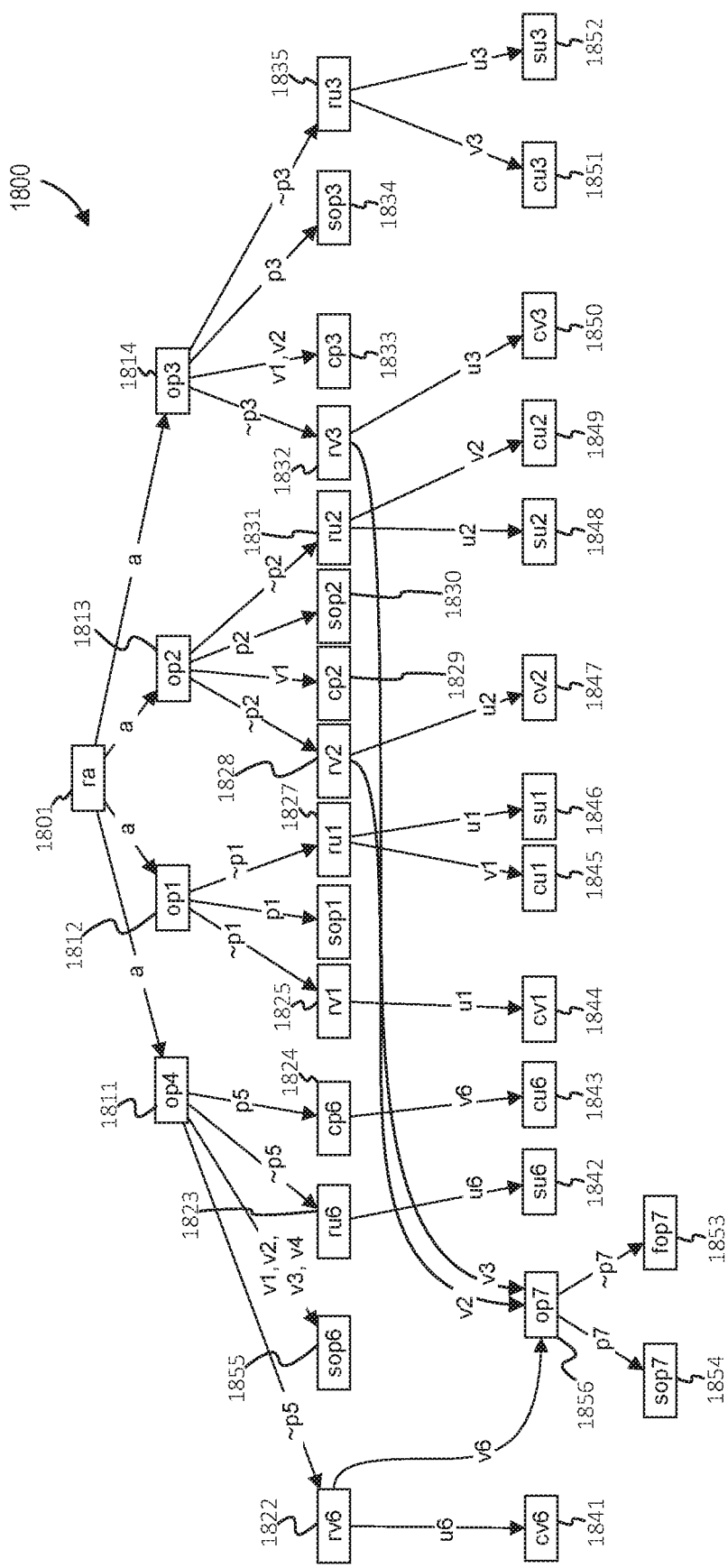
FIG. 18 depicts a directed graph representing multiple possible program states of a smart contract, in accordance with some embodiments of the present techniques.

FIG. 18 depicts a directed graph representing multiple possible program states of a smart contract, in accordance with some embodiments of the present techniques. The directed graph 1800 may be generated based on a smart contract program state. The directed graph 1800 may represent a set of possible states for a set of possible events accounted for by a smart contract and may represent an expanded directed graph or a combination of expanded directed graphs. The directed graph 1800 may be stored in various forms in a data store. For example, the directed graph 1800 may be stored in a form similar to that shown for the smart contract state data 200. In some embodiments, operations to simulate evolving program state from an initial program state, such as those described above, may be used to determine the directed graph 1800 from a previous directed graph. In some embodiments, a visual representation of the directed graph 1800 may be generated based on a symbolic AI model such as a smart contract. In some embodiments, the visual representation may include one or more user interface (UI) elements with which a user may interact. Furthermore, the text shown in each of the vertices of the directed graph 1800 may represent titles of specific vertices.

As shown in the directed graph 1800, the norm vertex 1801 includes the title "ra." The "r" in "ra" may indicate that the norm vertex 1801 represents a right norm. The "a" in "ra" may indicate that the norm vertex 1801 is currently active. Combined, the name "ra" may indicate that the norm vertex 1801 represents a rights norm that is currently active. Each of the norm vertices 1811-1814 may be set as active once the rights norm represented by the norm vertex 1801 is triggered. The "op" in the title of each of the norm vertices 1811-1814 may indicate that each of the norm vertices 1811-1814 represent obligation norms which are set as active upon triggering the norm vertex 1801. Each of the norm vertices 1822-1835, 1841-1853, 1855, 1861, and 1862 may be associated with a different norm. Each of the norm vertices that include a "s" in their title represents a satisfied norm. For example, the norm vertex 1848 represents a satisfied norm, which indicates that the rights norm represented by the norm vertex 1831 is satisfied. Each of the norm vertices that include a "c" in their label represents a cancelled norm. For example, the norm vertex 1845 represents a cancelled norm, which indicates that the rights norm represented by the norm vertex 1827 is cancelled. Each of the norm vertices that include a "f" in their label represents a failed norm. For example, the norm vertex 1845 represents a cancelled norm, which indicates that the rights norm represented by the norm vertex 1827 is cancelled.

In some embodiments, each of these norm vertices may have associated data that may indicate a smart contract state at that position and may be used to determine reward values. For example, a system may traverse the directed graph 1800 by first simulating a first entity initializing a smart contract represented by the directed graph 1800 by triggering the norm represented by the norm vertex 1801 to activate the obligation norm represented by the norm vertex 1812. The computer system may then simulate a second entity not satisfying the first obligation, resulting in the activation of the norms represented by the norm vertex 1825 and 1827. The computer system may then simulate proceeding to the norm represented by norm vertex 1844, resulting in the cancellation of rights obligation represented by the norm vertex 1825 and the cancellation of the smart contract as a whole. The computer system may traverse a set of possible paths allowed by the edges of the directed graph 1800 to determine score changes for each entity and use the score changes to determine reward values associated with events, actions, vertices, or program states for one or more entities.

In some embodiments, each of the norm vertices 1841-1855 may represent a terminal norm, such as a cancelled norm or a satisfied norm. One or more events may trigger a set of norms to activate one or more new norms. For example, the satisfied norm represented by the norm vertex 1855 may be satisfied by any one of events represented by v1, v2, v3, or v4 occurring. Furthermore, a norm may be triggered by an event to activate a plurality of other norms. For example, the occurrence of the event indicated by the symbol "~p5" may trigger the norm vertex 1811 to activate the norm vertices 1822-1823, where the event "~p5" may indicate that the event "p5" did not occur before a failure time threshold encoded by or otherwise associated with the norm vertex 1811 is satisfied.

Figure 19:
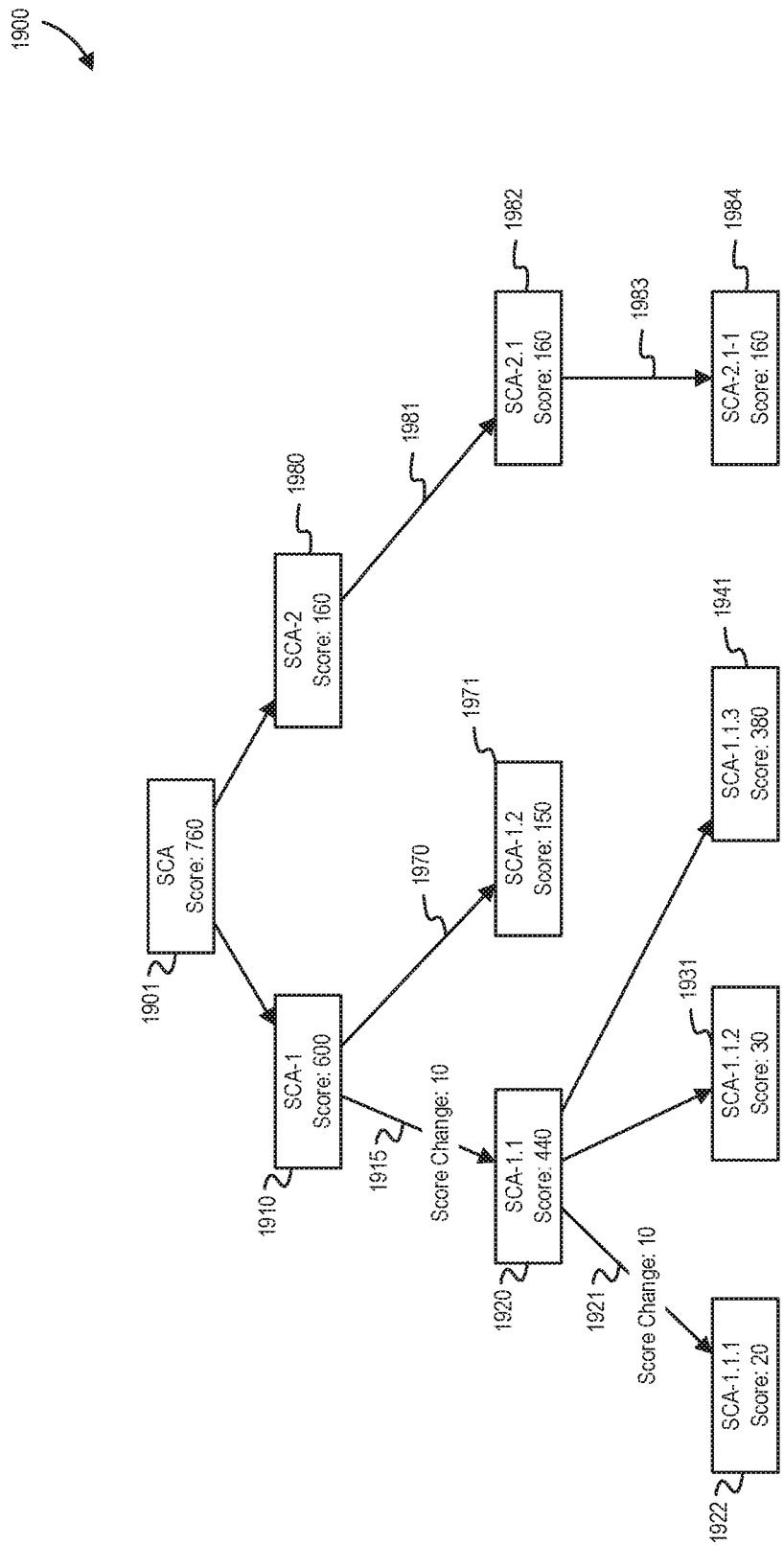
FIG. 19 depicts a tree diagram representing a set of related smart contract programs, in accordance with some embodiments of the present techniques.

FIG. 19 depicts a tree diagram representing a set of related smart contract programs, in accordance with some embodiments of the present techniques. The box 1901 represents a first smart contract titled "SCA" having a score value of 760. The score value may represent one or more types of information. For example, the score value may indicate an amount of data in gigabytes to be transmitted by Entity A to one or more other entities. The smart contract A may then be used to generate the child smart contracts titled "SCA-1" and "SCA-2," where the child smart contracts may be labeled as child smart contracts with respect to SCA. Likewise, some embodiments may label or otherwise indicate SCA as a parent smart contract with respect to SCA-1 and SCA-2. In some embodiments, the newly-generated smart contracts may represent a contract rollover event sent by Entity A, wherein the event triggers a rights norm of SCA to roll over SCA into the two smart contracts titled, SCA-1 represented by the box 1910 and SCA-2 represented by the box 1960. As shown, the score value associated with Entity A may also be divided between SCA-1 and SCA-2.

As indicated by the arrow 1981 pointing from the box 1980 to the box 1982, the smart contract SCA-2 represented by the box 1980 may be used to generate the smart contract SCA-2.1, which may be labeled as a child smart contract of SCA-2. Similarly, the arrow 1983 pointing from the box 1982 to the box 1984 may indicate that SCA-2.1 may be used to generate the smart contract SCA-2.1.1 represented by the box 1984. As indicated by a comparison of the score values displayed by the boxes 1980-1984, the score values associated with an entity may remain unchanged when a parent contract is deprecated and a child smart contract is initiated.

As indicated by the arrow 1915 pointing from the box 1910 to the box 1920, the smart contract SCA-1 represented by the box 1920 may be used to generate the smart contract SCA-1.1, which may be indicated to be a child smart contract of SCA-1. Similarly, the arrow 1970 pointing from the box 1910 to the box 1971 may indicate that SCA-1 may also be used to generate the smart contract SCA-1.2 represented by the box 1971. As shown by the score values displayed in the boxes 1910, 1920, and 1971, the score value 600 displayed by the box 1910 may be distributed into the score value 440 associated with SCA-1.1 and the score value 150 associated with SCA-1.2, where a score change of 10 may occur via a transaction between Entity A to another entity during the generation of the smart contract SCA-1.1.

The smart contract SCA-1.1 may then be used to generate the smart contract SCA-1.1.1, SCA-1.1.2, and SCA-1.1.3, as indicated by boxes 1922, 1931, and 1941, respectively. The score value of 440 displayed by the box 1920 and associated with SCA-1.1 may be distributed across the child smart contracts of SCA-1.1. For example, as shown by the boxes 1922, 1931, and 1941, the score value 440 associated with smart contract SCA-1.1 may be divided into the score values 20, 30, and 380, respectively. Furthermore, as indicated by the arrow 1921, the score assigned to SCA-1.1.1 is reduced by 10 during the generation of SCA-1.1.1, which reduces the score associated with SCA-1.1.1 from 30 to 20.

In some embodiments, each of the newly-generated contracts may be integrated into an object or database of the first contract SCA. Alternatively, either or both of the newly-generated smart contracts may be independent of the first contract, where each respective smart contract may or may not have a link associating the child smart contract with the parent smart contract. For example, the smart contract SCA-1.1 may include a saved property titled "parent rollover smart contract" with a field value set as to "SCA."

In some embodiments, a party may be an entity of a child smart contract even if it is not an entity of a parent smart contract. For example, entity B may be the initial entity to which entity A is obligated to provide a total data payload equal to 760 terabytes. After entity B exercises a rights norm to generate SCA-1 and SCA-2, entity A may be obligated to allocate 600 terabytes of data for entity B and 160 terabytes of data for a new entity C. Entity B may then further exercise a rights norm to generate SCA-1.1 and SCA-1.2 to offload memory allocation instructions, where SCA-1.1 includes an obligation norm for entity A to allocate 440 terabytes to entity B and allocate 150 terabytes for a new entity D. In addition, potentially as a condition of generating additional memory allocation smart contracts on behalf of entity B, the amount of memory that entity A is to allocate for entity B may be reduced by 10.

In some embodiments, the directionality of a graph edge of a directional graph may be used to indicate a cause and outcome. For example, the tail vertex of a graph edge may be associated with a first norm and the head vertex of the graph edge may be associated with a second norm that is activated the first norm is triggered. In some embodiments, the relationship between triggering and triggered norm may be reversed, where the head vertex of a graph edge is associated with a first norm and the tail vertex of the graph edge is associated with a second norm that is activated the first norm is triggered. The directionality of a graph edge as used herein is described for illustrative purposes and may be used in different embodiments to denote different relationships between a triggering vertex and its outcome vertex. Also as used herein, the use of the article "a," with respect an object does not necessitate a new instantiation or version of the object. For example, a directed graph may expand over time from having 1000 vertices and 800 edges to having 2000 vertices and 1800 edges and can be referred to either "the" directed graph and "a" directed graph without any ambiguity. In addition, a data element, data object, data type, or data structure such as a graph does not need to called a specific type in order to be considered a category associated with that type, and may be considered to be of that type if it includes elements or programmed relationships of that type. For example, a graph does not need to labeled as a directed graph to be considered as a directed graph, and a set of elements stored in a computer memory labeled "Terms Network" or some other title may be considered to be a directed graph if it includes components defining a directed graph, such as vertex indices representing graph vertices and a set of ordered pairs of vertex indices indicating edges of the directed graph.

Modifying the functions of a smart contract program or other symbolic AI program after the program has begun executing may pose challenges in distributed computing environments. For example, a set of criteria of a distributed computing platform and the time required to transfer the data needed to implement a modification in each local memory of a distributed computing platform may significantly increase the cost of operating a smart contract program on a distributed computing platform. While such computational costs may be advantageous by increasing the security of a transaction and making tampering attempts evident, they may inhibit the responsiveness of smart contract programs or other symbolic AI programs operating on a distributed computing platform. For example, some distributed computing platforms may require more than one minute, more than five minutes, or more than ten minutes to verify and distribute an update to a smart contract program. The concurrent execution of more than 10, more than 100, more than 1000, or more than 100,000 operations to amend smart contract programs on a distributed computing platform may cause network or computing performance losses. Such network or computing performance losses may reduce the reliability of smart contract programs or make them less responsive to future events. Operations or related systems that reduce the cost of amending a smart contract program may increase the responsiveness of a smart contract program to future events or verifiable changes.

Some embodiments may obtain an amendment request and extract one or more values from the amendment request usable to update a smart contract program state or other symbolic AI program state. The values extracted from the amendment request may include a set of conditional statement parameters, a set of entity identifiers, a set of conditional statement identifiers, or the like. The values extracted from the amendment request may be used to select or update a set of target norm vertices of a smart contract program directed graph. Some embodiments may determine, based on the amendment request, one or more types operations to perform such as updating a set of conditional statements, updating a set of norm vertices, updating a set of entities, or the like, where updating a set may include generating, modifying, or deleting an element of the set.

Some embodiments may simulate the updating of a directed graph based on one or more conditional statement identifiers encoded in the amendment request and modify an amendment request based on the simulation. For example, some embodiments may simulate a state change caused by an amendment request and then determine an outcome program state based on the simulated program state change. Based on a comparison of an outcome program state value with a threshold (e.g., a threshold provided by a verification agent), some embodiments may prevent the amendment request from changing the program state or modify instructions of the amendment request to satisfy the threshold.

Some embodiments may use a simulation of a state change caused by an amendment request to determine whether a modified smart contract program state would satisfy a set of criteria of one or more of the entities of a smart contract program, where the directed graph of the smart contract program is stored in a deserialized form on a first computing device. In response to a determination that the set of criteria is satisfied, some embodiments may modify the smart contract program state based on the amendment request and serialize the deserialized directed graph into a serialized array for distribution to other computing devices of a distributed computing platform. By deserializing and reserializing a directed graph based on an amendment request, some embodiments may reduce the memory needs of each computing device of the distributed computing platform. Furthermore, such operations may allow some embodiments may reduce the load on a network used to operate a distributed computing platform. However, while some embodiments may perform one or more of the above-recited operations, these operations are not necessary for some embodiments, and some embodiments may forego such operations to reduce processor use or to enjoy other advantages.

Some embodiments may select a set of entities based on the set of target norm vertices and determine whether a set of criteria of each selected entity of the set of selected entities is satisfied. Some embodiments may use the modified smart contract program state described above to determine whether the set of criteria are satisfied. Some embodiments may send a message to each respective entity of the set of selected entities, where the message may indicate that the respective entity is a participant of a target norm vertex. Alternatively, or in addition, some embodiments may include a requirement that a confirmation message authenticating the acceptance of the amendment request from each respective entity of the set of selected entities is obtained.

Some embodiments may update a smart contract program state in response to determining that the set of criteria are satisfied, such as by updating a set of conditional statements, updating their associated target norm vertices, updating their associated entities, or the like. Some amendment requests may further cause some embodiments to associate a newly-generated directed graph portion or an existing directed graph portion to one or more target norm vertices. Some embodiments may assign priority category values to one or more norm vertices, where the priority category values may be used to determine an order of vertex activation or vertex triggering in the case of a single event triggering multiple norm vertices.

Figure 20:
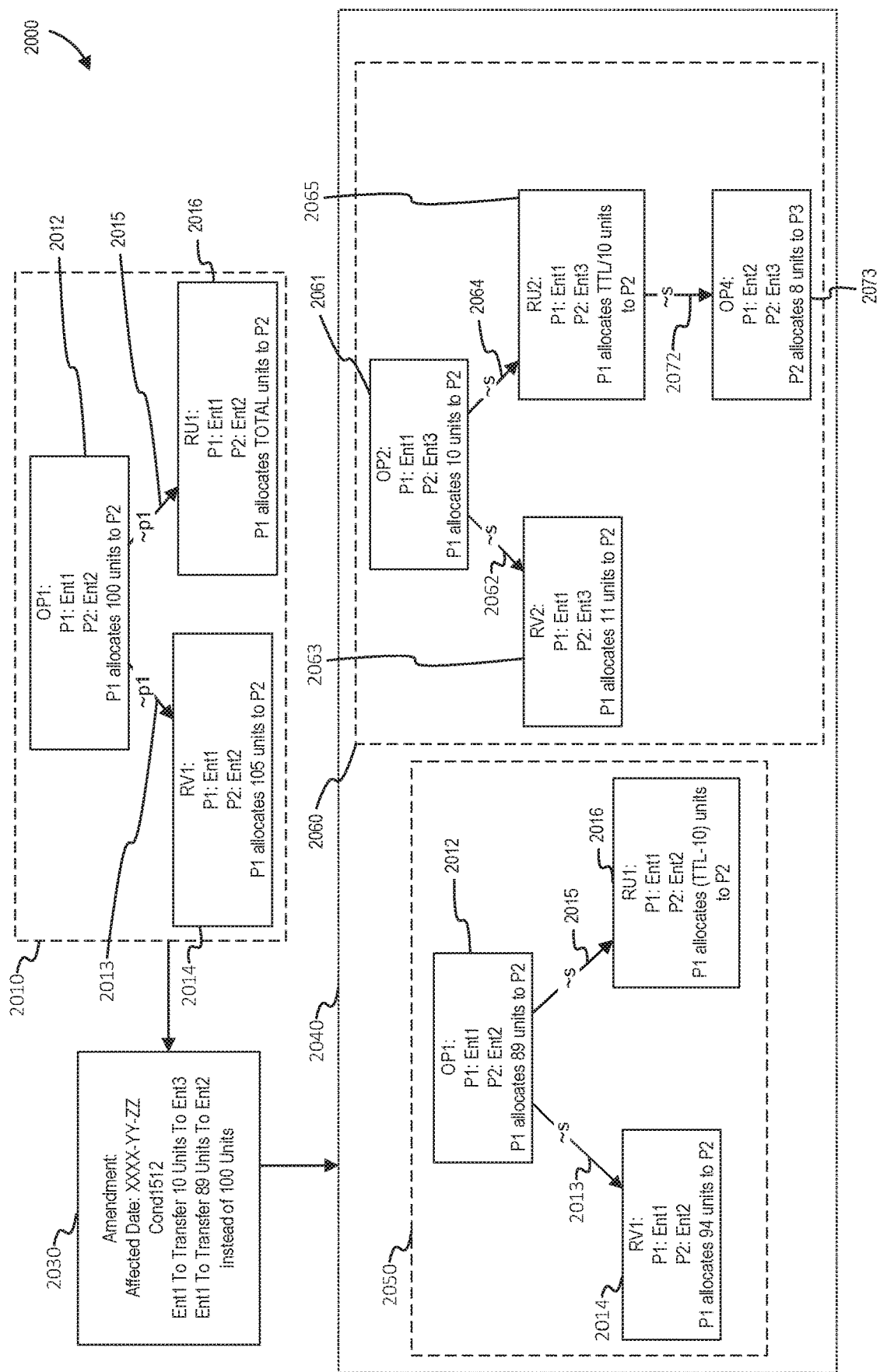
FIG. 20 depicts an example representation of an amendment request modifying a directed graph of a smart contract program, in accordance with some embodiments of the present techniques.

FIG. 20 depicts an example representation of an amendment request modifying a directed graph of a smart contract program, in accordance with some embodiments of the present techniques. The directed graphs shown in FIG. 20 are visualized in the form of boxes and edges. However, other representations are possible, and the directed graphs be stored in computer memory in various formats, such as arrays, matrices, data objects, or the like. The dashed box 2010 encloses a directed graph associated with a smart contract program state having a first norm vertex 2012 that may be categorized as an obligation norm. A conditional statement of the first norm vertex 2012 may include a condition that is satisfied if a first entity used to fill the entity field P1 allocates a first quantity equal to 100 units to a second entity used to fill the entity field P2. In some embodiments, the conditional statement of the first norm vertex may encode the first entity having the entity identifier "Ent1" and the second entity having the entity identifier "Ent2" based on the entity identifiers filling their respective entity fields of the conditional statement. Alternatively, or in addition, some embodiments may encode the first and second entity by hardcoding their respective entity identifiers into them. Additionally, some embodiments may determine that a norm vertex is associated with a set of entities encoded in a conditional statement associated with first norm vertex 2012. For example, some embodiments may determine that the first norm vertex 2012 is associated with the first entity and second entity because their corresponding entity identifiers are encoded in a conditional statement that is associated with first norm vertex 2012.

As indicated by the first directed graph edge 2013, failing to satisfy the conditional statement of the first norm vertex 2012 may result in the activation of the second norm vertex 2014, which may be categorized as a rights norm. The rights norm represented by the second norm vertex 2014 may represent a right of the first entity "Ent1" to allocate 105 units to the second entity "Ent2." In some embodiments, while not shown, satisfaction of the first norm vertex 2012 or second norm vertex 2014 may cause the activation of a norm vertex having no further child vertices that indicate that the obligation is fulfilled. Alternatively, or in addition, some embodiments may update a label to indicate that the norm vertex satisfied and has no additional child vertices. As indicated by the second directed graph edge 2015, failing to satisfy the conditional statement of the first norm vertex 2012 may also result in the activation of a third norm vertex 2016 categorized a rights norm. The third norm vertex 2016 may represent a right of the second entity "Ent2" to force the allocation of an amount represented by the value "TTL" by the first entity "Ent1," where "TTL" may be variable number dependent on a remaining amount. For example, the third norm vertex 2016 may represent a right of the second entity "Ent2" to force the allocation of 100 GB of a non-duplicable resource by the first entity "Ent1."

The smart contract program state associated with the directed graph 2010 may be modified by the amendment request 2030. The amendment request 2030 may include various parameters. For example, the amendment request 2030 may include a date on which the amendment is to take effect, a conditional statement identifier indicating the conditional statement that the amendment request 2030 is to modify or replace, or a pair of modifying conditional statements. The first modifying conditional statement of the pair of modifying conditional statements may indicate that the first entity "Ent1" is to transfer 10 units to a third entity "Ent3." A second modifying conditional statement of the pair of modifying conditional statements may indicate that the first entity is to transfer 89 units to the second entity "Ent2." As discussed further below, some embodiments may extract conditional statement parameters such as the entity identifiers, the quantitative amounts, the date, and the conditional statement identifier.

The directed graph 2040 may be an outcome directed graph after a state change to the program state of the directed graph 2010, where the state change is caused by the amendment request 2030. The directed graph 2040 includes a first directed graph portion 2050 and a second directed graph portion 2060, where the first directed graph portion 2050 and the second directed graph portion 2060 are disconnected from each other. The first directed graph portion 2050 includes the first norm vertex 2012, where the entity identifier "Ent3" replaces the entity identifier "Ent2" for the entity field "P2." In some embodiments, conditional statements of adjacent norm vertices may be affected based on the amendment request, even if the adjacent norm vertex is not directly referenced by an amendment request or does not use a conditional statement identified by an amendment request. For example, the second norm vertex 2014 may be updated such that the quantity "105" is changed to the quantity "94" based on the quantity of the rights norm the set as equal to the sum of the first quantity and an additional five units. Additionally, the third norm vertex 2016 may be updated such that the quantity "TTL" is changed to the quantity "(TTL-10)." Furthermore, some embodiments may include a score change, transfer of scores, or allocation of resources as a result of modifying a smart contract program based on the amendment. For example, an amendment request may cause some embodiments to cause the first entity to directly allocate an hour of processor time to a fourth entity.

The directed graph 2040 includes the second directed graph portion 2060, where the second directed graph portion may include a fourth norm vertex 2061, a fifth norm vertex 2063, a sixth norm vertex 2065, a seventh norm vertex 2067, an eighth norm vertex 2069, and a ninth norm vertex 2071. A conditional statement of the fourth norm vertex 2061 may include a condition that is satisfied if a first entity used to fill the entity field P1 allocates a first quantity 10 units to a second entity used to fill the entity field P2, where the first entity has the entity identifier "Ent1," and the second entity has the entity identifier "Ent3." As indicated by the third directed graph edge 2062, failing to satisfy the conditional statement of the fourth norm vertex 2061 may result in the activation of the fifth norm vertex 2063. The rights norm represented by the fifth norm vertex 2063 may represent a right of the first entity "Ent1" to allocate 11 units to the second entity "Ent3," which may be interpreted as curing a failure to satisfy the fourth norm vertex 2061. As indicated by the second directed graph edge 2064, failing to satisfy the conditional statement of the fourth norm vertex 2061 may also result in a third rights norm represented by the sixth norm vertex 2065. The third rights norm represented by the sixth norm vertex 2065 may represent a right of the second entity "Ent3" to force the allocation of an amount represented by the variable TTL/10 by the first entity "Ent1." Furthermore, as indicated by the directed graph edge 2072, failing to satisfy the conditional statement of the sixth norm vertex 2065 may result in the activation of the seventh norm vertex 2073. An obligations norm represented by the seventh norm vertex 2073 may represent an obligation of the second entity "Ent2" to allocate eight units to the third entity "Ent3."

Figure 21:
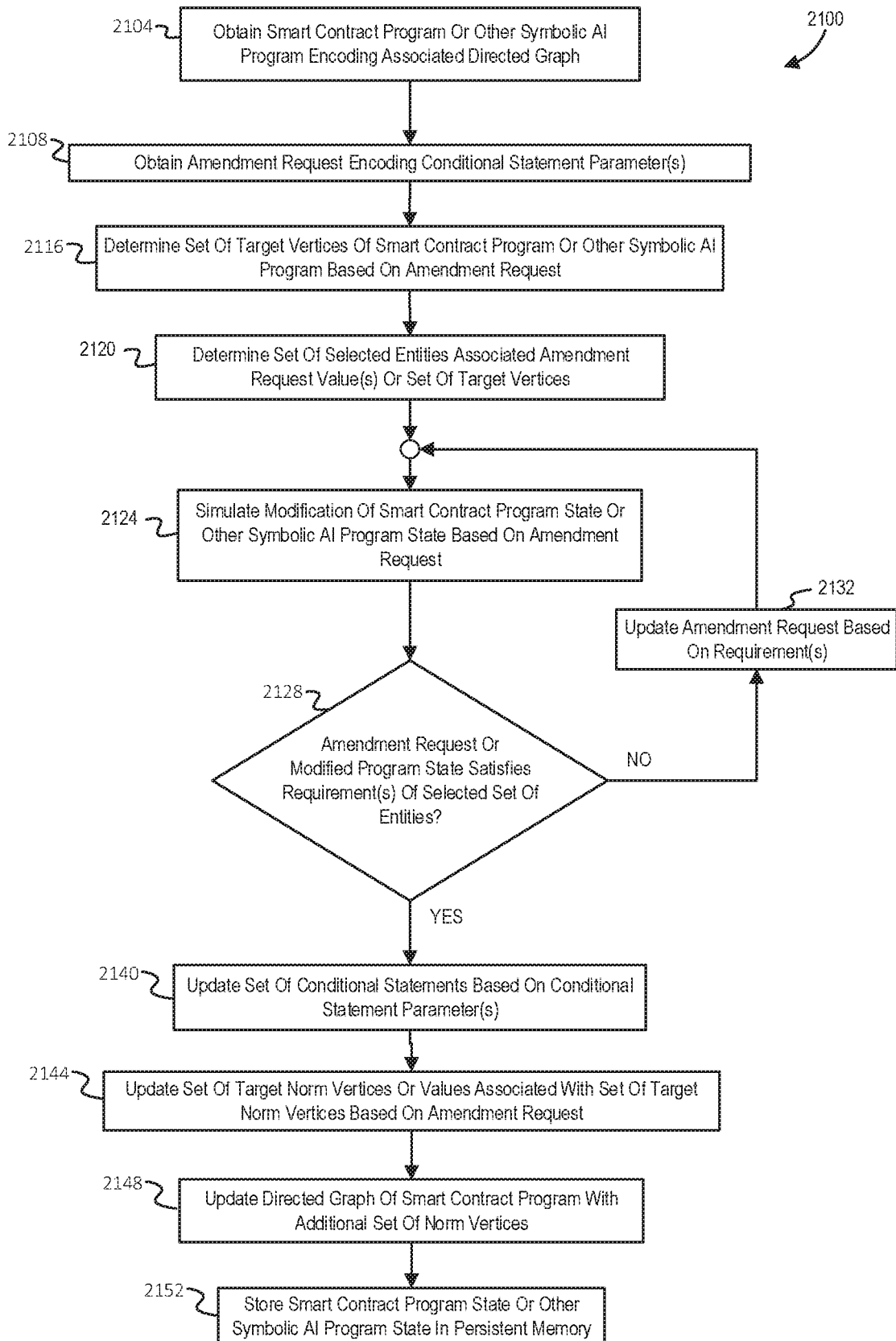
FIG. 21 is a flowchart of a process to modify a program state based on an amendment request, in accordance with some embodiments of the present techniques.

In some embodiments, the process 2100 of FIG. 21, like the other processes and functionality described herein, may be implemented as computer code stored on a tangible, non-transitory, machine-readable medium, such that when instructions of the code are executed by one or more processors, the described functionality may be effectuated. Instructions may be distributed on multiple physical instances of memory, e.g., in different computing devices, or in a single device or a single physical instance of memory (e.g., non-persistent memory or persistent storage), all consistent with use of the singular term "medium." In some embodiments, the operations may be executed in a different order from that described, some operations may be executed multiple times per instance of the process's execution, some operations may be omitted, additional operations may be added, some operations may be executed concurrently and other operations may be executed serially, none of which is to suggest that any other feature described herein is not also amenable to variation.

FIG. 21 is a flowchart of a process to modify a program state based on an amendment request, in accordance with some embodiments of the present techniques. In some embodiments, the process 2100 may include obtaining a smart contract program or other symbolic AI program encoding an associated directed graph, as indicated by block 2104. Obtaining a smart contract program state encoding an associated directed graph may include loading data from, copying a version of, or otherwise accessing a smart contract program or other symbolic AI program. In some embodiments, the smart contract program state may be active and in the process of being executed by a computing system and include data stored in persistent memory or non-persistent memory. For example, some embodiments may obtain the smart contract program state by executing the smart contract program state and retrieving a program state encoding the associated directed graph of the smart contract program state. Alternatively, or in addition, the smart contract program state may be archived or otherwise stored in a persistent memory of a computing system. The smart contract program state may be obtained from a smart contract program state, a predicted future state, a simulated state, or the like.

In some embodiments, as described above, the smart contract program state may encode a directed graph in the form of a serialized array of norm vertices and its corresponding set of graph edges. For example, the smart contract program state may include a serialized array of norm vertices "[1, 4, 7]," where each number of the numbers indicates a norm vertex, and a corresponding set of directed graph edges "[[1,4], [4,7]]," where each subarray indicates a directed graph edge. Alternatively, or in addition, the smart contract program state may include a plurality of serialized arrays of norm vertices and their corresponding edges. For example, the smart contract program state may include a first serialized array of norm vertices "[1, 4, 7]" associated with a corresponding serialized array of directed graph edges [[1, 7], [7,4]]. The smart contract program state may include a second serialized array of norm vertices "[2, 5, 7, 4, 41]" and their corresponding directed graph edges [[2,5], [7,5], [5,4], [4,41]]. As discussed further below, storing portions of a graph in separate serialized arrays of norm vertices may contribute to increasing memory efficiency or update efficiency when executing a smart contract program state.

In some embodiments, the directed graph may be disconnected, having two or more unconnected portions. For example, the smart contract program state may include a first serialized array of norm vertices "[1, 4, 7]" associated with a corresponding serialized array of directed graph edges [[1, 7],[7,4]]. The smart contract program state may also include a second serialized array of norm vertices "[2, 5, 7, 4, 41]" and their corresponding directed graph edges [[2,5], [4,5], [4,41]], where the graph portion formed by the first serialized array of norm vertices is disconnected from the graph portion formed by the second serialized array of norm vertices.

In some embodiments, the process 2100 may include obtaining an amendment request encoding a set of conditional statement parameters, as indicated by block 2108. The amendment request may be obtained at an API of a smart contract program, API of application in communication with the smart contract program, an API of a distributed computing platform, an API of a computing system executing the smart contract program, or the like. Some embodiments may obtain the amendment request from data entered by a user at a graphical user interface. Alternatively, or in addition, some embodiments may obtain an amendment request that was machine-generated or updated using a machine-learning system. The set of conditional statement parameters may include various types of information, such as a date of enforcement, a quantitative value, a categorical value, an entity identifier or other identifier, or the like. For example, an amendment request corresponding to the natural language instructions "entity 12591xc3 is obligated to allocate 300 GB to entity 27831t6" may include the quantity parameter "300" and the entity identifiers "12591xc3" and "27831t6."

The set of conditional statement parameters may include some or all of a conditional statement written in a computer-readable programming language. For example, the set of conditional statement parameters may include the conditional statement "if (ENTITY=="entity1x1"): SEND-RESOURCE(100, "entity1x1", "entity1x2")". Alternatively, or in addition, the set of conditional statement parameters may include a set of parameter values used to fill a field a conditional statement. For example, the set of conditional statement parameters may include a conditional statement identifier "cond_state10105421" with the associated parameters ["entity1x1"; "entity1x2"; 194]. The conditional statement identifier "cond_state10105421" may identify a conditional statement that may be represented in the form "if RCVD_FUNCTION(ARG1, ARG2, ARG3)." The function "RCVD_FUNCTION" may be a function that accepts the three parameters ARG1, ARG2, and ARG3 and returns the boolean "true" if ARG1 and ARG2 are entities and ARG1 has received the amount ARG3 from the entity identified by ARG2. The associated parameters may indicate that "entity1x1" is to be used in place of ARG1, that "entity1x2" is to be used in place of ARG2, and that "194" is to be used in place of ARG3.

In some embodiments, the amendment request may include specific instructions to generate a new directed graph portion. For example, the amendment request may include the instructions "Generate Vertex(1525, 215, "satisfied," 15216)," which may cause a smart contract program to generate a norm vertex identified as "1525." A graph edge may associate the newly-generated norm vertex to the norm vertex identified as "215" and be activated based on the satisfaction of the norm vertex identified as "215." The final parameter of the function "Generate Vertex" may indicate that the newly-generated norm vertex may be associated with a conditional statement identified as "15216." Alternatively, or in addition, some embodiments may determine that an amendment request includes instructions or values satisfiable by the generation of a new directed graph portion and, in response, generate the new graph portion. For example, some embodiments may determine that the instructions include "if vert_failed(vert[1653]): cond_state[15216]," where the instructions may cause a smart contract program to determine that a norm vertex associated with the conditional statement "15216" is in existence.

In some embodiments, the process 2100 may include determining a set of target norm vertices of the smart contract program state or other symbolic AI system based on the amendment request, as indicated by block 2116. In some embodiments, the amendment request may include direct references to one or more norm vertices of a directed graph of a smart contract program. For example, the event request may include a reference to the norm vertex "OP111-1," where the value "OP111-1" is a norm vertex identifier for a norm vertex in a smart contract graph. Alternatively, the amendment request may include a series of the old parameters to identify one or more smart contract graph norm vertices. For example, some embodiments may receive an amendment request that includes a set of norm vertex-identifying parameters, such as a parameter that specifies a transaction date, a set of affected entities, or a transaction amount. Some embodiments may extract the conditional statement parameters or other norm vertex-identifying parameter from the amendment request, where a norm vertex-identifying parameter may be any value that can be used to identify a set of norm vertices. For example, a norm vertex-identifying parameter may include a norm vertex identifier, a category type specific to a set of norm vertices, a time or time interval that can be used to isolate a set of norm vertices having fulfillment deadlines due after the time or within the time interval, or the like. Each parameter of the set of norm vertex-identifying parameters may then be used by a computing system to determine one or more norm vertices or conditional statements. For example, an amendment request specifying a modification for all transactions associated with a conditional statement identifier after a specified date may result in the extraction of the conditional statement identifier and the specified date as norm vertex-identifying parameters.

Some embodiments may determine a set of active norm vertices of a directed graph of a smart contract program or other symbolic AI program. Some embodiments may search through the set of active norm vertices instead of searching through all norm vertices of the directed graph. In some embodiments, an active norm vertex may be a norm vertex having an associated conditional statement that may be triggered, whereupon the triggering of the associated conditional statement causes the activation of another norm vertex to take place or may otherwise cause an state change to occur (e.g., update a label indicating that an obligation norm is satisfied). For example, some embodiments may determine that a first, second, and third norm vertex are each active norm vertices of a set of active norm vertices. Some embodiments may then search through the set of active norm vertices that satisfy a set of norm vertex-identifying parameters to determine a target norm vertex. For example, an amendment request may include norm vertex-identifying parameters specifying a change to terms associated with an allocation of 100 units by a first entity for a second entity. Some embodiments may extract the first entity identifier, the second entity identifier, and the allocation of 100 units to form a set of norm vertex-identifying parameters and search through a set of active norm vertices to find which norm vertices satisfy the set norm vertex-identifying parameters. This is not to suggest that all embodiments may restrict the search to a set of active norm vertices, and some embodiments may search through other norm vertices of a directed graph or all norm vertices of a directed graph for their own benefit(s), such as for ensuring a completeness of the search or for providing data for a study of historical performance.

Some embodiments may obtain amendment requests that may modify one or more conditional statements and search for a list of affected conditional statements, which may then be used to select a target norm vertex. For example, some embodiments may include an amendment request that includes the computer-interpretable code 'if entity[2123] .sending( )==true, Replace(2123, 254121),' which may be converted from the natural language statement, "if the entity having the entity identifier '2123' is sending a resource, replace it with the entity having the entity identifier '254121.'" Some embodiments may then search through a set of conditional statements to determine which of the set of conditional statements are affected by the amendment request based on which entities are part of a condition of the conditional statement. For example, a first conditional statement may include the condition 'if entity[2123].sending( )==true: message(entity[254121], "SENT").' Some embodiments may determine that the first conditional statement is an affected conditional statement and then determine a set of target norm vertices that includes, uses, or is otherwise associated with the first conditional statement.

In some embodiments, the process 2100 may include determining a set of selected entities based on the set of target vertices, as indicated by block 2120. As discussed above, the set of target vertices may be associated with a set of entities via the set of conditional statements encoding one or more of the set of entities. This set of entities may be used as a set of selected entities, where the set of selected entities may indicate entities that are directly affected by the amendment request. By determining which entities are directly affected by an amendment request, some embodiments may more effectively message the set of affected entities without overloading a messaging system by notifying only entities that are likely to have an interest in the amendment request. For example, a smart contract program may include a list of 100 entities, amongst which 25 are determined as being affected by an amendment request based on the entities associated with vertices affected by the amendment request. These 25 entities may then be sent a first message indicating that they are affected by the amendment request, while the other 75 entities are not sent any messages or sent a message different from the first message. Furthermore, some embodiments may require that an amendment request be confirmed by the set of selected entities instead of requiring that confirmation be provided by all entities of a smart contract program. By reducing the number of required confirmation messages, some embodiments may significantly reduce the time needed to amend a smart contract program having more than ten entities, more than twenty entities, more than two hundred entities, or the like by requiring a confirmation message from only a subset of the entities of the smart contract program.

In some embodiments, the process 2100 may include simulating a modification of the smart contract program state or other symbolic AI program state based on the amendment request, as indicated by block 2124. Some embodiments may simulate the modification of an application program state based on the amendment request by generating a version the smart contract program state and changing the version based on the amendment request without requiring the distribution of the changed version to other computing devices. Simulating a modification of the smart contract program state may include generating a new graph structure that is different from the graph structure of an unmodified smart contract program state with respect to the number of norm vertices, the number of edges, or the set of logical categories associated with each of the norm vertices. For example, a first graph structure of unmodified smart contract program state may include three active obligation norm vertices. After simulating a modification based on the amendment request, the graph structure of the modified smart contract program state may be changed such that the logical category of one norm vertex is changed from being an obligation norm to a prohibition norm. This may cause the simulated modification of the graph structure to include two active obligation norm vertices and one active prohibition norm vertex. Simulating a modification of the smart contract program state may include generating a version of a set of conditional statements and updating the version of the set of conditional statements based on the set of conditional statement parameters.

As further discussed in this disclosure, a simulated modification based on an amendment request may be used to determine whether an outcome state caused by the amendment request satisfies a set of requirements of the smart contract program. For example, as further illustrated below, an amendment request to a smart contract program state may cause a first entity to be obligated to allocate five terabytes of memory to a second entity. Some embodiments may simulate an implementation of the amendment request and determine that the simulated outcome state violates a third entity's requirement. For example, the third entity's requirement may be that the second entity is prohibited from reserving memory allocated by the first entity, where third entity's requirement may be implemented as a prohibition norm or may be implemented in another form (e.g., program-wide rule) encoded in the smart contract program. In response to this simulated violation, some embodiments may prevent the amendment request from modifying the smart contract program state or may modify the instructions of the amendment request (e.g., by changing the source entity for the allocated memory).

Some embodiments may simulate the modification of an application program state without simulating every modification caused by the amendment request. For example, a first amendment request may cause the modification of a program state to change the conditional statement and logical category of a first norm vertex. The change may cause an obligation norm of a first entity to allocate a first amount to a rights norm triggerable by a second entity to request a second amount from the first entity after an interval of time encoded in the amendment request. The computing system may simulate the modification of the application program state by changing the logical category associated with the first norm vertex and any associated graph structure changes without changing the first amount to the second amount or include the encoded interval of time. Based on a determination that a simulated modified graph structure is not identical to or otherwise different from a graph structure before a smart contract modification, some embodiments may generate a new norm vertex for a directed graph of a smart contract program.

In some embodiments, a representation of the simulated modification of the application program state based on the amendment request may be sent to one or more verification agents. A verification agent may include a third-party entity, an automated testing system, or another system. For example, some embodiments may simulate modification of a first smart contract program and send the graph structure, their corresponding conditional statements, or other related data to a verification agent for display a graphical user interface. Alternatively, some embodiments may simulate the modification of the application program state without any messages. The verification agent may send a message via an API, where the message may confirm that the simulated modification is acceptable, reject the simulated modification or may include a second simulated modification of the smart contract program state. As further described below, some embodiments may require a message confirming the authorization of the simulated modification before proceeding to use the simulated modifications for additional analysis. Alternatively, some embodiments may use the simulated modifications for further analysis without requiring a confirmation message.

Some embodiments may simulate the occurrence of a set of simulated events or a sequence of simulated events for a simulated modified smart contract program. For example, some embodiments may simulate the occurrence of a sequence of simulated events indicated to have occurred based on an associated set of occurrence times, where the associated set of occurrence times indicate the occurrence of a first simulated event of the sequence of simulated events on a first day and the occurrence of a second simulated event of the sequence of simulated events on a second day. Some embodiments may simulate the occurrence of a plurality of simulated events or a plurality of sequences of simulated events to determine a set of outcome scores corresponding to a set of simulated modified smart contract program states. For example, some embodiments may set the average amount of computing memory allocated over one month as an outcome score and determine a set of outcome program states across three equally-likely sequences of events based on five different simulated program states.

Some embodiments may determine a respective set of outcome program states for each respective simulated program state of the five different simulated program states, where each respective simulated program state is a result of modifying the program state based on a respective amendment request of the plurality of amendment requests. Some embodiments may then determine a respective set of outcome scores for each respective set of outcome program states. Some embodiments may then select an amendment request from the plurality of amendment requests based on the set of outcome scores, where the set of outcome scores may include each of the respective set of outcome scores. For example, some embodiments may select an amendment request based on which results in a maximum outcome score of the set of outcome scores. Some embodiments may perform one or more of the simulation operations described above using a single computing device or subset of computing devices of a distributed computing platform instead of using each computing device of the distributed computing platform to simulate a modification. By performing the simulation on a one computing device or a small number computing devices, some embodiments may reduce the computational load on the distributed computing platform and reduce the network traffic used to operate the distributed computing platform.

In some embodiments, the process 2100 may include determining whether the amendment request satisfies the set of criteria of the set of selected entities, as indicated by block 2128. Determining whether the amendment request satisfy the set of criteria of the set of selected entities may include determining whether the amendment request satisfies a set of governing conditional statements associated with the smart contract program. For example, a governing set of conditional statements may prohibit transactions with entities of a first entity type, and the amendment request may change a participating entity to an entity of the first entity type. In response, some embodiments may determine that the amendment request does not satisfy the set of criteria of the set of selected entities. In some embodiments, each entity of the set of selected entities may have a different set of criteria that must be satisfied in order to provide a respective confirmation message.

In some embodiments, the set of confirmation messages may include one or more authentication frameworks to authenticate a confirmation message. For example, the set of confirmation messages may include a set of passkey values. For example, each respective message of a set of confirmation messages may include a respective passkey value of the set of passkey values, where each message of the set of confirmation messages may be associated with a respective entity of the set of selected entities. For example, an entity may send a confirmation message, including a human-entered or machine-provided passkey value. Some embodiments may compare a respective passkey value with a respective stored passkey value to determine whether the respective passkey value matches with the respective stored passkey value. In some embodiments, some embodiments, the passkey value may be encrypted and compared to a set of encrypted passkey values to determine a match. Alternatively, or in addition, a passkey value may be decrypted and compared to a set of decrypted passkey values to determine a match. Based on the entity-sent passkey value matching a stored passkey value in a set of stored passkey value, some embodiments determine that a criterion associated with one or more of the set of selected entities is satisfied. While the above describes an implementation of one type of authentication framework, some embodiments may use one of various other types of authentication frameworks when sending confirmation messages or other messages. For example, some embodiments may implement a Public Key Infrastructure (PKI) framework, such as that described in "Introduction to public key technology and the federal PKI infrastructure" (Kuhn, D. Richard, et al. National Inst of Standards and Technology Gaithersburg Md., 2001), which is hereby incorporated by reference. Some embodiments may use various data transport protocols when implementing the authentication framework, such as secure socket layer (SSL) or transport layer security (TLS).

Various types of criteria may be used to determine whether to modify a smart contract program state based on the amendment request. In some embodiments, determining whether a criterion is satisfied may include determining whether an entity of a smart contract program is one of a set of prohibited entities or one of a set of prohibited entity types. For example, the entity "entity1" may have the entity type "x1x1," and determining whether the set of criteria is satisfied may include determining that entities of the entity type "x1x1" are entities of a prohibited entity type. In response, some embodiments may determine that the set of criteria is not satisfied by the entity "entity1."

In some embodiments, determining whether the set of criteria is satisfied may include determining whether a non-duplicable asset is concurrently transferred or allocated to different entities based on a single event or sequence of events. A non-duplicable asset may include an amount of computing time on a specific computing resource during a specific time interval. For example, a non-duplicable asset may include an allocated utilization time between 04:00 and 06:00 on a specified set of processor cores. The transfer or allocation of a non-duplicable resource to multiple resources may be detected as a conflict, and some embodiments may include a verification mechanism to prevent the conflict. For example, some embodiments may determine a simulated contract program state based on a simulation of the modification of a smart contract program state based on an amendment request. Some embodiments may then simulate how the simulated smart contract program state responds to a sequence of events and determine that a first entity is allocating control of a specific computing resource to a second entity based on an event, and that the first entity will also be caused to allocate control of the specific computing resource to a third entity based on the event. Some embodiments may determine this concurrent allocation and, in response, prevent the amend request from being implemented, send a message indicating that the amendment may cause a conflict, or the like.

In some embodiments, the set of criteria may include determining that an entity, set of entities, or the entity type is required for transactions of a specified transaction type or all transaction types. For example, some embodiments may include a criterion that each entity of a smart contract program is indicated as verified based on a verification field being populated with the value "verified." As another example, the entity "entity2" may have the entity type "x2x2" and a possible criterion may be that all entities of a smart contract program state be of the entity type "x2x2." In response, some embodiments may determine that the entity "entity2" satisfies the criterion.

Some embodiments may perform one or more of the determination operations described above using a subset of computing devices of a distributed computing platform instead of using each computing device of the distributed computing platform to determine whether a set of criteria are satisfied. For example, some embodiments may store a version of each of a set of criteria of a set of entities at a storage memory. Some embodiments may then determine whether an amendment request satisfies the set of entities using a computing device that includes or is otherwise capable of accessing the storage memory. After determining that the set of criteria is satisfied, some embodiments may send the amendment request or parameters stored in the amendment request to other computing devices of the distributed computing platform. By restricting the determination operation to one computing device or a small number of computing devices, some embodiments may reduce the overall computational load on the distributed computing platform and reduce the network traffic used to operate the distributed computing platform. In some embodiments, if the amendment request satisfies the set of criteria of the set of selected entities, operations of the process 2100 may proceed to block 2140. Otherwise, operations of the process 2100 may proceed to block 2132.

In some embodiments, the process 2100 may include updating an amendment request, as indicated by block 2132. In some embodiments, the amendment request may be updated in response to a failure to satisfy the set of criteria of the selected entities. In some embodiments, the amendment request being generated may be generated in a parameter space that allows the amendment request to have multiple possibilities. In some embodiments, some of these possibilities of the amendment request may satisfy the set of criteria of the selected entities while other possibilities of the amendment request May not satisfy the set of criteria of the selected entities. For example, a first version of the request may change a first quantity from the value 100 to the value 300 and a first criterion of one of the selected entities may require that the value of the first quantity the less than 200. In response, after determining that the amendment request failed the first criterion, some embodiments may update the agreement request to change the first quantity from the value 300 to the value 150 using one or more of various types of optimization methods or machine-learning methods.

Some embodiments may send a message to one or more of the set of selected entities in response to failing to satisfy the set of criteria of the selected entities. For example, some embodiments may send a message to all of the set of selected entities in response to failing the set of criteria. Some embodiments may send a message indicating that the set of criteria has been failed without updating the amendment request. Additionally, or alternatively, some embodiments may send a message to an entity or other agent that sent the amendment request indicating that the amendment request on a program state resulting from the amendment request has failed the set of criteria.

In some embodiments, the process 2100 may update a set of conditional statements based on the set of conditional statement parameters, as indicated by block 2140. In some embodiments, determining the updated set of conditional statements may include replacing one or more conditional statements with a new conditional statement determined from the set of conditional statement parameters. For example, a norm vertex may be associated with a first conditional statement, where the first conditional statement is indicated to be replaced by a second conditional statement encoded in an amendment request. In some embodiments, a conditional statement that is to be replaced or otherwise unused may be marked as deprecated. For example, some embodiments may change a usage indicator associated with a conditional statement to indicate that the conditional statement is deprecated based on an amendment request indicating that the conditional statement should be removed from use in the smart contract program. Alternatively, instead of deprecating a conditional statement stored in a set of conditional statements, some embodiments may determine delete the conditional statements.

In some embodiments, updating the set of conditional statements may include filling out, replacing, or otherwise using one or more conditional statement parameters to populate fields of the set of conditional statements. For example, the computing system may obtain a first plurality of entity identifiers, and a user may use the entity identifiers fill out the function that uses the first plurality of entity identifiers. By filling out a field of an existing conditional statement instead of replacing the condition statement, some embodiments may increase the speed by which a smart contract program state may be distributed on a distributed computing platform. However, while the above describes filling, replacing, or otherwise using one or more conditional statement parameters to populate fields of the set of conditional statements, some embodiments may forego such operations and update the set of conditional statements using other methods.

In some embodiments, updating the set of conditional statements may include adding one or more conditional statements to the set of conditional statements. Some embodiments may determine an updated set of conditional statements indexed by conditional statement identifiers by adding a new conditional statement that may have its own associated conditional statement identifier. For example, an amendment request may include an instruction to add a specific conditional statement to a set of conditional statements of a smart contract program. In response to obtaining the amendment request, some embodiments may include instructions to add a conditional statement identifier "x1x1" to a conditional statement identifier index.

In some embodiments, updating the set of conditional statements may include determining whether a conditional statement (or an associated norm vertex) was triggered by a past event. An outcome of the conditional statement may include a transaction between a first entity and a second entity. For example, after determining that a past event had triggered a norm vertex based on an amendment request modifying the norm vertex or an associated conditional statement, some embodiments may determine a first score value associated with a transaction caused by the outcome. Some embodiments may determine a second score value encoded in the amendment request and determine a difference between the first score value and the second score value. Some embodiments may then initiate a transaction between the first entity and the second entity based on the score difference. By using a score differences to account for differences between amendment requests and past events, some embodiments may include mechanisms to retroactively apply an amendment request.

In some embodiments, updating the set of conditional statements, set of target vertices, or other values of a program state operating on a distributed computing platform may include sending a set of values to each computing device of the distributed computing platform. In some embodiments, to determine the validity of a distributed value, the smart contract program may use one or more consensus algorithms. For example, to reach a consensus on the validity of a set of conditional statements, some embodiments may use a consensus Paxos algorithm, a Raft algorithm, HotStuff, or the like. Furthermore, some embodiments may centralize one or more of the operations described above at a single computing device or a subset of computing devices and then send a processed set of values to other computing devices of the distributed computing platform. For example, some embodiments may simulate modifications of a smart contract program using a first computing device and determine an updated amendment request based on the simulated modifications before sending the updated amendment request to other computing devices. Additionally, some embodiments may store or otherwise have access to a set of criteria of each entity of a set of selected entities to determine whether the set of criteria is satisfied. By centralizing operations at a single computing device or a subset of computing devices, some embodiments may reduce the overall computational cost of amending a smart contract program or other symbolic AI program.

In some embodiments, the process 2100 may include updating the set of target norm vertices or values associated with the set of target norm vertices based on the amendment request, as indicated by block 2144. Updating the set of target norm vertices may include updating a field of the target norm vertex for a conditional statement identifier of the target norm vertex with a new conditional statement identifier. Updating the field may associate the target norm vertex with the new conditional statement having the new conditional statement identifier. For example, a first target norm vertex may have or otherwise be associated with the conditional statement identifier "4457" and updated to have instead or otherwise be associated with the conditional statement identifier "9941." After the update, a first event satisfying the conditional statement having the identifier "9941" may trigger the first target norm vertex, whereas a second event satisfying the conditional statement having the identifier "4457" does not trigger first target norm vertex.

Some embodiments may update the smart contract program state by deserializing a serialized array representing a directed graph stored in persistent memory. The deserialized directed graph may be stored in non-persistent memory for fast processing or operations. Some embodiments may then add, modify, or remove a norm vertex or edge of the directed graph stored in the non-persistent memory and then reserialize the directed graph. For example, some embodiments may include a first serialized array "[1 3 5]" having an associated serialized array of edges "[[1,3], [3,5]]" stored in a persistent memory of a computing system. Some embodiments may deserialize the serialized array into an adjacency matrix form stored in the non-persistent memory and add a norm vertex having a norm vertex identifier "7" and edge directing from the norm vertex "5" to the norm vertex "7." Some embodiments may reserialize the deserialized directed graph to determine the updated serialized array "[1 3 5 7]" having an associated serialized array of edges "[[1,3], [3,5], [5,7]]." The deserialization and reserialization of directed graph data may result in increased storage memory use efficiency, or network performance efficiency (e.g., in the case of the smart contract being implemented on a distributed computing platform). However, while the above suggests some embodiments may implement a deserialization/reserialization operation, such operations are not necessary. Some embodiments may forego such operations and use other methods to benefit from increased computational performance efficiencies, network performance efficiencies, or the like.

In some embodiments, the process 2100 may include updating a directed graph of a smart contract program with an additional set of norm vertices, as indicated by block 2148. Some embodiments may associate an additional set of norm vertices with a directed graph of the smart contract program in response to an amendment request causing the creation of the additional set of norm vertices. For example, some embodiments may determine that an amendment request includes instructions or values that causes the generation of a new norm vertex in the directed graph based on a determination that a set of conditional statements parameters in the amendment request is unrelated to an existing norm vertex of the directed graph. Some embodiments may then generate a norm vertex by creating a new conditional statement and associating the new conditional statement with a newly created norm vertex having associated directed graph edge. In some embodiments, the amendment request may cause the creation of a plurality of norm vertices and their corresponding directed graph edges.

In some embodiments, the generated set of norm vertices may be serialized into a serialized array in a persistent memory. In some embodiments, the generated set of norm vertices may be deserialized into a deserialized directed graph stored on a non-persistent memory, where the deserialized directed graph may include an adjacency matrix or adjacency list. Some embodiments may generate an edge that connects one or more of the set of norm vertices with one or more norm vertices of the set of target norm vertices determined above. In some embodiments, one or more of the set of generated norm vertices may have an associated priority category value used to determine a sequence by which different norm vertices are triggered. In some embodiments, the implementation of an execution sequence based on a set of associated priority category values may be used to reduce the risk of contradictions or logical errors.

Some embodiments may associate a target norm vertex with another portion of an existing directed graph based on an amendment request. The other portion of the existing directed graph may be part of the smart contract program state. Alternatively, the other portion of the existing directed graph may be part of a different smart contract program state. For example, an amendment request for a first smart contract program may include a program identifier of a second smart contract program and a vertex identifier of a first norm vertex of the second smart contract program. Some embodiments may associate a target norm vertex with the first norm vertex based on the program identifier and the vertex identifier.

Various formats may be used to indicate this cross-program relationship or the order by which active norm vertices are triggered across different smart contract programs. For example, some embodiments may add a new directed graph edge to a set of directed graph edges, where the new directed graph edge may point from the target norm vertex to the norm vertex of the other smart contract program. Some embodiments may account for potential confusion by having the directed graph vertex point to a dummy norm vertex, where the dummy norm vertex includes values identifying the norm vertex of the other smart contract program. Some embodiments may assign a priority category value to each respective norm vertex or respective smart contract program and refer to the respective priority category values to determine an order by which norm vertices are triggered in response to an event that triggers multiple norm vertices.

In some embodiments, the process 2100 may include storing the smart contract program state or other symbolic AI program state in a persistent memory, as indicated by block 2152. After updating the program state of a smart contract program or other symbolic AI model, some embodiments may then store the smart contract program in a persistent storage memory of one or more computing devices. In addition, some embodiments may store the amendment request, rejected amendment requests, or other data related to an amendment request in a same storage memory.

Interactions between a pair of entities in a network of smart contract programs often rely on the ability of the first of the pair to predict the behavior of the second of the pair. Some entities may be able to use entity scores calculated from arithmetic operations to make such predictions, such as entity scores determined as a ratio of satisfied obligations to failed obligations. Such entity scores may be insufficient to predict entity behavior. In some cases, the norm vertices and program states of a smart contract program may cause an entity to behave in ways that would not be easily captured using entity scores that do not consider specific past behaviors or environmental changes. Various behaviors and program state features may be used to indicate possible patterns in a graph structure. However, the number of the possible permutations of a directed graph and its associated program state (which may be more than a thousand, more than a million, or more than a billion) may prevent a significant portion of possible features from being used to determine an entity score. Furthermore, direct use of entity scores may be infeasible in environments where an entity participating in a smart contract program may only be willing to participate if they are able to obfuscate certain values or parameters from other participants of the smart contract program or other possible observers.

Some embodiments may determine an outcome score associated with a behavior representable by a directed graph of a smart contract program (or other symbolic AI model) based on another behavior indicated by a graph portion of the directed graph or a program state of the smart contract program. These outcome scores may be used to predict how an entity may behave in, such as whether the entity is likely to accept a set of conditional statements, demand additional conditional statements, satisfy a set of conditional statements, or fail the set of conditional statements. These outcome scores may also be used to characterize an entity and determine one or more entity scores for the entity, where an entity score may be equal to an outcome score or be otherwise based on the outcome score. Some embodiments may use the outcome score or entity score to determine which rights norms the entity may exercise or prohibition norms the entity may violate.

Some embodiments may obtain the directed graph of the smart contract program. Some embodiments may determine whether the directed graph includes a graph portion that matches a graph portion template. Some embodiments may determine that a match occurs between a graph portion and a graph portion template by comparing the category labels of the norm vertices of the graph portion and the category labels of the norm vertex templates of the graph portion template. Determining a match may also include a comparison between other values of the graph portion and the graph portion template, such as a condition satisfaction state, a transaction score, a set of participating entities, or the like. An outcome score of the first entity associated with an outcome program state or an outcome vertex of the first entity may be determined based on a determination of a match between a graph portion of a directed graph and a graph portion template, where the graph portion template may be associated with the first entity.

In some embodiments, the graph portion template may be stored in or associated with an entity profile of the first entity. Alternatively, or in addition, the graph portion template may be stored in a general library of graph portion templates and used to determine a set of outcome scores for each entity in a set of smart contract programs or type of entity in the set of smart contract programs (e.g., used to determine outcome scores for all entities having a particular role). By using matching graph portions with stored graph portion templates, some embodiments may provide greater context-dependent predictions when determining outcome scores associated with a decision or program state of an entity and their associated entity score(s) for the entity.

In some embodiments, each respective entity vertex of an entity graph may include or otherwise be associated with a respective entity profile. In some embodiments, the entity graph and entity profiles may be stored in the same data structure. For example, each entity profile may be used as an entity vertex of an entity graph or otherwise be associated with the entity vertex of the entity graph.

Figure 22:
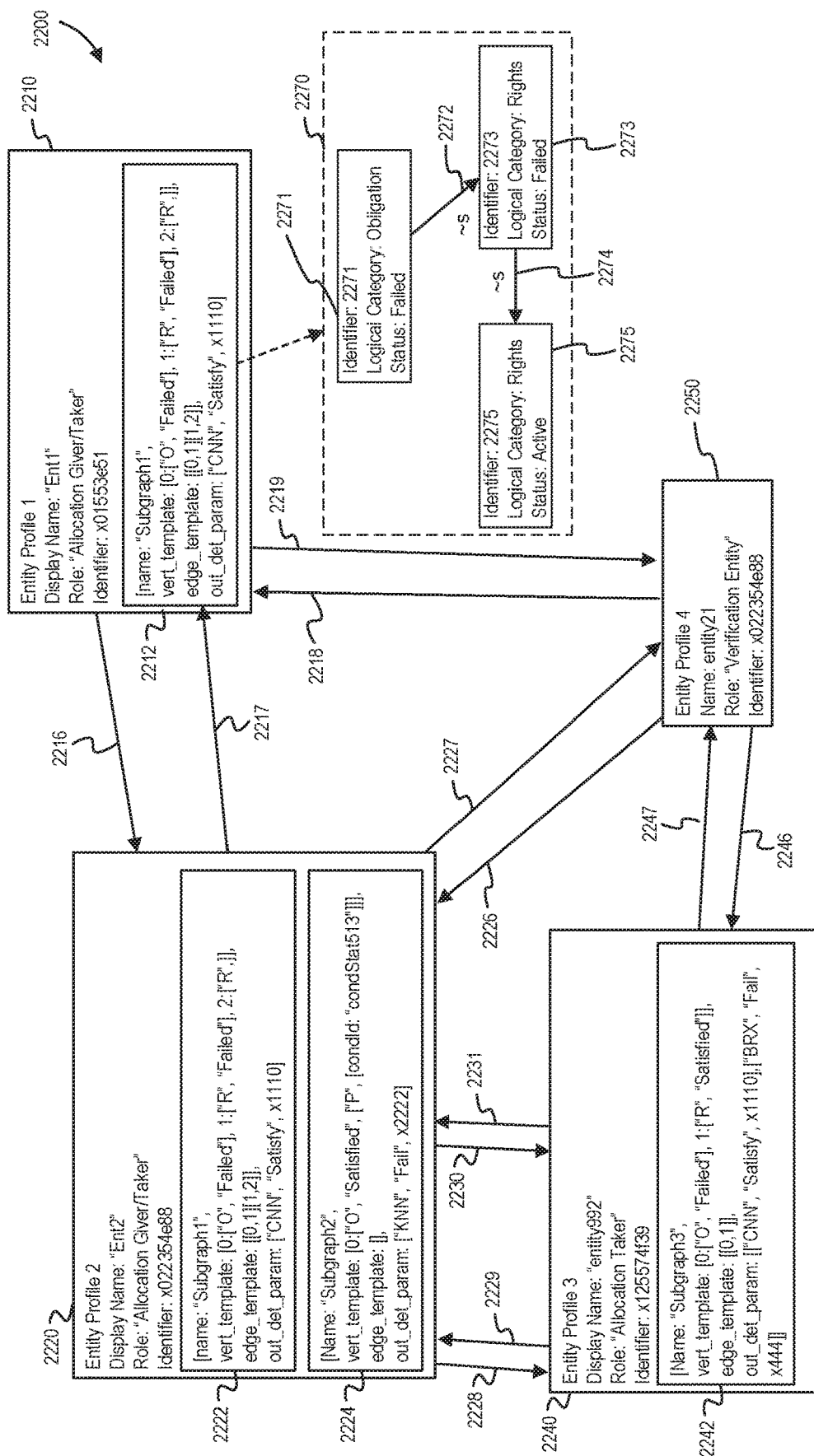
FIG. 22 depicts a diagram of an entity graph, in accordance with some embodiments of the present techniques.

FIG. 22 depicts a diagram of an entity graph, in accordance with some embodiments of the present techniques. An entity graph 2200 may include a set of vertices ("entity vertices") and edges associating the entity vertices, where the entity vertices may include or otherwise be associated with a first entity profile 2210, a second entity profile 2220, a third entity profile 2240, and a fourth entity profile 2250. In some embodiments, each respective entity vertex of the entity graph 2200 may include or otherwise be associated with a respective entity profile. In some embodiments, the entity graph and entity profiles may be stored in the same data structure. For example, each entity profile may be used as an entity vertex of an entity graph or otherwise be associated with the entity vertex of the entity graph. The entity profiles of the entity graph 2200 may be stored in a storage memory of a computing device. For example, the entity profiles of the entity graph 2200 may be stored as objects, lists, trees, or the like. While FIG. 2 depicts the entity graph as comprising entity profiles directly, some embodiments may instead generate or otherwise update an entity graph comprising entity vertices that include values other than those included in an entity profile or include a reference to the entity profile. In some embodiments, an entity graph may be used to determine relationships, events, types of transactions, transaction scores, or the like between different entities.

The box 2212 includes a dictionary encoding a graph portion template that can be visualized in a form represented in the dashed box 2270. As shown in the box 2212, a dictionary encoding the graph portion template may include a first key "name" with a corresponding value "subgraph1"

to indicate that the graph portion template has a name "subgraph1." The dictionary encoding the graph portion template in box 2212 may also include a second key "vertex types" and a corresponding value equal to a subdictionary, where each key of the sub dictionary may include a number and each value of the subdictionary may include a vertex property list. As shown in the box 2212, the vertex property list corresponding to the norm vertex template having the index value of "0" may be equal to ["0", "Failed"]. The first value of the vertex property list may indicate the category label "0" (which may represent an "obligation" category) associated with the first norm vertex template and the second value of the property list may indicate a state of the first norm vertex template.

In some embodiments, a category label of a norm vertex template may be similar to or the same as those assigned to one or more norm vertices, such as "obligation," "right," or "prohibition." Furthermore, some embodiments may use other characters to represent a category label. For example, The letters "O," "R," and "P" shown in FIG. 22 and used as part of the vertex property list shown in the box 2212, the box 2222, the box 2224, or the box 2242 may be associated with category labels such as "obligation," "rights," and "prohibitions," respectively. In some embodiments, the set of category labels may include a set of mutually exclusive category labels. For example, if the set of mutually exclusive category labels includes the category labels "obligation," "right," and "prohibition," a norm vertex template categorized as being an "obligation" norm may not be categorized as being a "prohibition" norm. As further discussed below, the use of mutually exclusive category labels can increase the speed and reliability of a matching operation between a graph portion and a graph portion template.

The dictionary shown in box 2212 may also include a third key "edge_template" and the corresponding value of the third key "edge_template" may include an array of subarrays, where each subarray may represent an edge template from a first norm vertex template to a second norm vertex template. An edge of a directed graph may be matched with an edge template if the head and tail of the edge match. In some embodiments, the order of the values in each subarray may indicate a directionality of the edge. For example, the subarray "[0,1]" may represent an edge associating the first norm vertex template represented by the key-value pair "[0: ["O", "Failed"]]" to the second norm vertex template represented by the key-value pair "[1: ["R", "Failed"]]," where the edge may have an edge direction from the first norm vertex template to the second norm vertex template.

The dictionary shown in block 2012 may also include a fourth key "out_det_param," where a corresponding value of the fourth key may include a set of outcome determination parameters or values otherwise associated with the outcome determination parameters. As described further below, some embodiments may determine an outcome determination parameter of a graph portion template using various methods such as by calculating a ratio of a first number to a second number, by computing a ratio of weighted sums, by training a machine learning model, or the like. In some embodiments, the outcome determination parameter of a graph portion template may be equal to correlated with a predicted likelihood of a particular outcome occurring.

In some embodiments, the set of outcome determination parameters may include a value to specify a type of outcome determination operation to use. For example, the set of outcome determination parameters of the box 2212 include the list '["CNN", "Satisfy", "x1110"].' The first element of the set of outcome determination parameters may be an identifier of an outcome determination model usable by a computing system to select the outcome determination model. For example, the value "CNN" may cause a computing system to select a convolutional neural network to determine an outcome score. The second element of the list used as a value for the fourth key "out_det_param" may indicate an outcome state associated with the outcome score being computed by a selected model. For example, the second element of the list ["CNN", "Satisfy", "x1110"]' may include the phrase "Satisfy," which may indicate that the outcome score represents a likelihood of the first entity to satisfy an obligation. The value "x1110" may indicate a record in a database of model parameters, where the record may include weights, biases, hyperparameters, or other values of the outcome determination model used to determine an outcome score.

FIG. 22 also includes a dashed box 2270 that encloses a visual representation of a part of a directed graph. The directed graph enclosed by the dashed box 2270 may match the graph portion template encoded in box 2212. Some embodiments may determine that the first norm vertex 2271 matches the norm vertex template represented by the first key-value pair '0: ["O", "Failed"].' This determination may be based on the "obligation" label of the first norm vertex matching the "0" (which may be used to represent an "obligation" norm) of the second key-value pair and the failed state of the first norm vertex 2271 matching the "Failed" state of the first key-value pair. Similarly, some embodiments may determine that the second norm vertex 2273 matches the norm vertex template represented by the second key-value pair '1: ["R", "Failed"].' This determination may be based on the rights norm label of the second norm vertex matching the "R" of the second key-value pair and the failed state of second norm vertex 2273 matching the "Failed" state of the second key-value pair. Some embodiments may determine that the third norm vertex 2275 matches the norm vertex template represented by the third key-value pair '2:["R",].' This determination may be based on the rights norm label of the second norm vertex matching the "R" of the second key-value pair.

As shown in the dashed box 2270, the first norm vertex 2271 may be associated with the second norm vertex 2273 via the directed graph edge 2272, and the second norm vertex 2273 may be associated with the third norm vertex 2275 via the directed graph edge 2274. A determination may be made that a directed graph edge matches with an edge template. This determination may be based on the head vertex of the directed graph edge matching with a corresponding vertex template that the edge template is directed away from and the tail vertex of the directed graph edge matching with a corresponding vertex template that the edge template is directed towards.

For example, some embodiments may determine that the directed graph edge 2272 may match the edge template subarray '[0,1]' displayed in the box 2212. This determination may be made based on the tail of the directed graph edge 2272 being the first norm vertex 2271, which matches with the norm vertex template represented by "0:["O", "Failed"],' and may also be based on the head of the directed graph edge 2272 being the second norm vertex 2273, which matches with the norm vertex template represented by "1:["R", "Failed"]," where the edge template subarray [0,1] directs away from the first and towards the norm vertex template represented by "1:["R", "Failed"]." Similarly, some embodiments may determine that the directed graph edge 2274 may match the edge template subarray '[1,2]' displayed in the box 2212. This determination may be made based on the tail of the directed graph edge 2274 being the second norm vertex 2273, which matches with the norm vertex template represented by "1:["R", "Failed"]" and may also be based on the head of the directed graph edge 2274 being the third norm vertex 2275, which matches with the norm vertex template represented by "2: ["R"]," where the edge template subarray [0,1] directs away from the norm vertex template represented by "1:["R", "Failed"] and towards the norm vertex template represented by "2:["R"]."

Some embodiments may determine that a graph portion template matches with a graph portion(s) of a smart contract directed graph. In response, these embodiments may further provide one or more norm vertex identifiers corresponding to the position of the graph portion in the smart contract program directed graph. For example, a graph portion of a directed graph that includes the first norm vertex 2271, second norm vertex 2273, and third norm vertex 2275 may be matched with a graph portion template. In response, some embodiments may provide an identifier for the first norm vertex 2271, second norm vertex 2273, or third norm vertex 2275 in association with the graph portion template.

In some embodiments, the entity graph 2200 may include an association between the first entity profile 2210 and the second entity profile 2220, where the association may include an entity graph edge. For example, the first entity profile 2210 may be associated with the second entity profile 2220 via a first entity graph edge 2216 and a second entity graph edge 2217. In some embodiments, the associations between entities an entity graph may be treated as edges having a directionality or may be associated with a quantitative or categorical value. For example, a first entity graph edge 2216 may be based on a norm vertex associated with a conditional statement that includes an allocation of computing resources from the first entity "Ent1" to the second entity "Ent2."

In some embodiments, the entity graph 2200 may include an association between the first entity profile 2210 and the second entity profile 2220. For example, the first entity profile 2210 may be associated with the second entity profile 2220 via a first entity graph edge 2216 and a second entity graph edge 2217. In some embodiments, the associations between entities an entity graph may be treated as edges having a directionality or may be associated with a quantitative or categorical value. For example, a first entity graph edge 2216 may be stored as an array [x01553e51, x022354e88] based on a norm vertex associated with a conditional statement that includes an allocation of computing resources from the first entity "Ent1" to the second entity "Ent2." Alternatively, or in addition, the first entity graph edge 2216 or other associations between different entities or between their corresponding profiles may be stored as pointers or reference identifiers associated with the entities themselves. Furthermore, some embodiments may store a set of associations such as a set of entity graph edges in a single record, data object, property, or the like. For example, some embodiments may store the first entity graph edge 2216 and second entity graph edge 2217 in the form of an entity association dictionary '[ent1: x01553e51, ent2: x022354e88, RAM: 50, Memory: −300]' to indicate an association based on a set of transactions or possible transactions between the first entity 'x01553e51' and the second entity 'x022354e88.' The entity association dictionary may be based on a first conditional statement of an obligation norm that would cause the first entity allocating 50 GB of RAM from the first entity 'x01553e51' to the second entity 'x022354e88' and a second conditional statement of an obligation norm that would cause the first entity allocating 50 GB of RAM from the first entity 'x01553e51' to the second entity 'x022354e88.'

In some embodiments, the entity graph 2200 may include an association between the second entity profile 2220 and the third entity profile 2240. For example, the entity graph 2200 may include a second set of associations that include the third entity graph edge 2228, a fourth entity graph edge 2229, a fifth entity graph edge 2230, and a sixth entity graph edge 2231. In some embodiments, each of the entity graph edges in the second set of associations may have a directionality from one of the pair of entities to the other of the pair of entities based on a transfer of data, provided service, allocation of resources, or the like. In some embodiments, each of the associations may be based on a set of conditional statements for which the corresponding triggering event(s) or outcome state(s) affect the pair of entities. For example, the third entity graph edge 2228 may be associated with the transaction score "100 GB" that is obtained from a conditional statement encoding the allocation of 100 GB of memory from the second entity associated with the second entity profile 2220 to the third entity associated with the third entity profile 2240.

In some embodiments, the entity graph 2200 may include an association between the first entity profile 2210 and a fourth entity profile 2250. The fourth entity profile 2250 of the entity graph 2200 may represent a verification entity that does not have any stored graph portion templates. The first entity profile 2210 may be associated with the fourth entity profile 2250 via the set of associations that include an entity graph edge 2218 and an entity graph edge 2219. Similarly, the second entity profile 2220 may be associated with the fourth entity profile 2250 via the set of associations that include an entity graph edge 2226 and an entity graph edge 2227. Similarly, the third entity profile data 240 may be associated with the fourth entity profile 2250 via the set of associations that include an entity graph edge 2246 and an entity graph edge 2247. In some embodiments, the entity graph edges between the first, second, or third entity with a verification entity may represent associations based on messages confirming that an action or a value has been sent to a fourth entity associated with the fourth entity profile 2250 by one of the respective entities associated with one of the other entity profiles 2210, 2220, or 2240. For example, the entity graph edges 2219, 2227, and 2247 may be based on instructions encoding the sending of outcome scores or other values to the fourth entity and the entity graph edges 2218, 2226, and 2246 may be based on instructions encoding the transmission of indicators indicating whether the sent scores or other values satisfy a set of criteria. In some embodiments, the entity associated with the fourth entity profile 2250 may provide verification that another entity had satisfied a threshold or other criteria.

Some embodiments may generate an entity graph where each of the entity profiles associated with the vertices of the entity graph satisfies one or more criteria. For example, while the entity graph 2200 includes the fourth entity profile 2250, some embodiments may generate an entity graph based on a first criterion that each entity allocates or receives allocations of computing resources with at least one other entity. Some embodiments may use this first criterion to generate an entity graph comprising entity vertices associated with the first entity profile, second entity profile, and third entity profile without including the fourth entity profile 2250.

Some embodiments may determine one or more paths through the entity graph 2200 to determine a relationship between different entities. For example, the first entity "x01553e51" is not shown to have any direct associations with the third entity "x125574f39." However, some embodiments may determine that the first entity "x01553e51" may be associated with the third entity "x125574f39" based on a path from the first entity "x01553e51" to the third entity "x125574f39" via the first entity graph edge 2216 and the third entity graph edge 2228. Some embodiments may determine that the first entity graph edge 2216 and the third entity graph edge 2228 form a path based on a shared resource type, a shared combination of resource types, shared range bounding transaction amounts, or the like.

Figure 23:
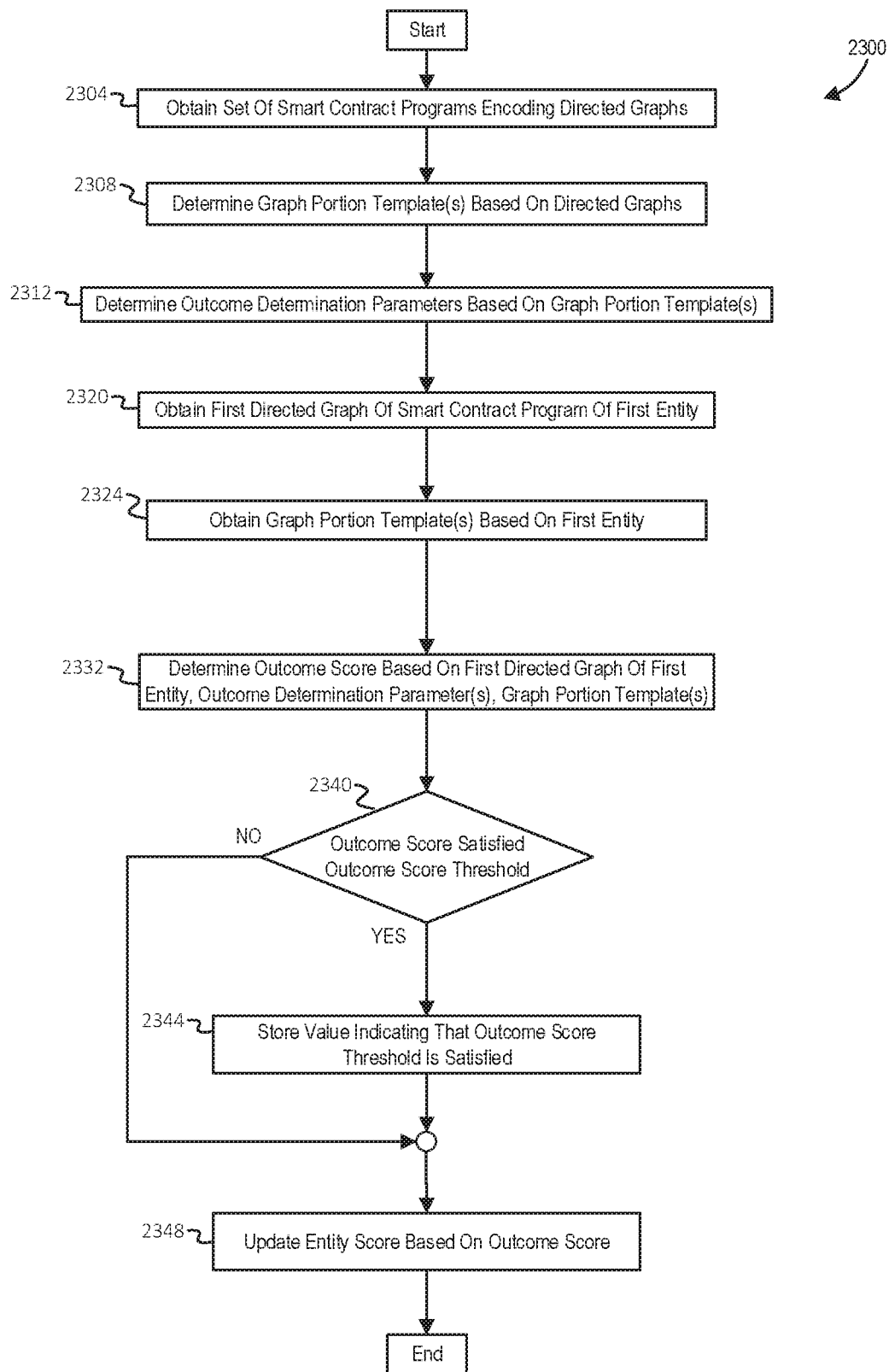
FIG. 23 is a flowchart of a process to assign an outcome score based on a graph portion, in accordance with some embodiments of the present techniques.

FIG. 23 is a flowchart of a process to assign an outcome score based on a graph portion, in accordance with some embodiments of the present techniques. In some embodiments, the process 2300 may include obtaining a set of smart contract programs, each of which encodes a directed graph, as indicated in block 2304. Each program of the set of smart contract programs may be obtained using operations similar to or the same as those described for block 2104 above. For example, the set of smart contract programs may be obtained from a centralized or decentralized computing platform executing a plurality of smart contract programs or storing a history of smart contract programs. In some embodiments, the number of smart contract programs may be over five smart contract programs, over 10 programs, over 50 programs, over 100 programs, or the like. For example, some embodiments may obtain over 50 smart contract programs, where each respective smart contract program of the plurality of smart contract programs includes data encoding a respective directed graph and encoding a respective set of entities capable of viewing or modifying a state of the respective smart contract program. In some embodiments, an obtained smart contract program may still be in operation, where the state of the smart contract program encoding the directed graph may be changed based on received event messages. Alternatively, or in addition, an obtained smart contract program may be completed and no longer responsive to event messages received by a computing platform. For example, a smart contract program may be executed to completion, where no further conditional statements of the smart contract program can be triggered.

In some embodiments, the process 2300 may include determining a first graph portion template based on the directed graphs of the set of smart contract programs, as indicated by block 2308. A graph portion template may include one or more norm vertex templates, one or more edges associating two norm vertex templates, or the like. A norm vertex template may include values associated with a norm vertex such as a category label, a satisfaction state, a conditional statement, a type of conditional statement, or the like. For example, the graph portion template may include a category label "obligation" and the satisfaction state "failed." As further described below, the norm vertex template may be used to determine the presence of a norm vertex, where two norm vertex templates of a graph portion template may be identical to each other or different from each other. For example, a norm vertex that is indicated to be an obligation norm that is failed may be matched with a first norm vertex template in response to the norm vertex template including or otherwise associated with the category label "obligation" and the satisfaction state "failed." In some embodiments, an edge template associating two norm vertex templates may be directed from a first norm vertex template to a second norm vertex template. An edge template associating two norm vertex templates may include an array specifying the identifiers of two norm vertex templates, a transaction amount, a range of transaction amounts, or the like.

In some embodiments, the graph portion template may be associated with one or more category labels, conditional statements, or types of conditional statements. For example, a set of category labels may be used for a set of norm vertex templates and may include mutually exclusive category labels. For example, a first graph portion template may include a first norm vertex template associated with a first category label, and an edge template may associate the first norm vertex template with a second norm vertex template, where the second norm vertex template may be associated with a second category label. In some embodiments, a conditional statement may be used to specify a graph portion template. For example, a graph portion template may include a terminal norm vertex associated with a failure to satisfy an obligation.

In some embodiments, the graph portion template may include a first norm vertex template and a second norm vertex template that are not connected to each other in the graph portion template. For example, the first norm vertex template may be associated with the category label "obligation norm" and the second norm vertex template may be associated with the same category label "obligation," where the first and second norm vertices may represent unrelated obligations of a first entity to allocate resources to a second entity. Alternatively, or in addition, the graph portion template may include a directed path or cycle connecting a set of norm vertex templates. For example, a first graph portion template may include a first norm vertex template associated with a second norm vertex template and a second norm vertex template associated with a third norm vertex template. In some embodiments, the graph portion template may include a combination of single, disconnected norm vertex templates, directed paths through norm vertex templates, circular paths through norm vertex templates, or the like, where paths through a graph portion template may be determined based on a set of edge templates.

Some embodiments may determine the first graph portion template based on a library of graph portion templates. For example, the library of graph portions templates may include a graph portion template associated with a first array indicating logical category labels of a subgraph. Various methods may be used to determine the presence of a subgraph in a graph. For example, some embodiments may decompose a directed graph into a set of possible subgraphs ("induced graphs") and determine whether a subgraph is present by comparing each induced graph of the set of possible subgraphs with each graph portion template of a set of graph portion templates. In some embodiments, graph portion templates that match one or more induced subgraphs of a directed graph may be included in the set of graph portion templates used to determine an outcome score. Furthermore, as discussed further below, a graph portion template may be associated with a specific entity or set of entities. For example, a graph portion may be stored in an entity profile associated with a specific entity. Alternatively, a graph portion template may be stored in a default set of graph portion templates that is used to determine outcome scores for multiple entities by default.

Some embodiments may use subgraph isomorphism algorithms to determine the presence of a subgraph in a graph, where a subgraph may be specified by a subgraph template. The detection of subgraph isomorphs may include algorithms that account for the possibility that a candidate subgraph is not present a graph (e.g., the candidate subgraph is not necessarily an induced subgraph of the graph) on include algorithms that assume the candidate subgraph is present (e.g., the candidate subgraph is known to be an induced subgraph of the graph). Some embodiments may use a plurality of subgraph isomorphism algorithms to determine the presence of a subgraph based on the subgraph structure itself. For example, some embodiments of may use algorithms to determine the presence of three-node subgraphs in a graph, such as algorithms developed by Itai and Rodeh or Eisenbrand and Grandoni, as described by in "Graph pattern detection" Dalirrooyfard (STOC 2019: Proc. 51st Annual ACM SIGACT Symposium on Theory of Computing, arXiv:1904.03741), which is herein incorporated by reference.

In some embodiments, the process 2300 may include determining a set of outcome determination parameters based on the set of graph portion templates, as indicated by block 2312. A set of outcome determination parameters may be used by an outcome determination model to determine an outcome score, such as a statistical prediction model, an unsupervised learning model, a supervised learning model, some combination thereof, or the like. As further discussed below, the outcome determination model using the outcome determination parameters may be used associated with an outcome score and an outcome. An outcome may include an outcome program state, the occurrence of an event, the satisfaction or failure of a payment obligation by an entity, the matching of a graph portion with a specified graph portion template, or the like.

In some embodiments, an outcome determination parameter may be determined using a ratio or a statistical calculation. In some embodiments, an outcome determination parameter may indicate or otherwise be correlated with a number of times that the behavior indicated by the first graph portion template had occurred. For example, the outcome score may be a ratio of the number of times that the first graph portion template matches with a graph portion in the set of directed graphs to the number of times that the first entity had interacted with another entity based on a plurality of the directed graphs of a plurality of smart contract programs. In some embodiments, an outcome determination model may be caused to use a specified set of outcome determination parameters for a directed graph based on the directed graph having a graph portion matching a second graph portion template, as discussed further below.

In some embodiments, the outcome determination parameters may include a set of weights, biases, or other parameters of a neural network model or another machine-learning model. Some embodiments may determine a set of outcome determination parameters for a first entity by training the neural network model or another machine-learning model to use a plurality directed graphs of a plurality of smart contract programs associated with the first entity. For example, the set of outcome determination parameters may include a set of neural network weights of one or more neurons of a convolutional neural network or other neural network, The convolutional neural network or other neural network may be used to determine a likelihood of an outcome action occurring, where the outcome action may include a transition to an outcome program state, an event occurring, or the like. In some embodiments, the neural network may be trained to use the match between a graph portion and a graph portion template as a feature. For example, some embodiments may be trained using a feature that is set to "1" when a directed graph has a graph portion that matches a first graph portion template and is set to "0" when the graph portion does not match the first graph portion. Additionally, or alternatively, the feature set may include other attributes such as global parameter values of the smart contract program state, variables stored in a storage memory accessible to the smart contract program, or the like.

In some embodiments, the feature set used to train a neural network model or other machine-learning model to determine outcome determination parameters based on a directed graph may include embeddings based on the directed graph. Some embodiments may encode the entity vertices of an entity graph to determine a feature set, such as by applying an embedding algorithm such as a one-hot encoding algorithm to a set of entity vertices. In some embodiments, the embedding assigned to a respective vertex of the directed graph may include or otherwise be associated with a relationship between the respective entity and other entities of the entity graph. For example, some embodiments may generate a set of entity graph features using a vertex embedding algorithm such as using a random walk algorithm, a neural network-based embedding algorithm, or the like. For example, some embodiments may generate a set of embeddings for the vertices of a directed graph using a random walk algorithm such as a DeepWalk algorithm, a Node2Vec algorithm, or the like. Use of a random walk algorithm may include performing random walk sampling for each vertex of the directed graph, training a skip-gram model by using the random walks as one-hot vectors and computing an embedding based on an output of the trained skip-gram model.

Alternatively, or in addition, some embodiments may generate the set of entity graph features using a neural network-based algorithm such as a structural deep network embedding (SDNE) algorithm. For example, some embodiments may use a set of autoencoders that may take a node adjacency vector as an input and is trained to reconstruct the node adjacency vector based on a second-order adjacency. The adjacency vector of a vertex may be represented as a vector where non-zero elements represent a connection between the vertex and other vertices a graph. A first-order adjacency vector for a first vertex may represent the adjacency vector for the first vertex itself, and a second-order adjacency vector of the first vector may represent the adjacency vector for a neighboring vertex of the first vertex. Some embodiments may use the adjacency vectors of a directed graph vertex as a set of embeddings for the directed graph or otherwise determine the set of embeddings based on the adjacency vector outputs of the set of autoencoders. While the above describes the use of random walk algorithms or neural network-based algorithms to generate a set of embeddings, various other algorithms or methods may be used to determine embeddings for a graph. For example, some embodiments may use a graph factorization embedding algorithm, GraRep embedding algorithm, locally linear embedding algorithm, laplacian eigenmaps embedding algorithm, high-order proximity preserved embedding algorithm, deep network embedding for graph representation embedding algorithm, graph convolutional neural network embedding algorithm, graph2vec algorithm, or the like.

In some embodiments, a set of features used to train an outcome determination model for a first entity may include data encoding or otherwise representing statuses of other entities of an entity graph that includes the first entity. For example, a feature used by an outcome determination model for a first entity may include or be based on a feature matrix representing whether other entities of the entity graph have been failed by the first entity. Alternatively, or in addition, a feature may include an entity graph feature that indicates a connectedness of the graph to a specific entity, a global parameter not specific to an entity (e.g., an index stock price, a system temperature value, or the like), or the like. For example, some embodiments may use the graph2vec algorithm, which may include sampling a set of entity subgraphs in an entity graph, training a skip-gram model based on the set of entity subgraphs, and determining entity embeddings based on the trained skip-gram model. Some embodiments may then train a neural network model using the set of entity embeddings to determine an outcome determination parameter.

In some embodiments, a feature used for training or using a machine learning model may include or be based on a set of transaction amounts indicating an amount that has been transferred to or from a respective entity associated with respective entity vertex with respect to each of the other entities that have had a transaction with the respective entity. Alternatively, or in addition, the feature may include or be based on a count of transactions that had occurred between the respective entity and other entities of an entity graph. For example, a feature for training or using a machine-learning model associated with a first entity may include a ratio of the number of times that the first entity had failed an obligation norm when dealing with a second entity to a number of times that the first entity had a transaction with the second entity. Alternatively, or in addition, this ratio or another value based on a count of transactions may be used as an outcome determination parameter.

In some embodiments, the process 2300 may include obtaining a first directed graph of smart contract program of a first entity, as indicated by block 2320. Operations to obtain the smart contract program of the first entity may be similar to or the same as those described for block 2104 above.

In some embodiments, the process 2300 may include obtaining a set of graph portion templates based on the first entity, as indicated by block 2324. Some embodiments may obtain the graph portion templates by obtaining an entity profile of an entity, where the entity profile includes or is otherwise associated with graph portion templates. As discussed above, the set of graph portion templates may be determined based on a set of smart contract programs associated with the first entity. In some embodiments, an entity profile may include an entity identifier, a set of values indicating one or more attributes associated with an entity, a set of entity scores, or the like. For example, an entity profile may include a set of display names, set of internal alphanumeric identifiers o the entity, set of numeric values or categories indicating behaviors, a set of numeric values or categories indicating limits or numeric ranges, or the like. Some embodiments may store a set of graph portion templates in an entity profile or otherwise associate the graph portion template with the entity profile. For example, some embodiments may store the display name "entity 553," the entity role name "resource allocator," a maximum resource allocation limit "106 GB," and a set of graph portion templates in the first entity profile. In some embodiments, a single entity may be associated with more than one entity profile. Alternatively, or in addition, the set of graph portion templates may be obtained from a library of graph portion templates that is either not associated with an entity profile or is associated with multiple entity profiles. For example, some embodiments may obtain a default set of graph portion templates to determine an outcome score for a first entity from a library of graph portion templates that is not stored in an entity profile of the first entity.

In some embodiments, the process 2300 may include determining a set of outcome scores based on the first directed graph of the first entity, the set of outcome determination parameters, or the set of graph portion templates, as indicated by block 2332. As described above, some embodiments may load or otherwise obtain a set of outcome determination parameters and use the obtained outcome determination parameters to determine an outcome score using an outcome determination model. The selection of an outcome determination model and its corresponding set of outcome determination parameters may be based on values stored in an entity profile of a first entity or otherwise based on values associated with the first entity. For example, a first entity profile may include a plurality of sets of outcome determination parameters, where each set of the plurality of sets causes the use of a respective outcome determination model and a respective set of outcome determination parameters for the respective outcome determination model.

The outcome determination model may include a model for determining predictions or the likelihood of an outcome such as a statistical model, a machine learning model, or the like. The outcome may include various possible outcomes, such as the satisfaction or failure of an obligation by an entity, the activation of a vertex having a specified category label, or the like. For example, some embodiments may determine that a first set of outcome determination parameters stored in an entity profile associated with a first entity specifies the use of a convolutional neural network as an outcome determination model. Some embodiments may then use a weights array identifier stored in the set of outcome determination parameters to obtain a set of weights and biases from a database of parameters. Some embodiments may then use the set of weights and biases for the convolutional neural network to determine an outcome score, where another value stored in the set of outcome determination parameters may indicate that the outcome score includes a measurement of the likelihood that the first entity will fail an obligation.

As described above, determining the outcome score may include determining whether a graph portion of the first directed graph matches a graph portion template of the set of graph portion templates. Some embodiments may use one or more graph isomorphism algorithms to determine whether a graph portion matches a template of the set of graph portion templates. In response to a determination that a match exists, some embodiments may update an input value of the outcome determination model, where the input value indicates that the graph portion matches a graph portion template. Some embodiments may then determine an outcome score based on the input value. For example, some embodiments may obtain a count of the number of times that the graph portion template matches a graph portion of the directed graph and use the count as an input value for a machine learning model to determine an outcome score. In some embodiments, the set of graph portion templates stored in the entity profile of a first entity or otherwise associated with the first entity may include a norm vertex template, an edge between norm vertex templates, a path through a plurality of vertex templates, or the like. Furthermore, in some embodiments, the outcome score may be one of a set of outcome scores, where each score of the set of outcome scores is determined using one of a set of outcome determination parameters.

In some embodiments, the process 2300 may include determining whether the outcome score satisfies an outcome score threshold, as indicated by block 2340. In some embodiments, the outcome score threshold may include a predetermined value. For example, an outcome score may indicate the likelihood that the first entity participates in a smart contract that includes a directed graph having a specified graph portion that matches a target graph portion template. For example, the outcome score threshold may be equal to 50%, and satisfying the outcome score threshold may indicate that at least 50% of the smart contracts in which the first entity participates include a directed graph having a graph portion that matches a target graph portion template. In some embodiments, each entity may include a plurality of outcome scores, where each of the plurality of outcome scores may have a corresponding outcome score threshold. If the outcome score satisfies the outcome score threshold, operations of the process 2300 may proceed to operations described for block 2344. Otherwise, operations of the process 2300 may proceed to operations described for block 2348.

In some embodiments, the process 2300 may include storing a value indicating that the outcome score threshold is satisfied, as indicated by block 2344. The value indicating that the outcome score threshold is satisfied may be stored in various forms. For example, the value indicating outcome score threshold satisfaction may include a boolean value, a number representing that the outcome score threshold is satisfied, an alphanumeric string such as "satisfied," a value of a dictionary or object property, or the like. As discussed further below, the value indicating outcome score threshold satisfaction may be stored in an entity profile, a database of values, or some other data structure stored on persistent computer memory. In some embodiments, the value may be stored on a tamper-evident, distributed ledger operating on a distributed computing platform. Alternatively, or in addition, the value may be stored on a centralized computing platform, such as on a single computing device. Furthermore, as described elsewhere in this disclosure, updating the value indicating outcome score threshold satisfaction may include updating an entity graph.

In some embodiments, the process 2300 may include updating an entity score based on the outcome score, as indicated by block 2348. Various methods may be used to determine an entity score based on the outcome score. For example, some embodiments may set an entity score to be equal to an outcome score. Alternatively, or in addition, an entity score may be equal to a weighted sum of entity scores. For example, some embodiments may determine an entity score to be equal to a set of outcome scores equal to a set of probabilities of obligation norm failure multiplied by a corresponding transaction score.

In some embodiments, updating the entity score based on the outcome score may include updating an entity profile associated with the entity graph, where the entity profile includes or is otherwise associated with the entity score. In some embodiments, the values updating an entity profile of the first entity may then also be used to update additional entity profiles of other entities of an entity graph. Some embodiments may store entity profile values or entity graph values on a tamper-evident, distributed ledger operating on a distributed computing platform. Alternatively, or in addition, the value may be stored on a centralized computing platform, such as on a single computing device.

Furthermore, in some embodiments, the entity score may be used in a set of simulations to determine whether an entity is likely to accept or reject amendments to the conditional statements of a smart contract program or the structure of a directed graph of the smart contract program. For example, a first outcome score may represent a likelihood of a first entity to fail an obligation based on a simulation of a first smart contract program and a second outcome score may represent a likelihood of the first entity to fail an obligation based on a simulation of a second smart contract program. Based on a comparison of the first outcome score and the second outcome score, some embodiments may determine the likelihood that a second entity is likely to accept or reject a proposed amendment to a conditional statement used in the first and second smart contract programs.

Figure 24:
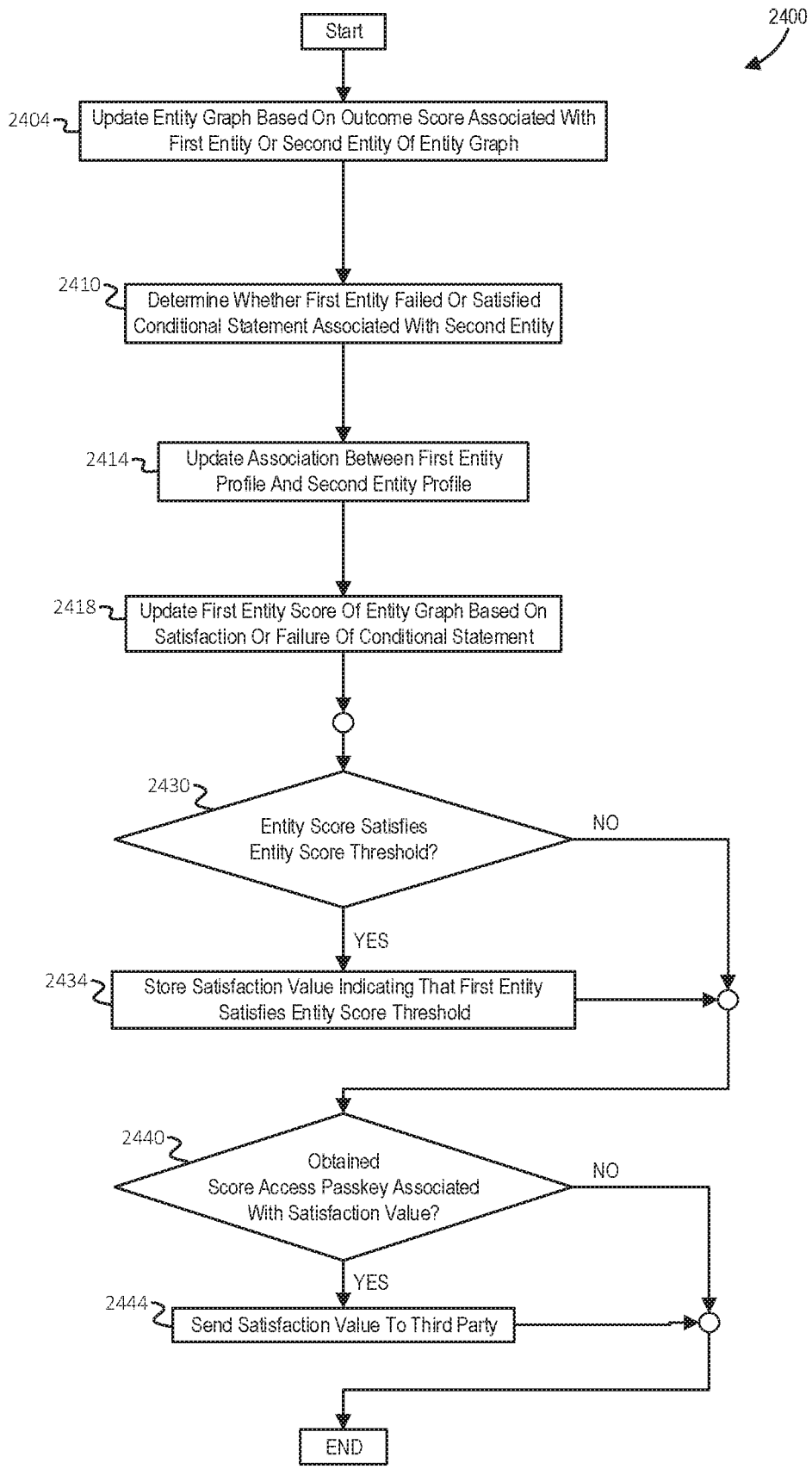
FIG. 24 is a flowchart of a process to send a message indicating that an entity score has been updated based on an entity graph, in accordance with some embodiments of the present techniques.

FIG. 24 is a flowchart of a process to send a message indicating that an entity score has been updated based on an entity graph, in accordance with some embodiments of the present techniques. In some embodiments, operations of the process 2400 may include updating an entity graph based on an outcome score associated with a first entity or a second entity of the entity graph, as indicated by block 2404. In some embodiments, updating an entity graph may include updating an entity score of the entity graph based on an outcome score determined using one or more of the operations described above for the process 2300. For example, an entity score for a first entity may be equal to an outcome score described above. Alternatively, or in addition, an entity score may be based on a combination of outcome scores. For example, in some embodiments, an entity score may be equal to a weighted sum of a first outcome score based on the number of times the entity fails two or more obligation norms and a second outcome score based on the number of times the entity triggers a rights norm to prematurely terminate a smart contract program.

In some embodiments, the entity score, entity profile associated with the entity score, or entity graph associated with the entity score may be stored on a distributed, tamper-evident ledger of a distributed computing platform. For example, a version of a first entity profile, a second entity profile, and an entity graph edge associating the first entity profile to the second entity profile may be stored on the distributed, tamper-evident ledger (e.g., stored as on-chain data). Alternatively, or in addition, some or all of the entity graph may be stored on storage memory that is not part of a distributed, tamper-evident ledger. For example, some embodiments may store data related to the entity graph in a storage memory of a centralized computing platform, where the data may be accessible and transferred over a distributed computing platform via a verification hash value. For example, some embodiments may update data related to a first entity profile by transmitting an updated score from a distributed computing platform to the centralized computing platform. Receiving the updated score may cause the centralized computing platform to update the first entity profile based on the updated score. In some embodiments, the updated score is not stored in a persistent memory of the distributed computing platform and is stored in a persistent memory of the centralized computing system, where the updates score may be obtained from the centralized computing system using data provided from the distributed computing platform.

Some embodiments may detect the similarity between two different entity profiles based on a set of entity similarity criteria. For example, some embodiments may compare a first entity profile and a second entity profile based on a set of predetermined fields such as an entity name, an account number, an identifier value, entity role, a hashed login value, or the like. Some embodiments may determine a similarity value based on a ratio of identical values in the set of predetermined fields. For example, some embodiments may determine that two entity profiles share a same entity name, a same entity role, and a same access privilege and, in response, determine that the two entity profiles satisfy an entity similarity criterion. In some embodiments, the determination that two entities satisfy a set of entity similarity criteria may cause a smart contract program or other symbolic AI program to generate a message indicating the two entity profiles. By indicating similarities between two entity profiles, some embodiments may reduce the risk of hacking attempts, counterfeiting attempts, unnecessary duplication of roles, or the like.

In some embodiments, operations of the process 2400 may include determining whether the first entity failed or satisfied a conditional statement associated with the second entity, as indicated by block 2410. In some embodiments, an event message may be obtained by a smart contract program that triggers a norm vertex associated with the first entity, where the event message causes the first entity to satisfy or fail a conditional statement associated with the norm vertex. For example, a conditional statement may correspond to an obligation norm vertex in a set of norm vertices, where a condition of the conditional statement may include the condition that the first entity sends an account renewal message to the second entity. In response to the first entity sending the account renewal message to the second entity, some embodiments may determine that the first entity has satisfied the obligation norm vertex. Alternatively, or in addition, an event message may be provided by the second entity, a third-party entity, another application operating on a computing platform executing the smart contract program or other symbolic AI program, an API of the smart contract program, or the like. For example, a conditional statement may correspond to an obligation norm vertex in a set of norm vertices, where the conditional statement may include a condition that the second entity sends a confirmation message indicating that it is able to use computing resource allocated by the first entity or has received a corresponding amount of a digital asset equivalent to the computing resource from the first entity. In response to the second entity not sending the confirmation message, some embodiments may determine that the first entity has failed a conditional statement associated with the second entity.

In some embodiments, operations of the process 2400 may include updating an association between a first entity profile and a second entity profile, as indicated by block 2414. The association between the first entity profile the second entity profile may be a part of the entity graph and may be stored as an entity graph edge associating a first entity vertex corresponding with the first entity profile and a second entity vertex corresponding with the second entity profile. The association between the first entity profile and the second entity profile may be stored in various forms associating a plurality of entity profiles, such as an array, a pointer from one of the entity profiles to another of the entity profiles, an identifier stored in one of the entity profiles that may be used to find another of the entity profile, or the like.

In some embodiments, updating the association between the first entity profile the second entity profile may be based on a transaction score between the first entity profile and the second profile. The transaction score may be used as a part of a conditional statement of a norm vertex or may otherwise be associated with the norm vertex. For example, a conditional statement of a rights norm vertex may indicate that a first entity of a set of norm vertices may trigger a rights norm vertex and cause a second entity to transfer 100 units of a digital asset to the first entity, where a transaction score of the rights norm vertex may be or otherwise include the 100 units. In response, some embodiments may update the association between the first entity profile the second entity profile by increasing an association value by 100 units. In some embodiments, the association between entity profiles may be updated even if there is no indication that an entity has satisfied or failed a conditional statement. For example, some embodiments may perform regular updates of an entity graph to update entity graph edges between entity vertices on an entity graph based on parameters of the conditional statements of a set of symbolic AI programs, where each entity vertex corresponds with an entity profile.

In some embodiments, an entity graph may include a plurality of entity graph edges between a first entity profile and a second entity profile of the entity graph. For example, each entity graph edge of the plurality of entity graph edges may represent a different resource type being used in a transaction between the different entities. Some embodiments may update an entity graph edge of the entity graph based on a resource type associated with a transaction score. For example, a first entity profile may be associated with a second entity profile via a first entity graph edge and a second entity graph edge, where the first entity graph edge represents a computing resource allocation and the second entity graph edge represents a time allocation. In response to determining that an event message indicates that the first entity has allocated 500 GB of storage memory to the second entity, some embodiments may update the entity graph by updating a score associated with the first entity graph edge and not updating a score associated with the second entity graph edge. Some embodiments may update the network by updating the association representing storage memory allocation between the first entity and the second entity by adding 500 GB to the storage memory.

In some embodiments, the process 2400 may include updating a first entity score of the entity graph based on the satisfaction or failure of the conditional statement, as indicated by the block 2418. As described above, an entity score for an entity may represent one of various types of attributes or behaviors of the entity and may include attributes or behaviors associated with the satisfaction or failure of norm vertices of a smart contract directed graph. For example, some embodiments may update an entity score of the first entity that represents the number of times that the first entity has failed an obligation. Some embodiments may include a plurality of entity scores associated with the entity profile. For example, some embodiments may include an entity profile storing or otherwise associated with a first entity score and a second entity score, where the first entity score may indicate a number of times that the first entity has failed an obligation norm and a second entity score may indicate a total amount of times that the first entity has exercised a rights norm resulting in another entity transferring an amount of digital assets to the first entity.

Some embodiments may obtain a previous entity score stored on a distributed, tamper-evident ledger and update the entity score based on the previous entity score. For example, some embodiments may obtain a previous entity score of a first entity equal to a ratio representing the number of satisfied obligations to the number of total obligations "975/1000." In response to an event message indicating that the first entity has satisfied another obligation, some embodiments may update the entity score by adding one to the numerator and denominator of the previous entity score to result in the ratio "976/1001."

In some embodiments, the first entity score may be stored in the first entity profile or otherwise associated with the first entity profile. For example, the first entity score may part of an entity profile stored on a tamper-proof, distributed ledger. In some embodiments, a first entity score may be encrypted and updating the first entity score may include sending an encryption key in conjunction with or otherwise associated with update values, where the update values may be used to update the first entity score or otherwise update the first entity profile. Some embodiments may obtain access to the encryption key or use of the encryption to a specified set of entities. For example, some embodiments may provide the encryption key associated with the first entity to the first entity itself, entities associated with one or more transactions with the first entity, a verified set of third-party entities, or the like. By securing the first entity score based on an encryption key, some embodiments may reduce the risk of unauthorized or otherwise inappropriate changes to an entity score of the first entity profile.

In some embodiments, operations of the process 2400 may include determining whether the entity score satisfies an entity score threshold, as indicated by block 2430. In some embodiments, the entity score threshold may be associated with a predetermined value or be controllable by a verification entity. Some embodiments may include a plurality of entity score thresholds, where each of the entity score thresholds may be associated with a specific type of entity score. For example, some embodiments may include a first entity score threshold representing a threshold amount of computing resources allocated over a period of time and a second entity score threshold representing a threshold amount of energy consumed by the first entity. If the entity score satisfies the entity score threshold, operations of the process 2400 may proceed to operations described for block 2434. Otherwise, operations of the process 2400 may proceed to operations described for block 2440.

In some embodiments, operations of the process 2400 may include storing a set of satisfaction values indicating that the first entity satisfies the entity score threshold, as indicated by block 2434. In some embodiments, the satisfaction value may be determined and shared with the first entity profile by a verification entity. For example, a verification entity may determine that a first entity satisfies entity score threshold, indicating that the first entity fulfills a required percentage of obligation norms. In response to this determination, some embodiments may store a satisfaction value in the entity profile of the first entity, where the satisfaction value indicates that the verification entity has determined that the entity score of the first entity satisfies the entity score threshold. Alternatively, or in addition, the satisfaction value indicating that the first entity satisfies the entity score threshold may be stored in a storage memory of the verification entity or in another data storage system.

By storing the satisfaction value indicating that the first entity satisfies the entity score threshold, other entities may then be allowed to determine that the first entity satisfies the entity score threshold without requiring additional computations that may slow down on distributed computing platforms. Furthermore, a verification entity may provide a satisfaction value indicating that a first entity satisfies the entity score threshold. Providing satisfaction values from a verification entity may enable some embodiments to protect the privacy of a first entity while still allowing other entities to trust or otherwise predict the behavior of the first entity.

In some embodiments, operations of the process 2400 may include determining whether a score access passkey value is obtained, as indicated by block 2440. The score access passkey value may be obtained by a smart contract management system to determine whether an entity score associated with an entity profile can be shared with a score-requesting entity. In some embodiments, the score access passkey value may be obtained as a part of another message sent to an API. In some embodiments, the score access passkey may include a series of alphanumeric characters, a set of values, hashed value(s), or the like. In some embodiments, the score access passkey for a satisfaction value of a first entity may be received from the first entity itself. Alternatively, or in addition, the score access passkey may be obtained from a second entity associated with the first entity via a transaction graph or an authenticated third party. If a determination is made that score access passkey is received, operations of the process 2400 may proceed to block 2444. Otherwise, operations of the process 2400 may be considered as complete.

In some embodiments, operations of the process 2400 may include sending a satisfaction value to the third party, as indicated by block 2444. In some embodiments, the satisfaction value may store or indicate a set of values indicating that the first entity satisfies the entity score threshold. Some embodiments may send a message to another entity or an API based on the value indicating that the entity score satisfies the entity threshold. For example, some embodiments may send a message indicating that a first entity score of a first entity satisfies the entity threshold to an application program interface of a second entity. Furthermore, as discussed above, some embodiments may determine additional entities that may be associated with the first entity based on a path through an entity graph and send the message to these additional entities as well. Furthermore, some embodiments may provide a satisfaction value without any score access passkey being obtained. For example, some embodiments may provide a first satisfaction value to set of entities without obtaining a score access passkey associated with the first satisfaction value but require that a score access passkey be received from an entity before providing the entity with a second satisfaction value.

The use of applications executing on a decentralized computing platform or decentralized, tamper-evident data stores in real-world situations poses technical challenges in areas such as information retrieval speed, analytical capabilities, and data privacy. Such problems may include memory storage issues, speed bottlenecks on data transfer, data update operations, or difficulties in processing complex operations in a distributed computing environment. For example, a query message encoding a graph portion template may require a non-serialized directed graph to match a graph portion with the graph portion template or to satisfy the query otherwise. The deserialization and reserialization operations may cause time delays that last longer than minutes or tens of minutes or cause computing devices to perform redundant computations. Such delays may make real-world operations unmanageable when multiple queries are being concurrently executed in a distributed computing environment. In addition, multi-participant applications executing on a decentralized computing platform may include access permission mechanisms on the type of information accessible to different types of entities. Such access permission mechanisms may often exacerbate the difficulty querying an application executing on a decentralized computing platform.

Some embodiments may use a hybrid computing system capable of concurrently and independently executing operations that change program state for an application executing on a decentralized computing platform and executing query logic to retrieve or update data associated with program state for the application. The hybrid computing system may include a set of computing devices acting as nodes of a decentralized computing platform capable of executing an application based on events caused by a set of participating entities. The hybrid computing system may also store program state encoding a directed graph on a decentralized, tamper-evident data store. Some embodiments may include operations to serialize the directed graph for storage in a persistent storage of a set of computing devices acting as nodes of a network used to operate a decentralized computing platform.

In addition, the hybrid computing system may include a second data store accessible to one or more computing devices of the network of computing devices. As discussed further below, the second data store may include a local persistent storage of a computing device, a persistent storage of a cloud computing server, a persistent storage of a second decentralized, tamper-evident data store, or the like. In some embodiments, the use of the second data store may increase efficiency when executing query logic to retrieve, analyze, or update directed graphs or other data associated with program state for an application executing on a decentralized computing platform. Some embodiments may deserialize a directed graph at a second computing device to generate a second instance of the directed graph in a non-serialized format, such as one of the non-serialized formats of a directed graph as described above. Some embodiments may store the second instance of the directed graph with associated data in a second persistent storage accessible to the second computing device. Upon receipt of a message, some embodiments may retrieve, analyze, or otherwise use values stored in the second persistent storage to provide a response value.

In some embodiments, the message to retrieve, analyze, or update values associated with a directed graph may include data specifying specific graph portions such as a graph portion template that includes labels specific to vertices of the directed graph. Some embodiments may match graph portions of a directed graph to the graph portion template to determine a subset of vertices relevant to or otherwise targeted by a message to determine the response value. As further discussed in this disclosure, the response value may be based on the subset of vertices, such as data encoded in the conditional statements of the subset of vertices, events associated with a subset of vertices, a count associated with the subset of vertices, or the like. For example, some embodiments may determine a specific change in a transaction score associated with a vertex, a timestamp indicating when a vertex of the subset of vertices was triggered, a computational result based on data associated with events causing the activation or the triggering of the subset of vertices, or the like. By separating application execution logic and query logic, a hybrid decentralized computing system may provide the transaction stability and trustworthiness of a blockchain system with the speed and analytical capabilities of systems based on data stored in a centralized data store. While some embodiments may be disclosed as including a specified feature or performing a specified operation, some embodiments may enjoy disclosed benefits without including the specified feature or without performing the specified operation.

In some embodiments, a message may include or otherwise be associated with an entity identifier useful for determining whether a set of data retrieval criteria associated with the subset of vertices or their corresponding entities is satisfied. For example, a first entity may not permit certain entities or only permitted certain entities to retrieve data associated with the first entity. In some embodiments, a response value may be modified or stopped from being sent if one or more data retrieval criteria are not satisfied by the message. By using graph vertex-level granularity to determine which criteria of a set of data retrieval criterion are applicable, the analytical capabilities of a hybrid computing system may be largely preserved while maintaining strong data privacy protection for participating entities of a technology-based self-executing protocols (e.g., a smart contract) or other symbolic AI applications.

Figure 25:
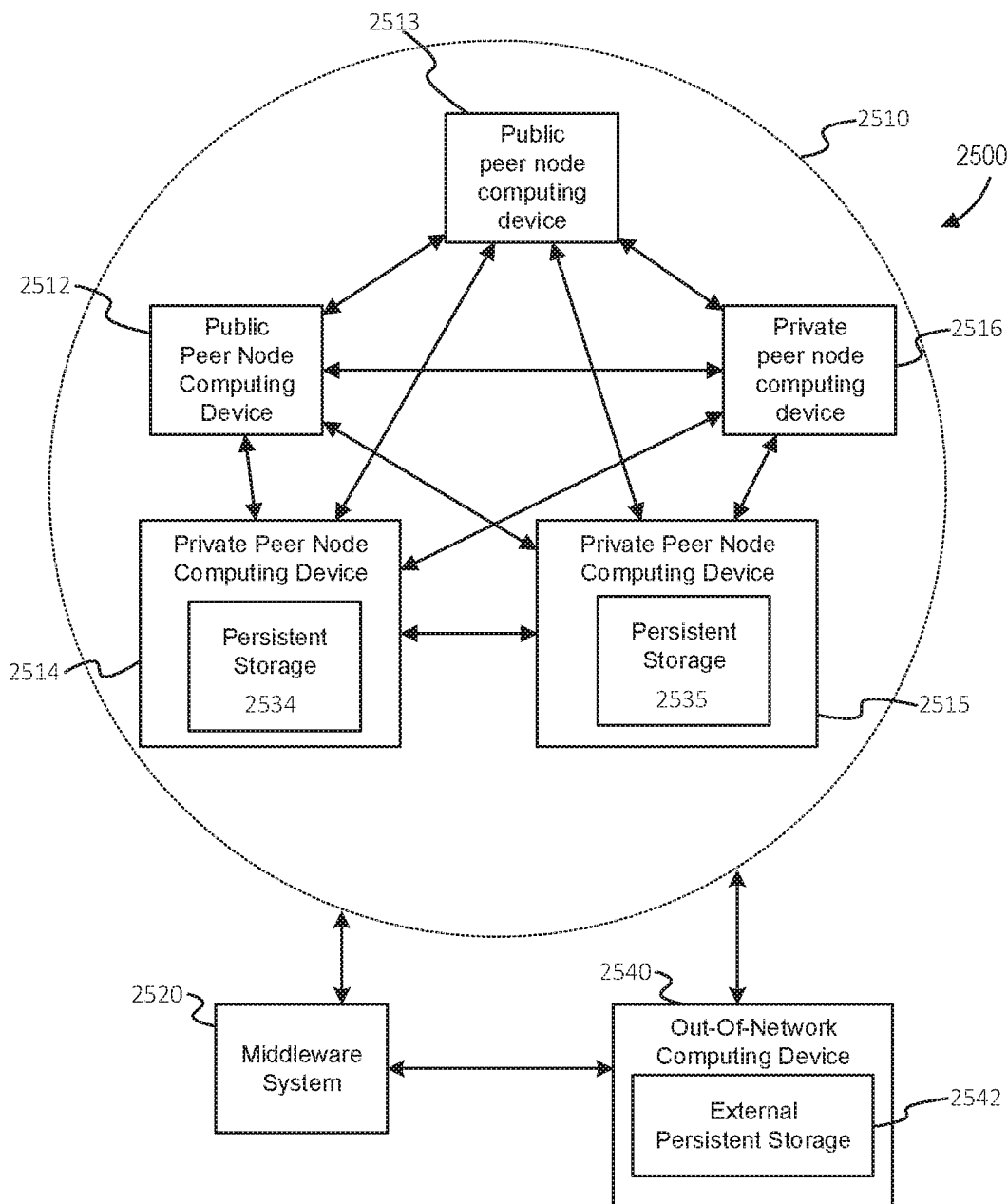
FIG. 25 depicts a diagram of a hybrid decentralized computing system usable for separating application execution logic from query logic, in accordance with some embodiments of the present techniques.

FIG. 25 depicts a diagram of a hybrid decentralized computing system usable for separating application execution logic from query logic, in accordance with some embodiments of the present techniques. The computing environment 2500 may include a hybrid network 2510, where the hybrid network 2510 includes a set of public peer node computing devices 2512 and a set of privately-controlled peer node computing devices 2514-2516. As shown in the hybrid network 2510, the first private peer node computing device 2514 may include a first persistent storage 2534 and the second private peer node computing device 2515 may include a second persistent storage 2535. In some embodiments, the first persistent storage 2534, second persistent storage 2535 or other persistent storage devices of the hybrid network 2510 may include one or more physical components usable as persistent storage. For example, a persistent storage may include a set of solid-state drives, a set of spinning disk hard drives, or the like.

In some embodiments, data based on program state for an application executing on a decentralized computing platform, records of a blockchain (e.g., blocks linked by cryptographic hashes), or other values may be distributed between one or more nodes of the hybrid network 2510. As discussed in this disclosure, program state for an application may include a directed graph, where it should be understood that data in a program state need not be labeled as a graph in program state or program code to constitute as one. Some embodiments may determine that a directed graph is present in program code if one or more characteristics of a directed graph are present in the program code. In some embodiments, characteristics of a directed graph may include having a set of values representing vertices (e.g., numbers, characters, strings, or the like) and directions between the set of vertices. For example, a graph encoded in program state may include a set of arrays, entries in a relational database, objects in an object-oriented programming, or the like.

In some embodiments, program state may be distributed from the public peer node computing device 2512 to other nodes of the hybrid network 2510, such as the first private peer node computing device 2514, and stored in the first persistent storage 2534. Alternatively, or in addition, program state may be distributed from the private peer node computing device 2514 to other nodes of the hybrid network 2510, such as the second private peer node computing device 2515 and stored in the second persistent storage 2535. In some embodiments, different instances of data may be stored in a same persistent storage. For example, the second persistent storage 2535 may include a first instance of the directed graph stored in a serialized data format that is distributed to other nodes of the hybrid network 2510. The second persistent storage 2535 may also include a second instance of the directed graph stored in a non-serialized data format that is used for other computing operations such as data retrieval or data analysis.

In some embodiments, each of the set of private peer node computing devices 2514-2516 may be controlled by or otherwise associated with a different entity and not controllable by other entities. For example, the first private peer node computing device 2514 may be associated with a first entity or be an on-premise server of a first organization, and the second private peer node computing device 2515 may be associated with a second entity or be an on-premise server of a second organization. Furthermore, each device of the set of public peer node computing devices 2512-2513 may be operating as nodes having different permission levels or roles in an implementation of a consensus algorithm, as described further below. For example, the public peer node computing device 2512 may serve as an observer and validator of blocks without the ability to generate new blocks of a blockchain operating on the hybrid network 2510.

In some embodiments, the set of private peer node computing devices 2514-2516 may be able to perform operations that nodes of the set of public peer node computing devices 2512 may not be permitted to perform. Alternatively, or in addition, the set of public peer node computing devices 2512-2513 may be able to perform operations that nodes of the private peer node computing devices 2514-2516 may not be permitted to perform. Some embodiments may update program state for an instance of an application executing on a decentralized computing platform or otherwise update data stored in a first decentralized, tamper-evident data store (e.g., a peer-to-peer data-sharing network) of the application. As used in this disclosure, it should be understood that executing an application on a decentralized computing platform may include executing an instance of the application on a computing device of the decentralized computing platform. Some embodiments may operate across the hybrid network 2510 using the set of public peer node computing devices 2512-2513 and the set of private peer node computing devices 2514-2516. For example, the first decentralized, tamper-evident data store may be used to store a blockchain, where both the set of private peer node computing devices 2514-2516 and the set of public peer node computing devices 2512-2513 may be used to verify the updates to the first decentralized, tamper-evident data store. Some embodiments assign different roles to different subsets of computing devices in a network of computing devices based on various blockchain architectures, such as that used for the Ethereum Delegated Proof of Stake (DPoS) system, Facebook Libra blockchain system, or the like.

In some embodiments, data may be provided to the hybrid network 2510 via a middleware system 2520. The middleware system 2520 may include various middleware systems or services. In some embodiments, the middleware system 2520 may include a centralized oracle system, such as a custom-built subsystem that includes an API of an application executing on a decentralized computing platform to receive data at a node of a network. For example, in some embodiments, external data such as a price, indicator of equipment failure, or environmental parameter change may be provided to the hybrid network 2510 to an API of an application executing on a decentralized computing platform operating across the hybrid network 2510. The external data may be directly received and validated at the first private peer node computing device 2514 before being distributed to other computing devices of the hybrid network 2510. In some embodiments, the middleware system 2520 may include a decentralized oracle network, such as the ChainLink network as described by "ChainLink: A Decentralized Oracle Network" (Ellis, Steve; Juels, Ari; and Nazarov, Sergey; Published 4 Sep. 2017), which is hereby incorporated by reference. For example, some embodiments may use a decentralized oracle network to obtain data from a cloud data warehouse such as Google BigQuery and use the data to update program state for an application executing on the hybrid network 2510. As further described below, in some embodiments, an out-of-network computing device 2540 may send data to the middleware system 2520 to update a system or may receive data from the middleware system 2520.

Alternatively, or in addition, data based on program state, such as an instance of a directed graph indicating state for a smart contract, may be stored in the external persistent storage 2542 of the out-of-network computing device 2540. In some embodiments, the out-of-network computing device 2540 may include an enterprise server that is accessible to one or more computing devices of the hybrid network 2510. For example, the external persistent storage 2542 may be accessible to the hybrid network 2510. Alternatively, or in addition, the out-of-network computing device 2540 may include a cloud server or a component of a cloud server. For example, out-of-network computing device 2540 may include a cloud computing server allocated for use as a part of a cloud computing service such as Amazon AWS server, Microsoft Azure server, Google cloud platform server, or the like. Alternatively, or in addition, the out-of-network computing device 2540 may be operating as a peer node of a second decentralized, tamper-evident data store. For example, the second decentralized, tamper-evident data store may include a network operating under the Interplanetary File System (IPFS) protocol, Swarm protocol, or the like. For example, some embodiments may store a directed graph in a non-serialized format in a persistent storage of a computing device participating in a network operating under the IPFS protocol. Data stored in a peer-to-peer data-sharing network may be distributed to other peers of the data-sharing network, which may increase the security, verifiability, and resiliency to failure of data stored in the external persistent storage 2542. Furthermore, in some embodiments, a computing device may operate as a node of a first network used to execute an application and may also operate as a node of a second network used to operate the second decentralized, tamper-evident data store, where the first network and second network may use different sets of computing devices.

In some embodiments, a message may be received by a computing device of the hybrid network 2510, the middleware system 2520, or the out-of-network computing device 2540 to obtain a response value based on an instance of a directed graph stored in a persistent storage accessible to the hybrid network 2510. Some embodiments may select a non-serialized instance of the directed graph stored in a persistent storage, such as the second persistent storage 2535 or the external persistent storage 2542, to determine the response value based on the directed graph. For example, the message may cause some embodiments to obtain a set of timestamps associated with vertices of the directed graph stored in the second persistent storage 2535 and use the data to compute a response value.

Figure 26:
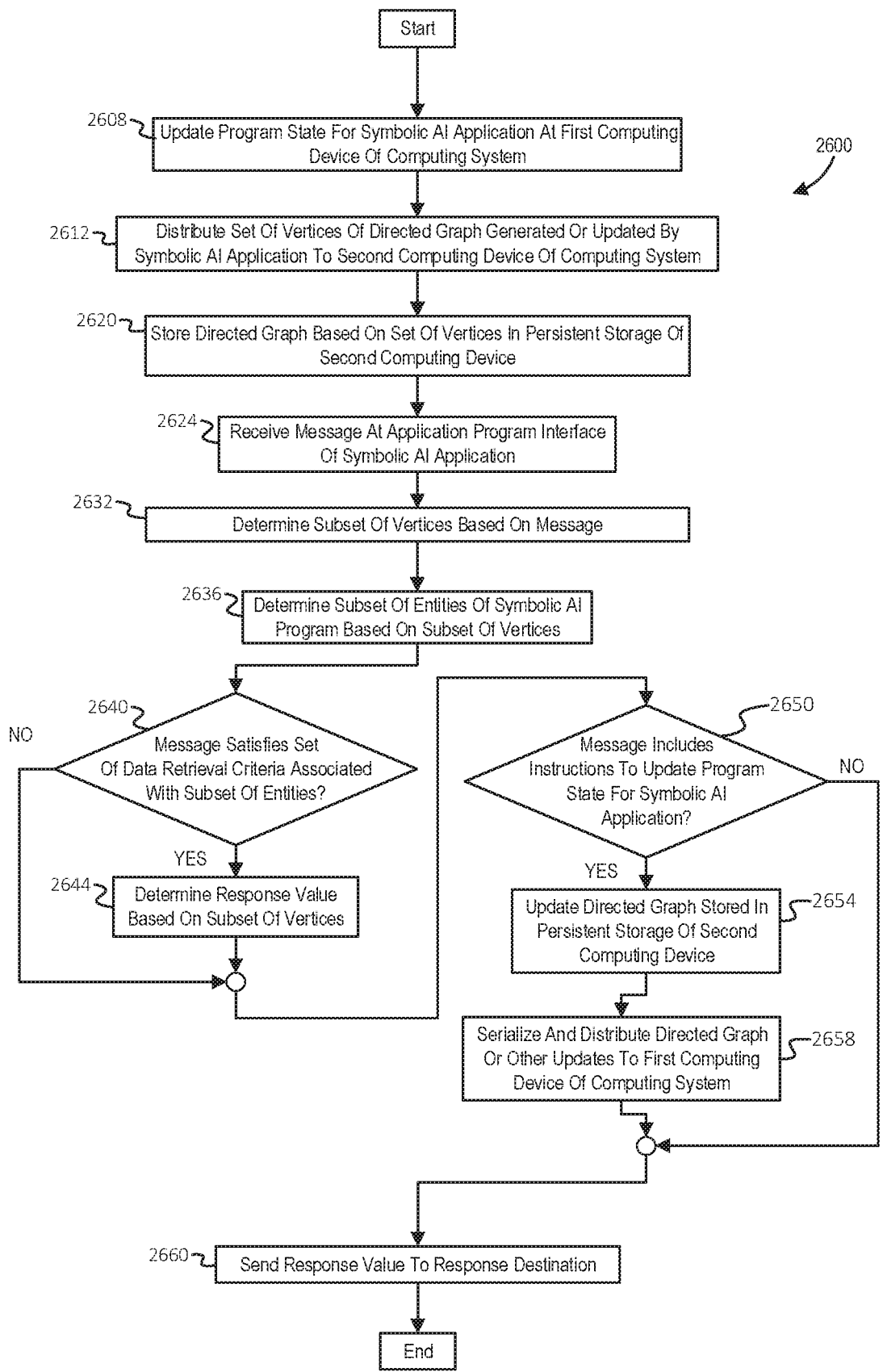
FIG. 26 depicts a flowchart of a process to retrieve a response value from a hybrid decentralized computing system based on a message, in accordance with some embodiments of the present techniques.

FIG. 26 depicts a flowchart of a process to retrieve a response value from a hybrid decentralized computing system based on a message, in accordance with some embodiments of the present techniques. FIG. 26 is a flowchart of processes that may be implemented in the computing environment of FIG. 25 to provide a response value, in accordance with some embodiments. For example, the process may execute one or more routines in the computing environment 2500. In some embodiments, the various operations of the process 2600 may be executed in a different order, operations may be omitted, operations may be replicated, additional operations may be included, some operations may be performed concurrently, some operations may be performed sequentially, and multiple instances of the process 2600 may be executed concurrently, none of which is to suggest that any other description herein is limited to the arrangement described. In some embodiments, the operations of the process 2600 may be effectuated by executing program code stored in one or more instances of a machine-readable non-transitory medium, which in some cases may include storing different subsets of the instructions on different physical embodiments of the medium and executing those different subsets with different processors, an arrangement that is consistent with use of the singular term "medium" herein.

In some embodiments, the process 2600 may include operations to update program state for a symbolic AI application at a first computing device of a computing system, as indicated for block 2608. The first computing device may operate as a node of a network operating executing a smart contract or other symbolic AI application. In some embodiments, the network may communicatively couple some or all of the nodes of the network to each other. For example, the first computing device may update a directed graph encoded in the form of a set of data tables by appending a value to a set of values representing vertices of the directed graph or changing the status of a vertex from "not triggerable" to "triggerable."

In some embodiments, the directed graph may be updated in a non-persistent storage and serialized into a serialized data format as a serialized set of vertices. For example, the directed graph may include a set of vertices and a set of directed graph edges associating pairs of the set of vertices together by including a serialized array, such as the array "[[1,2], [2,3], [3,4]]." As discussed in this disclosure, the directionality indicated by a graph edge may be used to determine which norm vertex is activated (i.e. set to be triggerable) after another norm vertex has been triggered. For example, a directed graph edge may point from a tail vertex to a head vertex. The directionality of the edge may indicate that the conditional statement of the head vertex is set to be triggerable when the conditional statement of the tail vertex has been satisfied or failed. (though this directionality may be arbitrary. Some embodiments may then store the serialized set of vertices in a first persistent storage of the first computing device. The first persistent storage may include a spinning disk hard drive, a solid-state drive, or the like. For example, some embodiments may store the serialized set of vertices in a solid-state drive of the first computing device. In some embodiments, the first persistent storage may be physically attached to other components of the first computing device or be in communication with a processor of the first computing device via a serial or parallel bus.

In some embodiments, the process 2600 may include operations to distribute a set of vertices of a directed graph generated or updated by the symbolic AI application to a second computing device of the computing system, as indicated by block 2612. In some embodiments, the first computing device may distribute data from a program state for a smart contract or other symbolic AI application to a second computing device. In some embodiments, the data may include a serialized set of vertices using a first distributed, tamper-evident data store. For example, the first computing device may be operated as a node of a decentralized computing platform and may update a first distributed, tamper-evident data store with the set of vertices. The second computing device may also be operated as a second node of the decentralized computing platform and obtain the set of vertices from the first distributed, tamper-evident data store.

Some embodiments may use one or more consensus algorithms to reach a consensus regarding a computational result, where the computational result may indicate the validity of a blockchain block (or other record of a decentralized, tamper-evident data store) to communicate, store, or distribute data. Some embodiments may use one or more consensus algorithms to verify or reject a result, such as proof of work consensus algorithm, proof of stake consensus algorithm, proof of burn consensus algorithm, proof of capacity consensus algorithm, proof of elapsed time consensus algorithm, proof of formulation consensus algorithm, or the like. In some embodiments, different sets of nodes may be assigned different roles to fulfill the function of a consensus algorithm.

In some embodiments, each node of a network may be assigned the same role with respect to result generation or validation. Alternatively, in some embodiments, a subset of nodes of a network may be selected to have the authority to perform operations such as generating a blockchain record, validating a blockchain record, modifying a program state of an application, approving transactions, or the like, where other nodes of the network do not have this authority. For example, a subset of nodes may have the authority to validate a transaction, modify program state, or otherwise administer one or more aspects of smart contract operations in a decentralized computing platform.

In some embodiments, the selection of the subset of nodes may be pre-determined or otherwise controlled by a central authority. For example, nodes of a subset of nodes may be pre-determined during an initial set-up of a decentralized computing platform or during a subsequent configuration of the decentralized computing platform by a network administrator. Alternatively, some embodiments may use a consensus voting process such as that used for an implementation of the DPoS algorithm across a plurality of computing devices in a network of computing devices. In a consensus voting process, nodes of a network may vote on a subset of nodes as delegate nodes that will generate and validate results, such as results used to generate new blocks of a blockchain. Various voting schemes may be implemented, such as a weighting votes based on stakes provided by each respective node, probabilistically selecting votes based on a score value assigned to each respective node, or the like.

In some embodiments, operations of the process 2600 may include storing a directed graph based on the set of vertices in a persistent storage of the second computing device, as indicated by block 2620. In some embodiments, a persistent storage of the second computing device may be a local memory storage attached to the second computing device, usable by the second computing device, or otherwise accessible to the second computing device via instructions provided by the second computing device. For example, if the second computing device is the second private peer node computing device 2515, the persistent storage used to store the directed graph instance may include the second persistent storage 2535. Alternatively, or in addition, the persistent storage of the second computing device may include a persistent storage of an external centralized computing system, such as the external persistent storage 2542 of the out-of-network computing device 2540. Alternatively, or in addition, the persistent storage of the second computing device may include a persistent storage used for a distributed, tamper-evident data store. For example, the second computing device may store the directed graph in a distributed, tamper-evident data store such as an IPFS system, Blockstack system, Swarm system, or the like. By storing data in a distributed, tamper-evident data store, some embodiments may increase the visible security of a history of transactions reflected by or otherwise associated with the directed graph.

In some embodiments, the directed graph or other data based on program state for an application executing on a decentralized computing platform may be stored in a record of a data structure such as a relational database. For example, some embodiments may store a directed graph in a database responsive to commands provided in a structured query language (SQL). Alternatively, or in addition, a directed graph or other data based on program state may be stored in a data structure such as a non-relational database (i.e., NoSQL database). For example, some embodiments may store a sequence of values representing a directed graph in a NoSQL database such as MongoDB, Cassandra, Coachbase, HBase, Redis, Hadoop database, Neo4j, or the like. Alternatively, or in addition, the directed graph or other data based on program state for an application may be stored in other data structures. For example, some embodiments may store an instance of the directed graph as a property of an object, value(s) in program state for a second application, a memory image, a tree data structure, a JSON document, or the like.

In some embodiments, an instance of the directed graph may be stored in association with other values, such as values based on events associated with the directed graph. For example, some embodiments may store a set of objects or arrays representing an instance of a directed graph in a record of a database on a persistent storage. In addition, some embodiments may determine that an event caused a program state change for an application and resulted in the transition to a new state of a directed graph from a previous state. In response, some embodiments may store event data associated with the state-updating event in association with an instance of the directed graph indicating the new state. For example, some embodiments may update a record storing directed graph data by storing an event message indicating the occurrence of a state-updating event, a timestamp representing the time at which the event occurred, values parsed from the event message, or the like.

Some embodiments may track the progression of a smart contract directed graph via a history graph, where the history graph may be represented as a sequence of records or other sets of values useful for generating a sequence of versions for a version-control system. Some embodiments may update a history graph by adding a new vertex to the history graph when a change to the smart contract directed graph occurs. For example, some embodiments may determine that a smart contract directed graph has been changed based on a comparison with a previous smart contract directed graph. In response, some embodiments may add a new vertex to a history graph by adding another entry to a sequence of records corresponding to the history graph. In some embodiments, the history graph may include data that is not stored in the smart contract directed graph or may include summarizations of changes to a smart contract directed graph across an interval of time or a set of changes. Some embodiments may store a smart contract directed graph by storing an update to the smart contract directed graph from a previous version of the smart contract directed graph. Furthermore, some embodiments may store data related to a change in the program state of an application. For example, some embodiments may store a score change associated with an event that caused a program state change in an application program state. Alternatively, or in addition, some embodiments may store entity identifiers of the entities associated with a graph-updating event.

Some embodiments may crawl through a set of blocks of a blockchain stored on a decentralized, tamper-evident data store to track a history of a directed graph and determine a sequence of previous versions of the directed. For example, some embodiments may crawl through a sequence of blocks in a blockchain sequence to determine a sequence of program states and their associated versions of a directed graph. Some embodiments may use a block crawling operation to track the evolution of a directed graph through the sequence of blocks from a starting point to a particular time, a particular state of the directed graph, a terminal program state, or the like. As discussed elsewhere in this disclosure, the program state history of an application or the history of a corresponding directed graph may be used as training inputs to determine prediction model parameters. These prediction model parameters may then be used by a prediction model to predict future entity behavior. Furthermore, some embodiments may use a block-crawling operation to provide a means of using one or more operations of this disclosure after an application had already started executing on a decentralized, tamper-evident data store.

In some embodiments, one or more natural language documents may be stored in the second persistent storage in association with the directed graph. A natural language document may include a text document written a human-interpretable language such as English, Spanish, French, Mandarin Chinese, Japanese, Korean, or the like. For example, a smart contract application may be associated with a natural language contract usable to explain terminology, contract operations, or the like. Some embodiments may store a text file of the natural language document in a first record of a database stored on the second persistent storage, where the first record may also store an instance of the directed graph.

In some embodiments, one or more prediction results using one or more operations described in this disclosure may be stored in association with a directed graph in persistent storage. For example, some embodiments may use a machine learning system to determine a predicted directed graph based on a current directed graph and a set of predicted future environmental parameters. The predicted directed graph or another prediction result (e.g., a cumulative score change) may be stored in a persistent storage in association with the directed graph. For example, a predicted directed graph may be stored in the same database record as a first directed graph, where the first directed graph was used as an input to generate the predicted directed graph.

In some embodiments, operations of the process 2600 may include receiving a message at an API of the symbolic AI application, as indicated by block 2624. In some embodiments, the message may be sent by an entity in the set of entities associated with a smart contract or other symbolic AI application. For example, a message sent to a smart contract API may include a query that includes a hashed passkey of a first entity listed as an entity participating in the smart contract. As further discussed below, different entities may be provided with different permissions that allow the respective entity to access different amounts of data or be provided with different types of results based on the data.

In some embodiments, the message may encode a graph portion template as a part of a query. In some embodiments, the graph portion template may represent elements of a graph or labels associated with the graph and may be encoded as a set of strings, characters, numbers, or the like. For example, the message may encode the graph portion template in the two of arrays "[R, O, P]" and "[[0,1],[02]]," where the first array indicates a set of category labels from a set of mutually exclusive category labels for a corresponding set of three vertex templates and the second array indicates a set of edge templates. In some embodiments, the use of category labels selected from a set of mutually exclusive category labels may increase the efficiency of determining matches between a graph portion of a directed graph and a graph portion template and reduce the possibility of a mismatch between a graph portion and a graph portion template.

A graph portion template may be matched with a portion of a directed graph, where a graph portion template may be matched with an entire graph or be matched with a portion of the graph that has fewer vertices or edges than the entire graph. For example, a vertex template may include a vertex that can be matched to a target vertex sharing a category label with the vertex template if the neighboring vertices of the vertex template also share labels with the neighboring vertices of the target vertex. Similarly, an edge template may include an edge that indicates a connection directed from a first vertex template to a second vertex template and may be matched to an edge of the directed graph based on their corresponding vertex templates and edge template direction matching with the vertices an edge direction of the directed graph. For example, the graph portion template in the two of arrays "[R, O, P]" and "[[0,1],[02]]" may the matched to a portion of the directed graph based on the portion including a first, second, and third vertex labeled as a "rights" norm, an "obligation" norm, and a "prohibition" norm, respectively.

In some embodiments, a message may encode a graph portion template by including an index value that references the graph portion template stored in a library of graph portion templates. After receiving a message that includes an index value referencing a graph portion template, some embodiments may search the library of graph portion templates to determine the graph portion template. For example, a message may include a first identifier "x0215," where "x0215" may be an index value in a library of graph portion templates that is associated with a first graph portion template. After receiving the message, some embodiments may search through the library of graph portion templates for the first identifier "x0215" retrieve the first graph portion template.

In some embodiments, the message may encode a graph portion template based on information included in the message that can be converted into a graph portion template. Some embodiments may determine a graph portion template from the set of instructions using a rule-based system or a NLP system, such as the probabilistic identification system described in provisional patent application 63/034,255 titled "Semantic Contract Maps." For example, some embodiments may receive a message that includes the string "rights norms activated by failed obligations" and convert the string into a set of arrays representing a graph portion template such as "["O", "R"] and "[[0,1]]" by parsing the string, isolating terms associated with vertices or category labels of vertices, and isolating terms associated with directed relationships between the vertices.

In some embodiments, a message may encode a category label to determine a result based on vertices having the category label. For example, some embodiments may receive a message that includes the character "R" or the word "right" represent a category label associated with "rights" norm vertices. As discussed further below, some embodiments may then determine a subset of vertices in the directed graph comprising a category label. By searching through a directed graph representing a symbolic AI application using a category label encoded in a message, some embodiments may provide the vertices associated with that category label or scores associated with those vertices. This information may then be used to compute a sum, count, or other summarizing result and include the result in a response value.

In some embodiments, the process 2600 may include determining a subset of vertices based on the message, as indicated by block 2632. A message may include a set of instructions or parameters to determine a subset of vertices of a directed graph. For example, the message may include a graph portion template to determine a subset of vertices. For example, some embodiments may search through a directed graph for the presence of a graph portion that matches a graph portion template encoded in the message. In some embodiments, the subset of vertices may include all of the vertices that matched with the graph portion template. For example, if a graph portion template includes three vertex templates, and if a graph portion includes three vertices that matched with the three vertex templates, some embodiments may select each of the three vertices for inclusion in a subset of vertices. Alternatively, some embodiments may select only one the subset of vertices that matched with a graph portion template, such as the earliest-activated vertex of the subset of vertices, the last-triggered vertex of the subset of vertices, the last-activated vertex of the subset of vertices, or the like.

Alternatively, or in addition, some embodiments may search through a directed graph based on the presence of a set of vertices that include or is otherwise associated with a category label or set of category labels. For example, after receiving a message indicating the category labels "rights" and "triggerable," some embodiments search through a directed graph for all vertices having a "rights" label and "triggerable" label. As discussed further below, this information may be used to determine a summation, a list of active norm vertices, or the like.

Some embodiments may receive a message that does not limit a search to a single instance of an application and may involve searching through a plurality of directed graphs representing a plurality of applications. In response, some embodiments may select a plurality of directed graphs, such as a plurality of directed graphs stored in a persistent storage of the second computing device, and search through each respective directed graph to determine a respective subset of vertices. For example, a message may include instructions to determine a response value for each smart contract that an entity is a participating entity. In response to receiving the message, some embodiments may select a plurality of directed graphs based on graph criteria encoded in the message. In some embodiments, the criteria may be explicitly encoded, such as criteria limiting the number of directed graphs to those associated with applications listing an entity. Each respective directed graph may represent a program state of a different instance of a smart contract application, and some embodiments may select a respective subset of vertices for each of the respective directed graphs of the plurality of directed graphs.

In some embodiments, the process 2600 may include determining a subset of entities of the symbolic AI program based on the subset of vertices, as indicated by block 2636. As discussed in this disclosure, a symbolic AI program may include a set of entities associated with a directed graph of the symbolic AI program, where one or more entities of the set of entities may trigger one or more conditional statements of the norm vertices of the directed graph. For example, a first entity may trigger a first vertex by satisfying a conditional statement of the first vertex, which may activate a second vertex by setting the second vertex to switch from an un-triggerable state to a triggerable state.

Some embodiments may determine the subset of entities based on the entities listed as capable of triggering vertex or being affected by an event satisfying the conditional statement of the norm vertex. For example, a vertex may be associated with a first entity and the second entity based on a conditional statement that is triggered when the first entity sends a specified hash value to the second entity.

In some embodiments, a first vertex may be associated with a first entity even if the first vertex itself is not triggered by an event caused by the first entity or causes a transaction to occur involving the first entity. For example, a first vertex may be associated with a first entity if the triggering of the first vertex activates a second vertex that may be triggered by an event caused by the first entity or causes a transaction involving the first entity. In some embodiments, associating entities with vertices based on neighboring vertices may increase the data privacy for each entity listed in a symbolic AI application when determining data access permissions. Additionally, or alternatively, associating entities with vertices based on neighboring vertices may increase data accuracy when determining response values for queries having one or more criteria based on entities.

Some embodiments may associate vertices from the subset of vertices with their corresponding set of entities in a persistent storage, such as in a data structure stored in a persistent storage of the second computing device. For example, some embodiments may generate a data table with entity identifiers as indices and vertex identifiers as values corresponding to those entity identifier indices. Alternatively, or in addition, some embodiments may generate a data table with vertex identifiers as indices and entity identifiers as values corresponding to those vertex identifier indices. As further discussed in this disclosure, some embodiments may use these associations to determine whether or how much data to provide in a response to a message.

In some embodiments, the process 2600 may include determining whether a message satisfies a set of data retrieval criteria associated with the subset of entities, as indicated by block 2640. Various entities may include or otherwise be associated with specific criteria indicating what other entities are capable of accessing information about the entity, or what types of information can be disclosed. For example, a first entity may include criteria that "level I" entities may access information about specific amounts associated with a transaction. The first entity may also include criteria that only "level II entities" may access information regarding whether a specified set of conditional statements associated with the obligation norms were satisfied by the first entity. Some embodiments may use signature values, entity identifiers, or other information encoded in a message or otherwise associated with the message to determine whether the source of the message is authorized to access information associated with an entity.

In some embodiments, a message may satisfy the set of data retrieval criteria even if it fails a criterion of the set of data retrieval criteria. For example, a set of data retrieval criteria may include a first criterion that specifies that all entities of a first type be provided a score range indicating the numeric range of a resource transfer that occurred during a previous transaction. The set of data retrieval criteria may also include a second criterion that specifies that all entities of a second type be provided a score indicating the exact amount of the resource transfer that occurred during the previous transaction. Some embodiments may satisfy the set of data retrieval criteria by failing the second criterion but satisfying the first criterion.

In some embodiments, a message that satisfies the set of data retrieval criteria may include or otherwise be associated with an identifier of a first entity, where the first entity is listed as a permitted entity to access requested data from the subset of entities. For example, a message may include an identifier of a first entity having an entity type of "regulation observer," and a data retrieval criterion of a second entity may include the condition that a transaction score of the second entity may only be obtained by entities having the entity type "regulation observer." In response to receiving the message, some embodiments may determine that the message satisfies the data retrieval criterion of the second entity. Operations of the process 2600 may proceed to operations described for block 2644 in response to the satisfaction of the set of data retrieval criteria. Otherwise, operations of the process 2600 may proceed to block 2650.

In some embodiments, the process 2600 may include determining a response value based on the subset of vertices, as indicated by block 2644. The response value may be determined based on instructions or parameters encoded in the message used to determine the subset of vertices. For example, some embodiments may receive a message requesting a count of vertices associated with a certain label. Alternatively, or in addition, some embodiments may receive a message requesting a sum of values associated with the subset of vertices. Alternatively, or in addition, some embodiments may receive a message encoding a function to apply to values associated with the subset of vertices.

In some embodiments, the response value may be determined as a combination of scores corresponding to conditional statements associated with the subset of vertices. For example, some embodiments may determine a set of outstanding obligation conditions that a first entity must satisfy. Some embodiments may parse the conditional statements associated with each obligation norm vertex of a subset of vertices to determine a score change required to satisfy each obligation norm vertex and compute the sum of the scores. Similar operations may be performed to determine sums of scores associated with vertex outcomes, such as the sum of a set of scores associated with rights norm vertices. While the above describes computations based on sums of scores, some embodiments may compute other response values based on a set of scores, such as a measure of central tendency of a set of scores, a measure of variance of a set of scores, a maximum value of a set of scores, a minimum value of a set of scores, or the like.

Alternatively, or in addition, some embodiments may determine a response value based on events triggering the subset of vertices. Some embodiments may determine an event or a history of events corresponding to the activation or triggering of a set of vertices and use the event or history of events to determine a response value. For example, some embodiments may determine that a sequence of two events including a first event indicating the allocation of a first amount of memory from a first entity to a second entity and a second event indicating the allocation of a second amount of memory from the first entity to the second entity resulted in the triggering of a subset of vertices. Some embodiments may then compute a mean average between the two amounts of allocated memory and include the mean average in a response value. Alternatively, or in addition, some embodiments may determine a count of occurrence as a response value. For example, some embodiments may determine a total number of times that a graph portion matches a graph portion template across five directed graphs representing five concurrently operating smart contracts and include the total number of times in a response value. Alternatively, or in addition, some embodiments may include data associated with the vertices or events causing the activation or triggering of the vertices in a response value, where. For example, some embodiments may include timestamp data, location data, and a total elapsed time between the earliest activation of a vertex in a subset of vertices and the latest triggering of a vertex in the subset of vertices in a response value.

In some embodiments, a message may include instructions to update a record, a directed graph, a label, or other value stored in a persistent storage of the second computing device. For example, a message may include text formatted as a SQL command, such as "UPDATE graph_table SET column1=value1 WHERE EntityID=0035," which may cause some embodiments to update a database storing the directed graph or data associated with the directed graph by setting the "column1" values of records having an entityID of "0035" to be equal to "value1." While a SQL format is used as a part of the message, update instructions in various other formats may be included in a message to cause some embodiments to update data stored in the persistent storage. For example, a message may include a set of instructions in the form of a set of values, where some embodiments may parse the set of values into parameters for those instructions.

Some embodiments may determine an update confirmation value after updating a directed graph or another value associated with an application in the persistent storage. For example, some embodiments may generate a hash value based on the sets of vertices and edges of the directed graph or use as a first update confirmation value. Some embodiments may determine whether a second update confirmation value is received and satisfies a set of storage update criteria based on the first update confirmation value, where the satisfaction of the set of storage update criteria may include determining that the first and second update confirmation values are equal to each other. For example, some embodiments may receive a second update confirmation value equal to "4325" and compare this second update confirmation value to a first update confirmation value (which may be "4325" or may be a different value) to determine whether the second update confirmation value satisfies the first update confirmation value.

In some embodiments, the set of storage update criteria may use an elapsed time threshold within which an update confirmation value must be satisfied in order for an update to the persistent storage to be considered to be valid. For example, a message may cause a second computing device to update an instance of the directed graph to include an additional vertex. In response, the second computing device may determine a first update confirmation value based on the updated directed graph. The second computing device may use a set of storage update criteria that includes instructions for the second computing to wait 30 minutes before undoing the update unless the second computing device receives a second update confirmation value based on an update to program state for an application operating on a decentralized computing platform storing a serialized version of the directed graph. By updating a record in a persistent storage before a program state upon which the record is based is distributed across a network, some embodiments may reduce slowdowns caused by relatively slow data distribution and retrieval operations in a decentralized, tamper-evident data store. For example, an update to a database used to store a history of program state that caused by the message may require less than one minute to finish, where the update may reflect a program state change that would require 15 minutes to propagate through the nodes of a network operating a decentralized, tamper-evident data store and reach the persistent memory.

In some embodiments, operations of the process 2600 may include determining whether the message includes instructions to update program state for the symbolic AI application, as indicated by block 2650. In some embodiments, the message may include instructions to update program state of the application. For example, a message may include instructions to update a program state of an application executing on a decentralized computing platform by including instructions to set the status of a norm vertex labeled as an "obligation" as failed. If the message includes instructions to update program state of the application, operations of the process 2600 may proceed to block 2654. Otherwise, operations of the process 2600 may proceed to block 2660.

In some embodiments, operations of the process 2600 may include updating a directed graph stored in the second persistent storage of the second computing device, as indicated by block 2654. Updating the directed graph stored in the persistent storage may include changing an existing record stored in the persistent storage of the second computing device. For example, some embodiments may update a record storing an instance of a directed graph to replace an existing set of indices representing the vertices of a directed graph with a new set of indices representing the vertices of the directed graph. Alternatively, updating the directed graph stored in the persistent storage may include adding a new entry to a data structure stored in the persistent storage. For example, some embodiments may add a new record to a data structure that includes a new set of values representing a directed graph encoded in the update parameters of a message received by a hybrid computing system.

In some embodiments, operations of the process 2600 may include serializing and distributing the directed graph or other updates to the first computing device of the computing system, as indicated by block 2658. After updating a directed graph in the persistent storage of the second computing device, some embodiments may then use the distribution mechanisms of an application executing on a decentralized computing platform to update other computing devices used to execute the application. For example, some embodiments may serialize, using one or more serialization operations described above, the version of the directed graph updated by the message at a second computing device acting as a node of a node network and distribute the serialized version to other nodes of the node network from the second computing device.

In some embodiments, operations of the process 2600 may include sending the response value to a response destination, as indicated by block 2660. The response value may be sent from a computing device capable of accessing the second persistent memory storing the subsets of vertices. For example, a query response that includes the response value may be sent from the second private peer node computing device 2515 or another computing device of the hybrid network 2510. In some embodiments, the message may indicate that a known entity having a known destination port or address is the source of a message. For example, some embodiments may receive a message indicating that an entity identified as "x345" is the source of the message, where a list of entities and their associated properties may include a response destination for the entity identified as "x345," where the response destination may include an email address, a identifier for a profile of an online messaging service, a phone number, a identifier for an API, or the like. Alternatively, or in addition, the message may encode an explicit response destination to which the response value is sent. For example, the message may include a response destination in the form of an API address that causes some embodiments to send the response value to the API address.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X' ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The term "set" may indicate a single item or a plurality of items, e.g., "set of widgets" may indicate only one widget or may indicate multiple widgets. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A tangible, non-transitory, machine-readable medium storing instructions that, when executed by a computing system, effectuate operations comprising: obtaining, with a computing system, program state of a smart contract, wherein the program state encodes a directed graph, the directed graph comprising: a set of vertices, and a set of directed edges connecting respective pairs of vertices among the set of vertices, a wherein the program state includes a set of conditional statements and a set of entities; obtaining, with the computing system, a request encoding a set of conditional statement parameters corresponding to an amendment to the smart contract; determining, with the computing system, a first subset of vertices in the directed graph, wherein each respective vertex of the first subset causes a state change of the program state in response to a respective conditional statement associated with the respective vertex being satisfied; selecting, with the computing system, a second subset of the first subset based on the set of conditional statement parameters encoded in the request; determining, with the computing system, a set of selected entities based on the second subset; determining, with the computing system, whether a set of criteria associated with the set of selected entities is satisfied; updating, with the computing system, the set of conditional statement parameters based on the set of conditional statements in response to a determination that the set of criteria associated with the set of selected entities is satisfied; updating, with the computing system, the second subset based on the updated set of conditional statements; and storing, with the computing system, the program state in storage memory after updating the second subset.

2. The medium of embodiment 1, wherein: the vertices are norm vertices; the first subset is a set of active vertices; the second subset is a set of target vertices; the set of entities include parties to the smart contract; and updating the set of conditional statements comprises: determining an affected conditional statement based on the request, wherein the set of target vertices comprises a reference that is associated with the affected conditional statement; setting an indicator associated with the affected conditional statement to indicate that the affected conditional statement is deprecated; generating a new conditional statement based on the set of conditional statement parameters; and setting the reference to be associated with the new conditional statement.

3. The medium of any of embodiments 1-2, wherein: the directed graph of the program state is stored in persistent memory and comprises a first serialized array of vertices and a second serialized array of vertices; a target vertex of the set of target vertices is a vertex of the first serialized array of vertices and not a vertex of the second serialized array of vertices; and updating the set of target vertices comprises: deserializing the first serialized array of vertices to generate a first deserialized directed graph in a non-persistent memory, wherein the first serialized array of vertices comprises an identifier of the target vertex, and wherein the first deserialized directed graph comprises an adjacency matrix or an adjacency list, and wherein the second serialized array of vertices is not concurrently deserialized, and serializing the first deserialized directed graph in the non-persistent memory to determine an updated first serialized array of vertices, and storing the updated first serialized array of vertices in the persistent memory.

4. The medium of any of embodiments 1-3, wherein the request comprises an entity identifier, and wherein the operations further comprises adding the entity identifier to a set of entities associated with the program state.

5. The medium of any of embodiments 1-4, wherein: the request comprises a first entity identifier associated with a first entity; a first conditional statement of the set of conditional statements comprises a condition that a second entity allocate a resource to a third entity, wherein a second entity identifier is associated with the second entity; and the operations further comprises: determining an entity field used by the first conditional statement, wherein the entity field comprises the second entity identifier, and updating the entity field to comprise the first entity identifier.

6. The medium of any of embodiments 1-5, wherein updating the set of target vertices comprises deleting a first directed edge from the set of directed edges, wherein the first directed edge associates a target vertex of the set of target vertices with a second vertex of the directed graph.

7. The medium of any of embodiments 1-6, the operations further comprising: obtaining a set of confirmation messages from each entity of the set of selected entities, wherein the set of confirmation messages comprises a set of passkey values, and wherein each respective passkey value of the set of passkey values is associated with a respective entity of the set of selected entities; and wherein determining that the set of criteria associated with the set of selected entities is satisfied comprises determining that each respective passkey value of the set of passkey values matches with a respective stored passkey value of a set of stored passkey values.

8. The medium of any of embodiments 1-7, wherein the operations further comprise: determining a first graph structure based on the request, wherein the first graph structure comprises the set of directed edges and a set of logical categories associated with each vertex of the first graph structure; determining whether the first graph structure is identical to a second graph structure of the directed graph; and in response to a determination that the first graph structure is different from the second graph structure with respect to a number of vertices or number of edges, adding a new vertex to the set of vertices based on the request in persistent memory.

9. The medium of any of embodiments 1-8, further comprising: determining a simulated modified program state, wherein determining the simulated modified program state comprises updating a version of the set of conditional statements, and wherein the simulated modified program state comprises the version of the set of conditional statements; determining a set of simulated events, wherein the set of simulated events are determined occur in sequence based on an associated set of occurrence times; and determining a set of outcome program states based on the simulated modified program state and the set of simulated events.

10. The medium of any of embodiments 1-9, wherein the request is a first request of a plurality of requests, further comprising: determining a set of simulated events; determining a set of outcome scores, wherein determining the set of outcome scores comprises, for each respective request of the plurality of requests: determining a respective simulated program state, wherein determining the respective simulated program state comprises updating a version of the set of conditional statements of the program state, and wherein the respective simulated program state comprises the version of the set of conditional statements, determining a respective set of outcome program states based on the respective simulated program state and the set of simulated events, and determining a respective set of outcome scores based on the respective set of outcome program states, wherein the respective set of outcome scores are part of the set of outcome scores; and selecting the first request from the plurality of requests based on the set of outcome scores.

11. The medium of any of embodiments 1-10, wherein the request comprises data encoding a second directed graph, and wherein updating the set of target vertices comprises updating a target vertex of the set of target vertices based on the second directed graph, and wherein an event that triggers a condition of the target vertex causes a second vertex of the second directed graph be set as triggerable.

12. The medium of any of embodiments 1-11, wherein the request comprises an identifier associated with a second directed graph of a second smart contract program, and wherein a target vertex of the set of target vertices is associated with a first priority category value, and wherein the operations further comprise: updating a set of directed edges based on a edge associating the target vertex with a second vertex of the second directed graph; and assigning a second priority category value to the second vertex, wherein: the first priority category value is different from the second priority category value, a first event triggers both the target vertex and the second vertex, and the order by which the target vertex and the second vertex is triggered in response to the first event is determined based on the first priority category value and the second priority category value.

13. The medium of any of embodiments 1-12, wherein: a target vertex of the set of target vertices is associated with a first priority category value; the request comprises a second priority category value: and updating the target vertex comprises changing the first priority category value to the second priority category value.

14. The medium of any of embodiments 1-13, wherein the request is a first request, and wherein the operations further comprise: determining that a previous request failed to satisfy the set of criteria associated with the set of selected entities is satisfied; and determining the first request based on the previous request by modifying a conditional statement parameter encoded in the previous request.

15. The medium of any of embodiments 1-14, wherein the request comprises a set of entity identifiers; determining whether the set of criteria is satisfied comprises determining whether the set of entity identifiers comprises any entities of set of prohibited entities or entities of a set of prohibited entity types.

16. The medium of any of embodiments 1-15, the operations further comprising: obtaining a previous request; determining a simulated modified program state, wherein determining the simulated modified program state comprises updating a version of the set of conditional statements based on the previous request, and wherein the simulated modified program state comprises the version of the set of conditional statements; determining a simulated event; determining that the simulated event causes an allocation of a non-duplicable asset from a first entity to a second entity based on the simulated event and an allocation of the non-duplicable asset from the first entity to a third entity based on the simulated event; and generating a message indicating that the previous request may cause a contradiction in response to a determination that the simulated event causes the allocation of the non-duplicable asset from the first entity to the second entity and the third entity based on the simulated event.

17. The medium of any of embodiments 1-16, wherein determining whether the set of criteria associated with the set of selected entities is satisfied the operations further comprising: storing the set of criteria of the set of selected entities at a storage memory accessible to a first computing device of a distributed computing platform; determining whether the set of criteria associated with the set of selected entities is satisfied using the first computing device; and in response to a determination that the set of criteria associated with the set of selected entities is satisfied using the first computing device, modifying a version of the program state based on the request using a second computing device of the distributed computing platform.

18. The medium of any of embodiments 1-17, wherein: updating the set of conditional statements comprises adding a new conditional statement to the set of conditional statements, wherein the new conditional statement is indexed by a conditional statement identifier; and updating the set of target vertices comprises associating a target vertex of the set of target vertices with the conditional statement identifier.

19. The medium of any of embodiments 1-18, wherein the request comprises a first amount, the operations further comprise: determining whether a target vertex of the set of target vertices is associated with a conditional statement that was triggered by a past event, wherein an outcome of the conditional statement is associated with a transaction between a first entity and a second entity, and wherein the transaction is associated with a score equal to a second amount; determining a difference between the first amount and the second amount; and initiating a transaction between the first entity and the second entity based on the difference.

20. The medium of any of embodiments 1-19, the operations comprising steps for amending the smart contract while the smart contract is active.

21. The medium of any of embodiments 1-20, the operations comprising: steps for amending the smart contract in a manner that affects only a subset of parties to the smart contract.

22. A system comprising: one or more processors; and memory storing instructions that, when executed by at least one of the one or more processors, causes at least one of the one or more processors to effectuate any of the operations of embodiments 1-21.

23. A method to perform the operations of any of the embodiments 1 to 21.

What is claimed is:

1. A tangible, non-transitory, machine-readable medium storing instructions that, when executed by a computing system, effectuate operations comprising:
   obtaining, with a computing system, program state of a smart contract, wherein the program state encodes a directed graph, the directed graph comprising:
      a set of vertices, and
      a set of directed edges connecting respective pairs of vertices among the set of vertices,
      a wherein the program state includes a set of conditional statements and a set of entities;
   obtaining, with the computing system, a request encoding a set of conditional statement parameters corresponding to an amendment to the smart contract;
   determining, with the computing system, a first subset of vertices in the directed graph, wherein each respective vertex of the first subset causes a state change of the program state in response to a respective conditional statement associated with the respective vertex being satisfied;
   selecting, with the computing system, a second subset of the first subset based on the set of conditional statement parameters encoded in the request;
   determining, with the computing system, a set of selected entities based on the second subset;
   determining, with the computing system, whether a set of criteria associated with the set of selected entities is satisfied;
   updating, with the computing system, the set of conditional statement parameters based on the set of conditional statements in response to a determination that the set of criteria associated with the set of selected entities is satisfied;
   updating, with the computing system, the second subset based on the updated set of conditional statements; and
   storing, with the computing system, the program state in storage memory after updating the second subset.

2. The medium of claim 1, wherein:
the vertices are norm vertices;
the first subset is a set of active vertices;
the second subset is a set of target vertices;
the set of entities include parties to the smart contract; and
updating the set of conditional statements comprises:
   determining an affected conditional statement based on the request, wherein the set of target vertices comprises a reference that is associated with the affected conditional statement;
   setting an indicator associated with the affected conditional statement to indicate that the affected conditional statement is deprecated;
   generating a new conditional statement based on the set of conditional statement parameters; and
   setting the reference to be associated with the new conditional statement.

3. The medium of claim 1, wherein:
the directed graph of the program state is stored in persistent memory and comprises a first serialized array of vertices and a second serialized array of vertices;
a target vertex of a set of target vertices is a vertex of the first serialized array of vertices and not a vertex of the second serialized array of vertices; and
updating the set of target vertices comprises:
   deserializing the first serialized array of vertices to generate a first deserialized directed graph in a non-persistent memory, wherein the first serialized array of vertices comprises an identifier of the target vertex, and wherein the first deserialized directed graph comprises an adjacency matrix or an adjacency list, and wherein the second serialized array of vertices is not concurrently deserialized, and
   serializing the first deserialized directed graph in the non-persistent memory to determine an updated first serialized array of vertices, and
   storing the updated first serialized array of vertices in the persistent memory.

4. The medium of claim 1, wherein the request comprises an entity identifier, and wherein the operations further comprise adding the entity identifier to a set of entities associated with the program state.

5. The medium of claim 1, wherein:
the request comprises a first entity identifier associated with a first entity;
a first conditional statement of the set of conditional statements comprises a condition that a second entity allocate a resource to a third entity, wherein a second entity identifier is associated with the second entity; and
the operations further comprise:
   determining an entity field used by the first conditional statement, wherein the entity field comprises the second entity identifier, and
   updating the entity field to comprise the first entity identifier.

6. The medium of claim 1, wherein updating a set of target vertices comprises deleting a first directed edge from the set of directed edges, wherein the first directed edge associates a target vertex of the set of target vertices with a second vertex of the directed graph.

7. The medium of claim 1, the operations further comprising:
   obtaining a set of confirmation messages from each entity of the set of selected entities, wherein the set of confirmation messages comprises a set of passkey values, and wherein each respective passkey value of the set of passkey values is associated with a respective entity of the set of selected entities; and wherein determining that the set of criteria associated with the set of selected entities is satisfied comprises determining that each respective passkey value of the set of passkey values matches with a respective stored passkey value of a set of stored passkey values.

8. The medium of claim 1, wherein the operations further comprise:

determining a first graph structure based on the request, wherein the first graph structure comprises the set of directed edges and a set of logical categories associated with each vertex of the first graph structure;

determining whether the first graph structure is identical to a second graph structure of the directed graph; and in response to a determination that the first graph structure is different from the second graph structure with respect to a number of vertices or a number of edges, adding a new vertex to the set of vertices based on the request in persistent memory.

9. The medium of claim 1, further comprising:

determining a simulated modified program state, wherein determining the simulated modified program state comprises updating a version of the set of conditional statements, and wherein the simulated modified program state comprises the version of the set of conditional statements;

determining a set of simulated events, wherein the set of simulated events are determined to occur in sequence based on an associated set of occurrence times; and determining a set of outcome program states based on the simulated modified program state and the set of simulated events.

10. The medium of claim 1, wherein the request is a first request of a plurality of requests, further comprising:

determining a set of simulated events;

determining a set of outcome scores, wherein determining the set of outcome scores comprises, for each respective request of the plurality of requests:

determining a respective simulated program state, wherein determining the respective simulated program state comprises updating a version of the set of conditional statements of the program state, and wherein the respective simulated program state comprises the version of the set of conditional statements, determining a respective set of outcome program states based on the respective simulated program state and the set of simulated events, and determining a respective set of outcome scores based on the respective set of outcome program states, wherein the respective set of outcome scores are part of the set of outcome scores; and selecting the first request from the plurality of requests based on the set of outcome scores.

11. The medium of claim 1, wherein the request comprises data encoding a second directed graph, and wherein updating a set of target vertices comprises updating a target vertex of the set of target vertices based on the second directed graph, and wherein an event that triggers a condition of the target vertex causes a second vertex of the second directed graph be set as triggerable.

12. The medium of claim 1, wherein the request comprises an identifier associated with a second directed graph of a second smart contract program, and wherein a target vertex of a set of target vertices is associated with a first priority category value, and wherein the operations further comprise:

updating a set of directed edges based on an edge associating the target vertex with a second vertex of the second directed graph; and assigning a second priority category value to the second vertex, wherein:

the first priority category value is different from the second priority category value, a first event triggers both the target vertex and the second vertex, and the order by which the target vertex and the second vertex is triggered in response to the first event is determined based on the first priority category value and the second priority category value.

13. The medium of claim 1, wherein:

a target vertex of a set of target vertices is associated with a first priority category value;

the request comprises a second priority category value; and updating the target vertex comprises changing the first priority category value to the second priority category value.

14. The medium of claim 1, wherein the request is a first request, and wherein the operations further comprise:

determining that a previous request failed to satisfy the set of criteria associated with the set of selected entities; and determining the first request based on the previous request by modifying a conditional statement parameter encoded in the previous request.

15. The medium of claim 1, wherein:

the request comprises a set of entity identifiers;

determining whether the set of criteria is satisfied comprises determining whether the set of entity identifiers comprises any entities of a set of prohibited entities or entities of a set of prohibited entity types.

16. The medium of claim 1, the operations further comprising:

obtaining a previous request;

determining a simulated modified program state, wherein determining the simulated modified program state comprises updating a version of the set of conditional statements based on the previous request, and wherein the simulated modified program state comprises the version of the set of conditional statements;

determining a simulated event;

determining that the simulated event causes an allocation of a non-duplicable asset from a first entity to a second entity based on the simulated event and an allocation of the non-duplicable asset from the first entity to a third entity based on the simulated event; and generating a message indicating that the previous request may cause a contradiction in response to a determination that the simulated event causes the allocation of the non-duplicable asset from the first entity to the second entity and the third entity based on the simulated event.

17. The medium of claim 1, wherein determining whether the set of criteria associated with the set of selected entities is satisfied, the operations further comprising:

storing the set of criteria of the set of selected entities at a storage memory accessible to a first computing device of a distributed computing platform;

determining whether the set of criteria associated with the set of selected entities is satisfied using the first computing device; and in response to a determination that the set of criteria associated with the set of selected entities is satisfied using the first computing device, modifying a version of the program state based on the request using a second computing device of the distributed computing platform.

18. The medium of claim 1, wherein:
updating the set of conditional statements comprises adding a new conditional statement to the set of conditional statements, wherein the new conditional statement is indexed by a conditional statement identifier; and
updating a set of target vertices comprises associating a target vertex of the set of target vertices with the conditional statement identifier.

19. The medium of claim 1, wherein the request comprises a first amount, the operations further comprising:
determining whether a target vertex of a set of target vertices is associated with a conditional statement that was triggered by a past event, wherein an outcome of the conditional statement is associated with a transaction between a first entity and a second entity, and wherein the transaction is associated with a score equal to a second amount;
determining a difference between the first amount and the second amount; and initiating a transaction between the first entity and the second entity based on the difference.

20. The medium of claim 1, the operations comprising:
steps for amending the smart contract while the smart contract is active.

21. The medium of claim 1, the operations comprising:
steps for amending the smart contract in a manner that affects only a subset of parties to the smart contract.

22. A method comprising:
obtaining, with a computing system, program state of a smart contract, wherein the program state encodes a directed graph, the directed graph comprising:
a set of vertices, and
a set of directed edges connecting respective pairs of vertices among the set of vertices,
a wherein the program state includes a set of conditional statements and a set of entities;
obtaining, with the computing system, a request encoding a set of conditional statement parameters corresponding to an amendment to the smart contract;
determining, with the computing system, a first subset of vertices in the directed graph, wherein each respective vertex of the first subset causes a state change of the program state in response to a respective conditional statement associated with the respective vertex being satisfied;
selecting, with the computing system, a second subset of the first subset based on the set of conditional statement parameters encoded in the request;
determining, with the computing system, a set of selected entities based on the second subset;
determining, with the computing system, whether a set of criteria associated with the set of selected entities is satisfied;
updating, with the computing system, the set of conditional statement parameters based on the set of conditional statements in response to a determination that the set of criteria associated with the set of selected entities is satisfied;
updating, with the computing system, the second subset based on the updated set of conditional statements; and
storing, with the computing system, the program state in storage memory after updating the second subset.

* * * * *